United States Patent
Hayakawa et al.

(10) Patent No.: US 8,346,034 B2
(45) Date of Patent: Jan. 1, 2013

(54) OPTICAL SELECTOR SWITCH AND SIGNAL-PROCESSING APPARATUS

(75) Inventors: Ken Hayakawa, Kanagawa (JP); Kazuo Haraoka, Tokyo (JP); Masaaki Hattori, Chiba (JP); Naoki Kaneko, Kanagawa (JP); Tetsujiro Kondo, Tokyo (JP); Hidehiko Sekizawa, Tokyo (JP); Nozomu Ozaki, Kanagawa (JP); Seiji Wada, Kanagawa (JP); Toshiyuki Sekiya, Tokyo (JP); Shinji Sangawa, Tokyo (JP)

(73) Assignee: Sony Corporation, Tokyo (JP)

( * ) Notice: Subject to any disclaimer, the term of this patent is extended or adjusted under 35 U.S.C. 154(b) by 351 days.

(21) Appl. No.: 12/601,844

(22) PCT Filed: May 27, 2008

(86) PCT No.: PCT/JP2008/059752
§ 371 (c)(1),
(2), (4) Date: Nov. 25, 2009

(87) PCT Pub. No.: WO2008/149734
PCT Pub. Date: Dec. 11, 2008

(65) Prior Publication Data
US 2010/0172613 A1    Jul. 8, 2010

(30) Foreign Application Priority Data

May 31, 2007  (JP) ................. 2007-145702
Apr. 15, 2008 (JP) ................. 2008-106178

(51) Int. Cl.
*G02B 6/26* (2006.01)
*G02B 6/42* (2006.01)

(52) U.S. Cl. ............... 385/18; 385/10; 385/31; 385/37; 385/146

(58) Field of Classification Search ............ 385/10, 385/18, 27, 30, 31, 37, 129–132, 146
See application file for complete search history.

(56) References Cited

U.S. PATENT DOCUMENTS

| | | | | |
|---|---|---|---|---|
| 4,139,259 A * | 2/1979 | Kersten et al. | ............. | 385/46 |
| 4,733,929 A * | 3/1988 | Brown | ............. | 385/31 |
| 5,106,181 A * | 4/1992 | Rockwell, III | ............. | 385/2 |
| 5,268,973 A * | 12/1993 | Jenevein | ............. | 385/14 |
| 5,274,720 A * | 12/1993 | Yamamoto | ............. | 385/129 |
| 5,327,276 A | 7/1994 | Shimosaka et al. | | |
| 5,536,265 A * | 7/1996 | van den Bergh et al. | ......... | 606/2 |

(Continued)

FOREIGN PATENT DOCUMENTS

JP      57 194645      11/1982
(Continued)

*Primary Examiner* — Daniel Petkovsek
(74) *Attorney, Agent, or Firm* — Oblon, Spivak, McClelland, Maier & Neustadt, L.L.P.

(57) ABSTRACT

An optical selector includes: an optical waveguide which includes a first light guide section having a first refractive index, a second light guide section having a second refractive index provided to the side of and along the entire circumference of the first light guide section, and a reflector provided at opposing positions on both surfaces of each of the first and second light guide sections while exposing the outer circumferential surface of the second light guide section; a single or plurality of LDs that are placed on the outer circumference of the optical waveguide, and emit light toward the first light guide section; and a single or plurality of photodetectors that are placed on the outer circumference of the optical waveguide, and receive light emitted from the outer circumference of the optical waveguide.

11 Claims, 56 Drawing Sheets

U.S. PATENT DOCUMENTS

| | | | |
|---|---|---|---|
| 5,542,017 A * | 7/1996 | Koike | 385/123 |
| 5,739,934 A | 4/1998 | Nomura et al. | |
| 5,822,475 A | 10/1998 | Hirota et al. | |
| 6,091,527 A | 7/2000 | Brisse et al. | |
| 6,628,441 B1 | 9/2003 | Staiger | |
| 6,697,542 B2 * | 2/2004 | Platzman et al. | 385/5 |
| 6,893,432 B2 * | 5/2005 | Intintoli et al. | 606/2 |
| 6,970,620 B2 * | 11/2005 | Ziegenhagen et al. | 385/31 |
| 7,020,361 B2 * | 3/2006 | Thiele et al. | 385/31 |
| 7,025,482 B2 * | 4/2006 | Yamashita et al. | 362/511 |
| 7,120,325 B1 | 10/2006 | Uchida | |
| 7,136,543 B2 * | 11/2006 | Nishiyama et al. | 385/14 |
| 7,263,251 B2 * | 8/2007 | Shirane et al. | 385/16 |
| 7,542,488 B2 * | 6/2009 | Schlueter et al. | 372/6 |
| 2002/0126460 A1 | 9/2002 | Heismann et al. | |
| 2004/0131307 A1 | 7/2004 | Nagahata et al. | |
| 2005/0265684 A1 * | 12/2005 | Nemoto et al. | 385/146 |

FOREIGN PATENT DOCUMENTS

| | | | |
|---|---|---|---|
| JP | 61 120109 | 6/1986 | |
| JP | 62 32421 | 2/1987 | |
| JP | 63 73218 | 4/1988 | |
| JP | 01010202 A * | 1/1989 | 385/901 |
| JP | 02153326 A * | 6/1990 | 385/16 |
| JP | 4 104694 | 4/1992 | |
| JP | 4 355526 | 12/1992 | |
| JP | 5 45606 | 2/1993 | |
| JP | 5 114909 | 5/1993 | |
| JP | 8 86976 | 4/1996 | |
| JP | 8 316981 | 11/1996 | |
| JP | 9 51325 | 2/1997 | |
| JP | 9 200122 | 7/1997 | |
| JP | 9 214468 | 8/1997 | |
| JP | 9 270753 | 10/1997 | |
| JP | 10 32545 | 2/1998 | |
| JP | 10 123350 | 5/1998 | |
| JP | 10 197764 | 7/1998 | |
| JP | 11 17721 | 1/1999 | |
| JP | 11 202141 | 7/1999 | |
| JP | 11 287961 | 10/1999 | |
| JP | 2000 9959 | 1/2000 | |
| JP | 2000 19434 | 1/2000 | |
| JP | 2000 111763 | 4/2000 | |
| JP | 2000 115214 | 4/2000 | |
| JP | 2001 4934 | 1/2001 | |
| JP | 2001 36142 | 2/2001 | |
| JP | 2001 174725 | 6/2001 | |
| JP | 2002 277770 | 9/2002 | |
| JP | 2002 287044 | 10/2002 | |
| JP | 2003 4964 | 1/2003 | |
| JP | 2003 149569 | 5/2003 | |
| JP | 2004 61799 | 2/2004 | |
| JP | 2004 112235 | 4/2004 | |

* cited by examiner

FIG. 16

| COLOR | REFLECTANCE (%) | | |
|---|---|---|---|
| | BRIGHT | AVERAGE | DARK |
| YELLOW | 70 | 50 | 30 |
| BEIGE | 65 | 45 | 25 |
| BROWN | 50 | 25 | 8 |
| RED | 35 | 20 | 10 |
| GREEN | 60 | 30 | 12 |
| BLUE | 50 | 20 | 5 |
| GRAY | 60 | 35 | 20 |
| WHITE | 80 | 70 | — |
| BLACK | — | 4 | — |

FIG. 17

| MATERIAL | | REFLECTANCE (%) |
|---|---|---|
| SPECULAR REFLECTING MATERIAL | SILVER SURFACE | 93 |
| | ELECTROPOLISHED ALUMINUM SURFACE | 90 TO 95 |
| | GLASS MIRROR SURFACE (ALUMINUM ALLOY) | 80 TO 85 |
| SCATTERING MATERIAL | PAPERS | |
| | WHITE PAPER: HOSHO PAPER | 85 TO 91 |
| | WHITE PAPER: BLOTTING PAPER, KENT PAPER, TORINOKO PAPER | 70 TO 80 |
| | WHITE ART PAPER | 60 TO 65 |
| | CRUDE WHITE PAPER (SHOJI PAPER) | 30 TO 50 |
| | TRACING PAPER | 20 TO 25 |
| | CLOTHES | |
| | WHITE CLOTH: FLANNEL, FUJI SILK | 60 TO 70 |
| | WHITE CLOTH: COTTON, HEMP | 40 TO 70 |
| | STONES | |
| | WHITE COLORED TILE | 70 TO 80 |
| | LIGHT COLORED TILE | 50 TO 70 |
| | WHITE COLORED MARBLE | 50 TO 60 |
| | LIGHT COLORED ARTIFICIAL STONE | 30 TO 50 |

HOSHO PAPER: THICK PAPER MADE FROM PAPER MULBERRY (Broussonetia kazinoki × B. papyrifera) AS MAIN RAW MATERIAL
TORINOKO PAPER: JAPANESE PAPER MADE FROM GANPI (Diplomorpha sikokiana) OR THE LIKE AS MAIN RAW MATERIAL
FUJI SILK: PLAIN WEAVE SILK FABRIC USING SPUN SILK

FIG. 18A

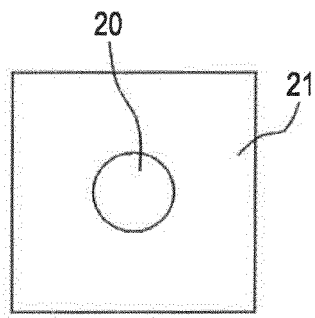

FIG. 22
| LD No. | WAVELENGTH (nm) | LD DRIVE VOLTAGE (mV) | APD OUTPUT LEVEL | COMBINATION REPRESENTED BY LD [5, 0] | | | | | |
|---|---|---|---|---|---|---|---|---|---|
| | | | | 6'd000 | 6d'001 | 6d'002 | 6d'003 | ... | 6d'3FF |
| LD00 | 730 | 720 | 509 | 0 | 1 | 0 | 1 | ... | 1 |
| LD01 | 760 | 720 | 521 | 0 | 0 | 1 | 1 | ... | 1 |
| LD02 | 790 | 720 | 523 | 0 | 0 | 0 | 0 | ... | 1 |
| LD03 | 820 | 720 | 541 | 0 | 0 | 0 | 0 | ... | 1 |
| LD04 | 850 | 720 | 547 | 0 | 0 | 0 | 0 | ... | 1 |
| LD05 | 880 | 720 | 557 | 0 | 0 | 0 | 0 | ... | 1 |
| APD OUTPUT LEVEL SUM VALUE | | | | 0 | 509 | 521 | 1030 | ... | 3198 |
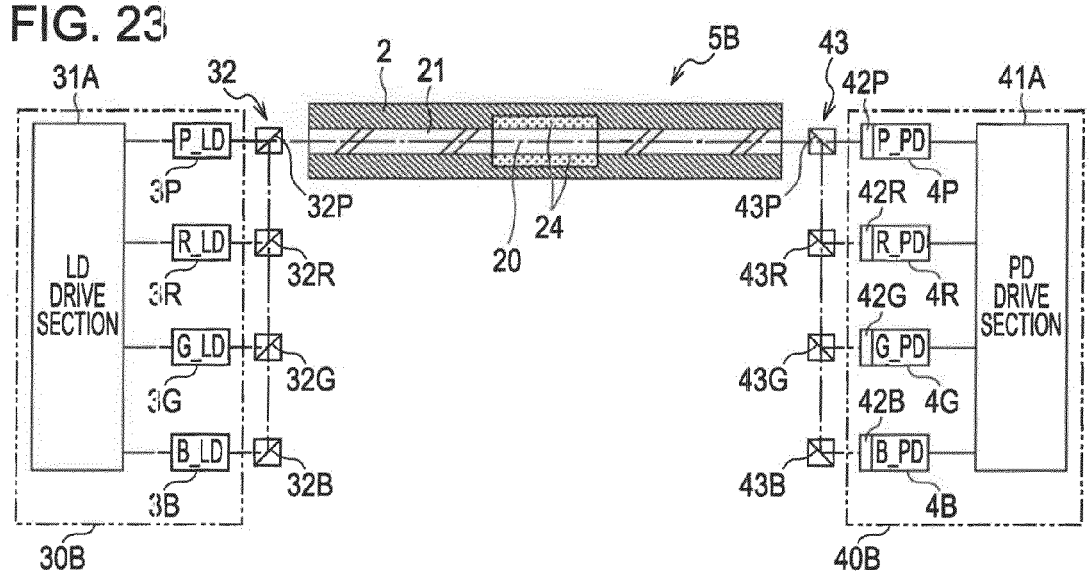
FIG. 23
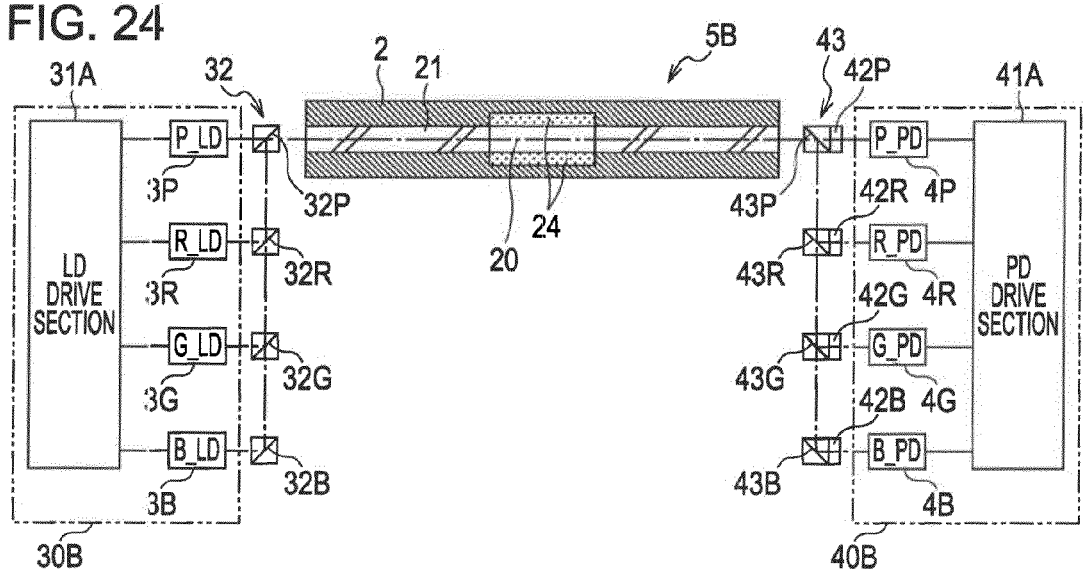
FIG. 24

FIG. 29

| WAVEGUIDE NO | FUNCTIONAL BOARD | | | | |
|---|---|---|---|---|---|
| | CONTROL | SIGNAL PROCESSING | SIGNAL PROCESSING | SIGNAL PROCESSING | SIGNAL PROCESSING |
| | X | A | B | C | D |
| 00 | TX | RX | | | |
| 01 | | TX | RX | | |
| 02 | | | TX | RX | |
| 03 | | | | TX | RX |
| 04 | RX | | | | TX |

FIG. 30

| WAVEGUIDE NO | FUNCTIONAL BOARD | | | | |
|---|---|---|---|---|---|
| | CONTROL | SIGNAL PROCESSING | SIGNAL PROCESSING | SIGNAL PROCESSING | SIGNAL PROCESSING |
| | X | A | B | C | D |
| 00 | TX | $RX_1$ | $RX_1$ | $RX_1$ | $RX_1$ |
| 01 | | TX | $RX_2$ | | |
| 02 | | | TX | $RX_2$ | |
| 03 | $RX_2$ | | | TX | $RX_2$ |
| 04 | $RX_1$ | $RX_2$ | | | TX |

FIG. 31

| | | FUNCTIONAL BOARD | | | | |
|---|---|---|---|---|---|---|
| | | CONTROL | SIGNAL PROCESSING | SIGNAL PROCESSING | SIGNAL PROCESSING | SIGNAL PROCESSING |
| | | X | A | B | C | D |
| WAVEGUIDE NO | 00 | TX$_{RGBP}$ | RX$_R$ | RX$_G$ | RX$_B$ | RX$_P$ |
| | 01 | | TX | RX$_2$ | | |
| | 02 | | | TX | RX$_2$ | |
| | 03 | RX$_2$ | | | TX | RX$_2$ |
| | 04 | RX$_1$ | RX$_2$ | | | TX |

FIG. 32

| | | FUNCTIONAL BOARD | | | | | | | | |
|---|---|---|---|---|---|---|---|---|---|---|
| | | CONTROL | SIGNAL PROCESSING | SIGNAL PROCESSING | SIGNAL PROCESSING | SIGNAL PROCESSING | SIGNAL PROCESSING | SIGNAL PROCESSING | SIGNAL PROCESSING | SIGNAL PROCESSING |
| | | X | A | B | C | D | E | F | G | H |
| WAVEGUIDE NO | 00 | TX$_{RGBP}$ | RX$_R$ | RX$_G$ | RX$_B$ | RX$_P$ | | | | |
| | 01 | TX$_{RGBP}$ | | | | | RX$_R$ | RX$_G$ | RX$_B$ | RX$_P$ |

FIG. 33

| FUNCTIONAL BOARD | | | | | | | | | |
|---|---|---|---|---|---|---|---|---|---|
| | CONTROL | SIGNAL PROCESSING | SIGNAL PROCESSING | SIGNAL PROCESSING | SIGNAL PROCESSING | SIGNAL PROCESSING | SIGNAL PROCESSING | SIGNAL PROCESSING | SIGNAL PROCESSING |
| | X | A | B | C | D | E | F | G | H |
| WAVEGUIDE NO 00 | $RX_{RGBP}$ | $TX_R$ | $TX_G$ | $TX_B$ | $TX_P$ | | | | |
| WAVEGUIDE NO 01 | $RX_{RGBP}$ | | | | | $TX_R$ | $TX_G$ | $TX_B$ | $TX_P$ |

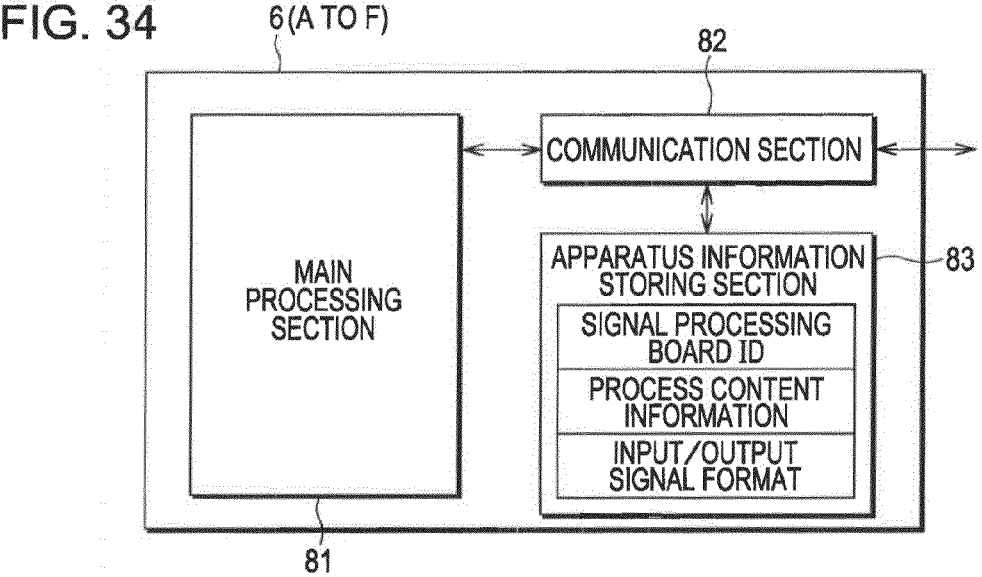

| PROCESS CONTENT | PROCESS ID | DESCRIPTION |
|---|---|---|
| EXTERNAL SIGNAL INPUT (a) | 00010 | INPUT SIGNAL FROM EXTERNAL (ANALOG) |
| EXTERNAL SIGNAL INPUT (b) | 00011 | INPUT SIGNAL FROM EXTERNAL (DIGITAL) |
| EXTERNAL SIGNAL OUTPUT (a) | 00020 | OUTPUT SIGNAL TO EXTERNAL (DIGITAL) |
| RESOLUTION CREATION (a) | 00030 | CREATE RESOLUTION |
| NOISE REMOVAL (a) | 00040 | REMOVE TRANSMISSION PATH NOISE |
| NOISE REMOVAL (b) | 00041 | REMOVE ENCODING NOISE |

| SIGNAL FORMAT | DIRECTION | SIGNAL FORMAT ID | CORRESPONDING PROCESS ID |
|---|---|---|---|
| 525i (60I) | INPUT | 00010 | 00010 |
| 525i (60I) | OUTPUT | 00011 | 00011 |
| 625i (50I) | INPUT | 00020 | 00010 |
| 525p (60P) | INPUT | 00030 | 00030 |
| 720p (60P) | INPUT | 00040 | 00040 |

FIG. 39

| SIGNAL PROCESSING BOARD | SIGNAL PROCESSING BOARD ID |
|---|---|
| APPARATUS A | 00010 |
| APPARATUS B | 00020 |
| APPARATUS C | 00030 |
| APPARATUS D | 00040 |

FIG. 40

| SIGNAL PROCESSING BOARD | INPUT APPARATUS | INPUT SIGNAL FORMATION | PROCESS CONTENT | OUTPUT APPARATUS | OUTPUT SIGNAL FORMATION |
|---|---|---|---|---|---|
| APPARATUS A | — | 525i (60I) | EXTERNAL SIGNAL INPUT (a) | — | 525i (60I) |
| APPARATUS A | — | 525p (60P) | EXTERNAL SIGNAL INPUT (a) | — | 525p (60P) |
| APPARATUS A | — | 1125i (60I) | EXTERNAL SIGNAL INPUT (a) | — | 1125i (60I) |
| APPARATUS B | — | 525i (60I) | NOISE REMOVAL (a) | — | 525i (60I) |
| APPARATUS B | — | 525p (60P) | NOISE REMOVAL (a) | — | 525p (60P) |
| APPARATUS C | — | 525i (60I) | RESOLUTION CREATION (a) | — | 720p (60P) |
| APPARATUS C | — | 525i (60I) | RESOLUTION CREATION (a) | — | 1125i (60I) |
| APPARATUS D | — | 525i (60I) | EXTERNAL SIGNAL OUTPUT (a) | — | 525i (60I) |
| APPARATUS D | — | 525p (60P) | EXTERNAL SIGNAL OUTPUT (a) | — | 525p (60P) |
| APPARATUS D | — | 720p (60P) | EXTERNAL SIGNAL OUTPUT (a) | — | 720p (60P) |

FIG. 41

| SIGNAL PROCESSING BOARD | INPUT APPARATUS | INPUT SIGNAL FORMATION | PROCESS CONTENT | OUTPUT APPARATUS | OUTPUT SIGNAL FORMATION |
|---|---|---|---|---|---|
| APPARATUS A | — | 525i (60I) | EXTERNAL SIGNAL INPUT (a) | APPARATUS B | 525i (60I) |
| APPARATUS A | — | 525p (60P) | EXTERNAL SIGNAL INPUT (a) | APPARATUS B | 525p (60P) |
| APPARATUS A | — | 525i (60I) | EXTERNAL SIGNAL INPUT (a) | APPARATUS C | 525i (60I) |
| APPARATUS B | — | 525i (60I) | EXTERNAL SIGNAL INPUT (a) | APPARATUS D | 525i (60I) |
| APPARATUS B | — | 525p (60P) | EXTERNAL SIGNAL INPUT (a) | APPARATUS D | 525p (60P) |
| APPARATUS B | APPARATUS A | 525i (60I) | NOISE REMOVAL (a) | — | 525i (60I) |
| APPARATUS B | APPARATUS A | 525p (60P) | NOISE REMOVAL (a) | — | 525p (60P) |
| APPARATUS C | APPARATUS A | 525i (60I) | RESOLUTION CREATION (a) | — | 720p (60P) |
| APPARATUS C | APPARATUS A | 525i (60I) | RESOLUTION CREATION (a) | — | 1125i (60I) |
| APPARATUS D | APPARATUS A | 525i (60I) | RESOLUTION CREATION (a) | — | 525i (60I) |
| APPARATUS D | APPARATUS A | 525p (60P) | EXTERNAL SIGNAL OUTPUT (a) | — | 525p (60P) |

FIG. 42

| SIGNAL PROCESSING BOARD | INPUT APPARATUS | INPUT SIGNAL FORMATION | PROCESS CONTENT | OUTPUT APPARATUS | OUTPUT SIGNAL FORMATION |
|---|---|---|---|---|---|
| APPARATUS A | — | 525i (60I) | EXTERNAL SIGNAL INPUT (a) | APPARATUS B | 525i (60I) |
| APPARATUS A | — | 525p (60P) | EXTERNAL SIGNAL INPUT (a) | APPARATUS B | 525p (60P) |
| APPARATUS A | — | 525i (60I) | EXTERNAL SIGNAL INPUT (a) | APPARATUS C | 525i (60I) |
| APPARATUS A | — | 525i (60I) | EXTERNAL SIGNAL INPUT (a) | APPARATUS D | 525i (60I) |
| APPARATUS A | — | 525p (60P) | EXTERNAL SIGNAL INPUT (a) | APPARATUS D | 525p (60P) |
| APPARATUS B | APPARATUS A | 525i (60I) | NOISE REMOVAL (a) | APPARATUS C | 525i (60I) |
| APPARATUS B | APPARATUS A | 525i (60I) | NOISE REMOVAL (a) | APPARATUS D | 525i (60I) |
| APPARATUS B | APPARATUS A | 525p (60P) | NOISE REMOVAL (a) | APPARATUS D | 525p (60P) |
| APPARATUS C | APPARATUS A | 525i (60I) | RESOLUTION CREATION (a) | — | 720p (60P) |
| APPARATUS C | APPARATUS A | 525i (60I) | RESOLUTION CREATION (a) | — | 1125i (60I) |
| APPARATUS C | APPARATUS B | 525i (60I) | RESOLUTION CREATION (a) | — | 720p (60P) |
| APPARATUS C | APPARATUS B | 525i (60I) | RESOLUTION CREATION (a) | — | 1125i (60I) |
| APPARATUS D | APPARATUS A | 525i (60I) | EXTERNAL SIGNAL OUTPUT (a) | — | 525i (60I) |
| APPARATUS D | APPARATUS A | 525p (60P) | EXTERNAL SIGNAL OUTPUT (a) | — | 525p (60P) |
| APPARATUS D | APPARATUS B | 525i (60I) | EXTERNAL SIGNAL OUTPUT (a) | — | 525i (60I) |
| APPARATUS D | APPARATUS B | 525p (60P) | EXTERNAL SIGNAL OUTPUT (a) | — | 525p (60P) |

FIG. 43

| SIGNAL PROCESSING BOARD | INPUT APPARATUS | INPUT SIGNAL FORMATION | PROCESS CONTENT | OUTPUT APPARATUS | OUTPUT SIGNAL FORMATION |
|---|---|---|---|---|---|
| APPARATUS A | — | 525i (60I) | EXTERNAL SIGNAL INPUT (a) | APPARATUS B | 525i (60I) |
| APPARATUS A | — | 525p (60P) | EXTERNAL SIGNAL INPUT (a) | APPARATUS B | 525p (60P) |
| APPARATUS A | — | 525i (60I) | EXTERNAL SIGNAL INPUT (a) | APPARATUS C | 525i (60I) |
| APPARATUS A | — | 525i (60I) | EXTERNAL SIGNAL INPUT (a) | APPARATUS D | 525i (60I) |
| APPARATUS A | — | 525p (60P) | EXTERNAL SIGNAL INPUT (a) | APPARATUS D | 525p (60P) |
| APPARATUS B | APPARATUS A | 525i (60I) | NOISE REMOVAL (a) | APPARATUS C | 525i (60I) |
| APPARATUS B | APPARATUS A | 525i (60I) | NOISE REMOVAL (a) | APPARATUS D | 525i (60I) |
| APPARATUS B | APPARATUS A | 525p (60P) | NOISE REMOVAL (a) | APPARATUS D | 525p (60P) |
| APPARATUS C | APPARATUS A | 525i (60I) | RESOLUTION CREATION (a) | APPARATUS D | 720p (60P) |
| APPARATUS C | APPARATUS A | 525i (60I) | RESOLUTION CREATION (a) | — | 1125i (60I) |
| APPARATUS C | APPARATUS B | 525i (60I) | RESOLUTION CREATION (a) | APPARATUS D | 720p (60P) |
| APPARATUS C | APPARATUS B | 525i (60I) | RESOLUTION CREATION (a) | — | 1125i (60I) |
| APPARATUS D | APPARATUS A | 525i (60I) | EXTERNAL SIGNAL OUTPUT (a) | — | 525i (60I) |
| APPARATUS D | APPARATUS A | 525p (60P) | EXTERNAL SIGNAL OUTPUT (a) | — | 525p (60P) |
| APPARATUS D | APPARATUS B | 525i (60I) | EXTERNAL SIGNAL OUTPUT (a) | — | 525i (60I) |
| APPARATUS D | APPARATUS B | 525p (60P) | EXTERNAL SIGNAL OUTPUT (a) | — | 525p (60P) |
| APPARATUS D | APPARATUS C | 720p (60P) | EXTERNAL SIGNAL OUTPUT (a) | — | 720p (60P) |

FIG. 44

| SIGNAL PROCESSING BOARD | INPUT APPARATUS | INPUT SIGNAL FORMATION | PROCESS CONTENT | OUTPUT APPARATUS | OUTPUT SIGNAL FORMATION |
|---|---|---|---|---|---|
| APPARATUS A | — | 525i (60I) | EXTERNAL SIGNAL INPUT (a) | APPARATUS B | 525i (60I) |
| APPARATUS A | — | 525p (60P) | EXTERNAL SIGNAL INPUT (a) | APPARATUS B | 525p (60P) |
| APPARATUS A | — | 525i (60I) | EXTERNAL SIGNAL INPUT (a) | APPARATUS C | 525i (60I) |
| APPARATUS A | — | 525i (60I) | EXTERNAL SIGNAL INPUT (a) | APPARATUS D | 525i (60I) |
| APPARATUS A | — | 525p (60P) | EXTERNAL SIGNAL INPUT (a) | APPARATUS D | 525p (60P) |
| APPARATUS B | APPARATUS A | 525i (60I) | NOISE REMOVAL (a) | APPARATUS C | 525i (60I) |
| APPARATUS B | APPARATUS A | 525i (60I) | NOISE REMOVAL (a) | APPARATUS D | 525i (60I) |
| APPARATUS B | APPARATUS A | 525p (60P) | NOISE REMOVAL (a) | APPARATUS D | 525p (60P) |
| APPARATUS C | APPARATUS A | 525i (60I) | RESOLUTION CREATION (a) | APPARATUS D | 720p (60P) |
| APPARATUS C | APPARATUS B | 525i (60I) | RESOLUTION CREATION (a) | APPARATUS D | 720p (60P) |
| APPARATUS D | APPARATUS A | 525i (60I) | EXTERNAL SIGNAL OUTPUT (a) | — | 525i (60I) |
| APPARATUS D | APPARATUS A | 525p (60P) | EXTERNAL SIGNAL OUTPUT (a) | — | 525p (60P) |
| APPARATUS D | APPARATUS B | 525i (60I) | EXTERNAL SIGNAL OUTPUT (a) | — | 525i (60I) |
| APPARATUS D | APPARATUS B | 525p (60P) | EXTERNAL SIGNAL OUTPUT (a) | — | 525p (60P) |
| APPARATUS D | APPARATUS C | 720p (60P) | EXTERNAL SIGNAL OUTPUT (a) | — | 720p (60P) |

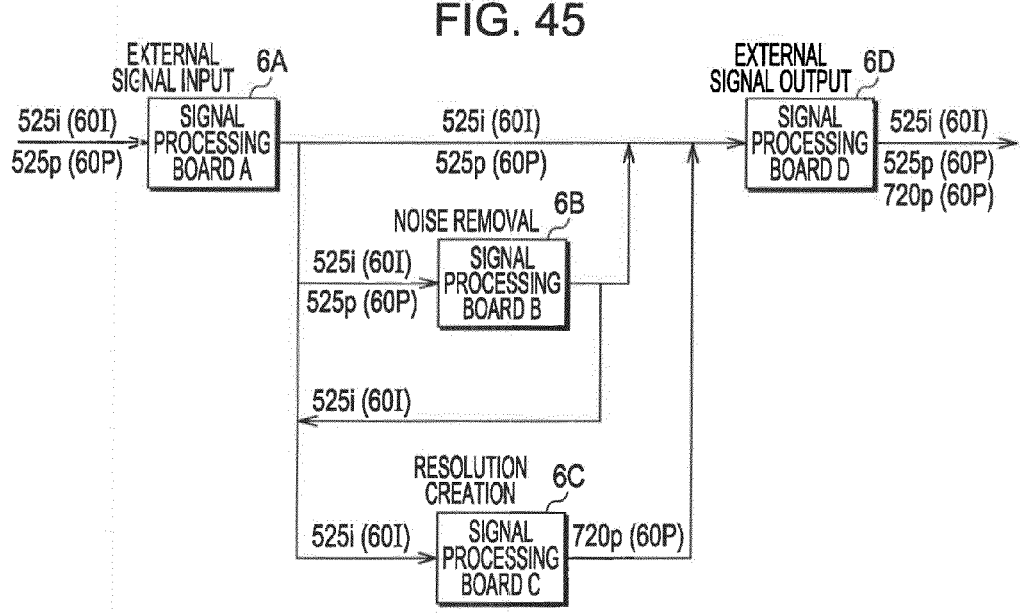

| WAVEGUIDE NO | FUNCTIONAL BOARD | | | | |
|---|---|---|---|---|---|
| | CONTROL | EXTERNAL SIGNAL INPUT | NOISE REMOVAL | RESOLUTION CREATION | EXTERNAL SIGNAL OUTPUT |
| | X | A | B | C | D |
| 00 | | TX | | | RX |
| 01 | | | | | |
| 02 | | | | | |
| 03 | | | | | |
| 04 | | | | | |

FIG. 51 A→B→D

| WAVEGUIDE NO | FUNCTIONAL BOARD | | | | |
|---|---|---|---|---|---|
| | CONTROL | EXTERNAL SIGNAL INPUT | NOISE REMOVAL | RESOLUTION CREATION | EXTERNAL SIGNAL OUTPUT |
| | X | A | B | C | D |
| 00 | | TX | RX | | |
| 01 | | | TX | | RX |
| 02 | | | | | |
| 03 | | | | | |
| 04 | | | | | |

| | | FUNCTIONAL BOARD | | | |
|---|---|---|---|---|---|
| | | CONTROL | EXTERNAL SIGNAL INPUT | NOISE REMOVAL | RESOLUTION CREATION | EXTERNAL SIGNAL OUTPUT |
| | | X | A | B | C | D |
| WAVEGUIDE NO | 00 | | TX | | RX | |
| | 01 | | | | TX | RX |
| | 02 | | | | | |
| | 03 | | | | | |
| | 04 | | | | | |

| | | FUNCTIONAL BOARD | | | |
|---|---|---|---|---|---|
| | | CONTROL | EXTERNAL SIGNAL INPUT | NOISE REMOVAL | RESOLUTION CREATION | EXTERNAL SIGNAL OUTPUT |
| | | X | A | B | C | D |
| WAVEGUIDE NO | 00 | | TX | RX | | |
| | 01 | | | TX | RX | |
| | 02 | | | | TX | RX |
| | 03 | | | | | |
| | 04 | | | | | |

FIG. 56

1. RESOLUTION CREATION AFTER NOISE REMOVAL
   (APPARATUS A + APPARATUS B + APPARATUS C + APPARATUS D = 5)
   $\phantom{(APPARATUS A +} 0 \phantom{APPARATUS B +} 3 \phantom{APPARATUS C +} 2 \phantom{APPARATUS D} 0$
2. AFTER NOISE REMOVAL (APPARATUS A + APPARATUS B + APPARATUS D = 3)
   $\phantom{AFTER NOISE REMOVAL (APPARATUS A} 0 \phantom{APPARATUS B} 3 \phantom{APPARATUS D} 0$
3. RESOLUTION CREATION (APPARATUS A + APPARATUS C + APPARATUS D = 2)
   $\phantom{RESOLUTION CREATION (APPARATUS A} 0 \phantom{APPARATUS C} 2 \phantom{APPARATUS D} 0$
4. PASS-THROUGH (NO PROCESSING) (APPARATUS A + APPARATUS D = 0)
   $\phantom{PASS-THROUGH (NO PROCESSING) (APPARATUS A} 0 \phantom{APPARATUS D} 0$

FIG. 57

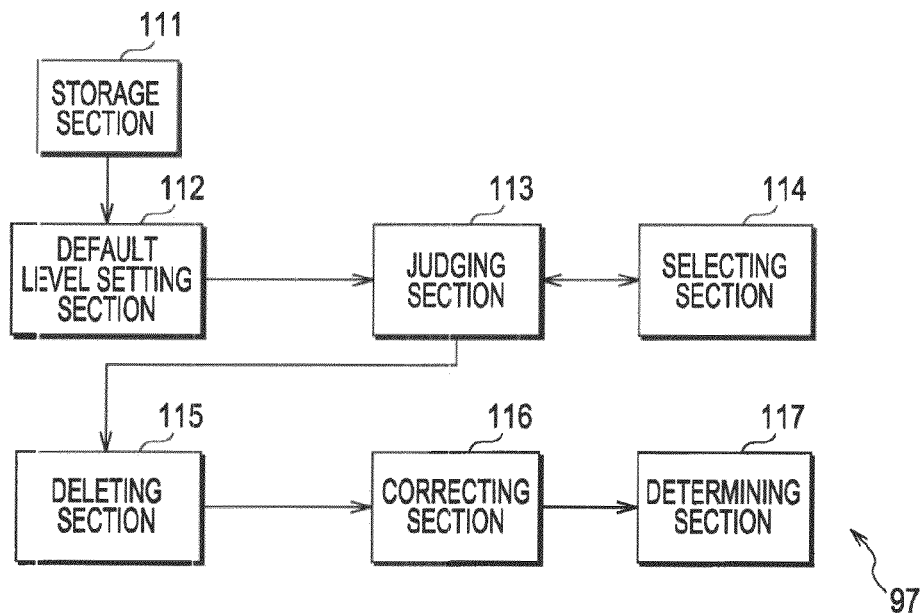

FIG. 59

1. RESOLUTION CREATION AFTER NOISE REMOVAL
   (APPARATUS A + APPARATUS B + APPARATUS C + APPARATUS D)
2. AFTER NOISE REMOVAL (APPARATUS A + APPARATUS B + APPARATUS D)
3. RESOLUTION CREATION (APPARATUS A + APPARATUS C + APPARATUS D)
4. PASS-THROUGH (NO PROCESSING) (APPARATUS A + APPARATUS D)

FIG. 60

1. EXTERNAL SIGNAL INPUT --> NOISE REMOVAL --> TEMPORAL RESOLUTION CREATION --> RESOLUTION CREATION --> EXTERNAL SIGNAL OUTPUT
2. EXTERNAL SIGNAL INPUT --> RESOLUTION CREATION --> EXTERNAL SIGNAL OUTPUT
3. EXTERNAL SIGNAL INPUT --> NOISE REMOVAL --> RESOLUTION CREATION --> EXTERNAL SIGNAL OUTPUT

FIG. 61

1. RESOLUTION CREATION
2. RESOLUTION CREATION AFTER NOISE REMOVAL
3. NOISE REMOVAL
4. PASS-THROUGH (NO PROCESSING)

| | | FUNCTIONAL BOARD | | | | | |
|---|---|---|---|---|---|---|---|
| | | CONTROL | IMAGE QUALITY DETECTION | Y/C SEPARATION | I/P CONVERSION | RESOLUTION CONVERSION | IMAGE QUALITY ADJUSTMENT |
| | | X | A | B | C | D | E |
| WAVEGUIDE NO | 00 | TX | RX | $RX_1$ | $RX_1$ | $RX_1$ | $RX_1$ |
| | 01 | $RX_R$ | TX RGBP | $RX_G$ | | | |
| | 02 | $RX_R$ | | TX RGBP | $RX_G$ | | |
| | 03 | $RX_R$ | | | TX RGBP | $RX_G$ | |
| | 04 | $RX_R$ | | | | TX RGBP | $RX_G$ |
| | 05 | $RX_R$ | | | | | TX |

CASE WHERE {FOURTH PREVIOUS BIT, THIRD PREVIOUS BIT, SECOND PREVIOUS BIT, FIRST PREVIOUS BIT, AND CURRENT BIT}
={1, 0, 0, 0, 0}

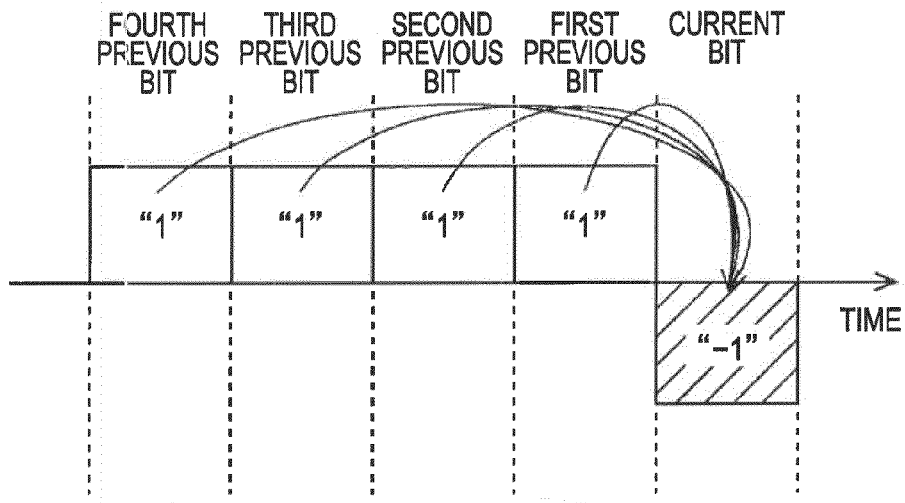
CASE WHERE {FOURTH PREVIOUS BIT, THIRD PREVIOUS BIT, SECOND PREVIOUS BIT, FIRST PREVIOUS BIT, AND CURRENT BIT}
={1, 0, 0, 0, 0}
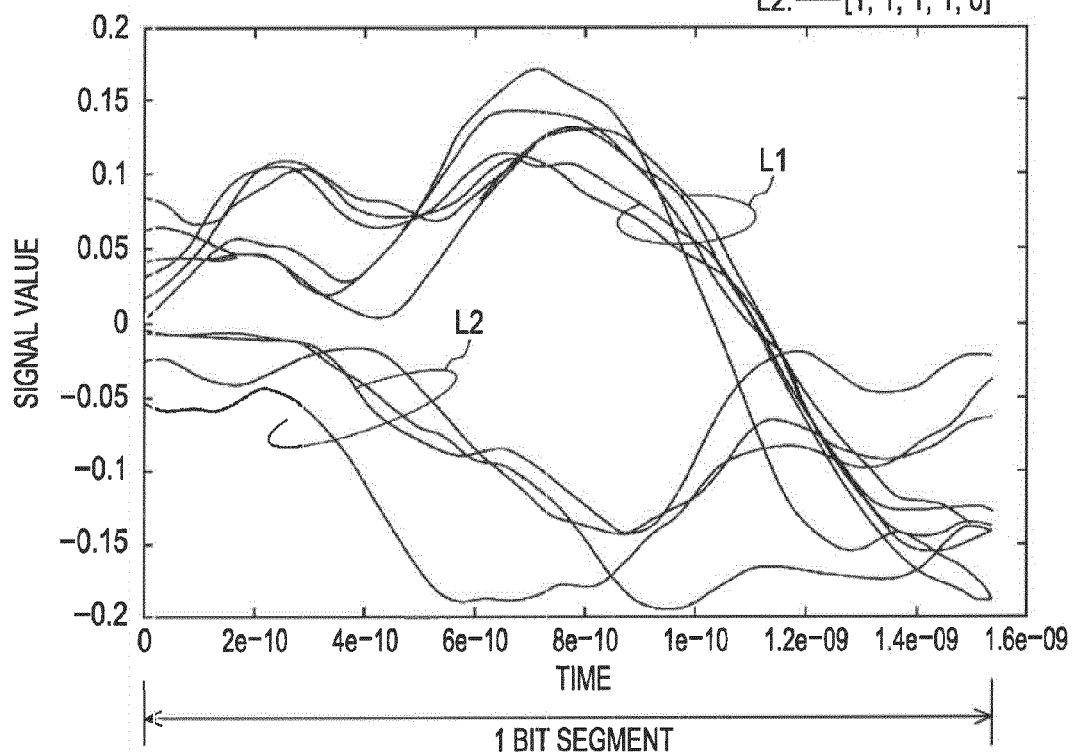

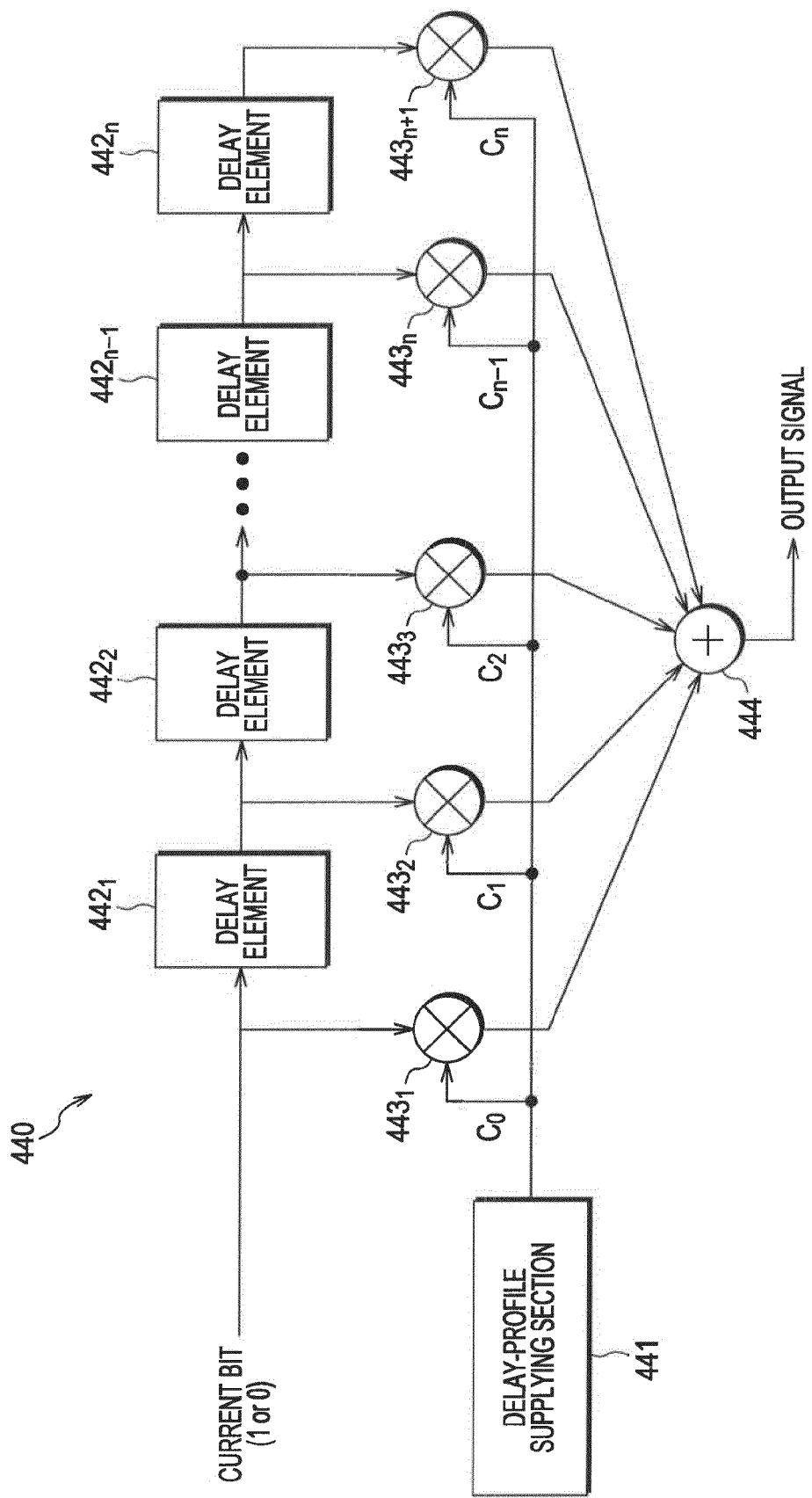

CASE WHERE {FOURTH PREVIOUS BIT, THIRD PREVIOUS BIT, SECOND PREVIOUS BIT, FIRST PREVIOUS BIT, AND CURRENT BIT}
={1, 1, 1, 1, 0}

CASE WHERE {FOURTH PREVIOUS BIT, THIRD PREVIOUS BIT, SECOND PREVIOUS BIT, FIRST PREVIOUS BIT, AND CURRENT BIT}
={1, 0, 0, 0, 0}

OPTICAL SELECTOR SWITCH AND SIGNAL-PROCESSING APPARATUS

TECHNICAL FIELD

The present invention relates to an optical waveguide that causes light transmitted through a light guide section to be irregularly reflected, scattered, refracted, or diffracted to enable one-to-many, many-to-one, or many-to-many signal transmission between the sending side and the receiving side, a signal processing apparatus including this optical waveguide, and a signal processing board connected to this optical waveguide. More specifically, the center portion of an optical waveguide is endowed with a function of irregularly reflecting, scattering, refracting, or diffracting light, and the surrounding portion is endowed with a function of transmitting light, thereby enabling transmission of a signal from a single or plurality of light output sections to a single or plurality of light input sections while suppressing attenuation of light. Also, a plurality of optical waveguides are laminated, and a light output section or light input section to be coupled to an optical waveguide in each layer is switched over, thereby enabling dynamic switching of signal transmission paths.

BACKGROUND ART

With advances in long-distance, multiplex communication technologies using optical cables, many-to-many optical multistage selectors are under research and development.

Specifically, there are fiber drive type optical switches in which a magnetically clad fiber is directly driven by an electromagnetic to change the path of light, micro-mirror type optical switches in which the light reflection angle is changed by using an MEMS mirror to change the passage path of light, waveguide-type optical switches in which after dividing light into two rays with different phases, one of the rays is subjected to phase inversion by heat so as to interfere with the original light, thereby switching light ON-OFF, and optical multistage switches using an optical sheet bus or the like. Switching of communication signals has been performed by configuring a many-to-many optical multistage selector by these techniques.

However, such optical switches are expensive with a large housing size, making them unsuitable for incorporation into general consumer appliances.

In view of this, there has been proposed a system in which each function of a product is modularized to facilitate addition and exchange of the function on an optical sheet bus (see, for example, Japanese Unexamined Patent Application Publication No. 10-123350).

In optical sheet buses according to the related art, scatterers are placed in a dispersed manner across the entire light transmission layer so that incident signal light is transmitted while being diffused, thereby enabling transmission of a signal between a plurality of boards connected to the optical sheet bus.

DISCLOSURE OF INVENTION

However, in the case of optical sheet buses according to the related art, the entire light transmission layer is made of scatterers, resulting in large attenuation of light transmitted therethrough. Also, in the case of a configuration in which a light diffusing plate formed of an acrylic resin layer having silica pigment mixed therein is placed on the back surface of a transparent optical sheet bus, light passing through silica particles undergoes a number of reflections within the particles before being emitted externally, resulting in large attenuation of light. Further, since the light diffusing plate is placed at a position at which light from a laser diode arrives after travelling rectilinearly, loss occurs as the light incident from the laser diode is reflected by the surface of the acrylic resin layer. Thus, with optical sheet buses according to the related art, it is difficult to transmit a signal by light with reliability from a circuit board on the sending side to an arbitrary circuit board on the receiving side. Also, it is not possible to dynamically switch signal transmission paths.

The present invention has been made in view of the above problems, and its object is to provide an optical waveguide that enables reliable transmission of a signal from a single or plurality of light output sections to a single or plurality of light input sections while suppressing attenuation of the transmitted light, a signal processing apparatus including this optical waveguide, and a signal processing board connected to this optical waveguide.

To solve the above-described problems, the present invention relates to an optical waveguide including: a light guide section in which light made incident from an arbitrary position on an outer circumference is propagated and emitted from an arbitrary position on the outer circumference; and a light reflection section that reflects light other than light emitted from the outer circumference of the light guide section, into the light guide section, in which the light reflection section has an irregular reflection section that irregularly reflects light.

In the optical waveguide according to the present invention, light incident on the light guide section from an arbitrary position on the outer circumference is transmitted through the light guide section while being confined therein by the light reflection section, and becomes incident on the irregular reflection section to be irregularly reflected. The light irregularly reflected by the irregular reflection section is transmitted through the light guide section while being confined therein by the light reflection section, and emitted in the entire circumferential direction from the outer circumference of the light guide section.

Thus, since light emitted from the light output section placed at an arbitrary position on the outer circumference of the optical waveguide can be received by the light input section placed at an arbitrary position on the outer circumference of the optical waveguide, by providing a single or plurality of light output sections and light input sections on the outer circumference of the optical waveguide, a one-to-many, many-to-one, or many-to-many optical selector is realized.

Also, the present invention relates to an optical waveguide including: a light guide section in which light made incident from an arbitrary position on an outer circumference is propagated and emitted from an arbitrary position on the outer circumference; a light reflection section that reflects light other than light emitted from the outer circumference of the light guide section, into the light guide section; and a light scattering section that scatters light other than light emitted from the outer circumference of the light guide section, into the light guide section.

In the optical waveguide according to the present invention, light incident on the light guide section from an arbitrary position on the outer circumference is transmitted through the light guide section while being confined therein by the light reflection section, and becomes incident on the light scattering section to be scattered. The light scattered by the light scattering section is transmitted through the light guide section while being confined therein by the light reflection section, and emitted in the entire circumferential direction from the outer circumference of the light guide section.

Thus, since light emitted from the light output section placed at an arbitrary position on the outer circumference of the optical waveguide can be received by the light input section placed at an arbitrary position on the outer circumference of the optical waveguide, by providing a single or plurality of light output sections and light input sections on the outer circumference of the optical waveguide, a one-to-many, many-to-one, or many-to-many optical selector is realized.

Further, the present invention relates to an optical waveguide including: a light guide section in which light made incident from an arbitrary position on an outer circumference is propagated and emitted from an arbitrary position on the outer circumference; and a light reflection section that reflects light other than light emitted from the outer circumference of the light guide section, into the light guide section, in which the light guide section has an optical-path changing section that refracts or diffracts light propagated therein.

In the optical waveguide according to the present invention, light incident on the light guide section from an arbitrary position on the outer circumference is transmitted through the light guide section while being confined therein by the light reflection section, and becomes incident on the optical-path changing section to be refracted or diffracted. The light refracted or diffracted by the optical-path changing section is transmitted through the light guide section while being confined therein by the light reflection section, and emitted in the entire circumferential direction from the outer circumference of the light guide section.

Thus, since light emitted from the light output section placed at an arbitrary position on the outer circumference of the optical waveguide can be received by the light input section placed at an arbitrary position on the outer circumference of the optical waveguide, by providing a single or plurality of light output sections and light input sections on the outer circumference of the optical waveguide, a one-to-many, many-to-one, or many-to-many optical selector is realized.

The present invention relates to a signal processing apparatus including: an optical waveguide having a light guide section in which light made incident from an arbitrary position on an outer circumference is propagated and emitted from an arbitrary position on the outer circumference, and a light reflection section that reflects light other than light emitted from the outer circumference of the light guide section, into the light guide section; and a plurality of signal processing boards each having an optical-electric signal conversion section and placed on the outer circumference of the optical waveguide, the optical-electric signal conversion section being optically coupled to the optical waveguide and including both or one of a light output section by which an electrical signal is converted into light and emitted and a light input section by which received light is converted into an electric signal.

In the signal processing apparatus according to the present invention, signal light emitted from the light output section of the signal processing board that sends a signal becomes incident on the light guide section from the outer circumference of the optical waveguide. The light incident on the light guide section is transmitted through the light guide section while being confined therein by the light reflection section, emitted in the entire circumferential direction from the outer circumference of the optical waveguide, and received by the light input section of the signal processing board that receives the signal.

In the case of a configuration in which the light reflection section of the optical waveguide has an irregular reflection section that irregularly reflects light, light emitted from the light output section of the signal processing board that sends a signal, and is incident on the light guide section from the outer circumference of the optical waveguide is transmitted through the light guide section while being confined therein by the light reflection section, and becomes incident on the irregular reflection section to be irregularly reflected. The light irregularly reflected by the irregular reflection section is transmitted through the light guide section while being confined therein by the light reflection section, emitted in the entire circumferential direction from the outer circumference of the optical waveguide, and received by the light input section of the signal processing board that receives the signal.

In the case of a configuration in which the optical waveguide has a light scattering section that scatters light other than light emitted from the outer circumference of the light guide section, into the light guide section, light emitted from the light output section of the signal processing board that sends a signal, and is incident on the light guide section from the outer circumference of the optical waveguide is transmitted through the light guide section while being confined therein by the light reflection section, and becomes incident on the light scattering section to be scattered. The light scattered by the light scattering section is transmitted through the light guide section while being confined therein by the light reflection section, emitted in the entire circumferential direction from the outer circumference of the optical waveguide, and received by the light input section of the signal processing board that receives the signal.

In the case of a configuration in which the light guide section has an optical-path changing section that refracts or diffracts light propagated therein, light emitted from the light output section of the signal processing board that sends a signal, and is incident on the light guide section from the outer circumference of the optical waveguide is transmitted through the light guide section while being confined therein by the light reflection section, and becomes incident on the optical-path changing section to be refracted or diffracted. The light refracted or diffracted by the optical-path changing section is transmitted through the light guide section while being confined therein by the light reflection section, emitted in the entire circumferential direction from the outer circumference of the optical waveguide, and received by the light input section of the signal processing board that receives the signal.

Also, the present invention relates to a signal processing board including an optical-electric signal conversion section including both or one of a light output section by which an electric signal is converted into light and light having rectilinearity set in a predetermined direction is emitted, and a light input section by which received light is converted into an electric signal, in which a light guide section, in which light made incident from an arbitrary position on an outer circumference is propagated and emitted from an arbitrary position on the outer circumference, is connected to an optical waveguide having a light reflection section that reflects light other than light emitted from the outer circumference of the light guide section, into the light guide section.

In the signal processing board according to the present invention, the optical-electric signal conversion section is optically coupled to the light guide section of the optical waveguide when connected to the optical waveguide. In the signal processing board that sends a signal, signal light is emitted from the light output section. The signal light outputted from the light output section of the signal processing board that sends a signal is incident on the light guide section from the outer circumference of the optical waveguide.

The light incident on the light guide section of the optical waveguide is transmitted through the light guide section while being confined therein by the light reflection section, emitted in the entire circumferential direction from the outer circumference of the optical waveguide, and received by the light input section of the signal processing board that receives the signal.

In the case of a configuration in which a plurality of optical waveguides are laminated, the optical-electric signal conversion section of the signal processing board is optically coupled to the optical waveguide located in an arbitrary layer of a plurality of layers, and the manner of connection of the plurality of signal processing boards is switched over to an arbitrary signal path.

According to the present invention, the optical waveguide has a function of emitting light in the entire circumferential direction of the light guide section by irregular reflection at the irregular reflection section, and the light reflection section has a function of propagating light incident from the outer circumference of the light guide section to the irregular reflection section, and propagating irregularly reflected light to the outer circumference of the light guide section. Since a plurality of optical paths are produced by irregular reflection of light incident from an arbitrary direction, attenuation of light can be suppressed.

Also, by providing the irregular reflection section on both sides across the light guide section, light incident on the light guide section is irregularly reflected between opposing irregular reflection sections, so that light incident from an arbitrary direction can be emitted in the entire circumferential direction of the light guide section.

Further, in the case of a configuration in which a light scattering section that uses scattering of light is provided, by propagating light incident from the outer circumference of the light guide section to the light scattering section by means of the light reflection section, and propagating light scattered by the light scattering section to the outer circumference of the light guide section by means of the light reflection section, light can be emitted in the entire circumferential direction of the light guider section while suppressing attenuation due to dissipation.

Also, in the case of a configuration in which an optical-path changing section using refraction or diffraction of light is provided, light incident from the outer circumference of the light guide section is propagated to the optical-path changing section by means of the light reflection section, and light refracted or diffracted by the optical-path changing section is propagated to the outer circumference of the light guide section by means of the light reflection section, thereby producing a plurality of optical paths by the refraction or diffraction of light incident from an arbitrary direction. Thus, attenuation of light can be suppressed.

Thus, since light emitted from the light output section placed at an arbitrary position on the outer circumference of the optical waveguide can be reliably received by the light input section placed at an arbitrary position on the outer circumference of the optical waveguide, by providing a single or plurality of light output sections and light input sections on the outer circumference of the optical waveguide, a one-to-many, many-to-one, or many-to-many optical selector is realized.

Also, by placing a plurality of signal processing boards on the outer circumference of a plurality of layers of laminated optical waveguides, and switching over the light output section and the light input section to be coupled in each signal processing board with respect to the optical waveguide in each layer, the manner of connection of the plurality of signal processing boards can be dynamically switched over to an arbitrary signal path.

BRIEF DESCRIPTION OF DRAWINGS

FIG. 16 is an explanatory diagram showing the reflectances of color-spread surfaces.

FIG. 17 is an explanatory diagram showing the reflectances of materials suited for a reflector and an irregular reflector.

FIG. 18A is a plan view showing another example of the shape of an optical waveguide.

FIG. 22 is an explanatory diagram showing computation results.

FIG. 23 is a structural view showing an example of a signal processing apparatus according to a second embodiment.

FIG. 24 is a structural view showing an example of the signal processing apparatus according to the second embodiment.

FIG. 29 is an explanatory diagram showing an example of a signal path switching operation in a signal processing apparatus.

FIG. 30 is an explanatory diagram showing an example of a signal path switching operation in a signal processing apparatus.

FIG. 31 is an explanatory diagram showing an example of a signal path switching operation in a signal processing apparatus.

FIG. 32 is an explanatory diagram showing an example of a signal path switching operation in a signal processing apparatus.

FIG. 33 is an explanatory diagram showing an example of a signal path switching operation in a signal processing apparatus.

FIG. 34 is a block diagram showing a functional configuration example of a signal processing board.

FIG. 35 is an explanatory diagram showing an example of process content information.

FIG. 39 is an explanatory diagram showing an example of a processing board table.

FIG. 40 is an explanatory diagram showing an example of a processing path table.

FIG. 41 is an explanatory diagram showing an example of a processing path table.

FIG. 42 is an explanatory diagram showing an example of a processing path table.

FIG. 43 is an explanatory diagram showing an example of a processing path table.

FIG. 44 is an explanatory diagram showing an example of a processing path table.

FIG. 45 is an explanatory diagram showing an example of signal paths.

FIG. 50 is an explanatory diagram showing an example of a signal path switching operation in a signal processing apparatus.

FIG. 51 is an explanatory diagram showing an example of a signal path switching operation in a signal processing apparatus.

FIG. 52 is an explanatory diagram showing an example of a signal path switching operation in a signal processing apparatus.

FIG. 53 is an explanatory diagram showing an example of a signal path switching operation in a signal processing apparatus.

FIG. 56 is a diagram illustrating summation of weights of priority levels.

FIG. 57 is a block diagram showing another functional configuration example of a priority level determining section.

FIG. 59 is a diagram showing an example of default priority levels.

FIG. 60 is a diagram illustrating the priority levels of assumed signal paths.

FIG. 61 is a diagram illustrating signal paths according to corrected priority levels.

FIG. 74B is a diagram illustrating distortion that occurs in the waveform of a signal received by a signal processing section.

FIG. 75 is a diagram illustrating distortion that occurs in the waveform of a signal received by a signal processing section.

FIG. 80 is a block diagram showing a functional configuration example of a computing apparatus for finding distortion that occurs in the waveform of the current bit.

BEST MODE FOR CARRYING OUT THE INVENTION

Hereinbelow, with reference to the drawings, a description will be given of embodiments of an optical selector and of a signal processing apparatus to which an optical waveguide according to the present invention is applied, and embodiments of a signal processing board to which the optical waveguide according to the present invention is connected.

Configuration Example of Optical Selector According to First Embodiment

Figure 1A:
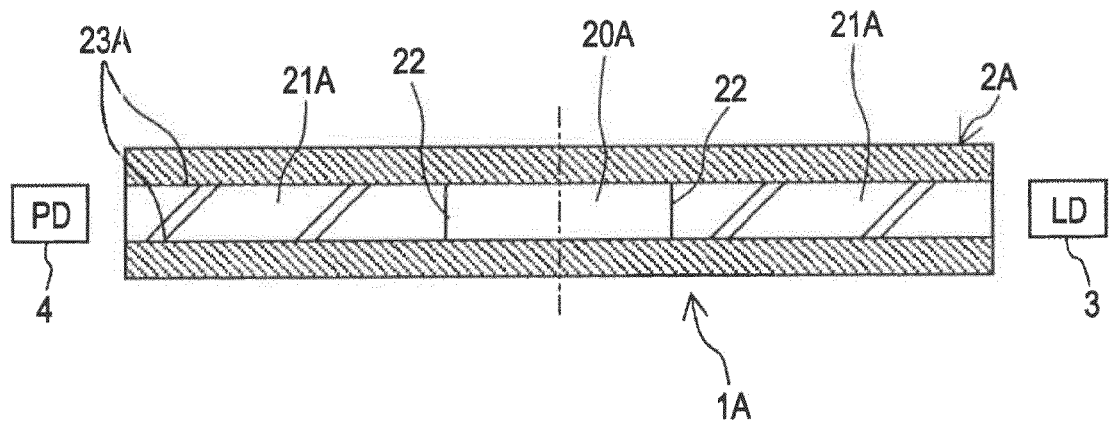
FIG. 1A is a structural view showing an example of an optical selector according to a first embodiment.
Figure 1B:
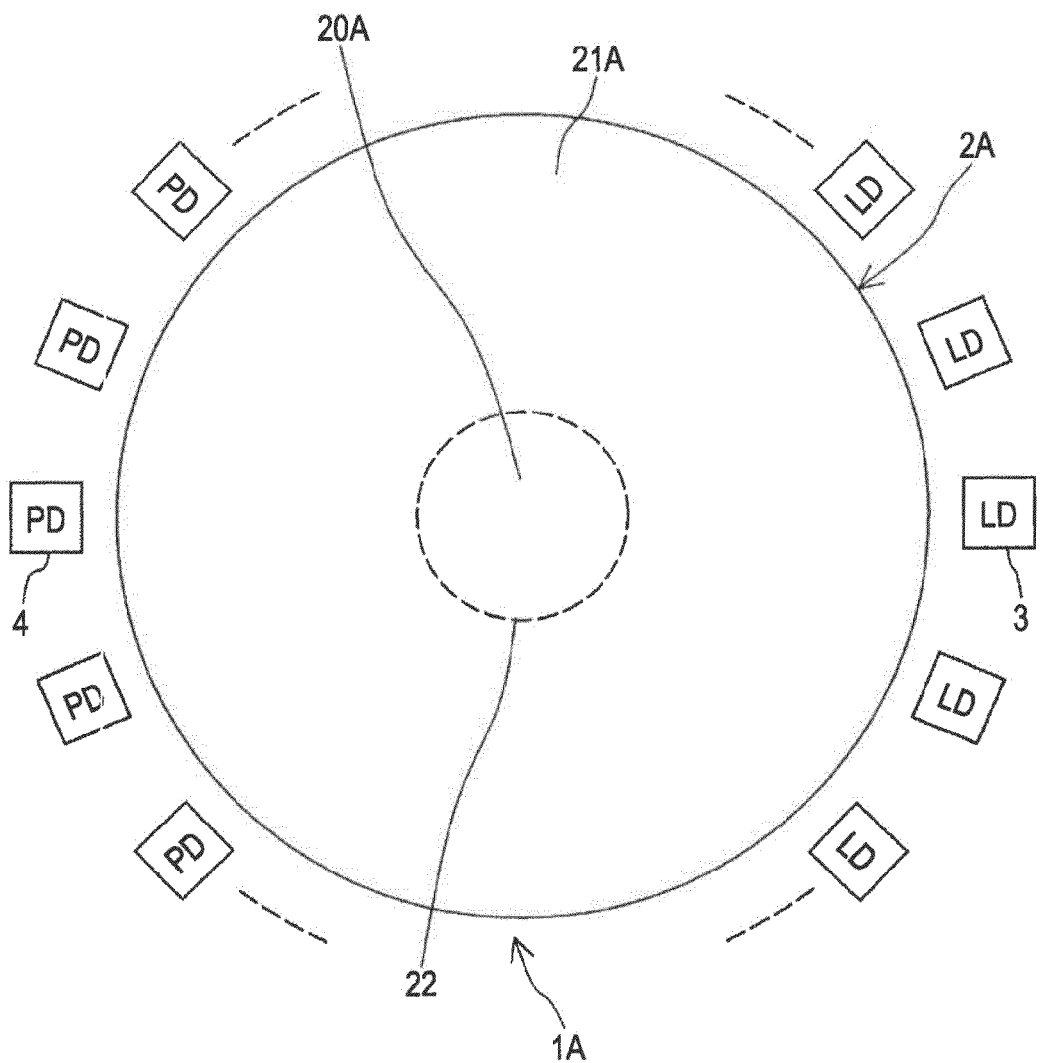
FIG. 1B is a structural view showing an example of the optical selector according to the first embodiment.

FIG. 1A and FIG. 1B are structural views each showing an example of an optical selector according to a first embodiment. FIG. 1A is a side cross-sectional view of the optical selector according to the first embodiment, and FIG. 1B is a plan view of the optical selector according to the first embodiment.

An optical selector 1A according to the first embodiment includes a planar-type optical waveguide 2A that causes light made incident from an arbitrary direction to pass through two kinds of light guide material with different refractive indices so as to be emitted from the entire circumferential direction, an LD (laser diode) 3 that outputs light having rectilinearity, and a photodetector 4 to which light is inputted.

The optical waveguide 2A includes a first light guide section 20A formed of a light guide material having a first refractive index in a predetermined wavelength range, and a second light guide section 21A formed of a light guide material having a second refractive index different from the first refractive index. The first light guide section 20A and the second light guide section 21A are both disc-shaped in this example, and the second light guide section 21A is provided to the side of and along the entire circumference of the first light guide section 20A.

The first light guide section 20A is formed of a transparent resin material, a cavity, or the like having the first refractive index in a predetermined wavelength range. Also, the second light guide section 21A is formed of a transparent resin material or the like having the second refractive index in a predetermined wavelength range.

For example, in the case of a configuration in which the first light guide section 20A and the second light guide section 21A are both formed of a resin material, the outer circumferential surface of the first light guide section 20A and the inner circumferential surface of the second light guide section 21A are in contact with each other at an interface 22 of the first light guide section 20A and the second light guide section 21A.

Also, in the case of a configuration in which the first light guide section 20A is formed by a cavity, and the second light guide section 21A is formed of a resin material, the inner circumferential surface of the second light guide section 21A is in contact with the cavity at the interface 22 of the first light guide section 20A and the second light guide section 21A.

Here, in either of the configurations described above, by aligning the center of the first light guide section 20A having a circular shape and the center of the second light guide section 21A with each other, the first light guide section 20A is placed substantially at the center of the second light guide section 21A.

The optical waveguide 2A includes a reflector 23A on the upper and lower surfaces of the first light guide section 20A and second light guide section 21A. The reflector 23A is an example of a light reflection section, and sandwiches the first light guide section 20A and the second light guide section 21A from both sides in such a way that the outer circumferential surface of the second light guide section 21A is exposed over the entire circumference, and the reflection surface that reflects light is opposed to the flat surface of the second light guide section 21A and the first light guide section 20A that is, for example, a cavity.

Thus, in the optical waveguide 2A, with arbitrary positions on the outer circumferential surface of the second light guide section 21A serving as light incidence section and emission section, light is made incident and emitted from the outer circumferential surface of the second light guide section 21A, and light incident on the second light guide section 21A is reflected by the reflector 23A and transmitted through the second light guide section 21A.

Also, with the interface 22 between the first light guide section 20A and the second light guide section 21A with different refractive indices serving as an optical-path changing section, the light transmitted through the second light guide section 21A is refracted and reflected by the interface 22, and emitted in the entire circumferential direction from the first light guide section 20A.

Further, the light emitted in the entire circumferential direction from the first light guide section 20A is transmitted through the second light guide section 21A, and emitted from the outer circumferential surface of the second light guide section 21A.

Therefore, in the optical waveguide 2A, when light is made incident toward the first light guide section 20A from an arbitrary position on the outer circumference, the light is emitted in the entire circumferential direction in the first light guide section 20A, thereby allowing reception of light at an arbitrary position on the outer circumference.

The LD 3 is an example of a light output section, and is placed at an arbitrary position on the outer circumference of the optical waveguide 2A, with an unillustrated light emitting section opposed to the outer circumferential surface of the second light guide section 21A. Also, the photodetector 4 is an example of a light input section, and is placed at an arbitrary position on the outer circumference of the optical waveguide 2A, with an unillustrated light receiving section opposed to the outer circumferential surface of the second light guide section 21A.

Operation Example of Optical Selector According to First Embodiment

Next, an operation example of the optical selector 1A according to the first embodiment will be described with reference to FIG. 1A and FIG. 1B.

In the LD 3, an electric signal is converted into an optical signal and outputted, and light outputted from the LD 3 is made incident on the optical waveguide 2A from the outer circumferential surface of the second light guide section 21A toward the first light guide section 20A.

The light made incident from the outer circumferential surface of the second light guide section 21A is transmitted through the second light guide section 21A by being reflected by the reflector 23A, and has its optical path deflected due to refraction, reflection, and the like by the interface 22 of the first light guide section 20A and the second light guide section 21A, in accordance with the difference in refractive index between the first light guide section 20A and the second light guide section 21A.

Also, light made incident on the first light guide section 20A is transmitted through the first light guide section 20A by being reflected by the reflector 23A, is made incident on the interface 22 of the first light guide section 20A and the second light guide section 21A, and has its optical path deflected due to refraction, reflection, and the like.

Thus, light outputted from the LD 3 and incident on the second light guide section 21A from an arbitrary position on the outer circumference of the optical waveguide 2A is transmitted through the second light guide section 21A, and becomes incident on the interface 22 of the first light guide section 20A and the second light guide section 21A, thereby having its optical path deflected due to refraction and the like.

Therefore, in the optical waveguide 2A, light is emitted in the entire circumferential direction of the first light guide section 20A, and transmitted through the second light guide section 21A. Then, the light transmitted through the second light guide section 21A is emitted in the entire circumferential direction from the outer circumferential surface of the second light guide section 21A, is inputted to the photodetector 4 placed at an arbitrary position on the outer circumference of the optical waveguide 2A, and an optical signal is converted into an electric signal and outputted.

In this way, light outputted from the LD 3 placed at an arbitrary position on the outer circumference of the optical waveguide 2A can be received by the photodetector 4 placed at an arbitrary position on the outer circumference of the optical waveguide 2A. Therefore, by providing a single LD 3 at an arbitrary position on the outer circumference of the optical waveguide 2A, and providing a plurality of photodetectors 4 at arbitrary positions on the outer circumference of the optical waveguide 2A, a one-to-many optical selector 1A is realized.

Also, by providing a plurality of LDs 3 at arbitrary positions on the outer circumference of the optical waveguide 2A, and providing a single photodetector 4 at an arbitrary position on the outer circumference of the optical waveguide 2A, a many-to-one optical selector 1A is realized.

Further, by providing a plurality of LDs 3 at arbitrary positions on the outer circumference of the optical waveguide 2A, and providing a plurality of photodetectors 4 at arbitrary positions on the outer circumference of the optical waveguide 2A, a many-to-many optical selector 1A is realized.

Here, when light outputted from the LD 3 is collected or the like so that the light is incident on the contact surface at a corner portion of the second light guide section 21A with the reflector 23A, at the interface 22 of the first light guide section 20A and the second light guide section 21A, the light is diffracted at the corner portion of the second light guide section 21A. Thus, it is possible to emit incident light in the entire circumferential direction of the optical waveguide 2A by diffraction, in accordance with the setting of the incidence position of light.

Configuration Example of Optical Selector According to Second Embodiment

FIG. 2A to FIG. 2C, FIG. 3A to FIG. 3C, and FIG. 4A to FIG. 4B are structural views each showing an example of an optical selector according to a second embodiment. In FIG. 2A to FIG. 2C, FIG. 3A to FIG. 3D, and FIG. 4A to FIG. 4B, the optical selector according to the second embodiment is shown in a side cross-sectional view. It should be noted that a plan view of the optical selector according to the second embodiment is the same as shown in FIG. 1B.

An optical selector 1B according to the second embodiment includes a planar-type optical waveguide 2B that causes light made incident from an arbitrary direction to be emitted from the entire circumferential direction by irregular reflection or scattering, the LD 3 that outputs light having rectilinearity, and the photodetector 4 to which light is inputted.

Here, reflection is a phenomenon in which a travelling wave, particle, or the like changes direction upon striking a medium different from the medium through which it is travelling or a discontinuous interface, and travels in a new direction within the original medium. If the irregularities of the interface are substantially equal to or larger than the wavelength, the reflected wave travels in various directions. Such reflection is referred to as irregular reflection or diffuse reflection.

On the other hand, scattering is a phenomenon in which when a wave strikes an obstacle that is not very large in comparison to its wavelength, a wave is produced which spreads out from the obstacle as the center. Scattering of light is scattering of light by a substance, and is described as the total effect of scattering with a quantum-mechanical particle. Although scattering in resonance lines with no wavelength change mainly occurs, scattering with wavelength change also occurs in some cases due to the Raman effect, fluorescence, Compton effect, Brillouin scattering, or the like. In the case of a uniform substance, scattering with no wavelength change by constituent particles combined with incident light only gives reflected light and refracted light, and macroscopic scattered light appears only when there are fluctuations in density or orientation of the constituent particles.

In the example shown in FIG. 2A to FIG. 2C and FIG. 3A to FIG. 3D, the optical waveguide 2B includes a first light guide section 20B formed of a light guide material having a first refractive index in a predetermined wavelength range, and a second light guide section 21B formed of a light guide material having a second refractive index different from the first refractive index. The first light guide section 20B and the second light guide section 21B are both disc-shaped in this example, and the second light guide section 21B is provided to the side of and along the entire circumference of the first light guide section 20B.

The first light guide section 20B is formed of a transparent resin material, a cavity, or the like having the first refractive index in a predetermined wavelength range. Also, the second light guide section 21B is formed of a transparent resin material or the like having the second refractive index in a predetermined wavelength range.

For example, in the case of a configuration in which the first light guide section 20B and the second light guide section 21B are both formed of a resin material, the outer circumferential surface of the first light guide section 20B and the inner circumferential surface of the second light guide section 21B are in contact with each other at the interface 22 of the first light guide section 20B and the second light guide section 21B.

Also, in the case of a configuration in which the first light guide section 20B is formed by a cavity, and the second light guide section 21B is formed of a resin material, the inner circumferential surface of the second light guide section 21B is in contact with the cavity at the interface 22 of the first light guide section 20B and the second light guide section 21B.

Here, in either of the configurations described above, by aligning the center of the first light guide section 20B having a circular shape and the center of the second light guide section 21B with each other, the first light guide section 20B is placed substantially at the center of the second light guide section 21B.

Figure 4A:
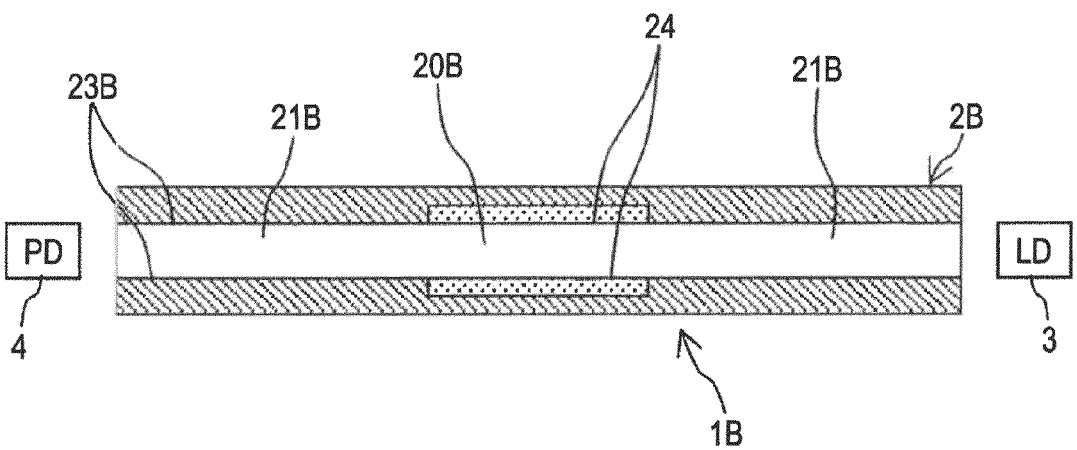
FIG. 4A is a structural view showing an example of the optical selector according to the second embodiment.
Figure 4B:
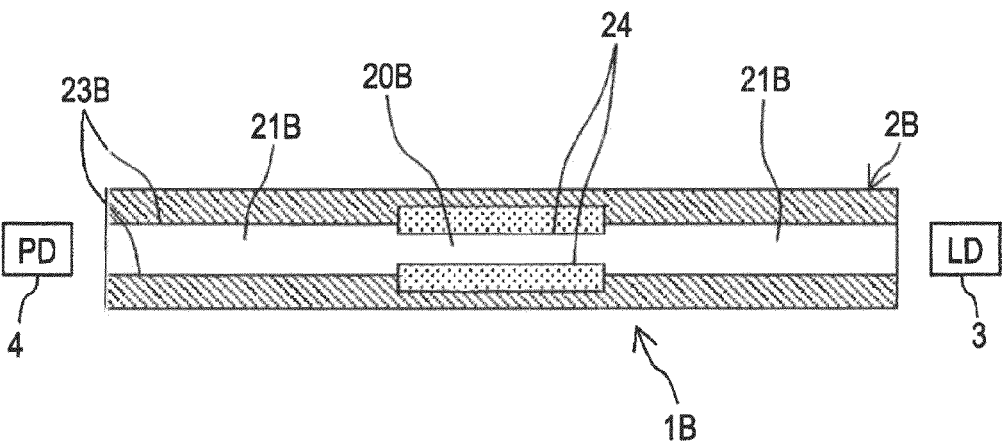
FIG. 4B is a structural view showing an example of the optical selector according to the second embodiment.

On the other hand, in the example shown in FIG. 4A to FIG. 4B, the first light guide section 20B and the second light guide section 21B of the optical waveguide 2B are both formed by a cavity.

The optical waveguide 2B has a reflector 23B provided on the upper and lower surfaces of the first light guide section 20B and second light guide section 21B. The reflector 23B is an example of a light reflection section, and sandwiches the second light guide section 21B from both sides such that the outer circumferential surface of the second light guide section 21B is exposed over the entire circumference, and the reflection surface that reflects light is opposed to the flat surface of the second light guide section 21B.

Further, in the configuration shown in FIG. 2A to FIG. 2C, FIG. 3A, FIG. 3B, and FIG. 4A to FIG. 4B, the optical waveguide 2B includes an irregular reflector 24 on the upper and lower surfaces of the first light guide section 20B. The irregular reflector 24 is an example of an irregular reflection section, and sandwiches the first light guide section 20B from both sides such that its irregular reflection surface, which irregularly reflects light by irregularities substantially equal to or larger than the wavelength of incident light, is opposed to the first light guide section 20B that is, for example, a cavity.

Figure 2A:
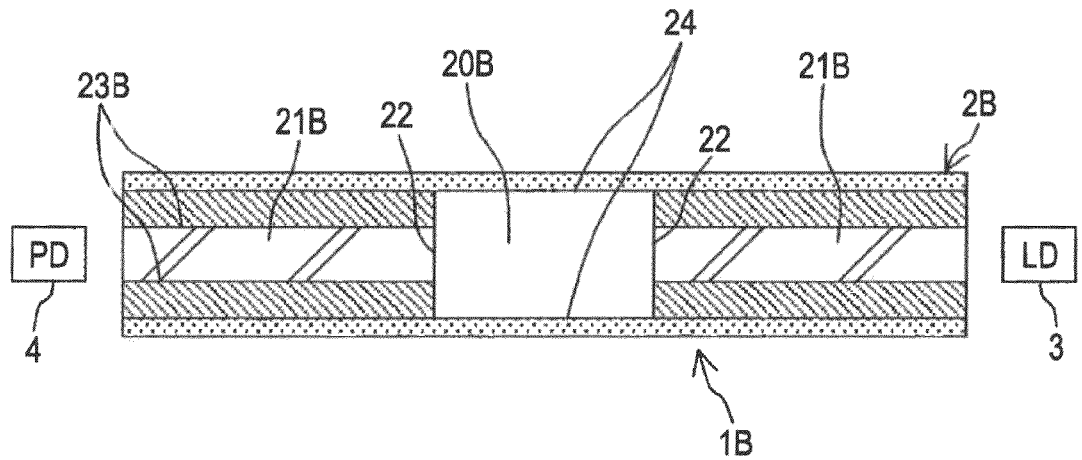
FIG. 2A is a structural view showing an example of an optical selector according to a second embodiment.
Figure 2B:
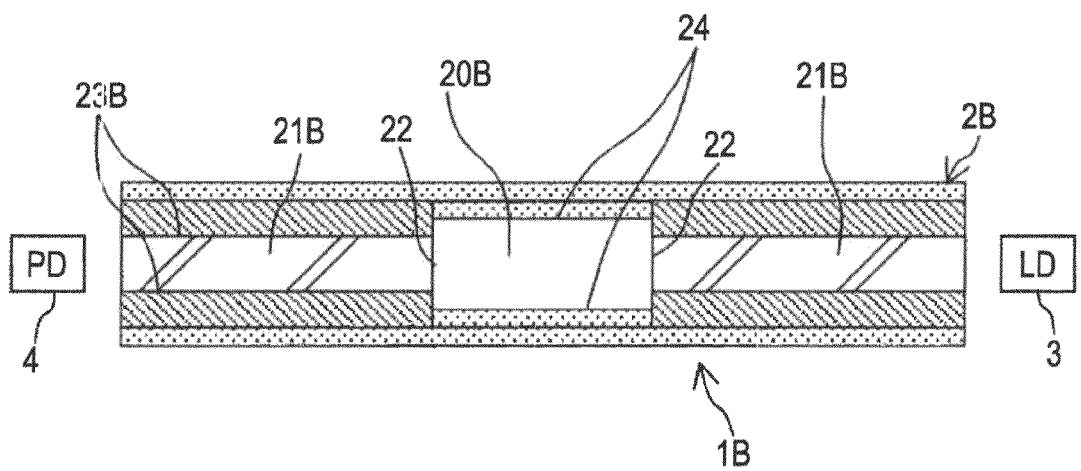
FIG. 2B is a structural view showing an example of the optical selector according to the second embodiment.
Figure 2C:
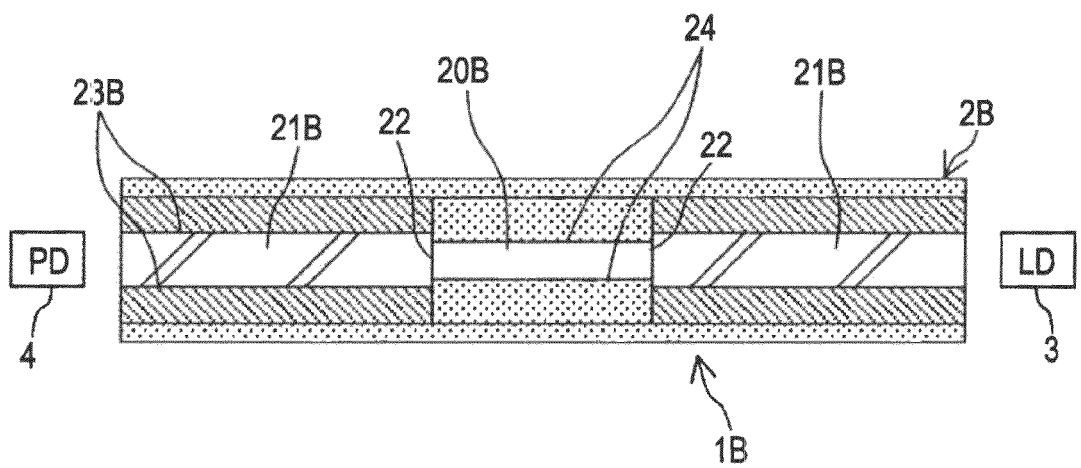
FIG. 2C is a structural view showing an example of the optical selector according to the second embodiment.
Figure 3A:
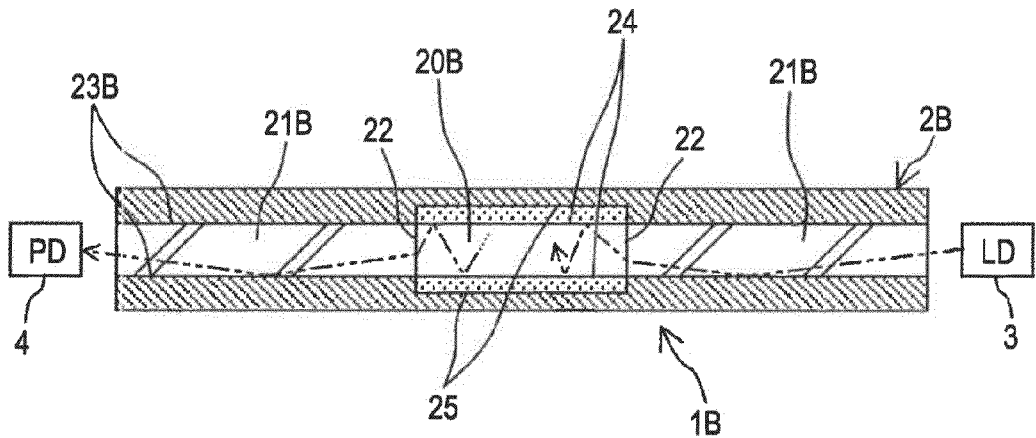
FIG. 3A is a structural view showing an example of the optical selector according to the second embodiment.
Figure 3B:
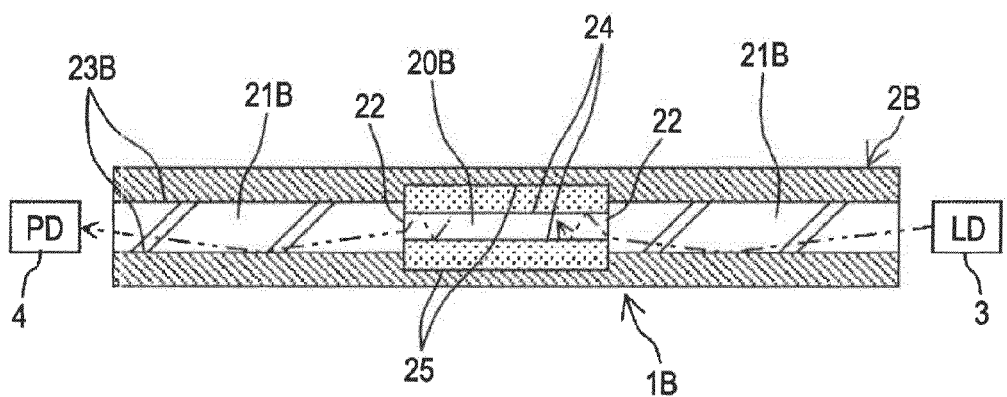
FIG. 3B is a structural view showing an example of the optical selector according to the second embodiment.

Here, in FIG. 2A, the reflector 23B sandwiching the second light guide section 21B is sandwiched further by the irregular reflector 24. The irregular reflection surface of the irregular reflector 24 which opposes the first light guide section 20B, and the reflection surface of the reflector 23B which opposes the second light guide section 21B have a distance corresponding to the thickness of the reflector 23B. It should be noted that the distance between the irregular reflection surface of the irregular reflector 24 and the reflection surface of the reflector 23B is not limited to this example. The irregular reflection surface of the irregular reflector 24 and the reflection surface of the reflector 23B may be brought closer to each other as shown in FIG. 2B, or may be flush with each other as shown in FIG. 3A and FIG. 4A. Alternatively, as shown in FIG. 2C, FIG. 3B, and FIG. 4B, the irregular reflection surface of the irregular reflector 24 may be located on the inner side than the reflection surface of the reflector 23B.

That is, the distance between the irregular reflection surface of the irregular reflector 24 and the reflection surface of the reflector 23B may be any predetermined distance that satisfies the condition that when light is made incident toward the first light guide section 20B from an arbitrary position on the outer circumference of the optical waveguide 2B, the intensity of irregularly reflected light measured on the outer circumference of the optical waveguide 2B becomes sufficient (hereinafter, this condition will be referred to as optical condition).

Figure 3C:
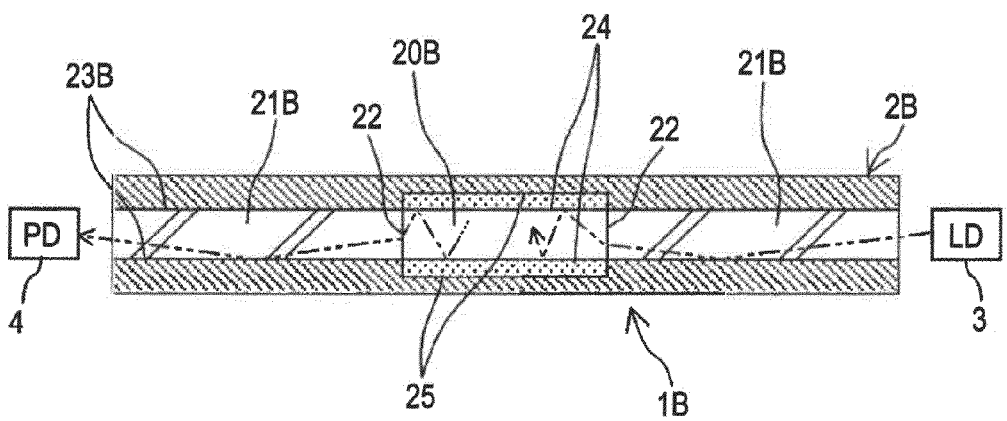
FIG. 3C is a structural view showing an example of the optical selector according to the second embodiment.

Also, in the configuration shown in FIG. 3C, the optical waveguide 2B includes a scatterer 24B on the upper and lower surfaces of the first light guide section 20B, and includes a reflector 25 on the outer side surface of the scatterer 24B. The scatterer 24B is an example of a light scattering section, and sandwiches the first light guide section 20B from both sides, with a sheet-like member for scattering incident light opposed to the first light guide section 20B that is, for example, a cavity. Also, the reflector 25 is an example of a light reflection section, and sandwiches the first light guide section 20B from both sides, with the reflection surface for reflecting light opposed to the outer side surface of the scatterer 24B. It should be noted that the reflector 25 may be formed integrally with the reflector 23B provided in the second light guide section 21B, or may be formed as an independent member.

Here, in FIG. 3C, the scattering surface of the scatterer 24B which opposes the first light guide section 20B, and the reflection surface of the reflector 23B which opposes the second light guide section 21B are flush with each other. However, the distance between the scattering surface of the scatterer 24B and the reflection surface of the reflector 23B may be any predetermined distance that satisfies, as the above-described optical condition, the condition that when light is made incident toward the first light guide section 20B from an arbitrary position on the outer circumference of the optical waveguide 23, the intensity of scattered light measured on the outer circumference of the optical waveguide 2B becomes sufficient. For example, as shown in FIG. 3D, the scattering surface of the scatterer 24B may be located on the inner side than the reflection surface of the reflector 23B.

Thus, in the optical waveguide 2B, with arbitrary positions on the outer circumferential surface of the second light guide section 21B serving as light incidence section and emission section, light is made incident and emitted from the outer circumferential surface of the second light guide section 21B, and light incident on the second light guide section 21B is reflected by the reflector 23B and transmitted through the second light guide section 21B.

Also, light transmitted through the second light guide section 21B is emitted in the entire circumferential direction from the first light guide section 20B, due to irregular reflection by the irregular reflector 24 in the example shown in FIG. 2A to FIG. 2C and FIG. 4A to FIG. 4B, and due to refraction, reflection, and the like by the interface 22 of the first light guide section 20B and the second light guide section 21B with different refractive indices in the example shown in FIG. 2A to FIG. 2C.

Figure 3D:
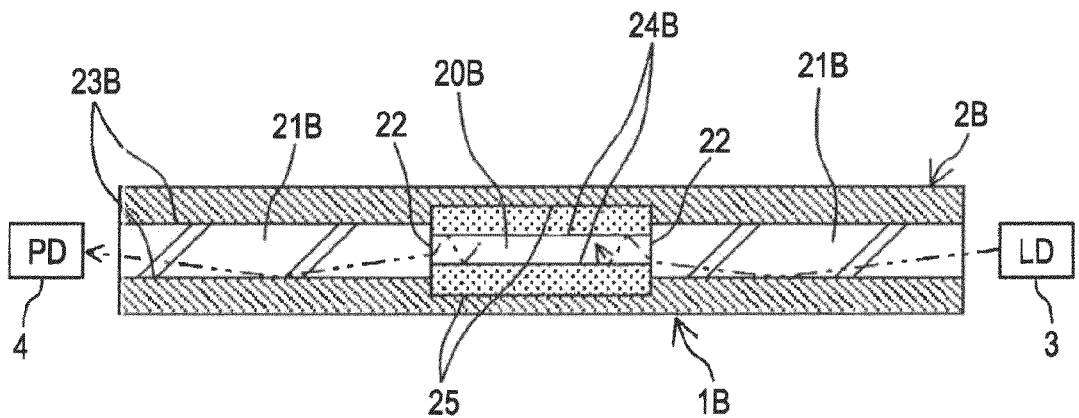
FIG. 3D is a structural view showing an example of the optical selector according to the second embodiment.

On the other hand, in the example shown in FIG. 3C and FIG. 3D, light transmitted through the second light guide section 21B is emitted in the entire circumferential direction from the first light guide section 20B, due to scattering by the scatterer 24B and reflection by the reflector 25, and due to refraction, reflection, and the like by the interface 22 of the first light guide section 20B and the second light guide section 21B with different refractive indices.

Further, the light emitted in the entire circumferential direction from the first light guide section 20B is transmitted through the second light guide section 21B, and emitted from the outer circumferential surface of the second light guide section 21B.

Therefore, in the optical waveguide 2B, when light is made incident toward the first light guide section 20B from an arbitrary position on the outer circumference, the light is emitted in the entire circumferential direction in the first light guide section 20B, thereby allowing reception of light at an arbitrary position on the outer circumference.

The LD 3 is placed at an arbitrary position on the outer circumference of the optical waveguide 2B, with an unillustrated light emitting section opposed to the outer circumferential surface of the second light guide section 21B. Also, the photodetector 4 is placed at an arbitrary position on the outer circumference of the optical waveguide 2B, with an unillustrated light receiving section opposed to the outer circumferential surface of the second light guide section 21B.

Here, in the example shown in FIG. 2A to FIG. 2C, in a case where the irregular reflector 24 has light transmitting property, a part of light incident on the first light guide section 20B transmits through the irregular reflector 24.

Accordingly, in the case where the irregular reflector 24 has light transmitting property, as in the case shown in FIG. 3A and FIG. 3B, the reflector 25 is provided on the outer side surface of the irregular reflector 24. The reflector 25 sandwiches the first light guide section 20B from both sides, with the reflecting surface for reflecting light opposed to the outer side surface of the irregular reflector 24. It should be noted that the reflector 25 may be formed integrally with the reflector 23B provided in the second light guide section 21B, or may be formed as an independent member.

Thus, a part of light incident on the first light guide section 20B and transmitted through the irregular reflector 24 is reflected by the reflector 25, and transmitted while being confined within the first light guide section 20B, so that the light made incident on the first light guide section 20B undergoes irregular reflection by the irregular reflector 24, and is emitted in the entire circumferential direction of the first light guide section 20B.

Operation Example of Optical Selector According to Second Embodiment

Next, an operation example of the optical selector 12 according to the second embodiment will be described with reference to FIG. 2A to FIG. 2C, FIG. 3A to FIG. 3D, and FIG. 4A to FIG. 4B.

In the LD 3, an electric signal is converted into an optical signal and outputted, and light outputted from the LD 3 is made incident on the optical waveguide 2B from the outer circumferential surface of the second light guide section 21B toward the first light guide section 20B.

The light made incident from the outer circumferential surface of the second light guide section 21B is transmitted through the second light guide section 21B by being reflected by the reflector 23B, and in the example shown in FIG. 2A to FIG. 2C and FIG. 3A and FIG. 32, has its optical path deflected due to refraction, reflection, and the like by the interface 22 of the first light guide section 20B and the second light guide section 21B in accordance with the difference in refractive index between the first light guide section 20B and the second light guide section 21B.

In the example shown in FIG. 2A to FIG. 2C, FIG. 3A, FIG. 3B, and FIG. 4A to FIG. 4B, light made incident on the first light guide section 20B undergoes irregular reflection upon being incident on the irregular reflector 24, and is transmitted through the first light guide section 20B with the reflected wave travelling in various directions. Also, in the example shown in FIG. 2A to FIG. 2C and FIG. 3A and FIG. 3B, light incident on the first light guide section 20B is transmitted through the first light guide section 20B and becomes incident on the interface 22 of the first light guide section 20B and the second light guide section 21B, and has its optical path deflected due to refraction, reflection, and the like.

Thus, light outputted from the LD 3 and incident on the second light guide section 21B from an arbitrary position on the outer circumference of the optical waveguide 2B is transmitted through the second light guide section 21B, and becomes incident on the first light guide section 20B, so the light undergoes irregular reflection by the irregular reflector 24 and is emitted in the entire circumferential direction from the first light guide section 20B.

Also, in the example shown in FIG. 2A to FIG. 2C and FIG. 3A and FIG. 3B, light incident on the second light guide section 21B is transmitted through the second light guide section 21B, and becomes incident on the interface 22 of the first light guide section 20B and the second light guide section 21B, thereby having its optical path deflected due to refraction and the like.

On the other hand, in the example shown in FIG. 3C and FIG. 3D, light made incident from the outer circumferential surface of the second light guide section 21B is transmitted through the second light guide section 21B by being reflected by the reflector 23B, and has its optical path deflected due to refraction, reflection, and the like by the interface 22 of the first light guide section 20B and the second light guide section 21B in accordance with the difference in refractive index between the first light guide section 20B and the second light guide section 21B.

Light incident on the first light guide section 20B is scattered upon being incident on the scatterer 24B, and is further reflected by the reflector 25 and transmitted through the first light guide section 20B. Also, light incident on the first light guide section 20B is transmitted through the first light guide section 20B and becomes incident on the interface 22 of the first light guide section 20B and the second light guide section 21B, thereby having its optical path deflected due to refraction, reflection, and the like.

Thus, in the example shown in FIG. 3C and FIG. 3D as well, light outputted from the LD 3 and incident on the second light guide section 21B from an arbitrary position on the outer circumference of the optical waveguide 2B is transmitted through the second light guide section 21B, and becomes incident on the first light guide section 20B, so that the light is scattered by the scatterer 24B and reflected by the reflector 25 so as to be emitted in the entire circumferential direction from the first light guide section 20B.

Therefore, in the optical waveguide 2B as well, light is emitted in the entire circumferential direction of the first light guide section 20B, and transmitted through the second light guide section 21B. Then, the light transmitted through the second light guide section 21B is emitted in the entire circumferential direction from the outer circumferential surface of the second light guide section 21B, is inputted to the photodetector 4 placed at an arbitrary position on the outer circumference of the optical waveguide 2B, and an optical signal is converted into an electric signal and outputted.

In this way, in the optical waveguide 2B, the first light guide section 20B at the center portion has a function of emitting light in the entire circumferential direction due to irregular reflection by the irregular reflector 24, and the second light guide section 21B around the first light guide section 20B has a function of transmitting incident light to the first light guide section 20B, and also transmitting irregularly reflected light to the outside. Since absorption of light is suppressed at the irregular reflection surface, attenuation is suppressed.

Also, by making the first light guide section 20B and the second light guide section 21B differ in refractive index, for example, as shown in FIG. 3A and FIG. 3B, light made incident from the outer circumference of the optical waveguide 2B and transmitted through the second light guide section 21B becomes incident on the irregular reflector 24 due to refraction at the interface 22. Then, by providing the irregular reflector 24 on both surfaces of the first light guide section 20B, light incident on the first light guide section 20B is irregularly reflected between opposing irregular reflectors 24, and irregular reflection is produced two or more times by each of reflected waves travelling in various directions. Thus, light incident from an arbitrary direction on the outer circumference of the optical waveguide 2B can be emitted in the entire circumferential direction of the first light guide section 20B.

Further, in the case of the configuration using the scatterer 24B as well, light incident on the first light guide section 20B is scattered by the scatterer 24B provided on both surfaces of the first light guide section 20B, and the light scattered by the scatterer 24B can be reflected by the reflector 25 to be incident on the first light guide section 20B, thereby making it possible to emit the light in the entire circumferential direction of the first light guider section 20B while suppressing attenuation due to dissipation.

Then, since light outputted from the LD 3 placed at an arbitrary position on the outer circumference of the optical waveguide 21B can be received by the photodetector 4 placed at an arbitrary position on the outer circumference of the optical waveguide 2B, by providing a single LD 3 at an arbitrary position on the outer circumference of the optical waveguide 2B, and providing a plurality of photodetectors 4 at arbitrary positions on the outer circumference of the optical waveguide 2B, a one-to-many optical selector 1B is realized.

Also, by providing a plurality of LDs 3 at arbitrary positions on the outer circumference of the optical waveguide 2B, and providing a single photodetector 4 at an arbitrary position on the outer circumference of the optical waveguide 2B, a many-to-one optical selector 1B is realized.

Further, by providing a plurality of LDs 3 at arbitrary positions on the outer circumference of the optical waveguide 2B, and providing a plurality of photodetectors 4 at arbitrary positions on the outer circumference of the optical waveguide 2B, a many-to-many optical selector 1B is realized.

It should be noted that the entire surface of the reflector may be formed by an irregular reflector.

Here, when light outputted from the LD 3 is collected or the like so that the light is incident on a corner portion of the second light guide section 21B at the interface 22 of the first light guide section 20B and the second light guide section 21B, the light is diffracted at the corner portion of the second light guide section 21B. Thus, it is possible to emit incident light in the entire circumferential direction of the optical waveguide 2B by diffraction, in accordance with the setting of the incidence position of light.

Modification of Optical Selector According to Second Embodiment

FIG. 5A to FIG. 5D, FIG. 6, and FIG. 7 are structural views each showing a modification of the optical selector according to the second embodiment. In FIG. 5A to FIG. 5C, FIG. 6, and FIG. 7, the modification of the optical selector according to the second embodiment is shown in a side cross-sectional view. It should be noted that a plan view of the optical selector according to the modification of the second embodiment is the same as shown in FIG. 1B.

Figure 5A:
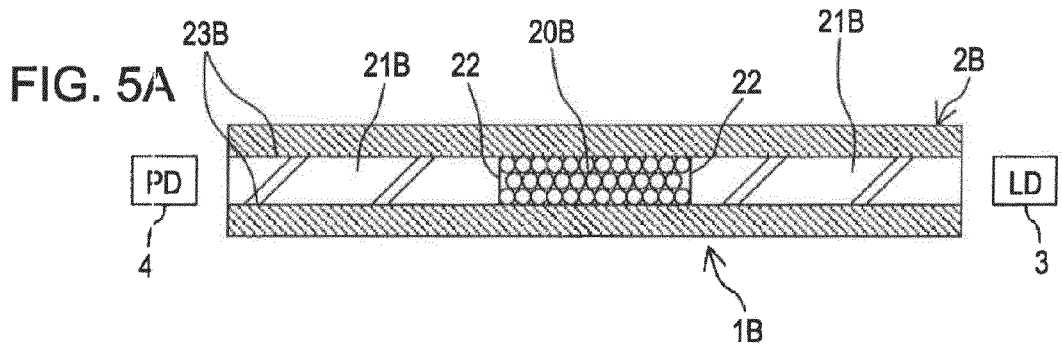
FIG. 5A is a structural view showing a modification of the optical selector according to the second embodiment.

In the example shown in FIG. 5A, the first light guide section 20B of the optical waveguide 2B is formed by irregular reflection materials. As the irregular reflection materials, for example, spherical light guide materials are used. The first light guide section 20B is formed by arranging the spherical light guide materials in a predetermined placement in a circular space formed at the center of the second light guide section 21B.

As the spherical light guide materials, for example, spherical beads as spacers forming a space for filling liquid crystals between opposing substrates in a liquid crystal panel are used, and the spherical beads are arrayed three-dimensionally in a honeycomb array in which they are staggered in position or in a circular array in which they are arranged on a row.

Figure 5B:
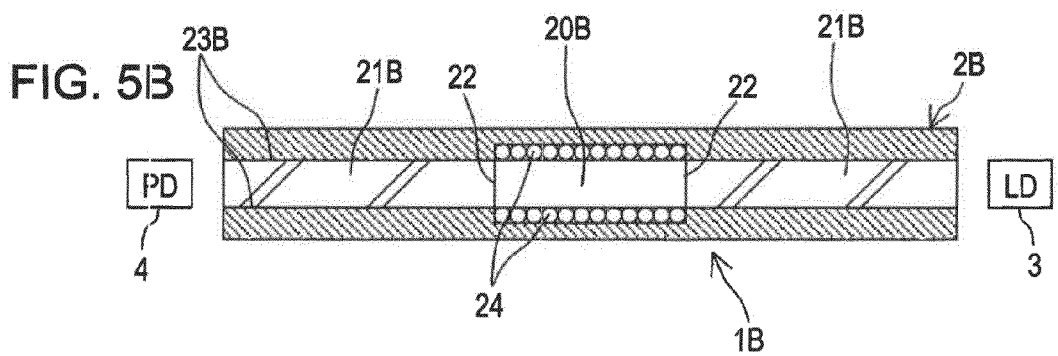
FIG. 5B is a structural view showing a modification of the optical selector according to the second embodiment.
Figure 5C:
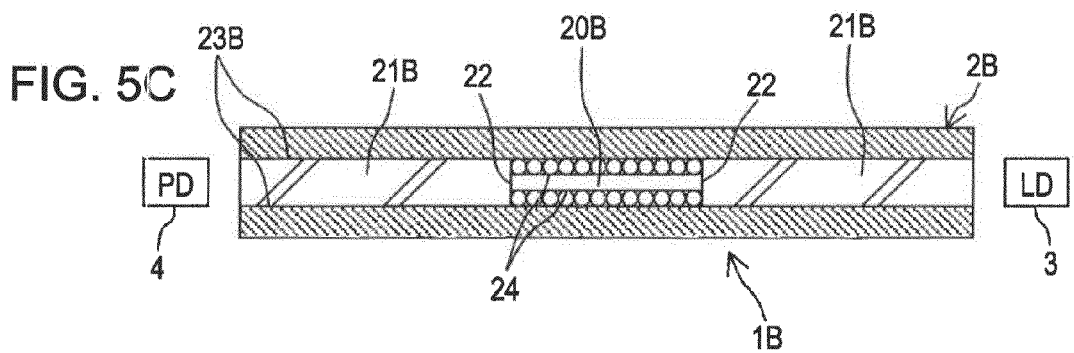
FIG. 5C is a structural view showing a modification of the optical selector according to the second embodiment.
Figure 5D:
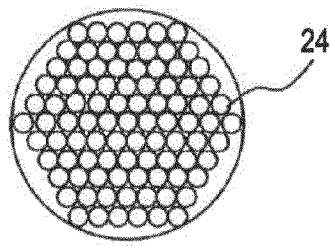
FIG. 5D is a structural view showing a modification of the optical selector according to the second embodiment.

In the example shown in FIG. 5B and FIG. 5C, the irregular reflector 24 is formed by spherical light guide materials. In the example shown in FIG. 5B and FIG. 5C as well, as the spherical light guide materials, for example, spherical beads as spacers forming a space for filling liquid crystals between opposing substrates in a liquid crystal panel are used, and as shown in the plan view of FIG. 5B, are placed in a placement that causes incident light to be irregularly reflected in the entire circumferential direction, for example, in a honeycomb array in which the spherical beads are staggered in position or in a circular array in which they are arranged on the circumference of a circle. In the case of a configuration in which spherical light guide materials are used as the irregular reflection materials, to enhance reflectance, it is preferable to make the spherical light guide materials to have a mirror surface by evaporation of aluminum or the like, and a protective film may be attached to the mirror surface. Aluminum may be evaporated individually onto the spherical light guide materials, or aluminum may be evaporated onto the whole of the spherical light guide materials arranged in a predetermined placement as shown in FIG. 5A to FIG. 5D.

Here, in FIG. 5B, the surface of the irregular reflector 24 which opposes the first light guide section 20B, and the reflection surface of the reflector 23B which opposes the second light guide section 21B are flush with each other. However, the distance between the surface of the irregular reflector 24 and the reflection surface of the reflector 23B may be any predetermined distance that satisfies the above-described optical condition. For example, as shown in FIG. 5C, the surface of the irregular reflector 24 may be located on the inner side than the reflection surface of the reflector 23B.

Figure 6:
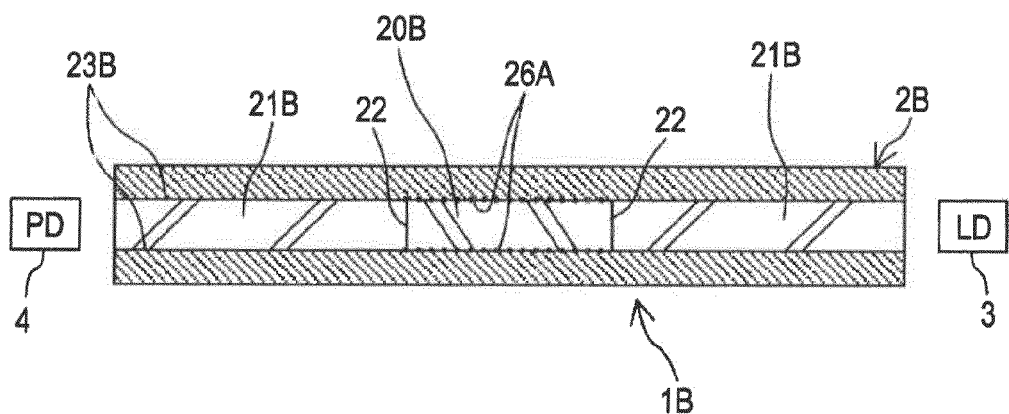
FIG. 6 is a structural view showing a modification of the optical selector according to the second embodiment.

In the example shown in FIG. 6, the first light guide section 20B of the optical waveguide 2B is formed by a solid such as a resin material, and instead of an irregular reflector, the interface of the first light guide section 20B with the reflector 23B is formed as a rough surface 26A.

The rough surface 26A is formed by polishing of the upper and lower surfaces of the first light guide section 20B having a cylindrical shape into a predetermined surface roughness so as to become like the surface of frosted glass, or the like. In the case of a configuration in which the interface of the first light guide section 20B with the reflector 23B is formed as the rough surface 26A instead of an irregular reflector, to enhance reflectance, it is preferable to make the rough surface 26A a mirror surface by evaporation of aluminum or the like with such a film thickness that allows the rough surface to be maintained, and a protective film may be attached to the mirror surface.

Thus, light incident on the first light guide section 20B undergoes irregular reflection upon being incident on the rough surface 26A and is transmitted through the first light guide section 20B, and emitted in the entire circumferential direction from the first light guide section 20B.

Figure 7:
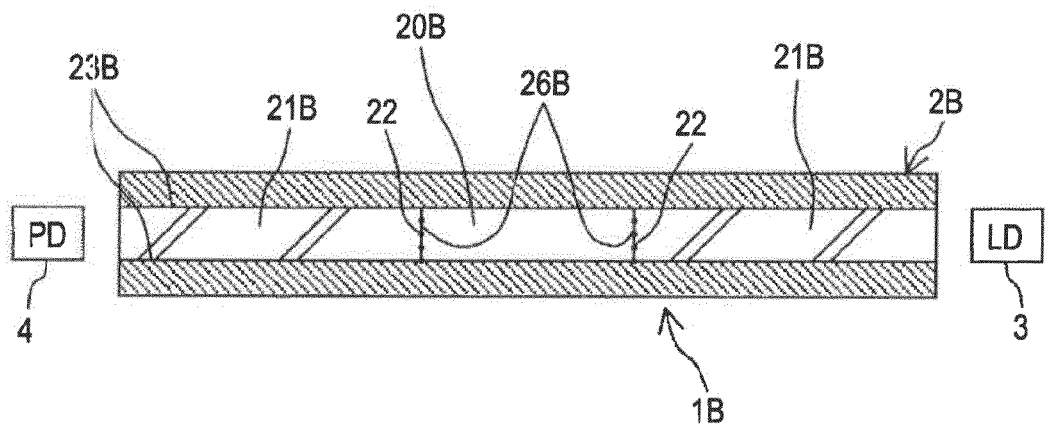
FIG. 7 is a structural view showing a modification of the optical selector according to the second embodiment.

In the example shown in FIG. 7, the interface 22 between the first light guide section 20B and second light guide section 21B of the optical waveguide 20B is formed as a rough surface 26B.

The rough surface 26B is formed by polishing the outer circumferential surface of the first light guide section 20B having a cylindrical shape in the case of a configuration in which the first light guide section 20B is formed by a solid such as a resin material, or by polishing of the inner circumferential surface of the second light guide section 21B having a ring-like shape in the case of a configuration in which the first light guide section 20B is formed by a cavity, into a predetermined surface roughness so as to become like the surface of frosted glass, or the like.

Thus, light incident on the interface 22 of the first light guide section 20B and the second light guide section 21B is irregularly reflected by the rough surface 26B and transmitted through the first light guide section 20B, and emitted in the entire circumferential direction from the first light guide section 20B.

Configuration Example of Optical Selector According to Third Embodiment

FIG. 8A to FIG. 8C, FIG. 9A to FIG. 9C, FIG. 10A to FIG. 10C, and FIG. 11A to FIG. 11C are structural views each showing an example of an optical selector according to a third embodiment. In FIG. 8A to FIG. 8C, FIG. 9A to FIG. 9C, FIG. 10A to FIG. 10C, and FIG. 11A to FIG. 11C, the optical selector according to the third embodiment is shown in a side cross-sectional view. It should be noted that a plan view of the optical selector according to the third embodiment is the same as shown in FIG. 1B.

An optical selector 1C according to the third embodiment includes a planar-type optical waveguide 2C that causes light made incident from an arbitrary direction to pass through two kinds of light guide material with different refractive indices, and causes the light to be irregularly reflected by using the action of a lens and an irregular reflector so as to be emitted in the entire peripheral direction, the LD 3 that outputs light having rectilinearity, and the photodetector 4 to which light is inputted.

The optical waveguide 2C includes a first light guide section 20C formed of a light guide material having a first refractive index in a predetermined wavelength range, and a second light guide section 21C formed of a light guide material having a second refractive index different from the first refractive index.

The first light guide section 20C and the second light guide section 21C are both disc-shaped in this example. With the center of the first light guide section 20C and the center of the second light guide section 21C aligned with each other, the first light guide section 20C is placed at substantially the center of the second light guide section 21C, and the second light guide section 21C is provided to the side of and along the entire circumference of the first light guide section 20C.

The first light guide section 20C is formed of a transparent resin material, a cavity, or the like having the first refractive index in a predetermined wavelength range. Also, the second light guide section 21C is formed of a transparent resin material or the like having the second refractive index in a predetermined wavelength range.

The optical waveguide 2C includes a lens section 27 at the interface 22 of the first light guide section 20C and the second light guide section 21C or in the second light guide section 21C.

The lens section 27 is an example of a lens member. In the example shown in FIG. 8A to FIG. 8C, the lens section 27A is formed by providing an annular light guide material having a predetermined refractive index along the outer circumferential surface of the first light guide section 20C.

The lens section 27A has a circular cross-sectional shape with a diameter substantially equal to the thickness of the second light guide section 21C, and is enclosed along the inner circumferential surface of the second light guide section 21C. Here, the lens section 27A is formed of a material having the same refractive index as the first light guide section 20C in this example.

Figure 9A:
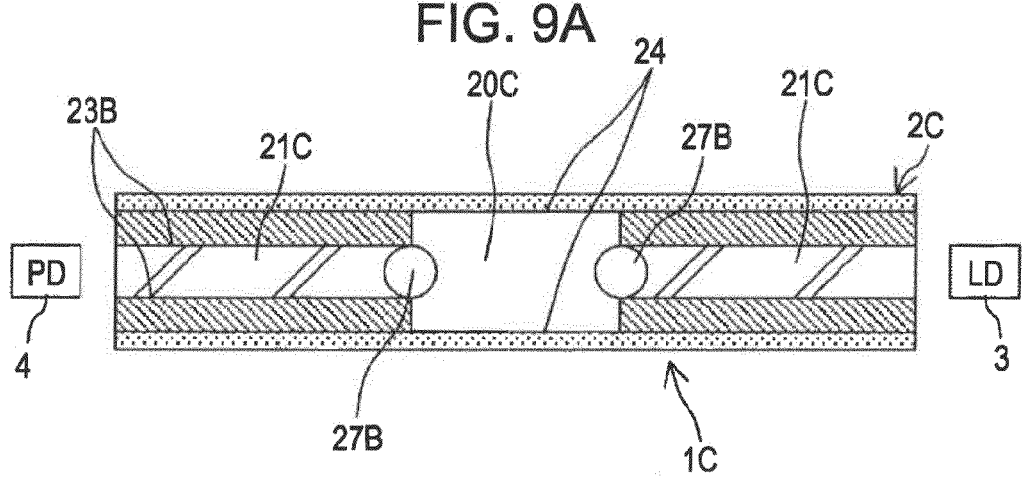
FIG. 9A is a structural view showing a modification of the optical selector according to the third embodiment.
Figure 9B:
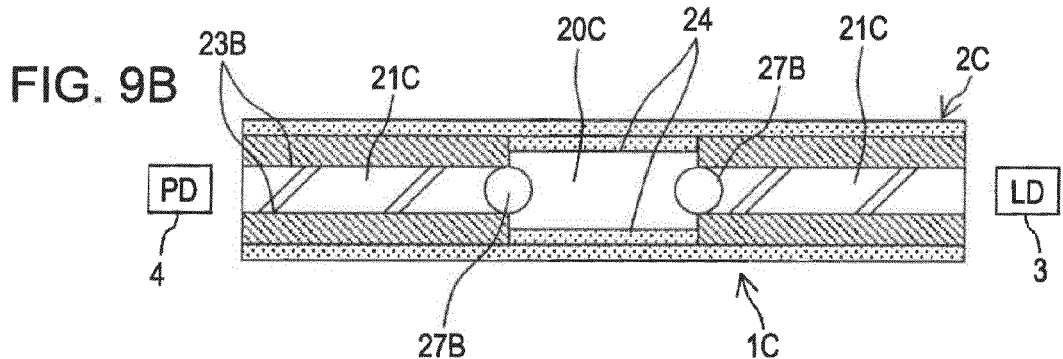
FIG. 9B is a structural view showing a modification of the optical selector according to the third embodiment.
Figure 9C:
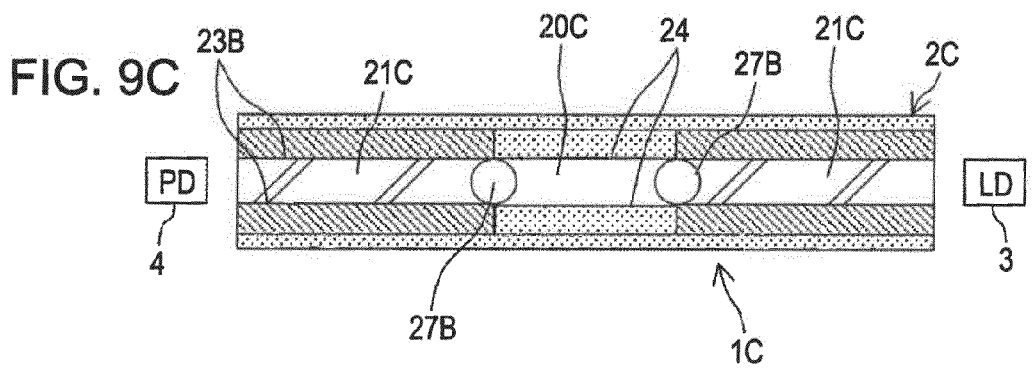
FIG. 9C is a structural view showing a modification of the optical selector according to the third embodiment.

In the example shown in FIG. 9A to FIG. 9C, a lens section 27B is formed by providing an annular light guide material having a predetermined refractive index along the interface of the first light guide section 20C and the second light guide section 21C.

The lens section 27B has a circular cross-sectional shape with a diameter substantially equal to the thickness of the second light guide section 21C, and is enclosed in the first light guide section 20C and the second light guide section 21C. Here, the lens section 27B is formed of a material having a third refractive index different from the first light guide section 20C and the second light guide section 21C in this example.

Figure 10A:
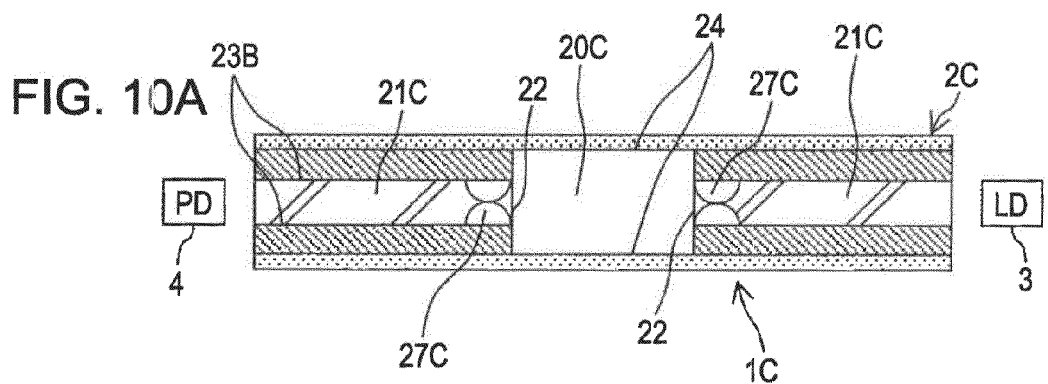
FIG. 10A is a structural view showing a modification of the optical selector according to the third embodiment.
Figure 10B:
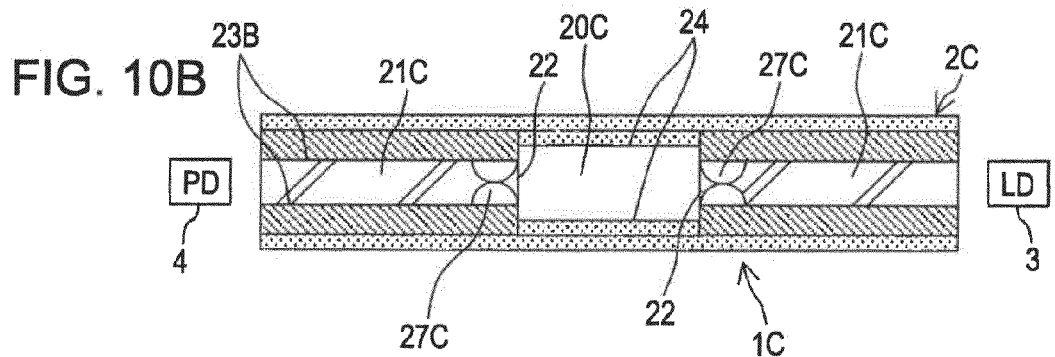
FIG. 10B is a structural view showing a modification of the optical selector according to the third embodiment.
Figure 10C:
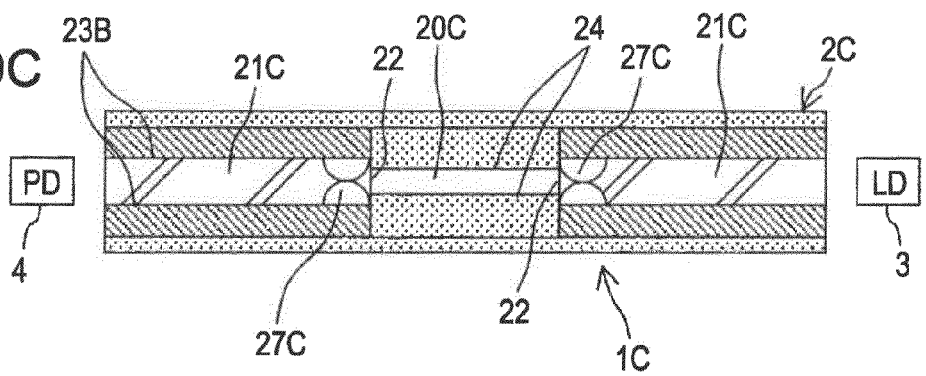
FIG. 10C is a structural view showing a modification of the optical selector according to the third embodiment.

In the example shown in FIG. 10A to FIG. 10C, a lens section 27C is formed by providing an annular light guide material having a predetermined refractive index along the outer circumferential surface of the first light guide section 20C.

The lens section 27C has a semicircular cross-sectional shape with a radius substantially equal to half the thickness of the second light guide section 21C, and is enclosed along the inner circumferential surface of the second light guide section 21C, with the apexes of the semicircles opposed to each other. Here, the lens section 27C is formed of a material having the third refractive index different from the first light guide section 20C and the second light guide section 21C in this example.

Figure 11A:
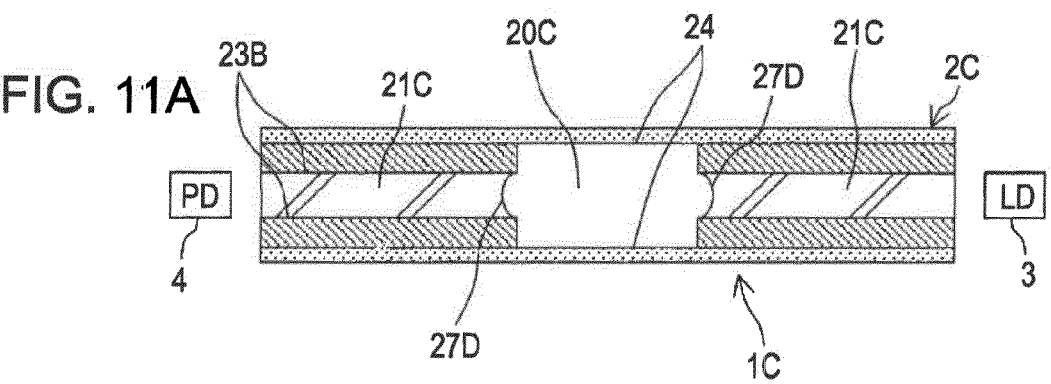
FIG. 11A is a structural view showing a modification of the optical selector according to the third embodiment.
Figure 11B:
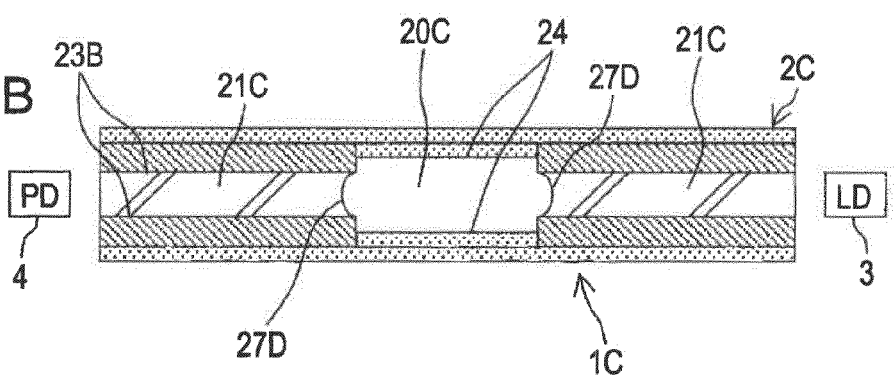
FIG. 11B is a structural view showing a modification of the optical selector according to the third embodiment.
Figure 11C:
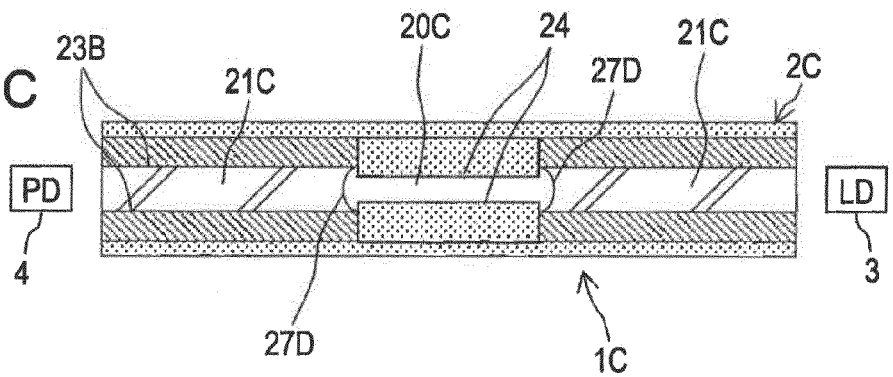
FIG. 11C is a structural view showing a modification of the optical selector according to the third embodiment.

In the example shown in FIG. 11A to FIG. 11C, a lens section 27D is formed by making the interface 22 of the first light guide section 20C and the second light guide section 21C a curved surface having a predetermined curvature radius R. In the case of a configuration in which the first light guide section 20D is a cavity, for example, the lens section 27D is formed by making the inner circumferential surface of the second light guide section 21C a concave curved surface.

Like the optical waveguide 2B of the optical selector 1B according to the second embodiment described with reference to FIG. 2A to FIG. 2C and the like, the optical waveguide 2C includes the reflector 23B on the upper and lower surfaces of the second light guide section 21C. Also, the irregular reflector 24 is provided on the upper and lower surfaces of the first light guide section 20C.

Here, in FIG. 8A, FIG. 9A, FIG. 10A, and FIG. 11A, as in FIG. 2A according to the second embodiment, the reflector 23B sandwiching the second light guide section 21C is further sandwiched by the irregular reflector 24. While the irregular reflection surface of the irregular reflector 24 and the reflection surface of the reflector 23B have a distance corresponding to the thickness of the reflector 23B, the distance between the irregular reflection surface of the irregular reflector 24 and the reflection surface of the reflector 23B may be any predetermined distance that satisfies the above-described optical condition.

Figure 8A:
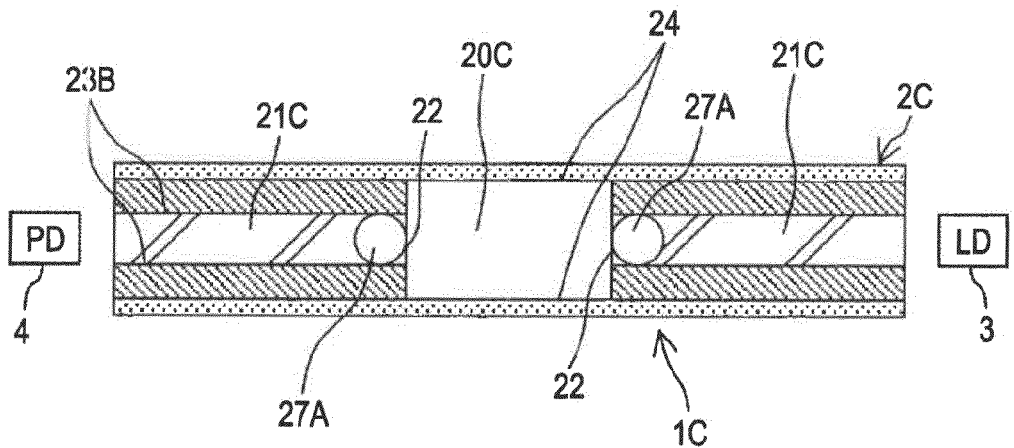
FIG. 8A is a structural view showing a modification of an optical selector according to a third embodiment.
Figure 8B:
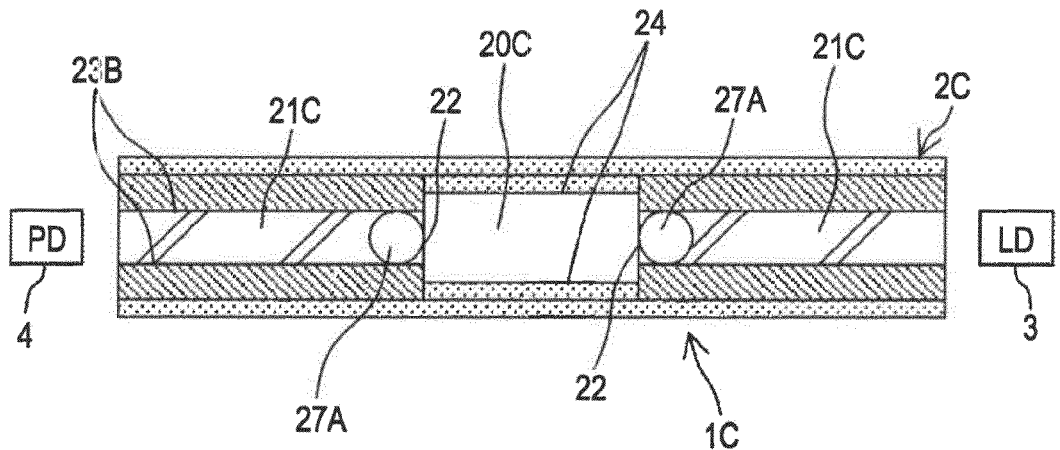
FIG. 8B is a structural view showing a modification of the optical selector according to the third embodiment.
Figure 8C:
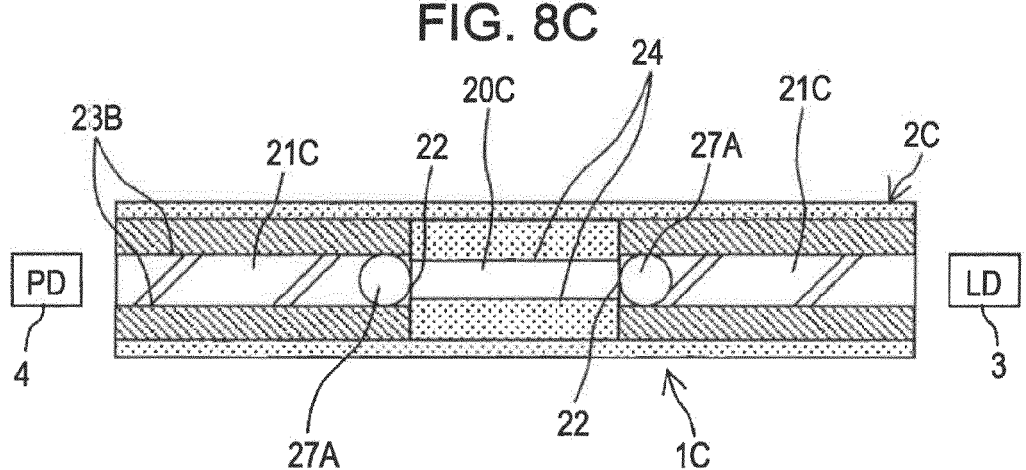
FIG. 8C is a structural view showing a modification of the optical selector according to the third embodiment.

That is, the irregular reflection surface of the irregular reflector 24 and the reflection surface of the reflector 23B may be brought closer to each other as shown in FIG. 8B, FIG. 9B, FIG. 10B, and FIG. 11B, may be flush with each other as shown in FIG. 9C, or as shown in FIG. 8C, FIG. 10C, and FIG. 11C, the irregular reflection surface of the irregular reflector 24 may be located on the inner side than the reflection surface of the reflector 23B.

Thus, in the optical waveguide 2C, with arbitrary positions on the outer circumferential surface of the second light guide section 21C serving as light incidence section and emission section, light is made incident and emitted from the outer circumferential surface of the second light guide section 21C, and light incident on the second light guide section 21C is reflected by the reflector 23B and transmitted through the second light guide section 21C.

In the example shown in FIG. 8A to FIG. 8C, light transmitted through the second light guide section 21C is emitted in the entire circumferential direction from the first light guide section 20C due to refraction, reflection, and the like by the lens section 27A and the interface 22 of the first light guide section 20C and the second light guide section 21C, and irregular reflection by the irregular reflector 24.

In the example shown in FIG. 9A to FIG. 9C, light transmitted through the second light guide section 21C is emitted in the entire circumferential direction from the first light guide section 20C due to refraction, reflection, and the like by the lens section 27B, and irregular reflection by the irregular reflector 24.

In the example shown in FIG. 10A to FIG. 10C, light transmitted through the second light guide section 21C is emitted in the entire circumferential direction from the first light guide section 20C due to refraction, reflection, and the like by the lens section 27C and the interface 22 of the first light guide section 20C and the second light guide section 21C, and irregular reflection by the irregular reflector 24.

In the example shown in FIG. 11A to FIG. 11C, light transmitted through the second light guide section 21C is emitted in the entire circumferential direction from the first light guide section 20C due to refraction, reflection, and the like by the lens section 27D, and irregular reflection by the irregular reflector 24.

Then, the light emitted in the entire circumferential direction from the first light guide section 20C is transmitted through the second light guide section 21C, and emitted from the outer circumferential surface of the second light guide section 21C.

Therefore, in the optical waveguide 2C, when light is made incident toward the first light guide section 20C from an arbitrary position on the outer circumference, the light is emitted in the entire circumferential direction in the first light guide section 20C, thereby allowing reception of light at an arbitrary position on the outer circumference.

The LD 3 is placed at an arbitrary position on the outer circumference of the optical waveguide 2C, with an unillustrated light emitting section opposed to the outer circumferential surface of the second light guide section 21C. Also, the photodetector 4 is placed at an arbitrary position on the outer circumference of the optical waveguide 2C, with an unillustrated light receiving section opposed to the outer circumferential surface of the second light guide section 21C.

Operation Example of Optical Selector According to Third Embodiment

Next, an operation example of the optical selector 1C according to the third embodiment will be described with reference to FIG. 8A to FIG. 8C, FIG. 9A to FIG. 9C, FIG. 10A to FIG. 10C, and FIG. 11A to FIG. 11C.

In the LD 3, an electric signal is converted into an optical signal and outputted, and light outputted from the LD 3 is made incident on the optical waveguide 2C from the outer circumferential surface of the second light guide section 21C toward the first light guide section 20C.

The light made incident from the outer circumferential surface of the second light guide section 21C is transmitted through the second light guide section 21C by being reflected by the reflector 23B. In the example shown in FIG. 8A to FIG. 8C, when the light transmitted through the second light guide section 21C passes through the lens section 27A with a different refractive index, since the cross-sectional shape of the lens section 27A is circular, the light is refracted by the action of the lens.

When the light refracted by the lens section 27A is incident on the interface 22 of the first light guide section 20C and the second light guide section 21C, its optical path is deflected due to refraction, reflection, and the like by the interface 22 of the first light guide section 20C and the second light guide section 21C, in accordance with the difference in refractive index between the first light guide section 20C and the second light guide section 21C.

Also, light incident on the first light guide section 20C is irregularly reflected upon being incident on the irregular reflector 24, transmitted through the first light guide section 20C along various optical paths, and becomes incident on the interface 22 of the first light guide section 20C and the second light guide section 21, and further on the lens section 27A to have its optical path deflected due to refraction, reflection, and the like.

In the example shown in FIG. 9A to FIG. 9C, when the light transmitted through the second light guide section 21C passes through the lens section 27B with a different refractive index, since the cross-sectional shape of the lens section 27B is circular, the light is refracted by the action of the lens, and becomes incident on the first light guide section 20C.

Also, light incident on the first light guide section 20C is irregularly reflected upon being incident on the irregular reflector 24, transmitted through the first light guide section 20C, and becomes incident on the lens section 27B to have its optical path deflected due to refraction and the like.

In the example shown in FIG. 10A to FIG. 10C, when the light transmitted through the second light guide section 21C passes through the lens section 27C with a different refractive index, since the cross-sectional shape of the lens section 27C is semicircular, the light is refracted by the action of the lens.

When the light refracted by the lens section 27C is incident on the interface 22 of the first light guide section 20C and the second light guide section 21C, its optical path is deflected due to refraction, reflection, and the like by the interface 22 of the first light guide section 20C and the second light guide section 21C, in accordance with the difference in refractive index between the first light guide section 20C and the second light guide section 21C.

Also, light incident on the first light guide section 20C is irregularly reflected upon being incident on the irregular reflector 24, transmitted through the first light guide section 20C, and becomes incident on the interface 22 of the first light guide section 20C and the second light guide section 21, and further on the lens section 27C to have its optical path deflected due to refraction, reflection, and the like.

In the example shown in FIG. 11A to FIG. 11C, when the light transmitted through the second light guide section 21C passes through the lens section 27D, since the first light guide section 20C and the second light guide section 21C differ in refractive index, and the lens section 27D is a curved surface, the light is refracted by the action of the lens, and becomes incident on the first light guide section 20C.

Also, the light incident on the first light guide section 20C is irregularly reflected upon being incident on the irregular reflector 24, transmitted through the first light guide section 20C, and becomes incident on the lens section 27D to have its optical path deflected due to refraction and the like.

Thus, light outputted from the LD 3 and incident on the second light guide section 21C from an arbitrary position on the outer circumference of the optical waveguide 2C is transmitted through the second light guide section 21C, and has its optical path deflected by the action of the lens section 27 (A, B, C, D) to be incident on the first light guide section 20C. In addition, the light incident on the first light guide section 20C is irregularly reflected by the irregular reflector 24 and transmitted through the first light guide section 20C, and further has its optical path deflected by the lens section 27 (A, B, C, D) to be emitted more evenly in the entire circumferential direction.

Therefore, in the optical waveguide 2C as well, light is emitted in the entire circumferential direction from the first light guide section 20C, and transmitted through the second light guide section 21C. Then, the light transmitted through the second light guide section 21C is emitted in the entire circumferential direction from the outer circumferential surface of the second light guide section 21C, is inputted to the photodetector 4 placed at an arbitrary position on the outer circumference of the optical waveguide 2C, and an optical signal is converted into an electric signal and outputted.

In this way, the optical waveguide 2C has a function of emitting light in the entire circumferential direction due to the action of the lens section 27 (A, B, C, D), and irregular reflection by the irregular reflector 24 in the first light guide section 20C at the center portion. In addition, the second light guide section 21C around the first light guide section 20C has a function of transmitting incident light to the first light guide section 20C, and transmitting irregularly reflected light to the outside. Since absorption of light is suppressed at the irregular reflection surface, attenuation is suppressed.

Then, since light outputted from the LD 3 placed at an arbitrary position on the outer circumference of the optical waveguide 2C can be received by the photodetector 4 placed at an arbitrary position on the outer circumference of the optical waveguide 2C, by providing a single LD 3 at an arbitrary position on the outer circumference of the optical waveguide 2C, and providing a plurality of photodetectors 4 at arbitrary positions on the outer circumference of the optical waveguide 2C, a one-to-many optical selector 1C is realized.

Also, by providing a plurality of LDs 3 at arbitrary positions on the outer circumference of the optical waveguide 2C, and providing a single photodetector 4 at an arbitrary position on the outer circumference of the optical waveguide 2C, a many-to-one optical selector 1C is realized.

Further, by providing a plurality of LDs 3 at arbitrary positions on the outer circumference of the optical waveguide 2C, and providing a plurality of photodetectors 4 at arbitrary positions on the outer circumference of the optical waveguide 2C, a many-to-many optical selector 1C is realized.

Here, in the configuration shown in FIG. 10A to FIG. 10C, when light outputted from the LD 3 is collected or the like so that the light is incident on the apex of the semicircular lens section 27C, the light is diffracted at the apex of the lens section 27C. Thus, it is possible to emit incident light in the entire circumferential direction of the optical waveguide 2C by diffraction, in accordance with the setting of the incidence position of light.

Also, in the optical waveguide 2C, letting the radius of the outer circumferential surface of the second light guide section 21C be r1 and the radius of the inner circumferential surface be r2, by placement at such an arbitrary position that the radius r of the annular shape of the lens section 27 (A, B, C) falls within r=r1−r2, an effect is obtained whereby light is irregularly reflected and emitted in the entire circumferential direction.

Configuration Example of Optical Selector According to Fourth Embodiment

FIG. 12A to FIG. 12C and FIG. 13A to FIG. 13C are structural views each showing an example of an optical selector according to a fourth embodiment. In FIG. 12A to FIG. 12C and FIG. 13A to FIG. 13C, the optical selector according to the fourth embodiment is shown in a side cross-sectional view. It should be noted that a plan view of the optical selector according to the fourth embodiment is the same as shown in FIG. 1B.

An optical selector 1D according to the fourth embodiment includes a planar-type optical waveguide 2D that causes light made incident from an arbitrary direction to be irregularly reflected by using the action of a lens and an irregular reflector so as to be emitted in the entire circumferential direction, the LD 3 that outputs light having rectilinearity, and the photodetector 4 to which light is inputted.

The optical waveguide 2D includes a first light guide section 20D formed of a light guide material having a first refractive index in a predetermined wavelength range, and a second light guide section 21D formed of a light guide material having a second refractive index different from the first refractive index.

The first light guide section 20D is formed of a transparent resin material or the like having the first refractive index in a predetermined wavelength range. Also, the second light guide section 21D is formed of a transparent resin material or the like having the second refractive index in a predetermined wavelength range.

Figure 12A:
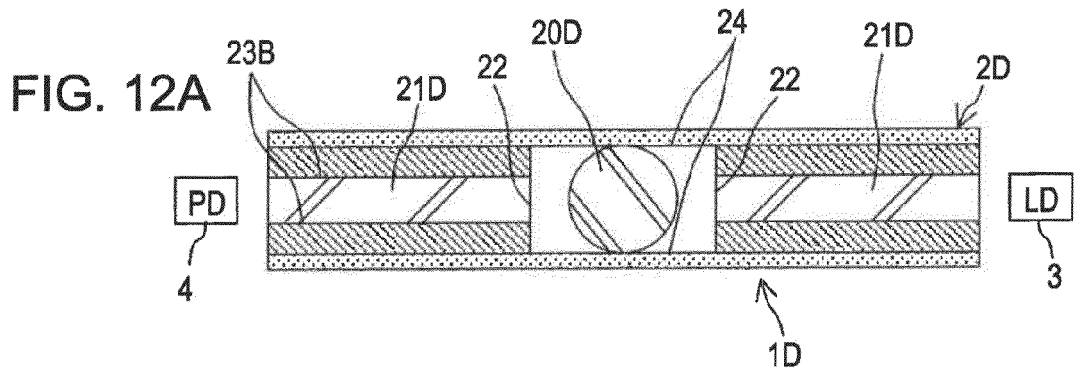
FIG. 12A is a structural view showing a modification of an optical selector according to a fourth embodiment.
Figure 12B:
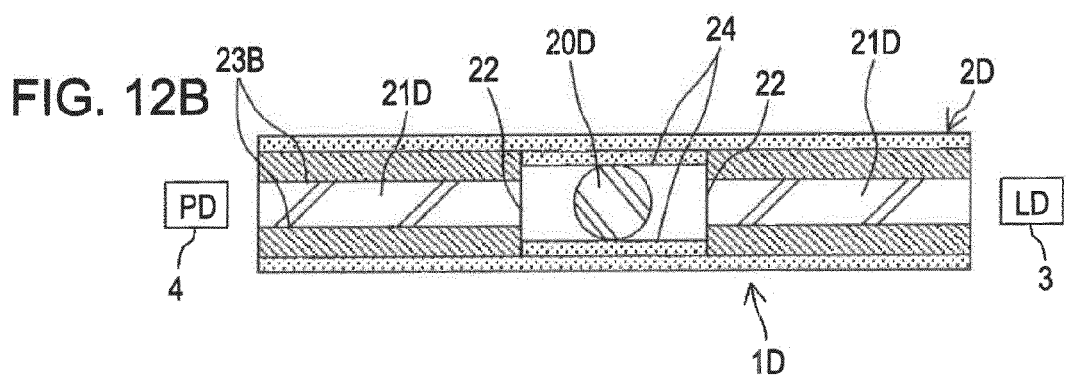
FIG. 12B is a structural view showing a modification of the optical selector according to the fourth embodiment.
Figure 12C:
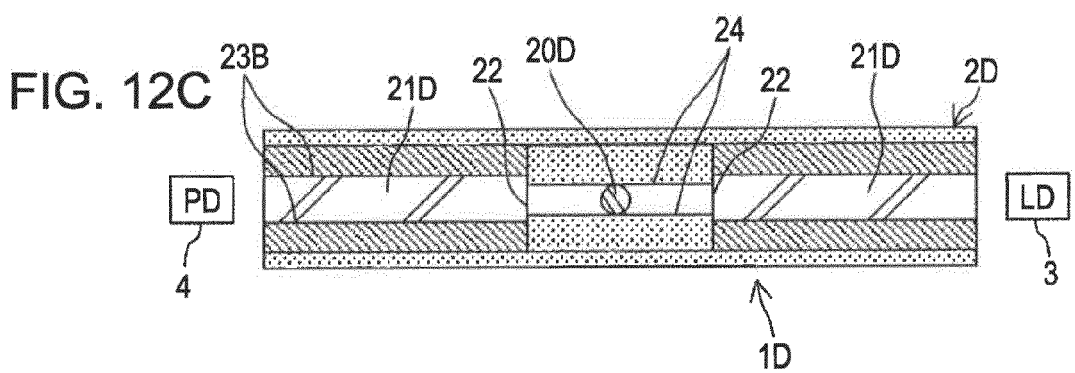
FIG. 12C is a structural view showing a modification of the optical selector according to the fourth embodiment.
Figure 13A:
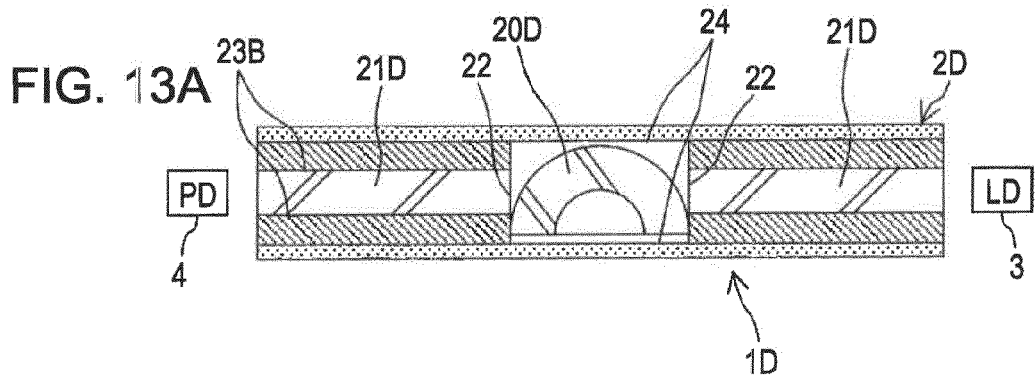
FIG. 13A is a structural view showing a modification of the optical selector according to the fourth embodiment.
Figure 13B:
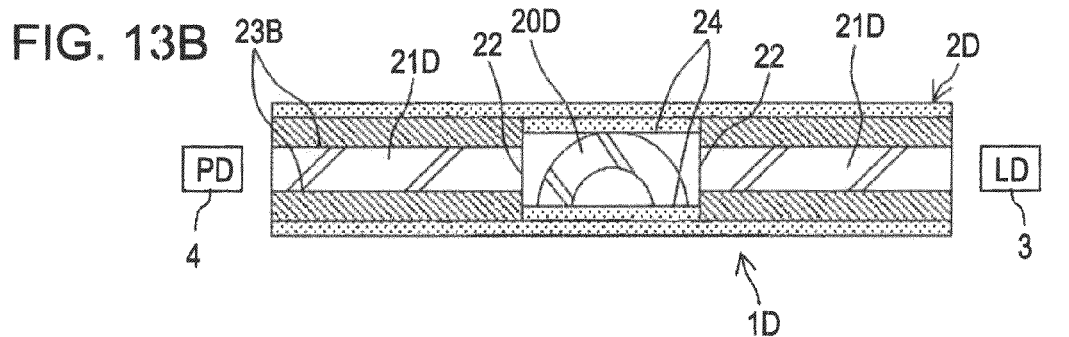
FIG. 13B is a structural view showing a modification of the optical selector according to the fourth embodiment.
Figure 13C:
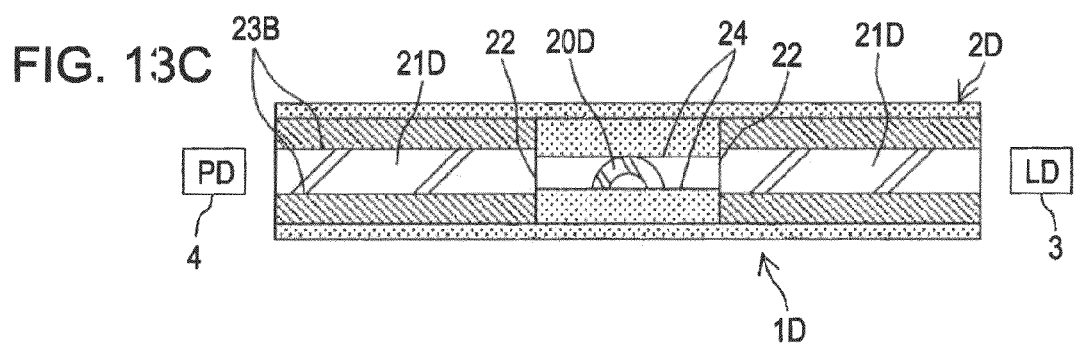
FIG. 13C is a structural view showing a modification of the optical selector according to the fourth embodiment.

The first light guide section 20D is formed in a solid spherical shape in the example shown in FIG. 12A to FIG. 12C, and is formed in a hollow semispherical shape in the example shown in FIG. 13A to FIG. 13C. Also, the second light guide section 21D is formed in a disc shape with a circular space formed at the center portion. With the center of the first light guide section 20D and the center of the second light guide section 21D aligned with each other, the first light guide section 20D is placed at substantially the center of the second light guide section 21D, and the second light guide section 21D is provided to the side of and along the entire circumference of the first light guide section 20D.

Like the optical waveguide 2B of the optical selector 1B according to the second embodiment described with reference to FIG. 2A to FIG. 2C and the like, the optical waveguide 2D includes the reflector 23B on the upper and lower surfaces of the second light guide section 21D. Also, the irregular reflector 24 is provided on the upper and lower surfaces of the first light guide section 20D.

Here, in FIG. 12A and FIG. 13A, as in FIG. 2A of the second embodiment, the reflector 23B sandwiching the second light guide section 21D is further sandwiched by the irregular reflector 24. While the irregular reflection surface of the irregular reflector 24 and the reflection surface of the reflector 23B have a distance corresponding to the thickness of the reflector 23B, the distance between the irregular reflection surface of the irregular reflector 24 and the reflection surface of the reflector 23B may be any predetermined distance that satisfies the above-described optical condition.

That is, the irregular reflection surface of the irregular reflector 24 and the reflection surface of the reflector 23B may be brought closer to each other as shown in FIG. 12B and FIG. 13B or, although not shown, may be flush with each other, or as shown in FIGS. 12C and 13C, the irregular reflection surface of the irregular reflector 24 may be located on the inner side than the reflection surface of the reflector 23B.

Thus, in the optical waveguide 2D, with arbitrary positions on the outer circumferential surface of the second light guide section 21D serving as light incidence section and emission section, light is made incident and emitted from the outer circumferential surface of the second light guide section 21D, and light incident on the second light guide section 21D is reflected by the reflector 23B and transmitted through the second light guide section 21D.

Also, the light transmitted through the second light guide section 21D is emitted in the entire circumferential direction of the first light guide section 20D due to refraction, reflection, and the like by the interface between the second light guide section 21D and the cavity, irregular reflection by the irregular reflector 24, and the action of the lens in the first light guide section 20D.

Further, the light emitted in the entire circumferential direction of the first light guide section 20D is transmitted through the second light guide section 21D, and emitted from the outer circumferential surface of the second light guide section 21D.

Therefore, in the optical waveguide 2D, when light is made incident toward the first light guide section 20D from an arbitrary position on the outer circumference, the light is emitted in the entire circumferential direction in the first light guide section 20D, thereby allowing reception of light at an arbitrary position on the outer circumference.

The LD 3 is placed at an arbitrary position on the outer circumference of the optical waveguide 2D, with an unillustrated light emitting section opposed to the outer circumferential surface of the second light guide section 21D. Also, the photodetector 4 is placed at an arbitrary position on the outer circumference of the optical waveguide 2D, with an unillustrated light receiving section opposed to the outer circumferential surface of the second light guide section 21D.

Operation Example of Optical Selector According to Fourth Embodiment

Next, an operation example of the optical selector 1D according to the fourth embodiment will be described with reference to FIG. 12A to FIG. 12C and FIG. 13A to FIG. 13C.

In the LD 3, an electric signal is converted into an optical signal and outputted, and light outputted from the LD 3 is made incident on the optical waveguide 2D from the outer circumferential surface of the second light guide section 21D toward the first light guide section 20D.

The light made incident from the outer circumferential surface of the second light guide section 21D is transmitted through the second light guide section 21D by being reflected by the reflector 23B, and upon being incident on the interface 22 between the first light guide section 20D and the cavity, its optical path is deflected due to refraction and the like in accordance with the difference in refractive index between the second light guide section 21D and the cavity.

When light emitted from the inner circumferential surface of the second light guide section 21D is incident on the first light guide section 20D, since the cross-sectional shape of the first light guide section 20D is formed as a curved surface in a circular shape, a semicircular shape, or the like, the light is refracted by the action of a lens. Also, the light emitted from the inner circumferential surface of the second light guide section 21D is irregularly reflected upon being incident on the irregular reflector 24.

Thus, light outputted from the LD 3 and incident on the second light guide section 21D from an arbitrary position on the outer circumference of the optical waveguide 2D is transmitted through the second light guide section 21D, has its optical path deflected by the action of the lens in the first light guide section 20D, and is irregularly reflected by the irregular reflector 24 and emitted in the entire circumferential direction.

Therefore, in the optical waveguide 2D as well, light is emitted in the entire circumferential direction of the first light guide section 20D, and transmitted through the second light guide section 21D. Then, the light transmitted through the second light guide section 21D is emitted in the entire circumferential direction from the outer circumferential surface of the second light guide section 21D, is inputted to the photodetector 4 placed at an arbitrary position on the outer circumference of the optical waveguide 2D, and an optical signal is converted into an electric signal and outputted.

In this way, in the optical waveguide 2D, the first light guide section 20D at the center portion has a function of emitting light in the entire circumferential direction due to the action of the lens and irregular reflection by the irregular reflector 24, and the second light guide section 21D around the first light guide section 20D has a function of transmitting incident light to the first light guide section 20D, and transmitting irregularly reflected light to the outside. Since absorption of light is suppressed at the irregular reflection surface, attenuation is suppressed.

Then, since light outputted from the LD 3 placed at an arbitrary position on the outer circumference of the optical waveguide 2D can be received by the photodetector 4 placed at an arbitrary position on the outer circumference of the optical waveguide 2D, by providing a single LD 3 at an arbitrary position on the outer circumference of the optical waveguide 2D, and providing a plurality of photodetectors 4 at arbitrary positions on the outer circumference of the optical waveguide 2D, a one-to-many optical selector 1D is realized.

Also, by providing a plurality of LDs 3 at arbitrary positions on the outer circumference of the optical waveguide 2D, and providing a single photodetector 4 at an arbitrary position on the outer circumference of the optical waveguide 2D, a many-to-one optical selector 1D is realized.

Further, by providing a plurality of LDs 3 at arbitrary positions on the outer circumference of the optical waveguide 2D, and providing a plurality of photodetectors 4 at arbitrary positions on the outer circumference of the optical waveguide 2D, a many-to-many optical selector 1D is realized.

Here, when light outputted from the LD 3 is collected or the like so that the light is incident on a corner portion of the second light guide section 21D at the interface of the first light guide section 20D and the second light guide section 21D, the light is diffracted at the corner portion of the second light guide section 21D. Thus, it is possible to emit incident light in the entire circumferential direction of the optical waveguide 2D by diffraction, in accordance with the setting of the incidence position of light.

Configuration Example of Optical Selector According to Fifth Embodiment

Figure 14A:
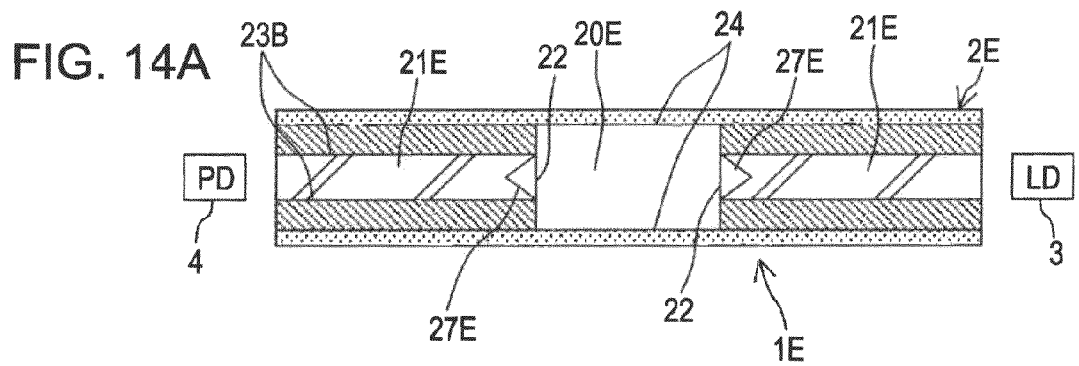
FIG. 14A is a structural view showing a modification of an optical selector according to a fifth embodiment.
Figure 14B:
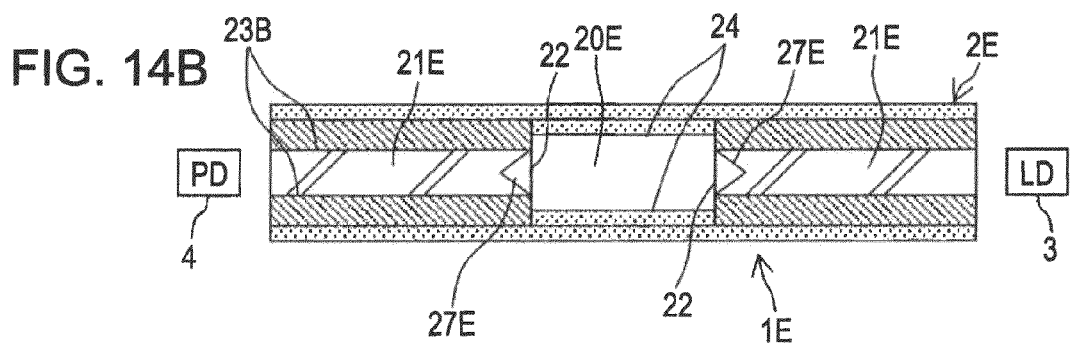
FIG. 14B is a structural view showing a modification of the optical selector according to the fifth embodiment.
Figure 14C:
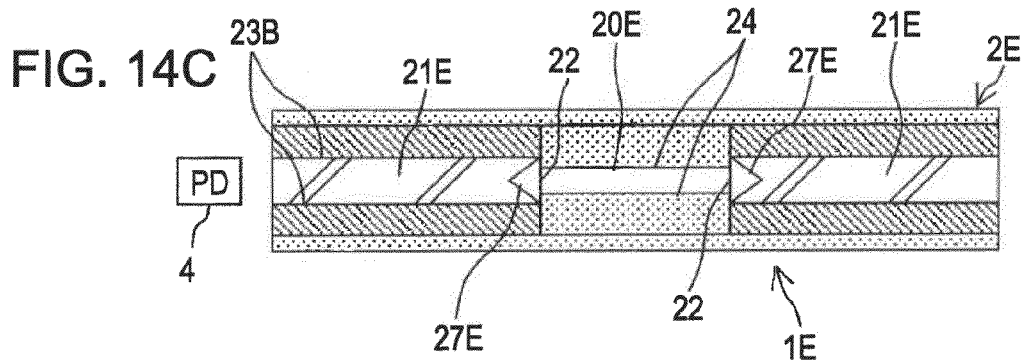
FIG. 14C is a structural view showing a modification of the optical selector according to the fifth embodiment.

FIG. 14A to FIG. 14C are structural views each showing an example of an optical selector according to a fifth embodiment. In FIG. 14A to FIG. 14C, the optical selector according to the fifth embodiment is shown in a side cross-sectional view. It should be noted that a plan view of the optical selector according to the fifth embodiment is the same as shown in FIG. 1B.

An optical selector 1E according to the fifth embodiment includes a planar-type optical waveguide 2E that causes light made incident from an arbitrary direction to pass through two kinds of light guide material with different refractive indices, and causes the light to be emitted in the entire circumferential direction due to refraction or diffraction using a prism and irregular reflection by an irregular reflector, the LD 3 that outputs light having rectilinearity, and the photodetector 4 to which light is inputted.

The optical waveguide 2E includes a first light guide section 20E formed of a light guide material having a first refractive index in a predetermined wavelength range, and a second light guide section 21E formed of a light guide material having a second refractive index different from the first refractive index.

The first light guide section 20E and the second light guide section 21E are both disc-shaped in this example. With the center of the first light guide section 20E and the center of the second light guide section 21E aligned with each other, the first light guide section 20E is placed at substantially the center of the second light guide section 21E, and the second light guide section 21E is provided to the side of and along the entire circumference of the first light guide section 20E.

The first light guide section 20E is formed of a transparent resin material, a cavity, or the like having the first refractive index in a predetermined wavelength range. Also, the second light guide section 21E is formed of a transparent resin material or the like having the second refractive index in a predetermined wavelength range.

The optical waveguide 2E includes a prism section 27E at the interface 22 of the first light guide section 20E and the second light guide section 21E.

The prism section 27E is an example of a diffraction member, and is formed by providing an annular light guide material having a predetermined refractive index along the outer circumferential surface of the first light guide section 20E.

The prism section 27E has a cross-sectional shape of a triangle whose one side has a length substantially equal to the thickness of the second light guide section 21E, and is enclosed along the inner circumferential surface of the second light guide section 21E, with one apex of the triangle located substantially at the center in the thickness direction of the second light guide section 21E. Here, the prism section 27E is formed of a material having a third refractive index different from the first light guide section 20E and the second light guide section 21E in this example.

Like the optical waveguide 2B of the optical selector 1B according to the second embodiment described with reference to FIG. 2A to FIG. 2C and the like, the optical waveguide 2E includes the reflector 23B on the upper and lower surfaces of the second light guide section 21E. Also, the irregular reflector 24 is provided on the upper and lower surfaces of the first light guide section 20E.

Here, in FIG. 14A, as in FIG. 2A of the second embodiment, the reflector 23B sandwiching the second light guide section 21E is further sandwiched by the irregular reflector 24. While the irregular reflection surface of the irregular reflector 24 and the reflection surface of the reflector 23B have a distance corresponding to the thickness of the reflector 23B, the distance between the irregular reflection surface of the irregular reflector 24 and the reflection surface of the reflector 23B may be any predetermined distance that satisfies the above-described optical condition.

That is, the irregular reflection surface of the irregular reflector 24 and the reflection surface of the reflector 23B may be brought closer to each other as shown in FIG. 14B or, although not shown, may be flush with each other, or as shown in FIG. 14C, the irregular reflection surface of the irregular reflector 24 may be located on the inner side than the reflection surface of the reflector 23B.

Thus, in the optical waveguide 2E, with arbitrary positions on the outer circumferential surface of the second light guide section 21E serving as light incidence section and emission section, light is made incident and emitted from the outer circumferential surface of the second light guide section 21E, and light incident on the second light guide section 21E is reflected by the reflector 23B and transmitted through the second light guide section 21E.

The light transmitted through the second light guide section 21E is emitted in the entire circumferential direction from the first light guide section 20E, due to refraction, reflection, and the like by the prism section 27E and the interface 22 of the first light guide section 20E and the second light guide section 21E, and irregular reflection by the irregular reflector 24.

Then, the light emitted in the entire circumferential direction from the first light guide section 20E is transmitted through the second light guide section 21E, and emitted from the outer circumferential surface of the second light guide section 21E.

Therefore, in the optical waveguide 2E, when light is made incident toward the first light guide section 20E from an arbitrary position on the outer circumference, the light is emitted in the entire circumferential direction in the first light guide section 20E, thereby allowing reception of light at an arbitrary position on the outer circumference.

The LD 3 is placed at an arbitrary position on the outer circumference of the optical waveguide 2E, with an unillustrated light emitting section opposed to the outer circumferential surface of the second light guide section 21E. Also, the photodetector 4 is placed at an arbitrary position on the outer circumference of the optical waveguide 2E, with an unillustrated light receiving section opposed to the outer circumferential surface of the second light guide section 21E.

Operation Example of Optical Selector According to Fifth Embodiment

Next, an operation example of the optical selector 1E according to the fifth embodiment will be described with reference to FIG. 14A to FIG. 14C.

In the LD 3, an electric signal is converted into an optical signal and outputted, and light outputted from the LD 3 is made incident on the optical waveguide 2E from the outer circumferential surface of the second light guide section 21E toward the first light guide section 20E.

The light made incident from the outer circumferential surface of the second light guide section 21E is transmitted through the second light guide section 21E by being reflected by the reflector 23B, and when the light transmitted through the second light guide section 21E passes through the prism section 27E, since the cross-sectional shape of the prism section 27E is triangular, the light is refracted by the action of the prism.

When the light refracted by the prism section 27E is incident on the interface 22 of the first light guide section 20E and the second light guide section 21E, its optical path is deflected due to refraction, reflection, and the like by the interface 22 of the first light guide section 20E and the second light guide section 21E, in accordance with the difference in refractive index between the first light guide section 20E and the second light guide section 21E.

Also, light incident on the first light guide section 20E is irregularly reflected upon being incident on the irregular reflector 24, transmitted through the first light guide section 20E, and becomes incident on the interface 22 of the first light guide section 20E and the second light guide section 21, and further on the prism section 27E to have its optical path deflected due to refraction, reflection, and the like.

Thus, light outputted from the LD 3 and incident on the second light guide section 21E from an arbitrary position on the outer circumference of the optical waveguide 2E is transmitted through the second light guide section 21E, and has its optical path deflected by the action of the prism section 27E to be incident on the first light guide section 20E. In addition, the light incident on the first light guide section 20E is irregularly reflected by the irregular reflector 24 and transmitted through the first light guide section 20E, and further has its optical path deflected by the prism section 27E to be emitted more evenly in the entire circumferential direction.

Therefore, in the optical waveguide 2E as well, light is emitted in the entire circumferential direction of the first light guide section 20E, and transmitted through the second light guide section 21E. Then, the light transmitted through the second light guide section 21E is emitted in the entire circumferential direction from the outer circumferential surface of the second light guide section 21E, is inputted to the photodetector 4 placed at an arbitrary position on the outer circumference of the optical waveguide 2E, and an optical signal is converted into an electric signal and outputted.

In this way, the optical waveguide 2E has a function of emitting light in the entire circumferential direction due to the action of the prism section 27E, and irregular reflection by the irregular reflector 24 in the first light guide section 20E at the center portion. In addition, the second light guide section 21E around the first light guide section 20E has a function of transmitting incident light to the first light guide section 20E, and transmitting irregularly reflected light to the outside. Since absorption of light is suppressed at the irregular reflection surface, attenuation is suppressed.

Then, since light outputted from the LD 3 placed at an arbitrary position on the outer circumference of the optical waveguide 2E can be received by the photodetector 4 placed at an arbitrary position on the outer circumference of the optical waveguide 2E, by providing a single LD 3 at an arbitrary position on the outer circumference of the optical waveguide 2E, and providing a plurality of photodetectors 4 at arbitrary positions on the outer circumference of the optical waveguide 2E, a one-to-many optical selector 1E is realized.

Also, by providing a plurality of LDs 3 at arbitrary positions on the outer circumference of the optical waveguide 2E, and providing a single photodetector 4 at an arbitrary position on the outer circumference of the optical waveguide 2E, a many-to-one optical selector 1E is realized.

Further, by providing a plurality of LDs 3 at arbitrary positions on the outer circumference of the optical waveguide 2E, and providing a plurality of photodetectors 4 at arbitrary positions on the outer circumference of the optical waveguide 2E, a many-to-many optical selector 1E is realized.

Here, when light outputted from the LD 3 is collected or the like so that the light is incident on the apex of the prism section 27E, the light is diffracted at the apex of the lens section 27E. Thus, it is possible to emit incident light in the entire circumferential direction of the optical waveguide 2E by diffraction, in accordance with the setting of the incidence position of light.

It should be noted that as for the shape of the prism section 27E, the cross-sectional shape may be a square. In the case where the cross-sectional is a square, light is diffracted so that the light is incident on a corner portion of the contact surface with the second light guide section 21E. Also, the apexes of light guide materials in a triangle shape having a height substantially equal to half the thickness of the second light guide section 21E may be opposed to each other. In this case as well, light is diffracted so that the light is incident on the opposing apexes of the triangles.

Configuration Example of Optical Selector According to Sixth Embodiment

Figure 15A:
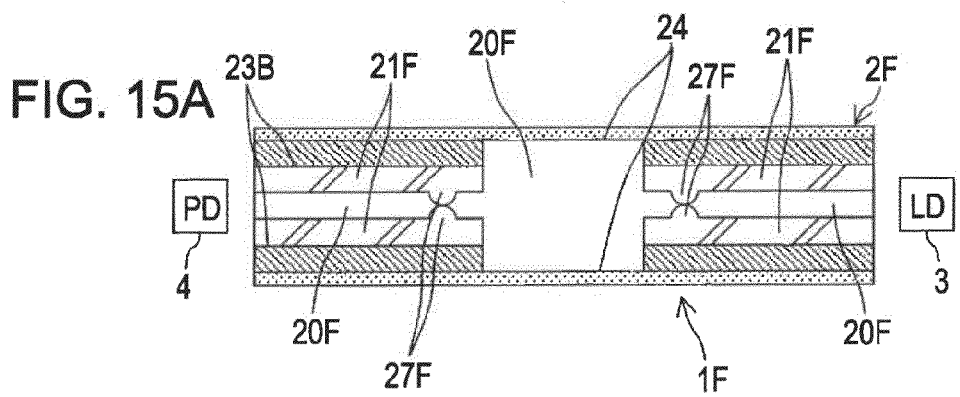
FIG. 15A is a structural view showing a modification of an optical selector according to a sixth embodiment.
Figure 15B:
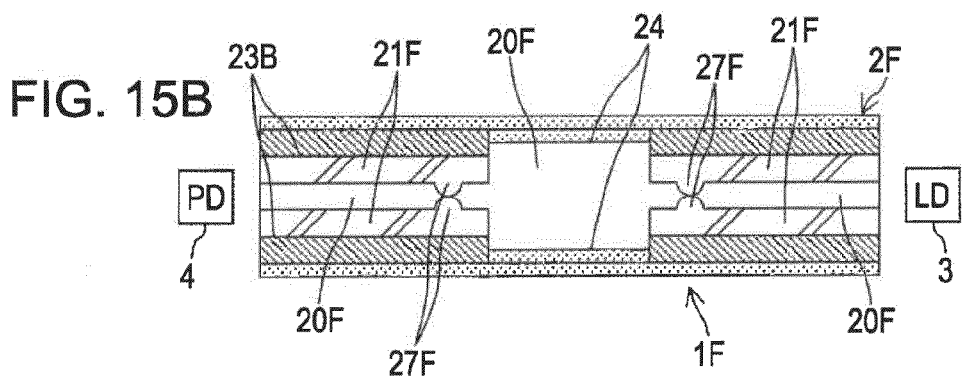
FIG. 15B is a structural view showing a modification of the optical selector according to the sixth embodiment.
Figure 15C:
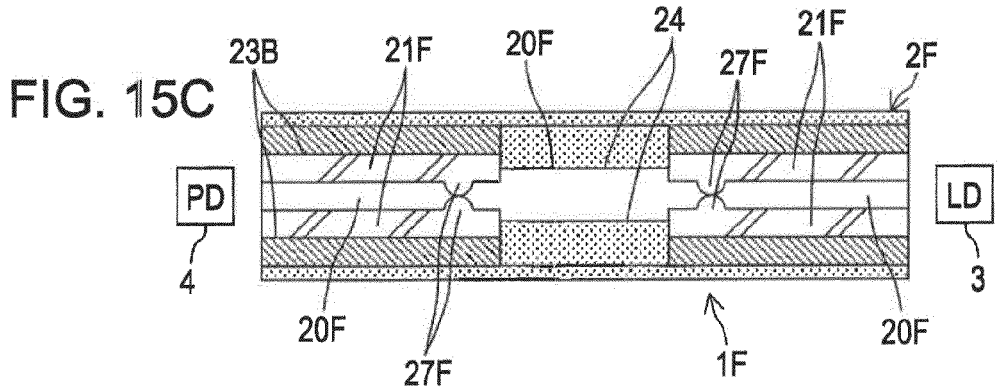
FIG. 15C is a structural view showing a modification of the optical selector according to the sixth embodiment.

FIG. 15A to FIG. 15C are structural views each showing an example of an optical selector according to a sixth embodiment. In FIG. 15A to FIG. 15C, the optical selector according to the sixth embodiment is shown in a side cross-sectional view. It should be noted that a plan view of the optical selector according to the sixth embodiment is the same as shown in FIG. 1B.

An optical selector 1F according to the sixth embodiment includes a planar-type optical waveguide 2F that causes light made incident from an arbitrary direction to pass through laminated light guide materials with different refractive indices, and undergo irregular reflection by an irregular reflector to be emitted in the entire circumferential direction, the LD 3 that outputs light having rectilinearity, and the photodetector 4 to which light is inputted.

The optical waveguide 2F includes a first light guide section 20F formed of a light guide material having a first refractive index in a predetermined wavelength range, and a second light guide section 21F formed of a light guide material having a second refractive index different from the first refractive index.

The first light guide section 20F is formed of a transparent resin material, a cavity, or the like having the first refractive index in a predetermined wavelength range. Also, the second light guide section 21F is formed of a transparent resin material or the like having the second refractive index in a predetermined wavelength range.

The second light guide section 21F is in a disc shape having a circular space formed at the center portion, with a lens section 27F having a semicircular cross-sectional shape formed annularly on one surface, and is laminated in layers with the lens sections 27F opposed to each other.

The first light guide section 20F is placed substantially at the center of the second light guide section 21F and in the space between the laminated second light guide sections 21F, while being aligned at the center with the second light guide section 21F. The second light guide section 21F is provided to the side of and along the entire circumference of the first light guide section 20F.

Like the optical waveguide 2B of the optical selector 1B according to the second embodiment described with reference to FIG. 2A to FIG. 2C and the like, the optical waveguide 2F includes the reflector 23B on the upper and lower surfaces of the laminated second light guide sections 21F. Also, the irregular reflector 24 is provided on the upper and lower surfaces of the first light guide section 20F placed at the center of the second light guide section 21F.

Here, in FIG. 15A, as in FIG. 2A of the second embodiment, the reflector 23B sandwiching the second light guide section 21F is further sandwiched by the irregular reflector 24. While the irregular reflection surface of the irregular reflector 24 and the reflection surface of the reflector 23B have a distance corresponding to the thickness of the reflector 23B, the distance between the irregular reflection surface of the irregular reflector 24 and the reflection surface of the reflector 23B may be any predetermined distance that satisfies the above-described optical condition.

That is, the irregular reflection surface of the irregular reflector 24 and the reflection surface of the reflector 23B may be brought closer to each other as shown in FIG. 15B or, although not shown, may be flush with each other, or as shown in FIG. 15C, the irregular reflection surface of the irregular reflector 24 may be located on the inner side than the reflection surface of the reflector 23B.

Thus, in the optical waveguide 2F, with arbitrary positions on the outer circumferential surface of the second light guide section 21F serving as light incidence section and emission section, light is made incident and emitted from the outer circumferential surface of the second light guide section 21F, and light incident on the second light guide section 21F is reflected by the reflector 23B and transmitted through the second light guide section 21F.

The light transmitted through the second light guide section 21F is emitted in the entire circumferential direction from the first light guide section 20F due to refraction by the lens section 27F, refraction, reflection, and the like by the interface 22 of the first light guide section 20F and the second light guide section 21F and by the interface of the laminated second light guide sections 21F and the cavity therebetween, and irregular reflection and the like by the irregular reflector 24.

Then, the light emitted in the entire circumferential direction from the first light guide section 20F is transmitted through the second light guide section 21F, and emitted from the outer circumferential surface of the second light guide section 21F.

Therefore, in the optical waveguide 2F, when light is made incident toward the first light guide section 20F from an arbitrary position on the outer circumference, the light is emitted in the entire circumferential direction in the first light guide section 20F, thereby allowing reception of light at an arbitrary position on the outer circumference.

The LD 3 is placed at an arbitrary position on the outer circumference of the optical waveguide 2F, with an unillustrated light emitting section opposed to the outer circumferential surface of the second light guide section 21F. Also, the photodetector 4 is placed at an arbitrary position on the outer circumference of the optical waveguide 2F, with an unillustrated light receiving section opposed to the outer circumferential surface of the second light guide section 21F.

Operation Example of Optical Selector According to Sixth Embodiment

Next, an operation example of the optical selector 1F according to the sixth embodiment will be described with reference to FIG. 15A to FIG. 15C.

In the LD 3, an electric signal is converted into an optical signal and outputted, and light outputted from the LD 3 is made incident on the optical waveguide 2F from the outer circumferential surface of the second light guide section 21F toward the first light guide section 20F.

The light made incident from the outer circumferential surface of the second light guide section 21F is transmitted through the second light guide section 21F by being reflected by the reflector 23B, and since the cross-sectional shape of the lens section 27F is semicircular, light incident on the lens section 27F is refracted by the action of the lens.

When the light transmitted through the second light guide section 21F and refracted by the lens section 27F is incident on the interface 22 of the first light guide section 20F and the second light guide section 21F, its optical path is deflected due to refraction, reflection, and the like by the interface 22 of the first light guide section 20F and the second light guide section 21F, in accordance with the difference in refractive index between the first light guide section 20F and the second light guide section 21F.

Also, light incident on the first light guide section 20F is irregularly reflected upon being incident on the irregular reflector 24, transmitted through the first light guide section 20F, and becomes incident on the interface 22 of the first light guide section 20F and the second light guide section 21F, and on the lens section 27F to have its optical path deflected due to refraction, reflection, and the like.

Thus, light outputted from the LD 3 and incident on the second light guide section 21F from an arbitrary position on the outer circumference of the optical waveguide 2F is transmitted through the second light guide section 21F, and has its optical path deflected by the action of the lens section 27F to be incident on the first light guide section 20F. In addition, the light incident on the first light guide section 20F is irregularly reflected by the irregular reflector 24 and transmitted through the first light guide section 20F, and further has its optical path deflected by the lens section 27F to be emitted more evenly in the entire circumferential direction.

Therefore, in the optical waveguide 2F as well, light is emitted in the entire circumferential direction from the first light guide section 20F, and transmitted through the second light guide section 21F. Then, the light transmitted through the second light guide section 21F is emitted in the entire circumferential direction from the outer circumferential surface of the second light guide section 21F, is inputted to the photodetector 4 placed at an arbitrary position on the outer circumference of the optical waveguide 2F, and an optical signal is converted into an electric signal and outputted.

In this way, the optical waveguide 2F has a function of emitting light in the entire circumferential direction due to the action of the lens section 27F, and irregular reflection by the irregular reflector 24 in the first light guide section 20F at the center portion. In addition, the second light guide section 21F around the first light guide section 20F has a function of transmitting incident light to the first light guide section 20F, and transmitting irregularly reflected light to the outside. Since absorption of light is suppressed at the irregular reflection surface, attenuation is suppressed.

Then, since light outputted from the LD 3 placed at an arbitrary position on the outer circumference of the optical waveguide 2F can be received by the photodetector 4 placed at an arbitrary position on the outer circumference of the optical waveguide 2F, by providing a single LD 3 at an arbitrary position on the outer circumference of the optical waveguide 2F, and providing a plurality of photodetectors 4 at arbitrary positions on the outer circumference of the optical waveguide 2F, a one-to-many optical selector 1F is realized.

Also, by providing a plurality of LDs 3 at arbitrary positions on the outer circumference of the optical waveguide 2F, and providing a single photodetector 4 at an arbitrary position on the outer circumference of the optical waveguide 2F, a many-to-one optical selector 1F is realized.

Further, by providing a plurality of LDs 3 at arbitrary positions on the outer circumference of the optical waveguide 2F, and providing a plurality of photodetectors 4 at arbitrary positions on the outer circumference of the optical waveguide 2F, a many-to-many optical selector 1F is realized.

Here, in the optical waveguide 2F as well, letting the radius of the outer circumferential surface of the second light guide section 21F be r1 and the radius of the inner circumferential surface be r2, by placement at such an arbitrary position that the radius r of the annular shape of the lens section 27F falls within r=r1−r2, an effect is obtained whereby light is irregularly reflected and emitted in the entire circumferential direction.

Specific Example of Optical Selector According to Each Embodiment

Next, a description will be given of a specific example of the shape, material, and the like of the optical waveguide 2(A to F) in the optical selector 1(A to F) according to each of the embodiments described above.

The second light guide section 21(A to F) constituting the optical waveguide 2 is made of, for example, PMMA (polymethylmethacrylate resin). Also, the first light guide section 20(A to F) is made of, for example, air or PMMA.

FIG. 16 is an explanatory diagram showing the reflectances of color-spread surfaces. FIG. 17 is an explanatory diagram showing the reflectances of materials suited for a reflector, an irregular reflector, and a scatterer.

FIG. 16 shows the reflectances of color-spread surfaces created by applying coatings having colors as indicated as thin as possible so as to satisfy the optical condition described with reference to FIG. 2A to FIG. 2C and the like. It can be appreciated that the reflectance is high when the color is white. Also, while the scattering mechanism of light completely differs between scattering and irregular reflection as described above, the irregular reflector 24 that irregularly reflects light is preferably in a color that has high reflectance. Also, as shown in FIG. 3C and the like, in the case of a configuration in which light incident on the scatterer 24B and scattered is specularly reflected by the reflector 25 as well, a color having high reflectance is preferred, and further, a material that can be made thin is preferred as the scatterer 24B.

For this reason, the scatterer 24B is realized by imparting fluctuations to the density or orientation of constituent particles. That is, a plastic material, polypropylene, polycarbonate, white paper, tracing paper, or the like mixed with an emulsifier is used, and in particular, the scatterer 24B is made of a material with high reflectance. Also, the scatterer 24B is made of such fine particles that the physical length L of the fluctuations in the density or orientation of its constituent particles is not very large in comparison to the wavelength λ of light used.

For that reason, as for the surface shape of the scatterer 24B, to suppress specular reflection due to its mirror-like property, the contact surface with the first light guide section 20 is preferably a rough surface. To that end, for example, a rough surface equivalent to a grit number called extra fine or super extra fine with a polishing tool such as sandpaper is preferred, and the surface of a white plastic material may be formed as a rough surface by sandblasting as well.

On the other hand, the irregular reflector 24 is a member that irregularly reflects incident light so that the light changes direction upon striking a medium different from the medium through which it is travelling or a discontinuous interface, and travels in a new direction within the original medium. By making the irregularities in the surface shape of the interface substantially equal to or larger than the wavelength of light, the reflected light travels in various directions, realizing irregular reflection. Also, fine mirror finishing by metal coating or the like for enhancing the reflectance of the interface is employed as well. For example, it is preferred to make the surface of glass a rough surface by sandblasting, and make the rough surface a mirror surface by evaporation of aluminum or the like.

It should be noted that also in the case of forming the interface 22 of the first light guide section 20 and the second light guide section 21 a rough surface, the interface 22 may be formed as a rough surface equivalent to the irregular reflector 24 and the scatterer 24B.

The reflector 23 provided on the upper and lower surfaces in order to transmit light while confining it within the second light guide section 21 and the first light guide section 20 is preferably a material with high reflectance to light, and is preferably be formed by evaporation of aluminum, for example. Also, the reflector 23 is preferably formed as a flat surface.

While the size of the optical waveguide 2 is arbitrary, as described later, the optical waveguide 2 has such a diameter that allows a plurality of boards whose sending and receiving sections are configured by the LD 3, the photodetector 4, and the like to be mounted in its periphery. Also, the thickness is about 3 mm. It should be noted, however, that the thickness is not limited to this, and may be any thickness that satisfies the above-described optical condition. Also, the diameter of the first light guide section 20 is less than half the radius of the second light guide section 21.

The output of the LD 3 is determined by taking into consideration the amount of attenuation or the like over the optical path length determined in accordance with the diameter of the optical waveguide 2. Also, the wavelength of light outputted from the LD 3 may be any one of red light, green light, blue light, and purple light.

Further, with respect to the plane direction (horizontal direction) of the optical waveguide 2, the spot diameter of light outputted from the LD 3 may be any diameter, such as a diameter that is smaller than the diameter of the first light guide section 20 at the time of incidence on the first light guide section, a diameter that is substantially equal to the diameter of the first light section, and, in the case of a configuration in which the lens section or the like is formed annularly around the first light guide section 20, a diameter that is substantially equal to the diameter of the lens section.

With respect to the thickness direction (vertical direction) of the optical waveguide 2, the spot diameter of light outputted from the LD 3 may be any diameter such as a diameter that is substantially equal to the thickness of the second light guide section 21 at the interface of the first light guide section 20 and the second light guide section 21 at the time of incidence on the first light guide section 21, or a diameter that is substantially equal to the thickness of the first light guide section 20, near the center of the first light guide section 20.

Also, by narrowing the spot diameter of light outputted from the LD 3, the direction may be set so that the light becomes directly incident on the irregular reflector 24, or the direction may be set so that the light becomes incident on a corner portion of the interface of the first light guide section 20 and the second light guide section 21.

Then, the spot diameter of light outputted from the LD 3 may be fixedly narrowed to a predetermined diameter with an optical lens, or the spot diameter may be made adjustable by using a water lens or the like whose lens shape is variable. Further, the angle of incidence on the optical waveguide 2 may be fixed, or a variable mechanism may be provided.

Here, as light emitting means for outputting light, a laser such as a semiconductor laser can be also used as the LD.

The reception sensitivity of the photodetector 4 is determined in accordance with the output of the LD 3, and the amount of attenuation in the optical waveguide 2. Also, the center wavelength that can be received by the photodetector 4 is determined in accordance with the wavelength of light outputted by the LD 3.

The size of the light receiving surface of the photodetector 4 may be determined in accordance with the diameter of light emitted from the optical waveguide 2. Also, the angle of incidence on the photodetector 4 may be vertical, or may be tilted insofar as a predetermined reception sensitivity is obtained.

For example, a receiving section that processes a signal that has undergone photoelectric conversion by the photodetector 4 may include a gain adjusting circuit, so that after gain is adjusted in the gain adjusting circuit from the reception sensitivity at the time when light whose parameters such as the output level and the spot diameter are set at a sending section including the LD 3 is received by the photodetector 4, the thresholds of [0] and [1] of digital data can be automatically set.

Figure 18B:
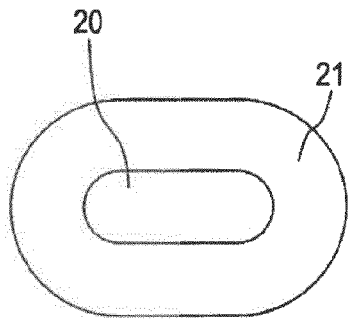
FIG. 18B is a plan view showing another example of the shape of an optical waveguide.
Figure 18C:
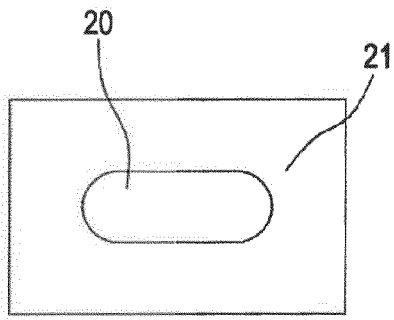
FIG. 18C is a plan view showing another example of the shape of an optical waveguide.

FIG. 18A to FIG. 18C are plan views each showing another example of the shape of an optical waveguide. In the example shown in FIG. 18A, the first light guide section 20 is a circle, and as for the second light guide section 21, the inner circumferential surface is the same circle as the first light guide section 20, and the outer circumferential surface is a square.

In the example shown in FIG. 18B, the first light guide section 20 is an ellipse, and as for the second light guide section 21, the inner circumferential surface is the same ellipse as the first light guide section 20, and the outer circumferential surface is also an ellipse.

In the example shown in FIG. 18C, the first light guide section 20 is an ellipse, and as for the second light guide section 21, the inner circumferential surface is the same ellipse as the first light guide section 20, and the outer circumferential surface is a rectangle.

If the first light guide section 20 has a shape with no corner portion, light is emitted substantially along the entire circumference. Also, if the outer circumferential surface of the second light guide section 21 is a square, incidence and emission of light are possible except at the corner portions, and the direction of incidence and emission of light may be toward the first light guide section 20.

Figure 19:
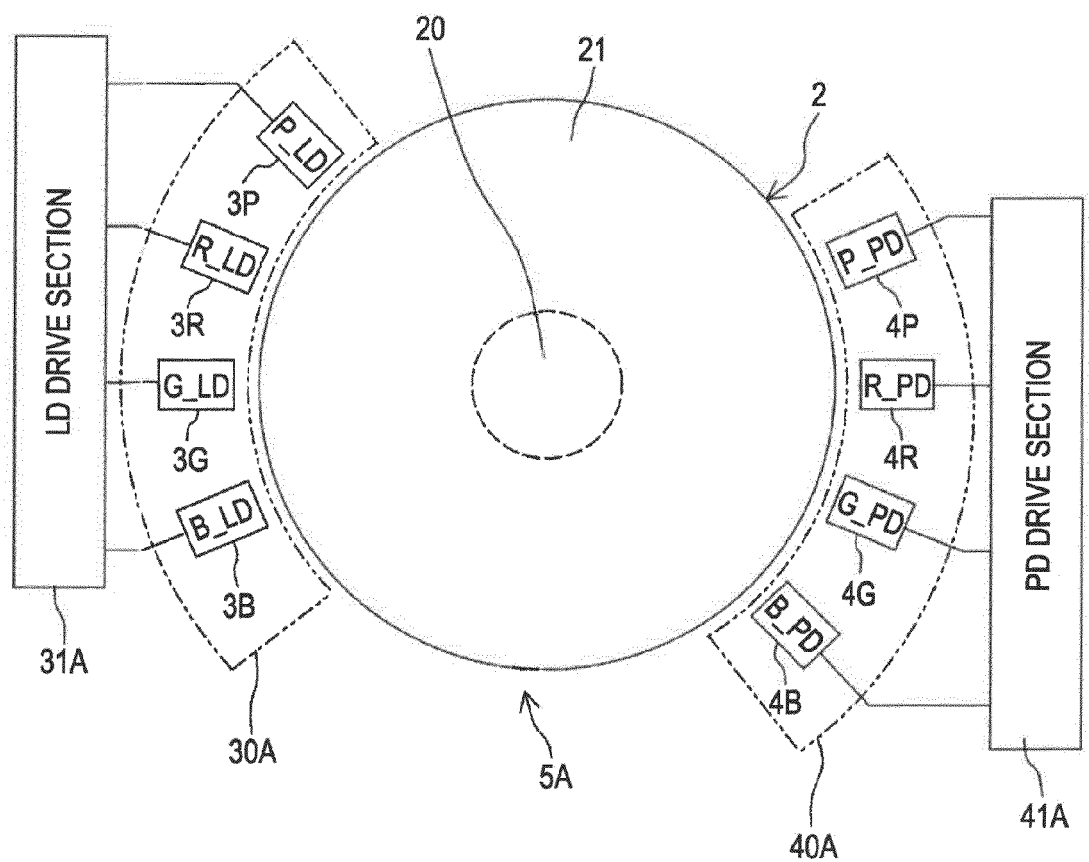
FIG. 19 is a structural view showing an example of a signal processing apparatus according to a first embodiment.

Configuration Example of Signal Processing Apparatus According to First Embodiment FIG. 19 is a structural view showing an example of a signal processing apparatus according to a first embodiment. It should be noted that in FIG. 19, the signal processing apparatus according to the first embodiment is shown in a schematic plan view.

A signal processing apparatus 5A according to the first embodiment includes a light output section 30A from which light of different wavelengths is outputted, a light input section 40A to which the light of different wavelengths outputted from the light output section 30A is inputted, and the optical waveguide 2 through which the light outputted from the light output section 30A and inputted at the light input section 40A is transmitted. Light of different wavelengths is combined and multiplexed.

The optical waveguide 2 is made of one of the optical waveguides 2(A to F) described with reference to FIG. 1A to FIG. 15C. Light incident from an arbitrary position on the outer circumference of the optical waveguide 2 is emitted in the entire circumferential direction of the optical waveguide 2, by refraction due to the difference in refractive index between the first light guide section 20 and the second light guide section 21, irregular reflection by the irregular reflector 24 provided in the first light guide section 20, and the like.

The light output section 30A includes a plurality of LDs 3 that output light with rectilinearity at different wavelengths. In this example, there are provided an LD 3R that outputs light at a wavelength of red, an LD 3G that outputs light at a wavelength of green, an LD 3B that outputs light at a wavelength of blue, and an LD 3P that outputs light at a wavelength of purple.

Each of the LDs 3 (R, G, B, P) is driven by an LD drive section 31A, and an electric signal is converted into light and outputted.

In the light output section 30A, four LDs 3 (R, G, B, P) are provided so as to be horizontal with respect to the plane of the optical waveguide 2, and are each placed along the outer circumference of the optical waveguide 2, with the output direction of light directed toward the first light guide section 20 of the optical waveguide 2.

The light input section 40A includes four photodetectors 4 (R, G, B, P) in this example in correspondence to the light output section 30A. Each of the photodetectors 4 (R, G, B, P) is driven by a PD drive section 41A, and an electric signal is converted into light and outputted.

In the photodetector 4R, an optical bandpass filter 42R that transmits red light is provided on the light receiving surface, and of the light transmitted through and emitted from the optical waveguide 2, light of a wavelength $\lambda_1$ outputted from the LD 3R is inputted.

Likewise, in the photodetector 4G, an optical bandpass filter 42G that transmits green light is provided on the light receiving surface, and of the light emitted from the optical waveguide 2, light of a wavelength $\lambda_2$ outputted from the LD 3G is inputted.

Also, in the photodetector 4B, an optical bandpass filter 42B that transmits blue light is provided on the light receiving surface, and of the light emitted from the optical waveguide 2, light of a wavelength $\lambda_3$ outputted from the LD 3B is inputted.

Further, in the photodetector 4P, an optical bandpass filter 42P that transmits purple light is provided on the light receiving surface, and of the light emitted from the optical waveguide 2, light of a wavelength $\lambda_4$ outputted from the LD 3P is inputted.

In the light input section 40A, four photodetectors 4 (R, G, B, P) are provided so as to be horizontal with respect to the plane of the optical waveguide 2, and are each placed on the outer circumference of the optical waveguide 2.

Operation Example of Signal Processing Apparatus According to First Embodiment

Next, an operation example of the signal processing apparatus 5A according to the first embodiment mentioned above will be described with reference to FIG. 19 and the like.

In the signal processing apparatus 5A, an electric signal is converted into an optical signal of a predetermined wavelength and outputted with each of the LDs (R, G, B, P).

Light outputted from the LD 3R of the light output section 30A is incident from the outer circumference of the optical waveguide 2 and, as described above, emitted in the entire circumferential direction of the optical waveguide 2 by refraction due to the difference in refractive index between the first light guide section 20 and the second light guide section 21, irregular reflection by the irregular reflector 24 provided in the first light guide section 20, and the like.

The light of the wavelength $\lambda_1$ outputted from the LD 3R and emitted in the entire circumferential direction of the optical waveguide 2 is transmitted through the optical bandpass filter 42R and inputted to the photodetector 4R. On the other hand, in the other photodetectors 4 (G, B, P), the light of the wavelength $\lambda_1$ outputted from the LD 3R is blocked by the respective optical bandpass filters 42 (G, B, P).

Likewise, the light of the wavelength $\lambda_2$ outputted from the LD 3G and emitted in the entire circumferential direction of the optical waveguide 2 is transmitted through the optical bandpass filter 42G and inputted to the photodetector 4G. On the other hand, in the other photodetectors 4 (R, B, P), the light of the wavelength $\lambda_2$ outputted from the LD 3G is blocked by the respective optical bandpass filters 42 (R, B, P).

Also, the light of the wavelength $\lambda_3$ outputted from the LD 3B and emitted in the entire circumferential direction of the optical waveguide 2 is transmitted through the optical bandpass filter 42B and inputted to the photodetector 4B. On the other hand, in the other photodetectors 4 (R, G, P), the light of the wavelength $\lambda_3$ outputted from the LD 3B is blocked by the respective optical bandpass filters 42 (R, G, P).

Further, the light of the wavelength $\lambda_4$ outputted from the LD 3P and emitted in the entire circumferential direction of the optical waveguide 2 is transmitted through the optical bandpass filter 42P and inputted to the photodetector 4P. On the other hand, in the other photodetectors 4 (R, G, B), the light of the wavelength $\lambda_4$ outputted from the LD 3P is blocked by the respective optical bandpass filters 42 (R, G, B).

In this way, in the signal processing apparatus 5A, since light of different wavelengths is outputted from the individual LDs 3 (R, G, B, P), a plurality of signals are combined and transmitted in the optical waveguide 2. Also, in the optical waveguide 2, since light incident from an arbitrary position on the outer circumference is emitted in the entire circumferential direction, by using optical bandpass filters or the like, light of a predetermined wavelength is inputted to each of the photodetectors 4 (R, G, B, P) placed on the outer circumference of the optical waveguide 2.

Thus, in the signal processing apparatus 5A, multiplexing of transmission signals by wavelength division becomes possible so that, for example, signals on four channels including video signals of the respective colors of R, G, B and a synchronizing signal can be transmitted through the optical waveguide 2 so as to be sent and received between the light output section 30A and the light input section 40A, making it possible to adopt such a signal transmission mode as TMDS (Transition Minimized Differential Signaling).

It should be noted that other than multiplexing by wavelength division, multiplexing is also possible by time division with a single wavelength. Also, it is possible to multiplex transmission signals by frequency division, or spectrum division with Viterbi coding.

Also, if a photodiode that is an analog output photodiode (APD) or a multi-bit output photodiode (TPD) and has high sensitivity, with good linearity between the received light energy and the output level, and a large output level range, is used as the light receiving element, light outputted from the light output section 30A and combined can be also separated by a single APD or TPD. Although the following description is directed to the example of an APD, in the case of a TPD, the output of an APD is simply digitized and outputted in bits, and there is otherwise no difference in its configuration and description.

Figure 20:
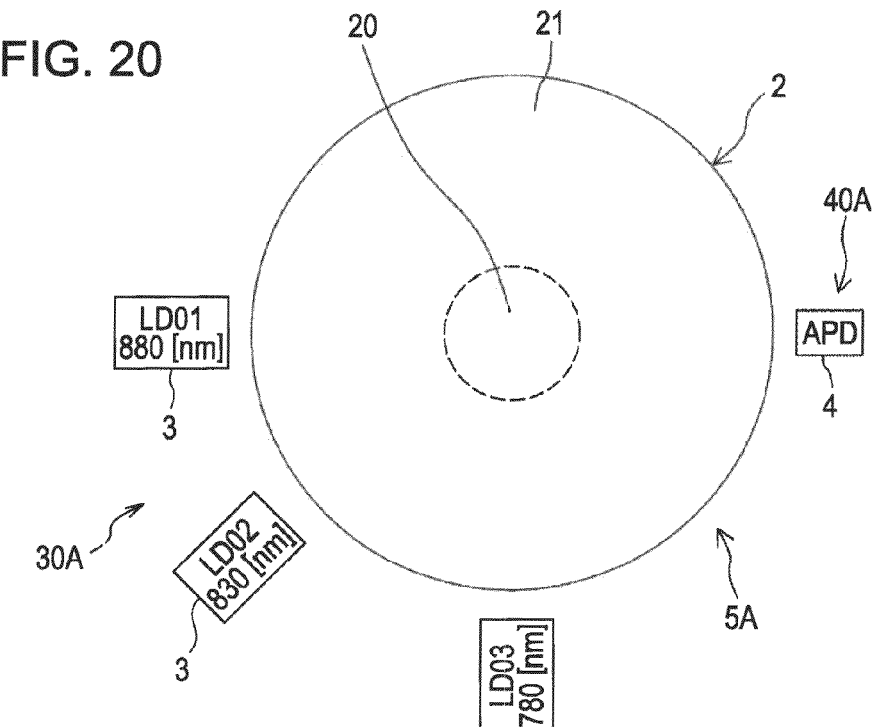
FIG. 20 is a structural view showing a modification of the signal processing apparatus according to the first embodiment.

FIG. 20 is a structural view showing a modification of the signal processing apparatus according to the first embodiment. For example, in the light output section 30A, a plurality of LDs 3 that output light with rectilinearity at different wavelengths are provided so as to be horizontal with respect to the plane of the optical waveguide 2. On the other hand, in the light input section 40A, a single APD 4 is provided on the outer circumference of the optical waveguide 2.

When light is outputted from the LDs 3, the light is transmitted through the optical waveguide 2 as described above, received by the APD 4, and undergoes photoelectric conversion so that an electric signal is outputted. The voltage level from the APD 4 varies for each output wavelength.

Accordingly, the output levels of the APD 4 when light is outputted from the individual LDs 3 are represented by, for example, prime numbers, and combined in such a way that the total sum of outputs does not become the same depending on the combination of LDs 3 that output light, thereby differentiating multi-bit values represented by the outputs of a plurality of LDs 3 by means of the output of a single APD 4.

Figure 21:
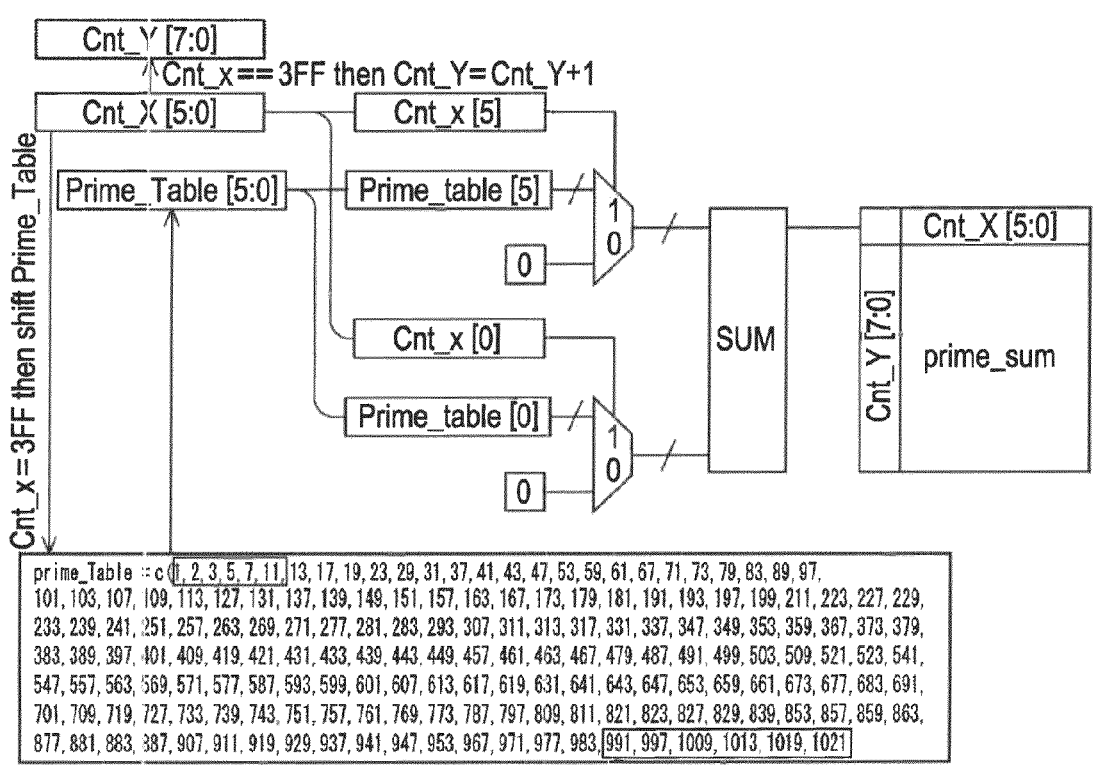
FIG. 21 is an explanatory diagram showing a method of computing values representing the output of an APD.

FIG. 21 is an explanatory diagram showing a method of computing values representing the output of an APD, and FIG. 22 is an explanatory diagram showing the computation results. In this example, a table is created in which prime numbers read from a table of an arbitrary range (up to 1021 in this example) of prime numbers are combined in a predetermined bit length and summed, and combinations of prime numbers whose summed values do not overlap are found.

For example, in the computation method mentioned above, when the bit length is varied from 2 bits to 10 bits, the maximum bit length that gives combinations whose summed values do not overlap is 6 bits, and the combination of prime numbers is 509, 521, 523, 541, 547, and 557 as shown in FIG. 22.

Then, by setting the wavelengths of the individual LDs 3 so as not to overlap so that the output level of the APD 4 determined in the manner described above is obtained, and by setting the output levels of the individual LDs 3 and using the set values by storage in a table or the like, multi-bit values represented by the outputs of a plurality of LDs 3 can be differentiated by the output of a single APD 4. It should be noted that the output level of the APD 4 may be represented by natural numbers or the like.

Configuration Example of Signal Processing Apparatus According to Second Embodiment FIG. 23 and FIG. 24 are structural views each showing an example of a signal processing apparatus according to a second embodiment. It should be noted that in FIG. 23 and FIG. 24, the signal processing apparatus according to the second embodiment is shown in a schematic side cross-sectional view.

A signal processing apparatus 5B according to the second embodiment includes a light output section 30B from which light of different wavelengths is outputted, a light input section 40B to which the light of different wavelengths outputted from the light output section 302 is inputted, and the optical waveguide 2 through which the light outputted from the light output section 30B and inputted at the light input section 40B is transmitted. The light of different wavelengths is combined and emitted from a single point to be multiplexed.

The optical waveguide 2 is made of one of the optical waveguides 2(A to F) described with reference to FIG. 1A to FIG. 15C. Light incident from an arbitrary position on the outer circumference of the optical waveguide 2 is emitted in the entire circumferential direction of the optical waveguide 2, by refraction due to the difference in refractive index between the first light guide section 20 and the second light guide section 21, irregular reflection by the irregular reflector 24 provided in the first light guide section 20, and the like.

The light output section 30B includes a plurality of LDs 3 that output light at different wavelengths. In this example, there are provided the LD 3R that outputs light at a wavelength of red, the LD 3G that outputs light at a wavelength of green, the LD 3B that outputs light at a wavelength of blue, and the LD 3P that outputs light at a wavelength of purple.

Each of the LDs 3 (R, G, B, P) is driven by the LD drive section 31A, and an electric signal is converted into light and outputted.

The light output section 30B has four LDs 3 (R, G, B, P) provided so as to be, for example, perpendicular to the plane of the optical waveguide 2, and includes an optical multiplexer 32 to output light outputted from the individual LDs 3 (R, G, B, P) from a single point.

The optical multiplexer 32 is an example of optical multiplexing means, and includes a reflecting film 32B that reflects light of the wavelength $\lambda_3$ outputted from the LD 3B. Also, there is provided a semi-transmitting film 32G that reflects light of the wavelength $\lambda_2$ outputted from the LD 3G and incident from one surface, and transmits light of the wavelength $\lambda_3$ reflected by the reflecting film 32B and incident from the other surface.

Likewise, there is provided a semi-transmitting film 32R that reflects light of the wavelength $\lambda_1$ outputted from the LD 3R and incident from one surface, and transmits light of the wavelength $\lambda_3$ transmitted by the semi-transmitting film 32G and incident from the other surface and light of the wavelength $\lambda_2$ reflected by the semi-transmitting film 32G and incident from the other surface.

Further, there is provided a semi-transmitting film 32P that transmits light of the wavelength $\lambda_4$ outputted from the LD 3P and incident from one surface, and reflects light of the wavelengths $\lambda_3$, $\lambda_2$ transmitted by the semi-transmitting film 32G and incident from the other surface and light of the wavelength $\lambda_1$ transmitted by the semi-transmitting film 32R and incident from the other surface.

Here, light outputted from each of the LDs 3 (R, G, B, P) varies in the amount of attenuation due to the difference in the number of semi-transmitting films 32 (R, G, B, P) by which it is transmitted and reflected. Accordingly, in the case where the individual LDs 3 (R, G, B, P) are placed as in this example, the drive levels of the individual light emitting elements are set so that the following relationship holds.

$$B_{LD}*G_D*R_D*P_D = G_{LD}*R_D*P_D = R_{LD}*P_D = P_{LD}$$

Here, $B_{LD}$ is the drive level of the LD 3B, $G_{LD}$ is the drive level of the LD 3G, $R_{LD}$ is the drive level of the LD 3R, and $P_{LD}$ is the drive level of the LD 3P. Also, $G_D$ is the attenuation factor in the semi-transmitting film 32G, $R_D$ is the attenuation factor in the semi-transmitting film 32R, and $P_D$ is the attenuation factor in the semi-transmitting film 32P.

With the above-mentioned configuration, the light of the wavelength $\lambda_1$ emitted from the LD 3R, the light of the wavelength $\lambda_2$ emitted from the LD 3G, the light of the wavelength $\lambda_3$ emitted from the LD 3B, and the light of the wavelength $\lambda_4$ emitted from the LD 3P are combined by the optical multiplexer 32, and each outputted at a substantially uniform level from a signal point.

The light input section 40B includes four photodetectors 4 (R, G, B, P) in this example in correspondence to the light output section 30B. Each of the photodetectors 4 (R, G, B, P) is driven by the PD drive section 41A, and an electric signal is converted into light and outputted.

In the example shown in FIG. 23, there are provided the photodetector 4R provided with the optical bandpass filter 42R that transmits red light, the photodetector 4G provided with the optical bandpass filter 42G that transmits green light, the photodetector 4B provided with the optical bandpass filter 42B that transmits blue light, and the photodetector 4P provided with the optical bandpass filter 42P that transmits purple light.

The light input section 40B has four photodetectors 4 (R, G, B, P) provided so as to be, for example, perpendicular to the plane of the optical waveguide 2, and includes an optical divider 43 that divides light emitted from the outer circumference of the optical waveguide 2 into the individual photodetectors 4 (R, G, B, P).

The optical divider 43 is an example of optical division means, and includes a semi-transmitting film 43P that divides light emitted from the optical waveguide 2 into transmitted light and reflected light, and causes the transmitted light to be inputted to the photodetector 4P, and a semi-transmitting film 43R that divides the light reflected by the semi-transmitting film 43P into transmitted light and reflected light, and cases the reflected light to be inputted to the photodetector 4R. Also, there are provided a semi-transmitting film 43G that divides the light transmitted through the semi-transmitting film 43R into transmitted light and reflected light, and causes the reflected light to be inputted to the photodetector 4G, and a reflecting film 43B that reflects the light transmitted through the semi-transmitting film 43G so as to inputted to the photodetector 4B.

Here, in the optical divider 43, the reflectance of the semi-transmitting film 43P is set so as to transmit ¼ and reflect ¾ of incident light, and the reflectance of the semi-transmitting film 43R is set so as to transmit ⅔ and reflect ⅓ of incident light. Also, the reflectance of the semi-transmitting film 43G is set so as to transmit ½ and reflect ½ of incident light, and the reflectance of the reflecting film 43B is set so as to reflect all of incident light.

Thus, it is possible for the optical divider 43 to split inputted light in four at substantially the same light quantity.

In the example shown in FIG. 24, optical bandpass filters are not provided to the individual photodetectors 4 (R, G, B, P), but the optical bandpass filters 42 (R, G, B, P) are provided to the individual emission surfaces of the optical divider 43.

That is, of the light transmitted through the semi-transmitting film 43P of the optical divider 43, light of the wavelength $\lambda_4$ outputted from the LD 3P is transmitted through the optical bandpass filter 42P and emitted from the optical divider 43, and inputted to the photodetector 4P.

Likewise, of the light reflected by the semi-transmitting film 43R of the optical divider 43, light of the wavelength $\lambda_1$ outputted from the LD 3R is transmitted through the optical bandpass filter 42R and emitted from the optical divider 43, and inputted to the photodetector 4R.

Also, of the light reflected by the semi-transmitting film 43G of the optical divider 43, light of the wavelength $\lambda_2$ outputted from the LD 3G is transmitted through the optical bandpass filter 42G and emitted from the optical divider 43, and inputted to the photodetector 4G.

Further, of the light reflected by the reflecting film 43B of the optical divider 43, light of the wavelength $\lambda_3$ outputted from the LD 3B is transmitted through the optical bandpass filter 42B and emitted from the optical divider 43, and inputted to the photodetector 4B.

Operation Example of Signal Processing Apparatus According to Second Embodiment

Next, an operation example of the signal processing apparatus 5B according to the second embodiment mentioned above will be described with reference to FIG. 23, FIG. 24, and the like.

In the signal processing apparatus 5B, light outputted from the individual LDs 3 (R, G, B, P) of the light output section 30B is combined by the optical multiplexer 32 and outputted.

The light outputted from the individual LDs 3 (R, G, B, P) of the light output section 30B and combined by the optical multiplexer 32 is incident from the outer circumference of the optical waveguide 2 and, as described above, emitted in the entire circumferential direction of the optical waveguide 2 by refraction due to the difference in refractive index between the first light guide section 20 and the second light guide section 21, irregular reflection by the irregular reflector 24 provided in the first light guide section 20, and the like.

The light emitted in the entire circumferential direction of the optical waveguide 2 is split in four by the optical divider 43, and light of the wavelength $\lambda_1$ outputted from the LD 3R is transmitted through the optical bandpass filter 42R and inputted to the photodetector 4R. On the other hand, in the other photodetectors 4 (R, G, P), the light of the wavelength $\lambda_1$ outputted from the LD 3R is respectively blocked by the optical bandpass filters 42 (G, B, P).

Likewise, light of the wavelength $\lambda_2$ outputted from the LD 3G is transmitted through the optical bandpass filter 42G and inputted to the photodetector 4G. On the other hand, in the other photodetectors 4 (R, B, P), the light of the wavelength $\lambda_2$ outputted from the LD 3G is respectively blocked by the optical bandpass filters 42 (R, B, P).

Also, light of the wavelength $\lambda_3$ outputted from the LD 3B is transmitted through the optical bandpass filter 42B and inputted to the photodetector 4B. On the other hand, in the other photodetectors 4 (R, G, P), the light of the wavelength $\lambda_3$ outputted from the LD 3B is respectively blocked by the optical bandpass filters 42 (R, G, P).

Further, light of the wavelength $\lambda_4$ outputted from the LD 3P is transmitted through the optical bandpass filter 42P and inputted to the photodetector 4P. On the other hand, in the other photodetectors 4 (R, G, B), the light of the wavelength $\lambda_4$ outputted from the LD 3P is respectively blocked by the optical bandpass filters 42 (R, G, B).

In this way, in the signal processing apparatus 5B, by combining the light of different wavelengths outputted from the individual LDs 3 (R, G, B, P) by the optical multiplexer 32, a plurality of signals are combined and transmitted in the optical waveguide 2. Also, light emitted from a single arbitrary location on the optical waveguide 2 is split by the optical divider 43, and by using optical bandpass filters or the like, light of a predetermined wavelength is inputted to each of the photodetectors 4 (R, G, B, P).

Thus, in the signal processing apparatus 5B as well, multiplexing of transmission signals by wavelength division becomes possible so that, for example, signals on four channels including video signals of the respective colors of R, G, B and a synchronizing signal can be transmitted through the optical waveguide 2 so as to be sent and received between the light output section 30A and the light input section 40A, thus enabling signal transmission by TMDS.

Figure 25:
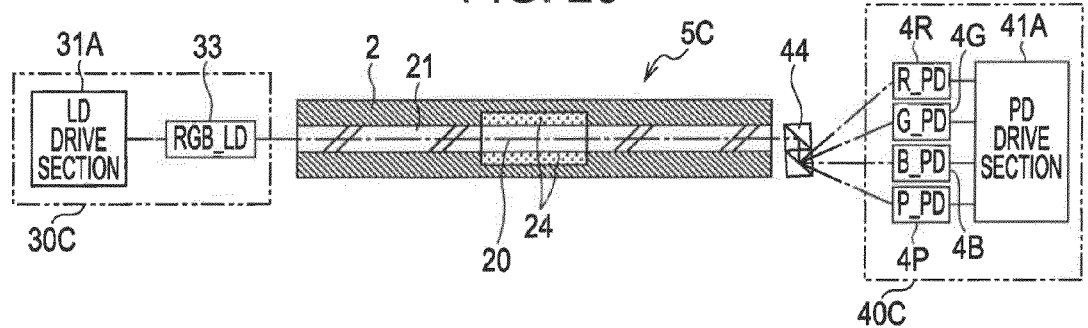
FIG. 25 is a structural view showing another example of a signal processing apparatus according to a third embodiment.
Figure 26:
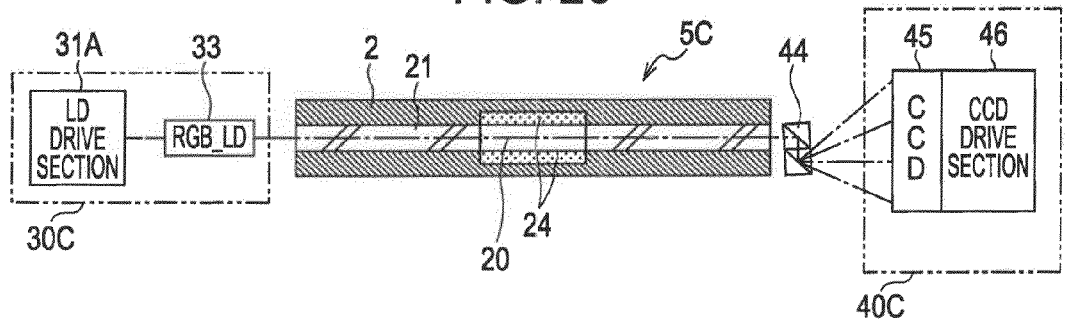
FIG. 26 is a structural view showing another example of the signal processing apparatus according to the third embodiment.

Configuration Example of Signal Processing Apparatus According to Third Embodiment FIG. 25 and FIG. 26 are structural views each showing an example of a signal processing apparatus according to a third embodiment. It should be noted that in FIG. 25 and FIG. 26, the signal processing apparatus according to the third embodiment is shown in a schematic side cross-sectional view.

A signal processing apparatus 5C according to the third embodiment includes a light output section 30C from which light of different wavelengths is outputted by a single light source, a light input section 40C to which the light of different wavelengths outputted from the light output section 30C is inputted after being divided, and the optical waveguide 2 through which the light outputted from the light output section 30C and inputted at the light input section 40C is transmitted. The light of different wavelengths is combined and emitted from a single point to be multiplexed.

The optical waveguide 2 is made of one of the optical waveguides 2(A to F) described with reference to FIG. 1A to FIG. 15C. Light incident from an arbitrary position on the outer circumference of the optical waveguide 2 is emitted in the entire circumferential direction of the optical waveguide 2, by refraction due to the difference in refractive index between the first light guide section 20 and the second light guide section 21, irregular reflection by the irregular reflector 24 provided in the first light guide section 20, and the like.

The light output section 30C includes an RGB-LED (Light Emitting Diode) 33 instead of a plurality of LDs that output light at different wavelengths. The RGB-LED 33 is driven by an LD drive section 31B, an electric signal is converted into light, and light at a plurality of wavelengths is outputted by a single light source. In the light output section 30C, the RGB-LED 33 is placed on the outer circumference of the optical waveguide 2, with the output direction of light directed toward the first light guide section 20 of the optical waveguide 2.

The light input section 40C includes four photodetectors 4 (R, G, B, P) in the example shown in FIG. 25. Each of the photodetectors 4 (R, G, B, P) is driven by the PD drive section 41A, and light is converted into an electric signal and outputted.

The light input section 40C includes an optical divider 44 that divides light outputted from the outer circumference of the optical waveguide 2 into individual wavelengths so as to be incident on the corresponding photodetectors 4 (R, G, B, P).

The optical divider 44 is an example of optical division means, and is configured by, for example, a dispersing optical element such as a prism in which a grating is formed. Light incident from the optical waveguide 2 is divided into individual wavelengths by diffraction.

Since the photodetector 4R is placed within a range in which red light of the wavelength $\lambda_1$ is emitted from the optical divider 44, of the light that is outputted from the RGB-LED 33 and transmitted through the optical waveguide 2 and emitted, light of the wavelength $\lambda_1$ is inputted.

Likewise, since the photodetector 4G is placed within a range in which green light of the wavelength $\lambda_2$ is emitted from the optical divider 44, of the light emitted from the optical waveguide 2, light of the wavelength $\lambda_2$ is inputted.

Also, since the photodetector 42 is placed within a range in which blue light of the wavelength $\lambda_3$ is emitted from the optical divider 44, of the light emitted from the optical waveguide 2, light of the wavelength $\lambda_3$ is inputted.

Further, since the photodetector 4P is placed within a range in which purple light of the wavelength $\lambda_4$ is emitted from the optical divider 44, of the light emitted from the optical waveguide 2, light of the wavelength $\lambda_4$ is inputted.

In the example shown in FIG. 26, a CCD (Charge Coupled Device) 45 is provided instead of the plurality of photodetectors. The CCD 45 is driven by a CCD drive section 46, and light that is outputted from the RGB-LED 33 and is transmitted through the optical waveguide 2 and emitted is outputted after being converted into an electric signal corresponding to light divided into each wavelength emitted from the optical divider 44.

Operation Example of Signal Processing Apparatus According to Third Embodiment Next, an operation example of a signal processing apparatus 5C according to the third embodiment mentioned above will be described with reference to FIG. 25, FIG. 26, and the like.

In the signal processing apparatus 5C, light of a plurality of predetermined wavelengths is combined and outputted from the RGB-LED 33 of the light input section 30C. The light outputted from the RGB-LED 33 is incident from the outer circumference of the optical waveguide 2 and, as described above, emitted in the entire circumferential direction of the optical waveguide 2 by refraction due to the difference in refractive index between the first light guide section 20 and the second light guide section 21, irregular reflection by the irregular reflector 24 provided in the first light guide section 20, and the like.

The light emitted in the entire circumferential direction of the optical waveguide 2 is divided into individual wavelengths by the optical divider 44. In the example shown in FIG. 25, light of the wavelength $\lambda_1$ divided by the optical divider 44 is inputted to a photodetector 44R.

Likewise, light of the wavelength $\lambda_2$ divided by the optical divider 44 is inputted to a photodetector 44G, light of the wavelength $\lambda_3$ divided by the optical divider 44 is inputted to a photodetector 44B, and light of the wavelength $\lambda_4$ divided by the optical divider 44 is inputted to a photodetector 44G.

Also, in the example shown in FIG. 26, light divided by the optical divider 44 is inputted to a predetermined area of the CCD 45 for each wavelength.

In this way, in the signal processing apparatus 5C, as light of a plurality of predetermined wavelengths is combined and outputted from the RGB-LED 33, a plurality of signals are combined and transmitted in the optical waveguide 2. Also, light emitted from a single arbitrary location of the optical waveguide 2 is divided into individual wavelengths by the optical divider 44, and in the example shown in FIG. 25, light of a predetermined wavelength is inputted to each of the photodetectors 4 (R, G, B, P). Also, in the example shown in FIG. 26, light of a wavelength corresponding to a predetermined area of the CCD 45 is inputted.

Thus, in the signal processing apparatus 5C as well, multiplexing of transmission signals by wavelength division becomes possible. It should be noted that in each of the embodiments of the signal processing apparatus described above, the number and order of placement of LDs and photodetectors are not limited to the above examples.

Figure 27A:
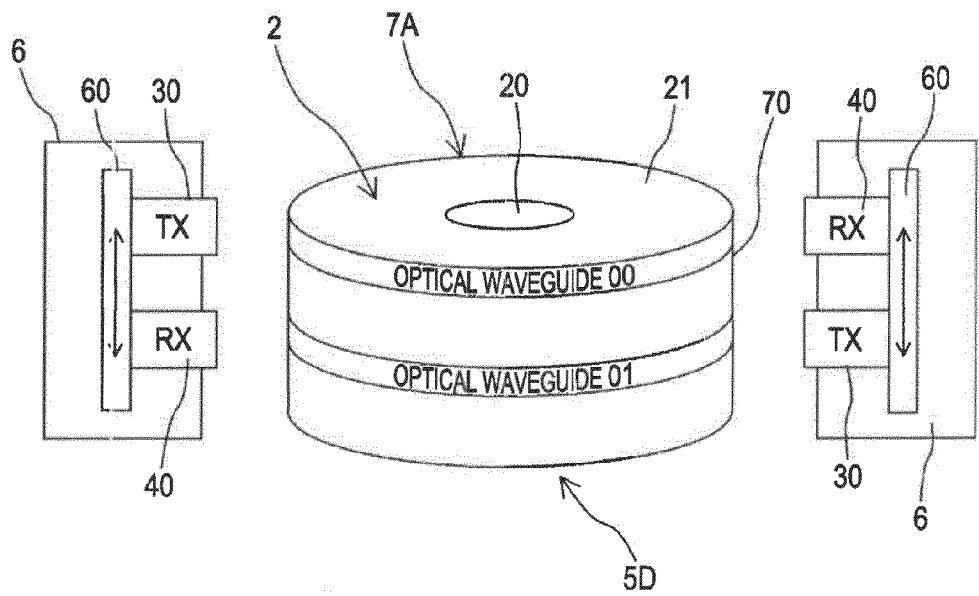
FIG. 27A is a structural view showing an example of a signal processing apparatus according to a fourth embodiment.
Figure 27B:
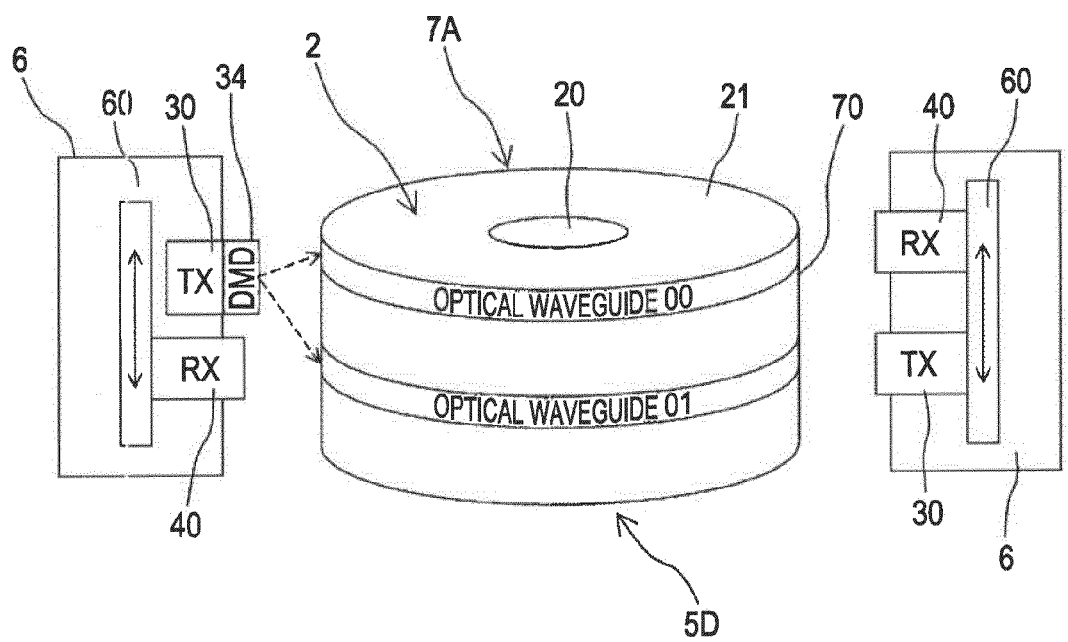
FIG. 27B is a structural view showing an example of the signal processing apparatus according to the fourth embodiment.

Configuration Example of Signal Processing Apparatus According to Fourth Embodiment FIG. 27A to FIG. 27B are structural views each showing an example of a signal processing apparatus according to a fourth embodiment. It should be noted that in FIG. 27A to FIG. 27B, the signal processing apparatus according to the fourth embodiment is shown in a schematic perspective view.

In a signal processing apparatus 5D according to the fourth embodiment, a plurality of functional boards 6 having predetermined functions are connected via an arbitrary signal path by an optical waveguide structure 7A.

The optical waveguide structure 7A includes any one of the optical waveguides 2(A to F) described with reference to FIG. 1A to FIG. 15C, and a plurality of the optical waveguides 2 are laminated while sandwiching therebetween a spacer 70 that is a light blocking member made of a material that does not transmit light.

In the optical waveguide 2 in each layer, as described above, light incident from an arbitrary position on the outer circumference is emitted in the entire circumferential direction of the optical waveguide 2, by refraction due to the difference in refractive index between the first light guide section 20 and the second light guide section 21, irregular reflection by the irregular reflector 24 provided in the first light guide section 20, and the like.

Then, no light leaks in the laminating direction of the optical waveguides 2, and a signal is independently transmitted in each of the optical waveguides 2.

The functional board 6 is an example of a signal processing board constituting a signal processing apparatus, and includes, as an optical-electric signal conversion section, a single or plurality of light output sections 30 from which an optical signal is outputted, and a single or plurality of light input sections 40 to which the optical signal is inputted.

The light output section 30 includes a configuration for outputting light at a single wavelength, or a configuration for outputting light at two or more different wavelengths, depending on the signal transmission mode or the like. In the case of the configuration for outputting light at a single wavelength, the light output section 30 includes an LD on the outer circumference of the optical waveguide structure 7A, with the light output direction directed toward the first light guide section 20 of the optical waveguide 2.

In the case of the configuration for outputting light at different wavelengths, for example, there is provided the light output section 30A described with reference to FIG. 19, the light output section 30B described with reference to FIG. 23 and the like, or the light output section 30C described with reference to FIG. 25 and the like.

In the light output section 30A described with reference to FIG. 19, four LDs 3 (R, G, B, P) that emit light at different wavelengths are provided so as to be horizontal with respect to the plane of the optical waveguide 2 constituting the optical waveguide structure 7A.

Also, the light output section 30B described with reference to FIG. 23 and the like includes the optical multiplexer 32 to make light outputted from each of the LDs (R, G, B, P) incident from a single arbitrary point of the optical waveguide 2. Further, the light output section 30C described with reference to FIG. 25 and the like includes the RGB-LED 33 from which light of different wavelengths is outputted.

The light input section 40 includes a configuration capable of receiving light of a single wavelength outputted from the light output section 30, or a configuration capable of receiving light of each of two or more different wavelengths, depending on the configuration of the light output section 30 and the signal transmission mode.

In the case of the configuration capable of receiving light of a single wavelength, the light input section 40 includes a photodetector on the outer circumference of the optical waveguide structure 7A, with the light receiving section directed toward the first light guide section 20 of the optical waveguide 2.

In the case of the configuration capable of receiving light of different wavelengths, for example, there are provided the light input section 40A described with reference to FIG. 19, the light input section 40B described with reference to FIG. 23 and the like, or the light input section 40C described with reference to FIG. 25 and the like.

In the light input section 40A described with reference to FIG. 19, the photodetectors 4 (R, G, B, P) provided with the optical bandpass filters 42 (R, G, B, P) that transmit light of desired wavelengths are provided so as to be horizontal with respect to the plane of the optical waveguide 2 constituting the optical waveguide structure 7A.

Also, the light input section 40B described with reference to FIG. 23 and FIG. 24 includes the optical divider 43 that divides light emitted from the optical waveguide 2, and the photodetectors 4 (R, G, B, P) that receive light of desired wavelengths that have been transmitted through the optical bandpass filters 42 (R, G, B, P).

Further, the light input section 40C described with reference to FIG. 25 and FIG. 26 includes the optical divider 44 that divides light emitted from the optical waveguide 2 into individual desired wavelengths, and the photodetectors 4 (R, G, B, P) or the CCD 45 that receives the divided light of desired wavelengths.

In this example, the light output section 30 and the light input section 40 are provided on the outer circumference of the optical waveguide structure 7A having a cylindrical shape so as to be opposed to the optical waveguide 2, and are fixed at positions allowing incidence/emission of light, with respect to the optical waveguide 2 in each layer of the optical waveguide structure 7A, in accordance with the signal path between the functional boards 6.

Alternatively, in the example shown in FIG. 27A, the light output section 30 and the light input section 40 are each provided with a moving mechanism 60, and moves along the laminating direction of the optical waveguides 2 so as to be placed at a position allowing incidence or emission of light with respect to an arbitrary optical waveguide 2, thereby switching signal paths between the functional boards 6.

The moving mechanism 60 includes, for example, a rail attached to the functional board 6, a roller that is attached to the light output section 30 and the light input section 40 and rotates along the rail, a drive mechanism for the roller, and the like.

The light output section 30 and the light input section 40 are attached to the moving mechanism 60 so as to be capable of moving in parallel to the center axis of the optical waveguide structure 7A having a cylindrical shape. The light output section 30 and the light input section 40 can ascend and descend independently so as to be placed at positions opposing a desired optical waveguide 2.

Also, in the case of a configuration in which a plurality of one or both of light output sections 30 and light input sections 40 are provided to the functional board 6, the light output sections 30 and the light input sections 40 can be placed at positions opposing the optical waveguides 2 in different layers of the optical waveguide structure 7A.

It should be noted that as shown in FIG. 27B, the light output section 30 may include, as an optical-path distributing mechanism, a digital mirror device (DMD) 34 constituting a reflecting member that is movable by the micro electro mechanism systems (MEMS), and the emitting direction of light emitted from the LD may be made variable so that the light is incident on an arbitrary optical waveguide 2. Also, in each of the functional boards 6, the light output section 30 and the light input section 40 may be fixed at positions allowing incidence/emission of light with respect to the optical waveguide 2 in each layer, and in accordance with the signal path between the functional boards 6, a predetermined light output section 30 and a predetermined light input section 40 may be selected by software for use.

Operation Example of Signal Processing Apparatus According to Fourth Embodiment

Next, an operation example of the signal processing apparatus 5C according to the fourth embodiment mentioned above will be described with reference to FIG. 27A to FIG. 27B and the like.

When, between the functional boards 6 between which a signal is to be transmitted, the light output section 30 and the light input section 40 are opposed to the optical waveguide 2 in the same layer, and an optical signal is outputted from the light output section 30, as described above, light incident from an arbitrary position on the outer circumference of the optical waveguide 2 is emitted in the entire circumferential direction of the optical waveguide 2, by refraction due to the difference in refractive index between the first light guide section 20 and the second light guide section 21, irregular reflection by the irregular reflector 24 provided in the first light guide section 20, and the like.

The light emitted in the entire circumferential direction of the optical waveguide 2 is inputted to the light input section 40 placed in the same layer as the output side, and is converted into an electric signal. Since light is emitted in the entire circumferential direction from the optical waveguide 2, the light input section 40 placed in the same layer as the output side can receive the light at an arbitrary position in the circumferential direction of the optical waveguide 2.

In the signal processing apparatus 5C in which light of two or more different wavelengths is transmitted, light outputted from each of the LDs 3 (R, G, B, P) of the light output section 30 and combined is incident from the outer circumference of the optical waveguide 2, and emitted in the entire circumferential direction of the optical waveguide 2, by refraction due to the difference in refractive index between the first light guide section 20 and the second light guide section 21, irregular reflection by the irregular reflector 24 provided in the first light guide section 20, and the like.

The light emitted in the entire circumferential direction of the optical waveguide 2 is divided into individual wavelengths corresponding to the LDs 3 (R, G, B, P). Light of the wavelength $\lambda_1$ outputted from the LD 3R is inputted to the photodetector 4R, light of the wavelength $\lambda_2$ outputted from the LD 3G is inputted to the photodetector 4G, light of the wavelength $\lambda_3$ outputted from the LD 3B is inputted to the photodetector 4B, and light of the wavelength $\lambda_4$ outputted from the LD 3P is inputted to the photodetector 4P.

Thus, by opposing the light output section 30 of a given functional board 6(00) to the optical waveguide 2(00) in the first layer, and opposing the light input section 40 of another functional board 6(01) to the optical waveguide 2(00) in the first layer, transmission of a signal by light from the functional board 6(01) to the functional board 6(01) becomes possible.

Also, by opposing the light output section 30 of the functional board 6(01) to the optical waveguide 2(01) in the second layer, and opposing the light input section 40 of the functional board 6(00) to the optical waveguide 2(01) in the second layer, transmission of a signal by light from the functional board 6(01) to the functional board 6(00) becomes possible.

Since light is transmitted independently through the optical waveguide 2(00) in the first layer and the optical waveguide 2(01) in the second layer, transmission of a signal by light from the functional board 6(00) to the functional board 6(01), and transmission of a signal by light from the functional board 6(01) to the functional board 6(00) can be performed simultaneously. Also, it is possible to send/receive a signal by wavelength multiplexing in each layer.

Also, in the case of a configuration in which a plurality of one or both of light output sections 30 and light input sections 40 are provided to the functional board 6, the first light output section 30 of a given functional board 6(00) is opposed to the optical waveguide 2(00) in the first layer, and the second light output section 30 is opposed to the optical waveguide 2(01) in the second layer. Also, the light input section 40 of another functional board 6(01) is opposed to the optical waveguide 2(00) in the first layer, and the light input section 40 of still another functional board 6(02: not shown) is opposed to the optical waveguide 2(01) in the second layer. Thus, transmission of different signals from the functional board 6(00) to different functional boards 6(01) and 6(02) becomes possible.

As a similar method, the first light output section 30 of a given functional board 6(00) is opposed to the optical waveguide 2(00) in the first layer, and the light input sections 40 of another functional board 6(01) and still another functional board 6(02) are each opposed to the optical waveguide 2 in the first layer. Then, by using, for example, red light outputted from the LD 3R for a signal transmitted from the functional board 6(00) to the functional board 6(01), and using, for example, green light outputted from the LD 3G for a signal transmitted from the functional board 6(00) to the functional board 6(02), transmission of different signals from a given functional board 6(00) to different functional boards 6(01), 6(02) becomes possible through signal transmission by wavelength multiplexing.

Also, by performing multiplexing of transmission signals by wavelength division in the optical waveguide 2 in the same layer, multi-bit signal transmission is possible between a given functional board 6(00) and another functional board 6(01), thus making it possible to, for example, assign an ID to each functional board, and notify this by an optical signal.

Figure 28:
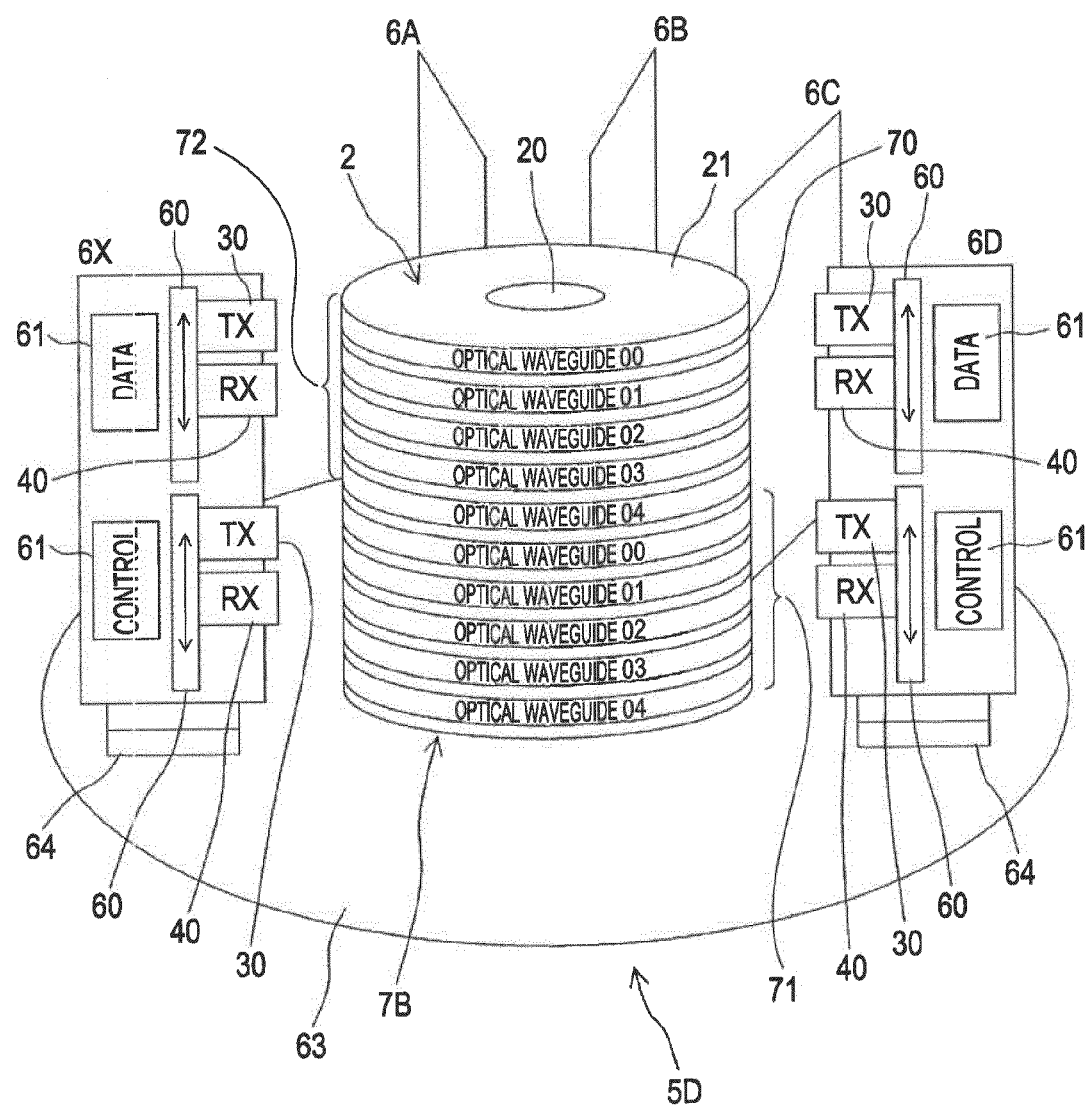
FIG. 28 is a structural view showing a specific example of the signal processing apparatus according to the fourth embodiment.

Example of Signal Path Switching Operation in Signal Processing Apparatus According to Fourth Embodiment FIG. 28 is a structural view showing a specific example of the signal processing apparatus according to the fourth embodiment. Next, a description will be given of a specific example of signal path switching between functional boards. Here, in FIG. 28, the signal processing apparatus is shown in a schematic perspective view.

The signal processing apparatus 5D includes, as functional boards, a control board 6X, and a plurality of signal processing boards 6(A to D) having predetermined functions. The functional boards are connected via an arbitrary signal path by an optical waveguide structure 7B.

The optical waveguide structure 7B has any one of the optical waveguides 2(A to F) described with reference to FIG. 1A to FIG. 15C laminated in layers via the spacer 70, and includes a control signal transmission layer 71 in which control signals are transmitted between the control board 6X and the individual signal processing boards 6(A to D), and between the individual signal processing boards 6(A to D), and a data transmission layer 72 in which data is transmitted between the individual signal processing boards 6 (A to D).

In the control signal transmission layer 71 and the data transmission layer 72, a number of layers of the optical waveguides 2 set in accordance with the number of boards that can be connected via the optical waveguide structure 7B, the assumed signal path, and the like are laminated. In this example, five layers of the optical waveguides 2 are laminated for transmission of control signals, and five layers of the optical waveguides 2 are laminated for transmission of data.

In the optical waveguide 2 in each layer, as described above, light incident from an arbitrary position on the outer circumference of the optical waveguide 2 is emitted in the entire circumferential direction of the optical waveguide 2, by refraction due to the difference in refractive index between the first light guide section 20 and the second light guide section 21, irregular reflection by the irregular reflector 24 provided in the first light guide section 20, and the like. Then, no light leaks in the laminating direction of the optical waveguides 2, and a signal is independently transmitted in each of the optical waveguides 2.

The control board 6X and the signal processing boards 6(A to D) each include a single or plurality of light output sections 30 from which an optical signal is outputted, and a single or plurality of light input sections 40 to which an optical signal is inputted. Also, the control board 6X and the signal processing boards 6(A to D) each include a signal processing section 61 that performs processing on a signal outputted from the light output section 30 and a signal inputted from the light input section 40. A processing section for control signals and a processing section for data may be individually provided in the signal processing section 61.

The light output section 30 includes a configuration for outputting light at a single wavelength, or a configuration for outputting light at two or more different wavelengths, depending on the signal transmission mode or the like. In the case of the configuration for outputting light at a single wavelength, the light output section 30 includes an LD on the outer circumference of the optical waveguide structure 7A, with the light output direction directed toward the first light guide section 20 of the optical waveguide 2.

In the case of the configuration for outputting light at different wavelengths, for example, there are provided the light output section 30A described with reference to FIG. 19, the light output section 30B described with reference to FIG. 23 and the like, or the light output section 30C described with reference to FIG. 25 and the like.

The light input section 40 includes a configuration capable of receiving light of a single wavelength outputted from the light output section 30, or a configuration capable of receiving light of each of two or more different wavelengths, depending on the configuration of the light output section 30 and the signal transmission mode.

In the case of the configuration capable of receiving light of a single wavelength, the light input section 40 includes a photodetector on the outer circumference of the optical waveguide structure 7A, with the light receiving section directed toward the first light guide section 20 of the optical waveguide 2.

In the case of the configuration capable of receiving light of different wavelengths, for example, there are provided the light input section 40A described with reference to FIG. 19, the light input section 40B described with reference to FIG. 23 and the like, or the light input section 40C described with reference to FIG. 25 and the like.

The light output section 30 and the light input section 40 are each provided with the moving mechanism 60, and moves along the laminating direction of the optical waveguides 2 so as to be placed at a position allowing incidence or emission of light with respect to an arbitrary optical waveguide 2, thereby switching signal paths between the control board 6X and the signal processing boards 6(A to D).

In the signal processing apparatus 5D, the control board 6X and the signal processing boards 6(A to D) are mounted to a base substrate 63. The base substrate 63 is an example of a mounting substrate, and includes a power supply and a cooling fan that are not illustrated, and sockets 64 to which the control board 6X and the signal processing boards 6(A to D) are detachably mounted. Power is supplied to the control board 6X and the signal processing boards 6(A to D).

The sockets 64 are an example of connecting mechanism, and are installed at a plurality of locations along the outer circumference of the optical waveguide structure 7B. When the control board 6X or each of the signal processing boards 6(A to D) is mounted to an arbitrary socket 64, the light output section 30 and the light input section 40 are moved by the moving mechanism 60 so as to be opposed to a desired optical waveguide 2, thereby enabling incidence/emission of light.

In the optical waveguide 2 in each layer constituting the optical waveguide structure 7B, light made incident from an arbitrary position on the outer circumference is emitted in the entire circumferential direction of the optical waveguide 2. Thus, incidence/emission of light with respect to the optical waveguide 2 is possible whichever socket 64 the control board 6X or each of the signal processing boards 6(A to D) is fitted into.

Thus, in the signal processing apparatus 5D, changing of functions or addition of functions is possible by changing or adding the signal processing boards 6 mounted to the base substrate 63.

FIG. 29 to FIG. 33 are explanatory diagrams each showing an example of a signal path switching operation in a signal processing apparatus. Next, referring to FIG. 28, FIG. 29 to FIG. 33, and the like, a description will be given of an example of signal paths that are switched in the signal processing apparatus 5D.

When the signal path between the control board 6X and the signal processing boards 6(A to D) is in a looped configuration, as shown in FIG. 29, the light output section 30 (TX) of the control board 6X is opposed to the optical waveguide 2(00) in the first layer, and the light input section 40 (RX) of the signal processing board 6A is opposed to the optical waveguide 2(00) in the first layer.

The light output section 30 (TX) of the signal processing board 6A is opposed to the optical waveguide 2(01) in the second layer, and the light input section 40 (RX) of the signal processing board 6B is opposed to the optical waveguide 2(01) in the second layer.

The light output section 30 (TX) of the signal processing board 6B is opposed to the optical waveguide 2(02) in the third layer, and the light input section 40 (RX) of the signal processing board 6C is opposed to the optical waveguide 2(02) in the third layer.

The light output section 30 (TX) of the signal processing board 6C is opposed to the optical waveguide 2(03) in the fourth layer, and the light input section 40 (RX) of the signal processing board 6D is opposed to the optical waveguide 2(03) in the fourth layer.

The light output section 30 (TX) of the signal processing board 6D is opposed to the optical waveguide 2(04) in the fifth layer, and the light input section 40 (RX) of the control board 6X is opposed to the optical waveguide 2(04) in the fifth layer.

Thus, a signal is transmitted by light from the control board 6X to the signal processing board 6A, and a signal is transmitted by light from the signal processing board 6A to the signal processing board 6B.

Also, a signal is transmitted by light from the signal processing board 6B to the signal processing board 6C, and a signal is transmitted by light from the signal processing board 6C to the signal processing board 6D. Further, a signal is transmitted by light from the signal processing board 6D to the control board 6X.

By providing two lines of the light input sections 40 that can be moved independently in the control board 6X and the signal processing boards 6(A to D), it is also possible to switch over the signal path between the control board 6X and the signal processing boards 6(A to D) to a broadcast configuration.

That is, in a case where the signal path between the control board 6X and the signal processing boards 6(A to D) is to be configured as broadcast, as shown in FIG. 30, the light output section 30 (TX) of the control board 6X is opposed to the optical waveguide 2(00) in the first layer, and the first light input section 40 ($RX_1$) of the signal processing board 6A is opposed to the optical waveguide 2(00) in the first layer.

Likewise, the first light input section 40 ($RX_1$) of the signal processing board 6B, the first light input section 40 ($RX_1$) of the signal processing board 6C, and the first light input section 40 ($RX_1$) of the signal processing board 6D are each opposed to the optical waveguide 2(00) in the first layer.

On the other hand, the light output section 30 (TX) of the signal processing board 6A is opposed to the optical waveguide 2(01) in the second layer, and the second light input section 40 (RX$_2$) of the signal processing board 6B is opposed to the optical waveguide 2(01) in the second layer.

The light output section 30 (TX) of the signal processing board 6B is opposed to the optical waveguide 2(02) in the third layer, and the second light input section 40 (RX$_2$) of the signal processing board 6C is opposed to the optical waveguide 2(02) in the third layer.

The light output section 30 (TX) of the signal processing board 6D is opposed to the optical waveguide 2(03) in the fourth layer, and the second light input section 40 (RX$_2$) of the signal processing board 6D is opposed to the optical waveguide 2(03) in the fourth layer.

The light output section 30 (TX) of the signal processing board 6D is opposed to the optical waveguide 2(04) in the fifth layer, and the light input section 40 of the control board 6X is opposed to the optical waveguide 2(04) in the fifth layer.

Thus, the same signal is transmitted by light from the control board 6X to each of the signal processing boards 6(A to D).

On the other hand, a signal is transmitted by light from the signal processing board 6A to the signal processing board 6B. Also, a signal is transmitted by light from the signal processing board 6B to the signal processing board 6C, and a signal is transmitted by light from the signal processing board 6C to the signal processing board 6D. Further, a signal is transmitted by light from the signal processing board 6D to the control board 6X.

Here, if the light output section 30 and the light input section 40 are configured to be capable of, for example, sending and receiving four colors of light, for example, one-to-four signal transmission becomes possible. That is, in the case where the signal path between the control board 6X and the signal processing boards 6(A to D) is in a broadcast configuration, as shown in FIG. 31, in the optical waveguide 2 in the first layer, transmission of a signal from the control board 6X to the signal processing board 6A is performed by red light. Also, transmission of a signal to the signal processing board 6B is performed by green light, transmission of a signal to the signal processing board 6C is performed by blue light, and transmission of a signal to the signal processing board 6D is performed by purple light. Thus, signal transmission via four lines (one-to-four) is possible with a single layer of the optical waveguide 2.

Further, if the light output section 30 and the light input section 40 are configured to be capable of, for example, sending and receiving four colors of light, in the signal transmission from the control board 6X to each signal processing board, one-to-four signal transmission is possible with a single layer of the optical waveguide 2. Thus, as shown in FIG. 32, it is possible to perform 1-to-8 signal transmission with two layers of the optical waveguides 2, and further 1-to-12 signal transmission with three layers of the optical waveguides 2. By using wavelength multiplexing, one-to-many signal transmission is possible without increasing the number of layers of the optical waveguides 2.

Likewise, in the signal transmission from each signal processing board to the control board 6X, four-to-one signal transmission is possible with a single layer of the optical waveguide 2. Thus, as shown in FIG. 33, it is possible to perform 8-to-1 signal transmission with two layers of the optical waveguides 2, and further 12-to-1 signal transmission with three layers of the optical waveguides 2. By using wavelength multiplexing, many-to-one signal transmission is possible without increasing the number of layers of the optical waveguides 2.

Operation Example of Signal Processing in Signal Processing Apparatus According to Fourth Embodiment Incidentally, in the signal processing apparatus according to the fourth embodiment mentioned above, it is necessary to make it easy for the user to connect arbitrary signal processing boards. Accordingly, a description will be given of a control for creating a signal path in accordance with the connected signal processing boards, in the signal processing apparatus according to the fourth embodiment mentioned above.

FIG. 34 is a block diagram showing a functional configuration example of each of the signal processing boards 6(A to D) described with reference to FIG. 27A to FIG. 27B. As shown in the same drawing, each of the signal processing boards 6(A to D) includes a main processing section 82, a communication section 82, and an apparatus information storing section 83.

The communication section 82 includes the light output section 30, the light input section 40, and the like shown in FIG. 34, and communicates with another signal processing board other than with the control board 6X, via a selected optical waveguide 2 of the optical waveguide structure 7B.

The apparatus information storing section 83 stores the signal processing board ID of its own, process content information, and the input/output signal format in advance. The apparatus information storing section 83 includes, for example, a microprocessor, a RAM (Random Access Memory), a ROM (Read Only Memory), and the like. Of course, the apparatus information storing section 83 may include only a RAM, a flash ROM, or a control circuit. The main processing section 81 controls the operation of the signal processing boards 6(A to D).

The signal processing board ID stored in the apparatus information storing section 83 is an identification number unique to each signal processing apparatus to identify each signal processing apparatus.

Also, the process content information stored in the apparatus information storing section 83 is information related to a process that can be executed by the signal processing board.

FIG. 35 is an explanatory diagram showing an example of process content information. Exemplified as the process content information are external signal input (a), (b), external signal output (a), resolution creation (a), and noise removal (a), (b). The process ID for each process is 00010, 00011, 00020, 00030, 00040, or 00041 in this example.

The external signal input (a) means a process of inputting an analog signal from the external. The external means that a signal is inputted without going through the optical waveguide structure 7B. The external signal input (b) means a process of inputting a digital signal from the external. The external signal output (a) means a process of outputting a digital signal to the external. The outputting of a signal to the external means that a signal is outputted without going through the optical waveguide structure 7B.

The resolution creation (a) means a process of creating a resolution. The noise removal (a) means a process of removing transmission path noise, and the noise removal (b) means a process of removing encoding noise.

Each of the signal processing boards 6(A to D) stores the content of a process to be executed by itself among these process contents, as process content information in the apparatus information storing section 83.

It should be noted that, in addition, the minimum information necessary for the internal control of the system, information to be used for user interfaces, and the like may be stored as the process content information.

The input/output signal format means a format in which a signal that can be inputted to or outputted from each signal processing board.

Figures 36, 37:
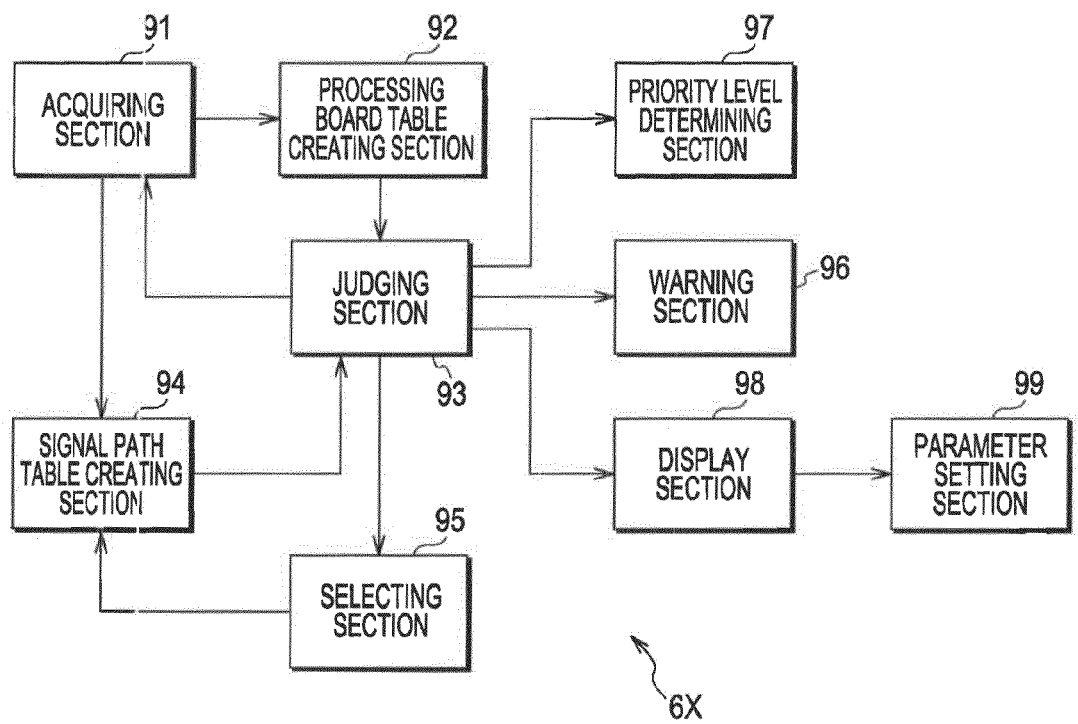
FIG. 36 is an explanatory diagram showing an example of input/output signal formats.
FIG. 37 is a block diagram showing a functional configuration example of a control board.

FIG. 36 is an explanatory diagram showing an example of input/output signal format. In the example in FIG. 36, a signal format for input and a signal output for output in a signal format 525i(60I) are respectively described. The signal format ID for the former is 00010 and the corresponding process ID is 00010, and the signal format ID for the latter is 00011 and the corresponding process ID is 00011.

Further, as an input signal format 625i(50I), a signal format ID 00020 and a corresponding process ID 00010 are described. Further, as an input signal format 525p(60P), a signal format ID 00030 and a corresponding process ID 00030 are described. As an input signal format 720p(60P) as well, a signal format ID 00040 and a corresponding process ID 00040 are described.

It should be noted that, for example, the numeral "525" of a signal format indicates the number of scanning lines, and the numeral "60" of "60I" indicates the number of frames. Also, "I" indicates an interlaced mode, and "P" indicates progressive (line sequential mode).

Each of the signal processing boards 6(A to D) stores the input/output signal format of its own among these input/output signal formats, in the apparatus information storing section 83.

FIG. 37 is a block diagram showing a functional configuration example of the control board 6X. An acquiring section 91 acquires signal processing board IDs, process content information, and input/output signal formats from the individual signal processing boards 6(A to D). A processing board table creating section 92 creates a processing board table for identifying apparatuses connected to the optical waveguide structure 7B, on the basis of the signal processing board IDs acquired by the acquiring section 91. A judging section 93 performs such determination processes as to whether or not there is a change in the processing board table, whether or not there is an external input apparatus or an intermediate apparatus as a signal processing board, whether or not there is a signal path that has not been established, and whether or not the number of signal paths is plural.

A signal path table creating section 94 creates and stores a signal path table indicating signal paths of the individual signal processing boards 6(A to D) connected to the optical waveguide structure 7B. A selecting section 95 performs various selection processes on the basis of the results of judgment by the judging section 93. A warning section 96 gives various warnings to the user on the basis of the results of judgment by the judging section 93. A priority level determining section 97 determines the priority levels of signal paths if there are a plurality of signal paths. A display section 98 controls the display of the determined signal path, a parameter input screen, and the like. A parameter setting section 99 performs a process of setting parameters such as resolution on the basis of the parameter input screen displayed by the display section 98.

Figure 38A:
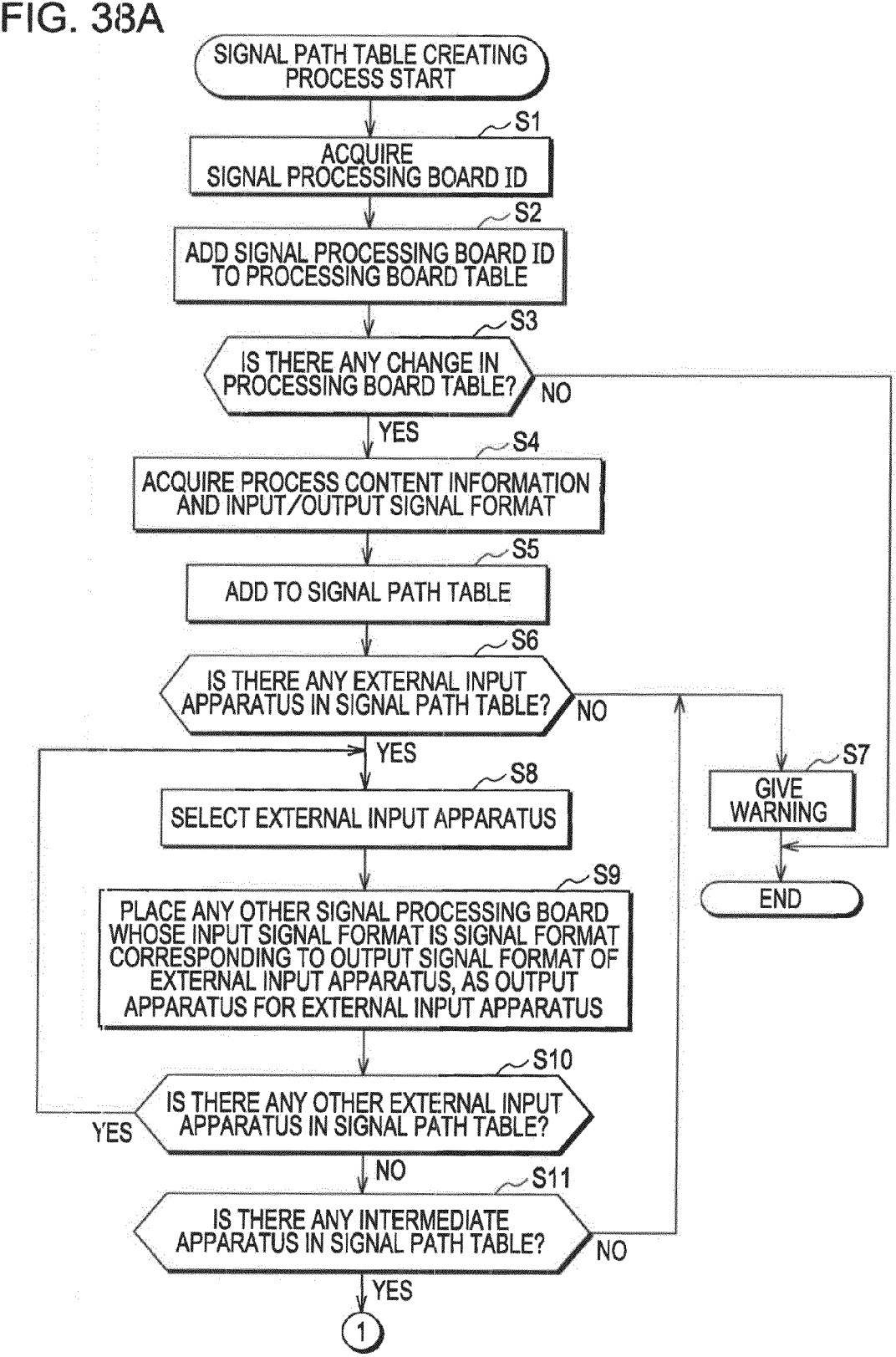
FIG. 38A is a flowchart illustrating a signal path table creating process.
Figure 38B:
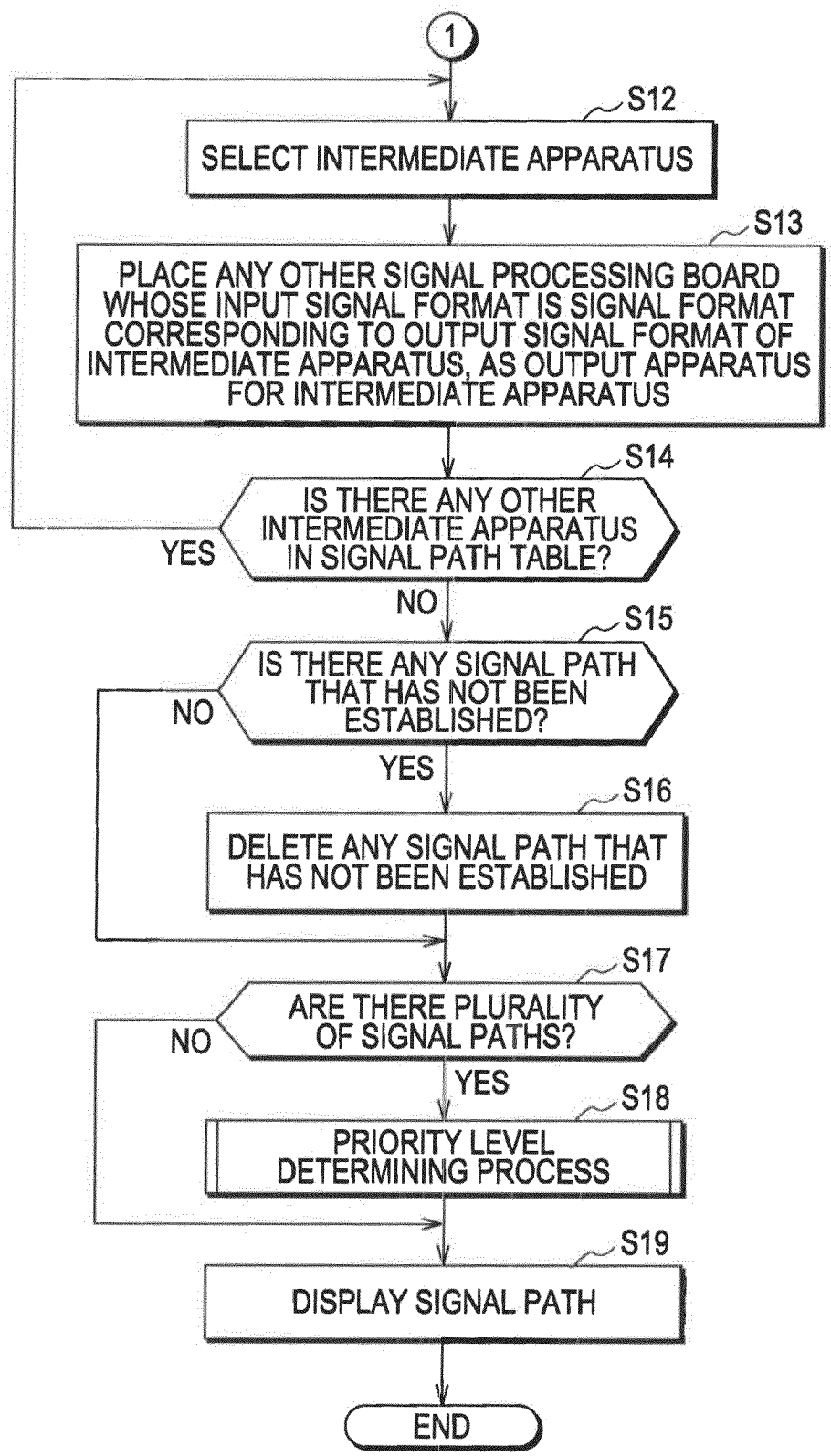
FIG. 38B is a flowchart illustrating a signal path table creating process.

FIG. 38A and FIG. 38B are flowcharts illustrating a signal path table creating process. Next, referring to FIG. 38A and FIG. 38B, the signal path table creating process will be described. This process is executed, for example, immediately after turning on the power of the signal processing apparatus 5D.

In step S1, the acquiring section 91 of the control board 6X executes a process of acquiring a signal processing board ID from each of the signal processing boards 6(A to D) connected to the optical waveguide structure 7B. Specifically, the acquiring section 91 requests each of the signal processing boards 6(A to D) to send a signal processing board ID, via the optical waveguide structure 7B.

Each of the signal processing boards 6(A to D) notifies the control board 6X of the signal processing board ID stored in the apparatus information storing section 83, via the optical waveguide structure 7B.

In step S2, the processing board table creating section 92 of the control board 6X executes a process of adding a signal processing board ID to the processing board table. Specifically, the processing board table creating section 92 adds the signal processing board ID supplied from the acquiring section 91 to the processing board table that is internally stored.

FIG. 39 is an explanatory diagram showing an example of a processing board table. In this example, since the signal processing boards 6(A to D) are connected, a processing board table as shown in FIG. 39 is created. In the illustrated example, as the names of signal processing boards, apparatuses A to D, and their respective signal processing board IDs (00010 and the like) are described in association with each other.

Next, in step S3, the judging section 93 judges whether or not there is any change in the processing board table. That is, a processing board table created when the power was previously turned on is compared with a processing board table created when the power is turned on this time. If there is no change between those, since a signal path table has already been created as well, the process is terminated.

In contrast, if it is judged in step S3 by the judging section 93 that there is any change in the processing board table, in step S4, the acquiring section 91 executes a process of acquiring the process content information and input/output signal format from the signal processing board that has been added.

Specifically, the acquiring section 91 requests the signal processing board newly added to the processing board table created this time, to send its process content information and input/output signal format.

The signal processing board having received this request reads the process content information and input/output signal format of its own stored in its apparatus information storing section 83, and notifies the control board 6X of the read information via the optical waveguide structure 7B.

Upon receiving the process content information and the input/output signal format from the newly added signal processing board, the acquiring section 91 of the control board 6X supplies this to the signal path table creating section 94. In step S5, the signal path table creating section 94 adds, to the signal path table, the process content information and the input/output signal format supplied from the acquiring section 91, and creates a new signal path table.

FIG. 40 to FIG. 44 are explanatory diagrams each showing an example of a processing path table. Since no previous processing board table and signal processing table exist when the power of the signal processing apparatus 5D is turned on for the first time, a processing board table and a signal processing table for all the connected signal processing boards are created. FIG. 40 shows an example of a signal path table created in this way.

In the example shown in FIG. 40, the signal processing board 6A has the external signal input (a) as its process content, its input signal format is 525i(60I), 525p(60P), or 1125i(60I), and likewise, the corresponding output signal format is 525i(60I), 525p(60P), or 1125i(60I). That is, the external signal output (a) means that an inputted signal format is outputted as it is.

The signal processing board 6B has the noise removal (a) as its process content, its input signal format is 525*i*(60I) or 525*p*(60P), and the signal output format is 525*i*(60I) or 525*p* (60P), respectively, in correspondence to the input signal format.

That is, in the noise removal (a), an input in the input signal format 525*i*(60I) or 525*p*(60P) is outputted as a signal in the corresponding output signal format, that is, 525*i*(60I) or 525*p* (60P), after noise is removed.

The signal processing board 6C has the resolution creation (a) as its process content, its input signal format is 525*i*(60I), and the signal output format is 720*p*(60P) or 1125*i*(60I).

That is, the signal processing board 6C outputs a signal inputted in the input signal format 525*i*(60I), in the output signal format 720*p*(60P) or in the output signal format 1125*i* (60I), after its resolution creation.

The signal processing board 6D has the external signal output (a) as its process content, its input signal format is 525*i*(60I), 525*p*(60P), or 720*p*(60P), and the signal output format is 525*i*(60I), 525*p*(60P), or 720*p*(60P), respectively, in correspondence to the input signal format.

That is, the signal processing board 6D has a function of outputting an inputted signal to the external as it is.

Next, in step S6, the judging section 93 of the control board 6X judges whether or not there is any external input apparatus in the signal path table. In the case of the signal path table in FIG. 40, the signal processing board 6A having a function as an external input apparatus exists. Supposing that no external input apparatus exists in the signal path table, it is not possible to execute a connection process. Accordingly, if it is judged by the judging section 93 that there is no external input apparatus in the signal path table, the warning section 96 executes a process of giving a warning in step S7. Specifically, a message such as "connection is not possible because there is no external input apparatus" is presented.

If it is judged by the judging section 93 that an external input apparatus exists in the signal path table, in step S8, the selecting section 95 executes a process of selecting the external input apparatus. That is, one external input apparatus is selected from among apparatuses described in the processing board table. For example, the signal processing board 6A is selected here.

In step S9, the signal path table creating section 94 places any other signal processing board whose input signal format is a signal format corresponding to the output signal format of the external input apparatus, as the output apparatus for the external input apparatus.

Specifically, the signal processing board 6A selected in step S8 has an output signal format 525*i*(60I), 525*p*(60P), or 1125*i*(60I).

Apparatuses having input signal formats corresponding to any one of these output signal formats are the signal processing board 6B (525*i*(60I), 525*p*(60P)), the signal processing board 6C (525*i*(60I)), and the signal processing board 6D (525*i*(60I), 525*p*(60P)).

Accordingly, as shown in the signal path table in FIG. 41, each of the signal processing boards 6B, 6C, and 6D is described as the output apparatus for the signal processing board 6A. Likewise, the signal processing board 6A is described as the input apparatus for each of the signal processing boards 6B, 6C, and 6D.

Thus, a signal path through which the output of the signal processing board 6A is supplied to the signal processing board 6B, 6C, or 6D is created.

Next, in step S10, the judging section 93 of the control board 6X judges whether or not there is any other external input apparatus in the signal path table. If there is any other external input apparatus, the processing returns to step S8, and a new external input apparatus is selected again. In step S9, a process of creating a signal path table is executed with respect to the selected external input apparatus.

However, in the case of the signal path table in FIG. 40 or FIG. 41, no external input apparatus exists other than the signal processing board 6A. Accordingly, the process proceeds from step S10 to step S11. In step S11, the judging section 93 judges whether or not there is any intermediate apparatus in the signal path table. An intermediate apparatus refers to an apparatus that is neither an external input apparatus nor an external output apparatus. In other words, an intermediate apparatus means an apparatus placed between the external input apparatus and the external output apparatus.

Incidentally, if there is no intermediate apparatus in the signal path table, after all, a processing signal inputted from the external input apparatus is simply outputted to the external output apparatus as it is. Thus, no signal path is created in practice. Accordingly, in this case, in step S9, the warning section 96 displays a message such as "there is no apparatus to connect".

If it is judged in step S11 by the judging section 93 that an intermediate apparatus exists in the signal path table, in step S12, the selecting section 95 executes a process of selecting an intermediate apparatus from the signal path table.

In the case of the example of the signal path table in FIG. 40 or FIG. 41, the signal processing board 6B and the signal processing board 6C are intermediate apparatuses. Accordingly, in step S12, for example, the signal processing board 6B is selected. In step S13, the signal path table creating section 94 places any other signal processing board whose input signal format is a signal format corresponding to the output signal format of the intermediate apparatus, as the output apparatus for the intermediate apparatus.

Thus, as shown in, for example, FIG. 42, the signal processing board 6C and the signal processing board 6D are each described as the output apparatus for the signal processing board 6B, and the signal processing board 6B is described as the input apparatus for each of the signal processing board 6C and the signal processing board 6D.

Next, in step S14, the judging section 93 judges whether or not there is any other intermediate apparatus in the signal path table. In the case of the signal path table in FIG. 40 or FIG. 42, the signal processing board 6C is also an intermediate apparatus. Accordingly, the processing returns to step S12, and the selecting section 95 selects the signal processing board 6C as an intermediate apparatus. Then, in step S13, as shown in FIG. 43, the signal path table creating section 94 describes the signal processing board 6D as the output apparatus for the signal processing board 6C, and describes the signal processing board 6C as the input apparatus for the signal processing board 6D.

In step S14 again, the judging section 93 judges whether or not there is any other intermediate apparatus in the signal path table. In the case of the signal path table in FIG. 40 or FIG. 43, there is no longer any other intermediate apparatus. Accordingly, in step S15, the judging section 93 judges whether or not there is any signal path that has not been established. As shown in the signal path table in FIG. 43, no output apparatus is described for the second path from the top of the signal processing board 6C serving as an intermediate apparatus. Likewise, no output apparatus is described for the fourth path from the top. This means that this path has not been established.

Accordingly, in step S16, the signal path table creating section 94 executes a process of deleting any signal path that has not been established. Specifically, the second and fourth paths from the top of the signal processing board 6C shown in the drawing are deleted. Thus, the signal path table becomes as shown in FIG. 44.

If it is judged in step S15 that there is no signal path that has not been established, the process in step S16 is unnecessary and thus skipped.

Thereafter, in step S17, the judging section 93 judges whether or not there are a plurality of signal paths. If there are a plurality of signal paths, in step S18, a priority level determining process for selecting one signal path from among the plurality of signal paths is executed. Details of this priority level determining process will be described later.

If it is judged in step S17 by the judging section 93 that a plurality of signal paths do not exist, the priority level determining process in step S18 is skipped. Next, in step S19, the display section 98 performs a process of displaying a signal path. Specifically, a signal path created in step S18, or step S9, S13, or S16 is displayed on a monitor or the like and presented to the user.

FIG. 45 to FIG. 49 are explanatory diagrams each showing an example of signal path, and FIG. 50 to FIG. 53 are explanatory diagrams each showing an example of signal path switching operation in a signal processing apparatus.

The signal paths described in the signal path table in FIG. 44 are illustrated as shown in FIG. 45. As shown in FIG. 46 to FIG. 49, the signal paths include four signal paths.

Figure 46:
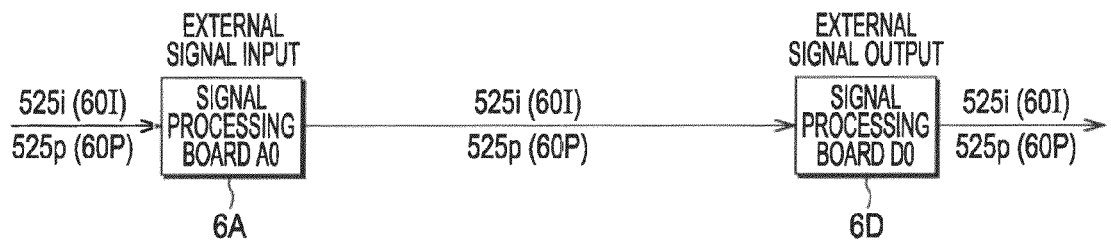
FIG. 46 is an explanatory diagram showing an example of a signal path.

To realize the signal path in FIG. 46, as shown in FIG. 50, the light output section 30 (TX) of the signal processing board 6A is opposed to, for example, the optical waveguide 2(00) in the first layer, and the light input section 40 (RX) of the signal processing board 6D is opposed to the same optical waveguide 2(00) in the first layer.

In the signal path in FIG. 46, the signal processing board 6A serving as an external input apparatus outputs a signal inputted in the input signal format 525i(60I) or 626p(60P) as it is in the same format to the signal processing board 6D serving as an external output apparatus, and the signal processing board 6D outputs the signal as it is in the same output signal format. That is, in this case, an inputted signal is simply passed through, and practically no processing is performed.

Figure 47:
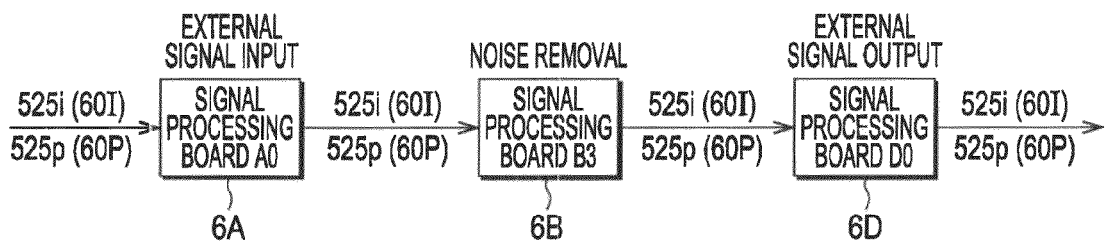
FIG. 47 is an explanatory diagram showing an example of a signal path.

To realize the signal path in FIG. 47, as shown in FIG. 51, the light output section 30 (TX) of the signal processing board 6A is opposed to, for example, the optical waveguide 2(00) in the first layer, and the light input section 40 (RX) of the signal processing board 613 is opposed to the same optical waveguide 2(00) in the first layer. Also, the light output section 30 (TX) of the signal processing board 6B is opposed to, for example, the optical waveguide 2(01) in the second layer, and the light input section 40 (RX) of the signal processing board 6D is opposed to the same optical waveguide 2(01) in the second layer.

In the signal path shown in FIG. 47, the signal processing boards 6A, 6B, and 6D are placed in order. The signal processing board 6A supplies a signal inputted in the input signal format 525i(60I) or 525p(60P), to the signal processing board 6B serving as an intermediate apparatus having a noise removal function. The signal processing board 6B removes noise from the signal inputted in the input signal format 525i(60I) or 525p(60P), and outputs the signal to the signal processing board 6D serving as an external output apparatus, as an output signal in the corresponding output signal format. The signal processing board 6D outputs the signal inputted in the input signal format 525i(60I) or 525p(60P) as it is in that format.

Figure 48:
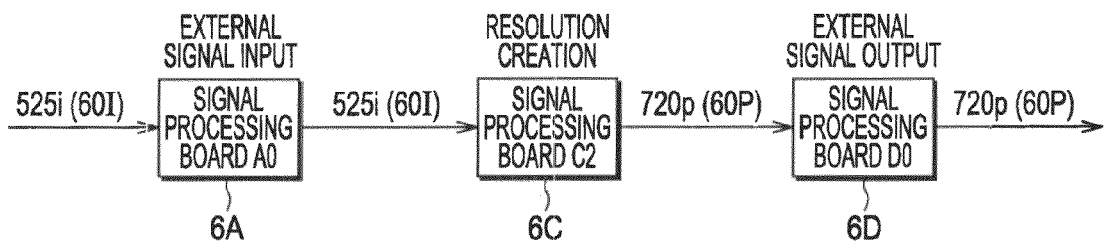
FIG. 48 is an explanatory diagram showing an example of a signal path.

To realize the signal path in FIG. 48, as shown in FIG. 52, the light output section 30 (TX) of the signal processing board 6A is opposed to, for example, the optical waveguide 2(00) in the first layer, and the light input section 40 (RX) of the signal processing board 6C is opposed to the same optical waveguide 2(00) in the first layer. Also, the light output section 30 (TX) of the signal processing board 6C is opposed to, for example, the optical waveguide 2(01) in the second layer, and the light input section 40 (RX) of the signal processing board 6D is opposed to the same optical waveguide 2(01) in the second layer.

In the signal path shown in FIG. 48, the signal processing boards 6A, 6C, and 6D are placed in order. The signal processing board 6A receives an input of a signal in the input signal format 525i(60I), and supplies this as it is in that format to the signal processing board 6C serving as an intermediate apparatus. The signal processing board 6C executes a resolution creation process with respect to the signal inputted in the input signal format 525i(60I), and outputs the signal to the signal processing board 6D serving as an external output apparatus in the output signal format 720p(60P). The signal processing board 6D outputs the signal inputted in the input signal format 720p(60P) to an external apparatus as it is in that format.

Figure 49:
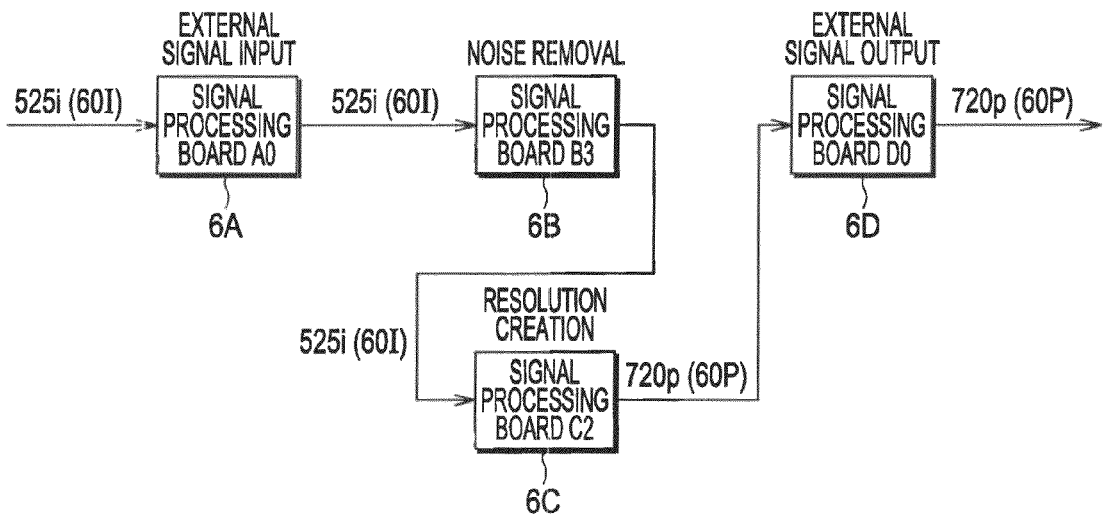
FIG. 49 is an explanatory diagram showing an example of a signal path.

To realize the signal path in FIG. 49, as shown in FIG. 53, the light output section 30 (TX) of the signal processing board 6A is opposed to, for example, the optical waveguide 2(00) in the first layer, and the light input section 40 (RX) of the signal processing board 6B is opposed to the same optical waveguide 2(00) in the first layer. Also, the light output section 30 (TX) of the signal processing board 6B is opposed to, for example, the optical waveguide 2(01) in the second layer, and the light input section 40 (RX) of the signal processing board 6C is opposed to the same optical waveguide 2(01) in the second layer. Further, the light output section 30 (TX) of the signal processing board 6C is opposed to, for example, the optical waveguide 2(02) in the third layer, and the light input section 40 (RX) of the signal processing board 6D is opposed to the same optical waveguide 2(02) in the third layer.

In the signal path shown in FIG. 49, the signal processing boards 6A, 6B, 6C, and 6D are placed in order. The signal processing board 6A serving as an external input apparatus receives an input of a signal in the input signal format 525i(60I), and supplies this as it is in that format to the signal processing board 6B serving as an intermediate apparatus. The signal processing board 69 performs a noise removal process with respect to the signal inputted in the input signal format 525i(60I), and outputs the signal in the same signal format to the signal processing board 6C serving as an intermediate apparatus.

The signal processing board 6C performs a resolution creation process with respect to the signal inputted in the input signal format 525i(60I), and outputs the signal to the signal processing board 6D serving as an external output apparatus in the output signal format 720p(60P). The signal processing board 6D outputs the signal inputted in the input signal format 720p(60P) to an external apparatus as it is in that format.

Figure 54:
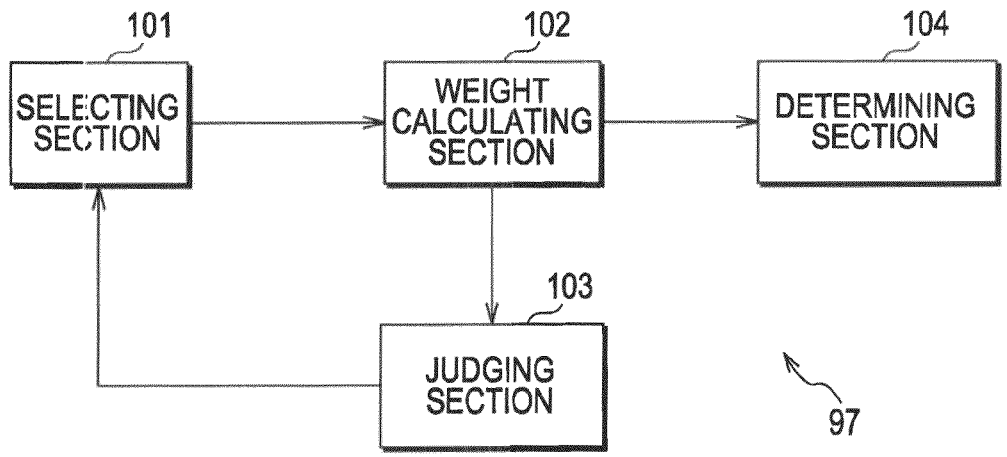
FIG. 54 is a block diagram showing a functional configuration example of a priority level determining section.

In this way, since four signal paths exist, the priority level determining section 97 performs a process of determining one signal path in the priority level determining process in step S18. To this end, the priority level determining section 97 has a functional configuration as shown in FIG. 54.

A selecting section 101 executes a process of selecting one signal path from among a plurality of signal paths. A weight calculating section 102 calculates the weight of the signal path selected by the selecting section 101. A judging section 103 judges whether or not a weight calculation process has been executed with respect to all the signal paths, and if any signal path for which calculation has not been performed exists, causes the selecting section 101 to select another signal path again. A determining section 104 determines priority levels on the basis of weights calculated by the weight calculating section 102.

Figure 55:
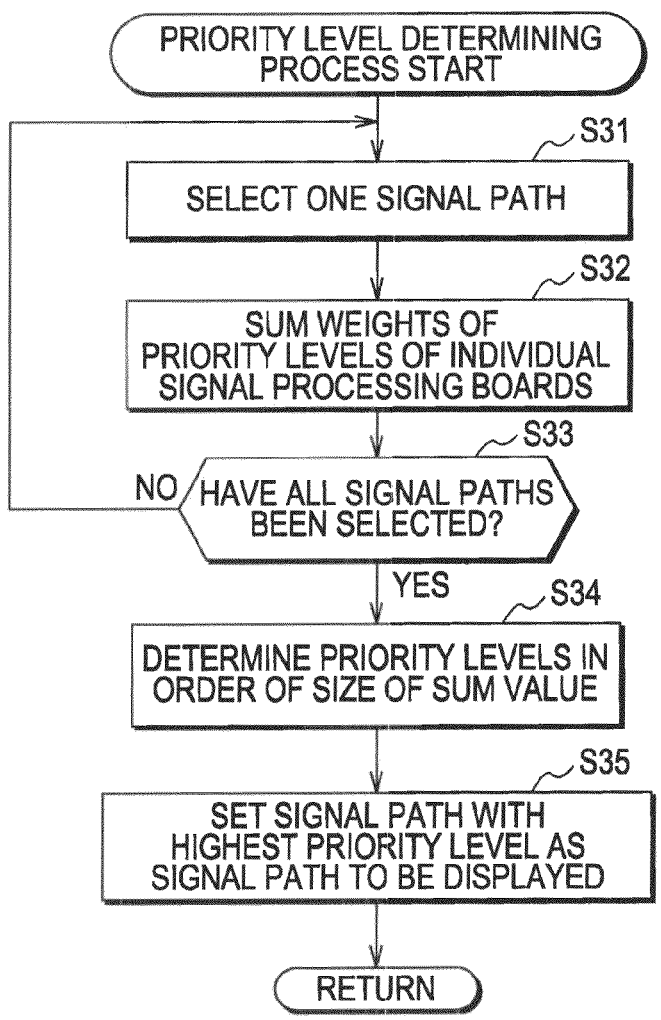
FIG. 55 is a flowchart illustrating a priority level determining process.

Next, referring to the flowchart in FIG. 55, the priority level determining process will be described. In step S31, the selecting section 101 selects one signal path from among a plurality of signal paths. For example, the signal path shown in FIG. 46 is selected here from among the paths shown in FIG. 46 to FIG. 49.

In step S32, the weight calculating section 102 sums the weights of priority levels of individual signal processing boards. Specifically, in the case of this embodiment, weights of 0, 3, 2, and 0 are determined in advance for the signal processing board 6A, the signal processing board 6B, the signal processing board 6C, and the signal processing board 6D, respectively. The weights are also supplied from the individual signal processing boards to the control board 6X, together with signal processing board IDs. The weight calculating section 102 records the weights. In the case of the signal path in FIG. 46, the weights of the signal processing board 6A and signal processing board 6D are both 0, so their sum value is 0.

Next, in step S33, the judging section 103 judges whether or not all the signal paths have been selected. In the present case, since not all the signal paths have been selected yet, in step S31, the selecting section 101 causes the selecting section 101 to select another signal path again. Thus, for example, the signal path in FIG. 47 is selected. In step S32, the weight calculating section 102 calculates the weights of the individual apparatuses in the signal path in FIG. 47. In this case, the weight of the signal processing board 6A is 0, the weight of the signal processing board 6B is 3, and the weight of the signal processing board 6D is 0, so their sum value becomes 3.

Similar processes are sequentially executed thereafter. In the case of the signal path shown in FIG. 48, the weight of the signal processing board 6A is 0, the weight of the signal processing board 6C is 2, and the weight of the signal processing board 6D is 0, so their sum value becomes 2. Also, in the case of the signal path shown in FIG. 49, the weight of the signal processing board 6A is 0, the weight of the signal processing board 62 is 3, the weight of the signal processing board 6C is 2, and the weight of the signal processing board 6D is 0, so their sum value becomes 5.

If it is judged in step S33 that all the signal paths have been selected, in step S34, the determining section 104 determines priority levels in the order of size of the sum value. That is, in the present case, the sum values of weights of the four signal paths shown in FIG. 46 to FIG. 49 are as shown in FIG. 56 when illustrated in order. The sum value of weights of the signal path shown in FIG. 45 in which a resolution creation process is executed after noise removal is the greatest at 5, and the sum value of weights of the signal path shown in FIG. 47 in which noise removal is executed is the next greatest at 3. The sum value in the case of executing a resolution creation process shown in FIG. 48 is the third greatest at 2. The sum value is the smallest for the signal path shown in FIG. 46, and that value is 0.

Therefore, in this case, the priority levels become as shown in FIG. 56. Accordingly, in step S35, the determining section 104 determines a signal path with the highest priority level to be the signal path to be displayed. In the case of the example in FIG. 56, the signal path in which a resolution creation process is executed after noise removal is selected. Therefore, in the process of displaying a signal path in step S19 in FIG. 38B, in the case of this example, the signal path shown in FIG. 49 is displayed.

While in the above-mentioned priority level determining process priority levels are determined by using weights that are set in advance for individual signal processing boards, weights may be determined on the basis of assumed paths that are assumed for individual signal paths. In such a case, the priority level determining section 97 is configured as shown in FIG. 57, for example.

A storage section 111 stores default priority levels in advance. A default level setting section 112 sets the default levels stored in the storage section 111. A judging section 113 judges whether or not there is any signal processing apparatus having assumed signal paths. If there is any signal processing apparatus having assumed signal paths, a selecting section 114 performs a process of selecting the most upstream signal processing apparatus from the assumed signal paths.

A deleting section 115 executes a process of deleting any assumed signal path including a signal processing board that is not actually connected. A correcting section 116 executes a process of correcting the default priority levels set by the default level setting section 112, on the basis of priority levels selected by the selecting section 114. A determining section 117 determines a signal path with the highest priority level.

Figure 58:
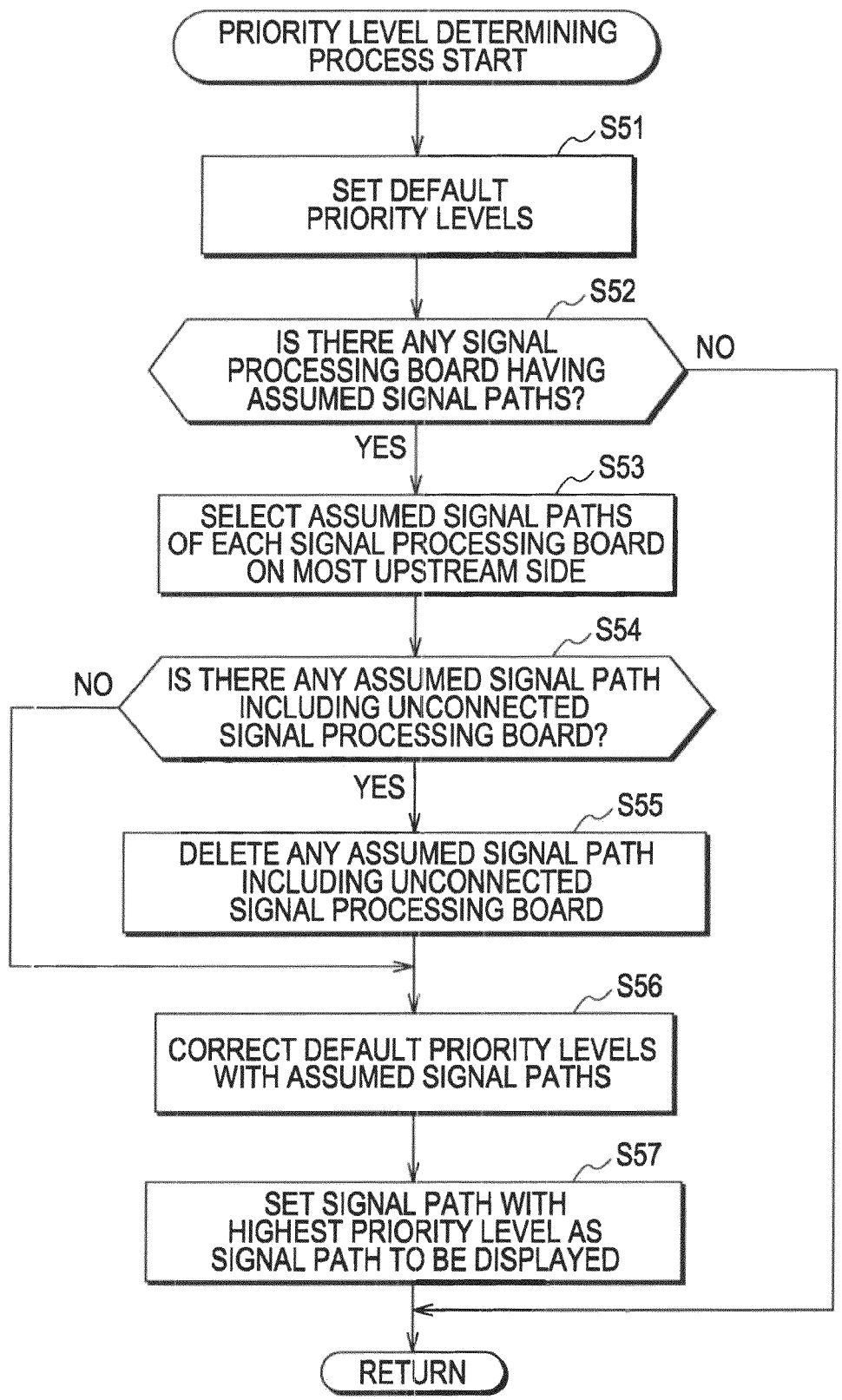
FIG. 58 is a flowchart illustrating a priority level determining process.

Next, referring to the flowchart in FIG. 58, a description will be given of the priority level determining process based on assumed signal paths.

In step S51, a default level setting section 112 sets default priority levels. Specifically, default levels stored in the storage section 111 in advance are set as provisional priority levels here. As the default priority levels, for example, priority levels determined by the process in FIG. 55 described above can be set as well. In such a case, the priority levels shown in FIG. 59 are set as provisional priority levels here.

That is, the first is the signal path that performs a resolution creation process after noise removal, the second is the signal path that performs noise removal, the third is the signal path that executes a resolution creation process, and the fourth is the signal path that performs a pass-through process.

Next, in step S52, the judging section 113 judges whether or not there is any signal processing board having assumed signal paths. That is, in the case of this embodiment, for each signal processing board, the priority levels of assumed signal paths when the signal processing board is used are stored in advance. Then, the signal paths are also supplied to the control board 6X together with a signal processing board ID. For example, if the assumed signal paths as shown in FIG. 60 are appended to the signal processing board 6C, these are supplied to the control board 6X. In the case of the example in FIG. 60, the first is a signal path for external input, temporal resolution creation, resolution creation, and external output, the second signal path is a signal path for external input, resolution creation, and external output, and the third signal path is a signal path for external input, noise removal, resolution creation, and external output.

In step S53, the selecting section 114 selects the assumed signal paths of the most upstream signal processing board. Specifically, in a signal path with the highest priority level among the priority levels provisionally set in the process in step S51, the assumed signal paths of a signal processing board on the most upstream side of its signal flow are selected. Specifically, since the priority levels shown in FIG. 59 are set in step S51, the order of signal processing in the first signal path with the highest priority level is in the order of the signal processing boards 6A, 63, 6C, and 6D.

Therefore, the signal processing board 6A is located most upstream, and the signal processing board 6D is located most downstream. If assumed signal paths are appended to the signal processing board 6B and the signal processing board 6C, the assumed signal paths of the signal processing board 63 on the more upstream side are selected. In the present case, since no assumed signal paths are appended to the signal processing board 63, the assumed signal paths of the signal processing board 6C as shown in FIG. 60 are selected. Thus, it is possible to set more optimum signal paths.

In step S54, the judging section 113 judges whether or not there is any assumed signal path that includes an unconnected signal processing board. That is, it is judged whether or not, among the assumed signal paths selected in the process of step S53, there is any signal processing board that is actually connected, and a function that cannot be executed is included.

That is, it is judged whether or not the process cannot be executed without connecting another signal processing board. If the process cannot be executed without connecting another signal processing board, since it is impossible to execute the assumed signal path, in step S55, the deleting section 115 deletes the assumed signal path including such an unconnected signal processing board. In the case of the example in FIG. 60, the temporal resolution creating process of the first signal path is a function that can be executed by neither of the signal processing boards 6A to 6D. Therefore, no signal processing board for the temporal resolution creating process is connected. Accordingly, this assumed signal path is deleted.

If it is judged in step S54 that no assumed signal path including an unconnected signal processing board exists, since no assumed signal path to be deleted exists, the process of step S55 is skipped.

Next, in step S56, the correcting section 116 executes a process of correcting default priority levels by assumed signal paths. In this case, the priority levels according to the assumed signal paths take precedence over the default priority levels. For this reason, the priority levels shown in FIG. 59 that are set in the process of step S51 are corrected by the assumed signal paths set in step S55, resulting in the priority levels as shown in FIG. 61.

That is, in FIG. 60, resolution creation that comes third in FIG. 59 comes first, and the process of performing resolution creation after noise removal, which comes first in FIG. 59, is given the second priority level. For this reason, the third priority level in FIG. 59 is given the highest priority level, resulting in the priority levels as shown in FIG. 61.

In step S57, the determining section 117 executes a process of determining a signal path with the highest priority level as the signal path to be displayed. Specifically, the determining section 117 determines the first signal path in FIG. 61 for executing a resolution creation process, that is, the signal path in FIG. 48, as the signal path to be displayed.

Therefore, in this case, in step S19 in FIG. 38B, this signal path shown in FIG. 48 is displayed.

It should be noted that if a voice delay control board is connected as a functional board, the signal processing apparatus 5D can be also configured to perform a so-called lip-sync process, in which a delay equivalent to the processing time of an image signal and a delay equivalent to the processing time of a voice signal are synchronized with each other, on the basis of the set signal path.

For example, if the lengths of the image signal processing time of the signal processing board 6A to the signal processing board 6D shown in FIG. 46 to FIG. 49 are set to 0, 1, 2, and 0, respectively, by setting the amount of voice delay to 0 when the signal path shown in FIG. 46 is set, setting the amount of voice delay to 1 when the signal path shown in FIG. 47 is set, setting the amount of voice delay to 2 when the signal path shown in FIG. 48 is set, and setting the amount of voice delay to 3 when the signal path shown in FIG. 49 is set, the respective delay times may be controlled by the voice delay control circuit.

The series of processes described above can be either executed by hardware or executed by software. If the series of processes is to be executed by software, a program constituting the software is installed into a computer embedded in dedicated hardware, or into, for example, a general purpose computer that can execute various functions when installed with various programs, from a network or a recording medium.

Figure 62:
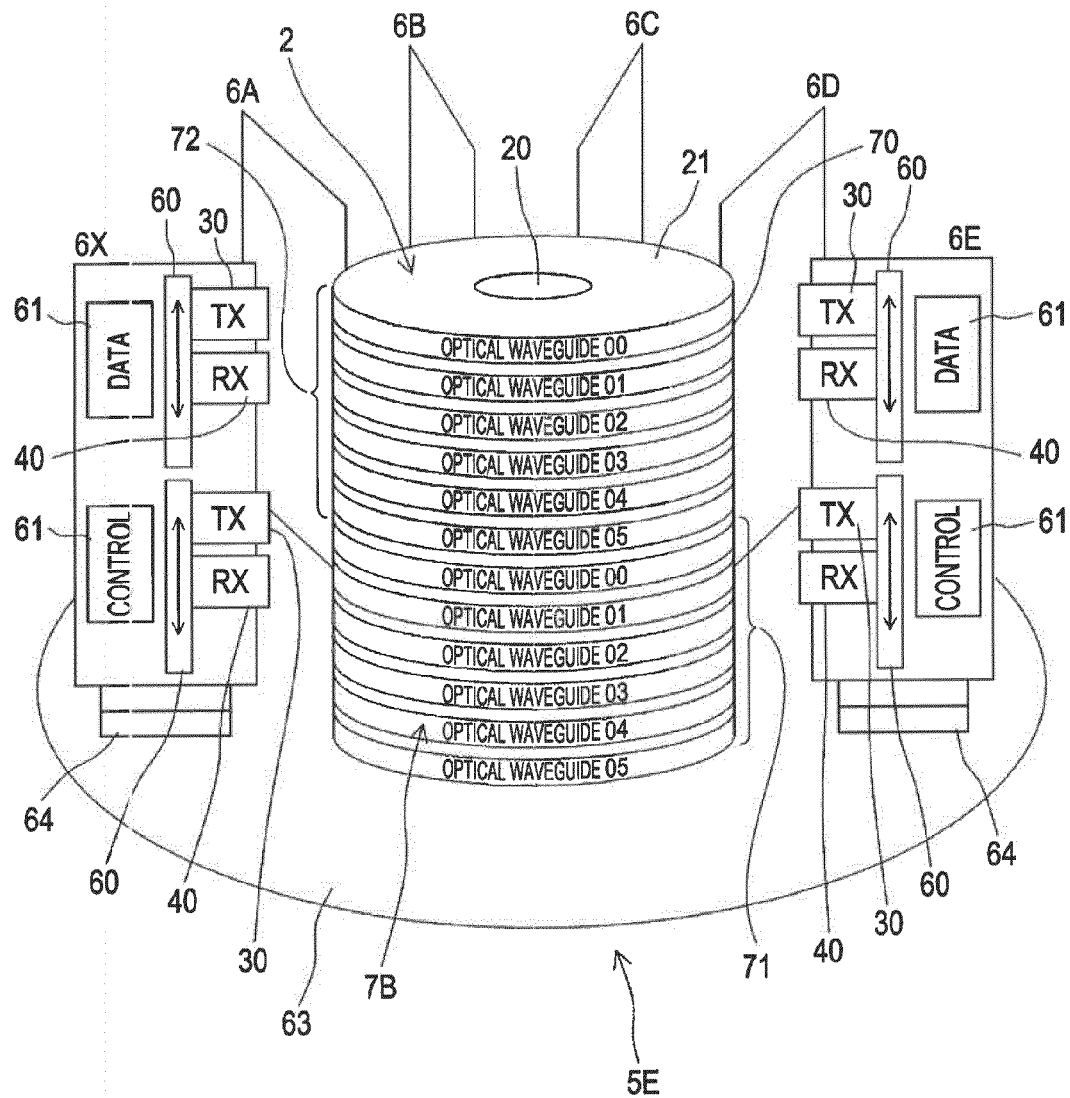
FIG. 62 is a structural view showing a specific example of the signal processing apparatus according to the fourth embodiment.

Another Operation Example of Signal Processing in Signal Processing Apparatus According to Fourth Embodiment FIG. 62 is a structural view showing another specific example of the signal processing apparatus according to the fourth embodiment. Next, a description will be given of another example of signal processing executed in the signal processing apparatus according to the fourth embodiment. Here, in FIG. 62, the signal processing apparatus is shown in a schematic perspective view.

In recent years, due to the increased bandwidth of input images, in image processing systems, there are cases where LSIs (Large Scale Integrations) and modules with relatively narrow bandwidths are placed in parallel to perform processing at the same time. In this case, it is necessary to control a large number of LSIs and modules in a unified manner. At this time, controlling all of controlled apparatuses independently is complicated and tends to become redundant in terms of mechanism. Accordingly, broadcast type control is often used.

If a broadcast type control signal is used, the control apparatus may simply output a common control signal to a plurality of controlled apparatuses, thereby facilitating control.

It should be noted, however, that if a broadcast type control signal is used, there is a problem in that it becomes difficult to find a failed controlled apparatus, with the result that it becomes difficult to ensure reliability of operation.

Accordingly, a description will be given of a control with which, in the signal processing apparatus according to the fourth embodiment described above, a plurality of apparatuses are controlled by using a broadcast type control signal, and also reliability of operation can be ensured.

A signal processing apparatus 5E includes, as functional boards, the control board 6X, and a plurality of signal processing boards 6(A to E) having predetermined functions. The individual functional boards are connected via an arbitrary signal path by the optical waveguide structure 7B. In this example, there are provided an image quality detecting section as the signal processing board 6A, a Y/C separation section as the signal processing board 6B, an I/P conversion section as the signal processing board 6C, a resolution conversion section as the signal processing board 6D, and an image quality adjusting section as the signal processing board 6E.

In the optical waveguide structure 7B, any one of the optical waveguides 2(A to E) described with reference to FIG. 1A to FIG. 15C is laminated in layers via the spacer 70, and there are provided the control signal transmission layer 71 in which control signals are transmitted between the control board 6X and the individual signal processing boards 6(A to E), and between the individual signal processing boards 6(A to E), and the data transmission layer 72 in which data is transmitted between the individual signal processing boards 6 (A to E).

In the optical waveguide 2 in each layer, as described above, light incident from an arbitrary position on the outer circumference of the optical waveguide 2 is emitted in the entire circumferential direction of the optical waveguide 2, by refraction due to the difference in refractive index between the first light guide section 20 and the second light guide section 21, irregular reflection by the irregular reflector 24 provided in the first light guide section 20, and the like. Then, no light leaks in the laminating direction of the optical waveguides 2, and a signal is independently transmitted in each of the optical waveguides 2.

The control board 6X and the signal processing boards 6(A to E) each include a single or plurality of light output sections 30 from which an optical signal is outputted, and a single or plurality of light input sections 40 to which an optical signal is inputted. Also, the control board 6X and the signal processing boards 6(A to E) each include the signal processing section 61 that performs processing on a signal outputted from the light output section 30 and a signal inputted from the light input section 40. A processing section for control signals and a processing section for data may be individually provided in the signal processing section 61.

The light output section 30 includes a configuration for outputting light at a single wavelength, or a configuration for outputting light at two or more different wavelengths, depending on the signal transmission mode or the like. In the case of the configuration for outputting light at a single wavelength, the light output section 30 includes an LD on the outer circumference of the optical waveguide structure 7A, with the light output direction directed toward the first light guide section 20 of the optical waveguide 2.

In the case of the configuration for outputting light at different wavelengths, for example, there are provided the light output section 30A described with reference to FIG. 19, the light output section 30B described with reference to FIG. 23 and the like, or the light output section 30C described with reference to FIG. 25 and the like.

The light input section 40 includes a configuration capable of receiving light of a single wavelength outputted from the light output section 30, or a configuration capable of receiving light of each of two or more different wavelengths, depending on the configuration of the light output section 30 and the signal transmission mode.

In the case of the configuration capable of receiving light of a single wavelength, the light input section 40 includes a photodetector on the outer circumference of the optical waveguide structure 7A, with the light receiving section directed toward the first light guide section 20 of the optical waveguide 2.

In the case of the configuration capable of receiving light of different wavelengths, for example, there are provided the light input section 40A described with reference to FIG. 19, the light input section 40B described with reference to FIG. 23 and the like, or the light input section 40C described with reference to FIG. 25 and the like.

The light output section 30 and the light input section 40 are each provided with the moving mechanism 60, and moves along the laminating direction of the optical waveguides 2 so as to be placed at a position allowing incidence or emission of light with respect to an arbitrary optical waveguide 2, thereby switching signal paths between the control board 6X and the signal processing boards 6(A to E).

In the signal processing apparatus 5E, the control board 6X and the signal processing boards 6(A to E) are mounted to the base substrate 63. The base substrate 63 is an example of a mounting substrate, and includes a power supply and a cooling fan that are not illustrated, and the sockets 64 to which the control board 6X and the signal processing boards 6(A to E) are detachably mounted. Power is supplied to the control board 6X and the signal processing boards 6(A to E).

The sockets 64 are installed at a plurality of locations along the outer circumference of the optical waveguide structure 7B. When the control board 6X or each of the signal processing boards 6(A to E) is mounted to an arbitrary socket 64, the light output section 30 and the light input section 40 are moved by the moving mechanism 60 so as to be opposed to a desired optical waveguide 2, thereby enabling incidence/emission of light.

In the optical waveguide 2 in each layer constituting the optical waveguide structure 7B, light made incident from an arbitrary position on the outer circumference is emitted in the entire circumferential direction of the optical waveguide 2. Thus, incidence/emission of light with respect to the optical waveguide 2 is possible whichever socket 64 the control board 6X or each of the signal processing boards 6(A to E) is fitted into.

Thus, in the signal processing apparatus 5E, changing of functions or addition of functions is possible by changing or adding the signal processing boards 6 mounted to the base substrate 63.

Figure 63:
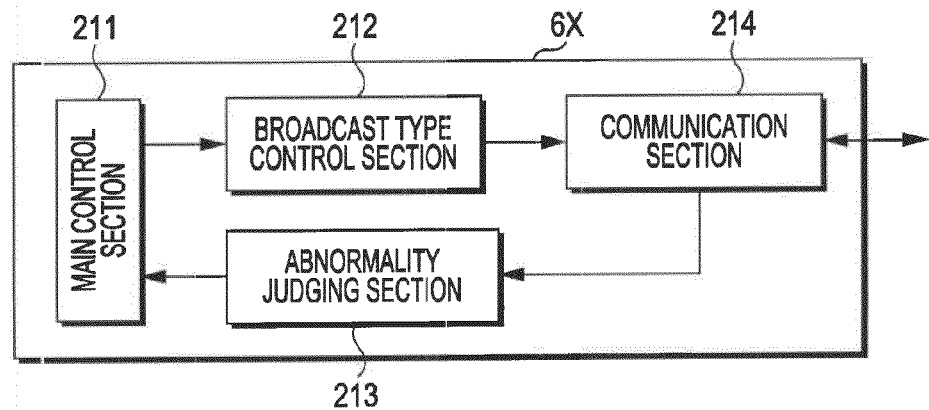
FIG. 63 is a block diagram showing a functional configuration example of a control board.

FIG. 63 is a block diagram showing a functional configuration example of the control board 6X described with reference to FIG. 62. The control board 6X includes a main control section 211, a broadcast type control section 212, an abnormality judging section 213, and a communication section 214.

The main control section 211 performs basic power supply control, initialization of the broadcast control section 212, and system maintenance and management such as resetting in the event of an abnormality. The broadcast type control section 212 has a state machine for each of the signal processing boards 6(A to E) shown in FIG. 62, and outputs a broadcast type control signal to each of the signal processing boards 6(A to E) to control its operation, in accordance with an instruction from the main control section 211 based on a user's operation.

The abnormality judging section 213 receives error signals from the signal processing boards 6(A to E), judges which one of them has failed, and notifies the main control section 11 of the judgment result.

The communication section 214 includes the light output section 30, the light input section 40, and the like shown in FIG. 62, and communicates with each of the signal processing boards 6(A to E) via a selected optical waveguide 2 of the optical waveguide structure 7B.

Figures 64, 65:
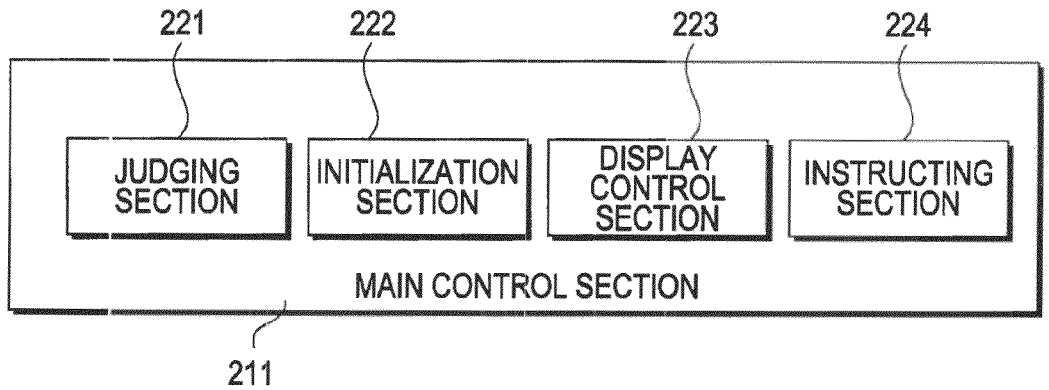
FIG. 64 is a block diagram showing a functional configuration example of a main control section.
FIG. 65 is an explanatory diagram showing an example of a signal path switching operation in a control process in which a control board performs failure detection of each signal processing board.

FIG. 64 is a block diagram showing a functional configuration example of the main control section 211 described with reference to FIG. 63. The main control section 211 has such functional components as a judging section 221, an initialization section 222, a display control section 223, and an instructing section 224.

The judging section 221 performs various determination processes, such as whether or not a notification of an abnormality has been received from the abnormality judging section 213, or whether or not termination has been commanded. The initialization section 222 executes a process of initializing the broadcast type control section 212. The display control section 223 performs a control of causing a predetermined message to be displayed to the user. The instructing section 224 outputs various instructions to the individual sections of the signal processing boards 6 (A to E) via the broadcast type control section 212.

Next, the functions of the individual signal processing boards 6 (A to E) will be described. The signal processing board 6A (hereinafter, also referred to as image quality detecting section) detects the field intensity of a signal inputted from the external, or detects whether or not an inputted video signal is in a 2-3 pull-down format.

The signal processing board 6B (hereinafter, also referred to as Y/C separation section) separates a video signal supplied from the image quality detecting section 6A into a luminance signal Y and a chrominance signal C. At this time, a process of converting a 4:2:2 YUV signal into a 4:4:4 signal is also performed. The Y/C separation section 6B may be configured in any manner as long as it has a function of separating a luminance signal and a chrominance signal from each other.

The signal processing board 6C (hereinafter, also referred to as I/P converting section) converts a video signal supplied from the Y/C separation section 6B from a signal in an interlaced mode into a signal in a progressive mode. The configuration of the I/P converting section 6C is also arbitrary.

The signal processing board 6D (hereinafter, also referred to as resolution converting section) converts the resolution of a video signal supplied from the I/P converting section 6C. For example, a process of converting an inputted SD (Standard Definition) signal into an HD (High Definition) signal is performed. The configuration of the resolution converting section 6D is also arbitrary.

The signal processing board 6E (hereinafter, also referred to as image quality adjusting section) adjusts the image quality of a video signal supplied from the resolution converting section 6D. Specifically, the level of the video signal is adjusted so that the signal becomes suitable for a display apparatus such as an LCD (Liquid Crystal Display), a CRT (Cathode Ray Tube), or a plasma display.

FIG. 65 is an explanatory diagram showing an example of a signal path switching operation in a control process in which the control board 6X performs failure detection of each of the signal processing boards 6(A to E), showing a signal path on the control signal transmission layer 71 side of the optical waveguide structure 7B shown in FIG. 62.

In the signal processing apparatus 5E, to output a broadcast type control signal from the control board 6X to each of the signal processing boards 6(A to E), the light output section 30 (TX) of the control board 6X is opposed to the optical waveguide 2(00) in the first layer on the control signal transmission layer side, and the first light input section 40 ($RX_1$) of the image quality detecting section 6A is opposed to the optical waveguide 2(00) in the first layer.

Likewise, the first light input section 40 ($RX_1$) of the Y/C separation section 6B, the first light input section 40 ($RX_1$) of the I/P conversion section 6C, the first light input section 40 ($RX_1$) of the resolution conversion section 6D, and the light input section 40 ($RX_1$) of the image quality adjusting section 6E are each opposed to the optical waveguide 2(00) in the first layer.

Since each of the signal processing boards 6(A to E) outputs a synchronous type control signal to a signal processing board in the subsequent stage, and outputs an error signal to the control board 6X, the light output section 30 (TX) is configured to be capable of outputting two lines of signals by wavelength multiplexing, for example.

Then, to output an error signal from each of the signal processing boards 6(A to E) to the control board 6X, the light output section 30 (TX) of the image quality detecting section 6A is opposed to the optical waveguide (01) in the second layer, and the second light input section 40 (RX) of the control board 6X is opposed to the optical waveguide (01) in the second layer. Likewise, the light output section 30 (TX) of the Y/C separation section 6B is opposed to the optical waveguide (02) in the third layer, and the second light input section 40 (RX) of the control board 6X is opposed to the optical waveguide (02) in the third layer.

Also, the light output section 30 (TX) of the I/P conversion section 6C is opposed to the optical waveguide (03) in the fourth layer, and the fourth light input section 40 (RX) of the control board 6X is opposed to the optical waveguide (03) in the fourth layer. Further, the light output section 30 (TX) of the resolution conversion section 6D is opposed to the optical waveguide (04) in the fifth layer, and the fifth light input section 40 (RX) of the control board 6X is opposed to the optical waveguide (04) in the fifth layer. Also, the light output section 30 (TX) of the image quality adjusting section 6E is opposed to the optical waveguide (05) in the sixth layer, and the sixth light input section 40 (RX) of the control board 6X is opposed to the optical waveguide (05) in the sixth layer.

On the other hand, to receive a synchronous type control signal by each of the signal processing boards 6 (B to E) from a signal processing board in the previous stage, the second light output section 40 (RX) of the Y/C separation section 6B in the subsequent stage is opposed to the optical waveguide 2(01) in the second layer in accordance with the light output section 30 (TX) of the image quality detecting section 6A in the previous stage.

Likewise, the second light output section 40 (RX) of the I/P conversion section 6C in the subsequent stage is opposed to the optical waveguide 2(02) in the third layer in accordance with the light output section 30 (TX) of the Y/C separation section 6B in the previous stage. Also, the second light output section 40 (RX) of the resolution conversion section 6D in the subsequent stage is opposed to the optical waveguide 2(03) in the fourth layer in accordance with the light output section 30 (TX) of the I/P conversion section 6C in the previous stage. Further, the second light output section 40 (RX) of the image quality adjusting section 6E in the subsequent stage is opposed to the optical waveguide 2(04) in the fifth layer in accordance with the light output section 30 (TX) of the resolution conversion section 6D in the previous stage.

Here, transmission of an error signal from each of the signal processing boards 6(A to E) to the control board 6X is performed by, for example, red light, and transmission of a synchronous type control signal from each of the signal processing boards 6(A to E) to the signal processing board in the subsequent stage is performed by, for example, green light. It is thus possible for each of the signal processing boards 6(A to E) to transmit a synchronous type control signal and an error signal by a single layer of the optical waveguide 2.

Figure 66:
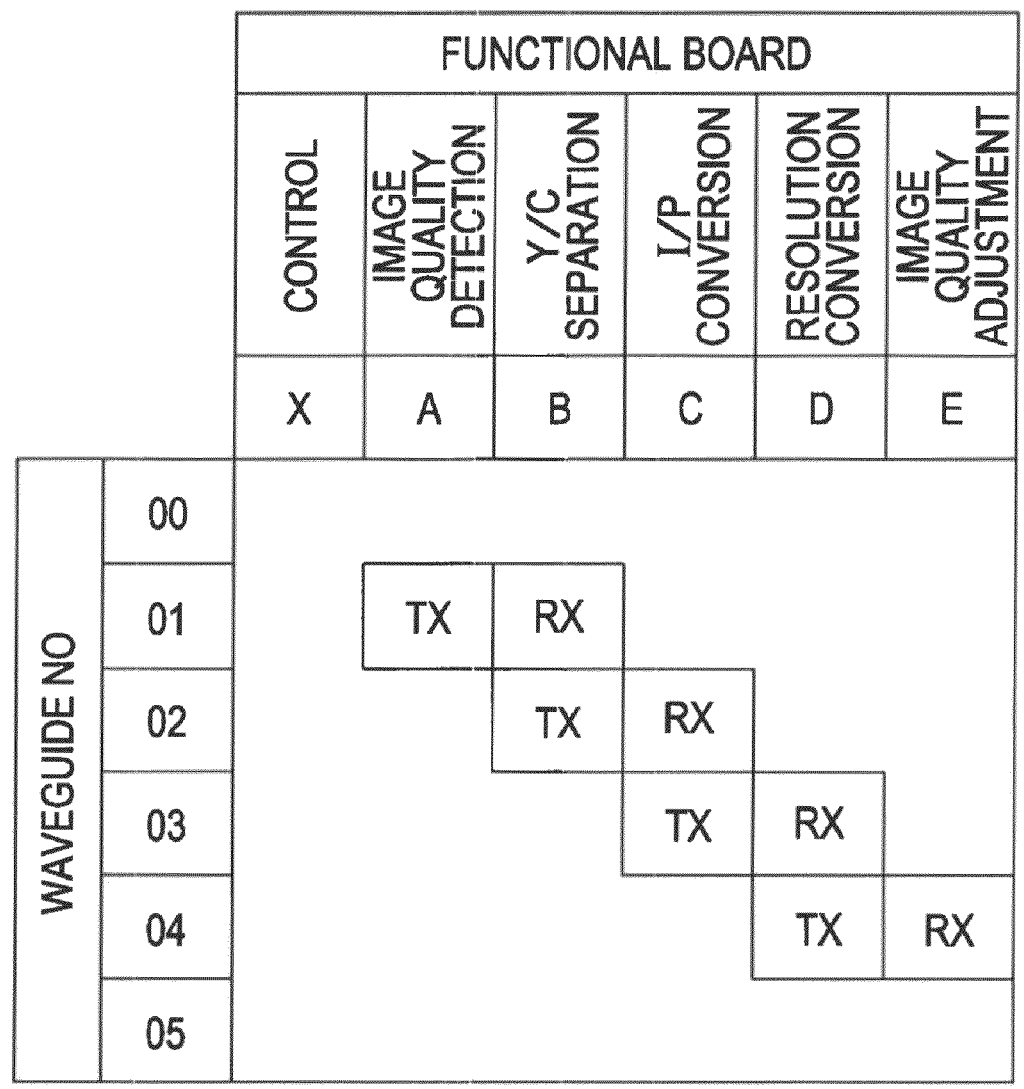
FIG. 66 is an explanatory diagram showing an example of a signal path switching operation in a control process in which data is transmitted between individual signal processing boards.

FIG. 66 is an explanatory diagram showing an example of a signal path switching operation in a control process in which data is transmitted between the individual signal processing boards 6(A to E), showing a signal path on the data transmission layer 72 side of the optical waveguide structure 7B shown in FIG. 62.

Normally, to transmit data whose processing has been finished in the signal processing board in the previous stage to the signal processing board in the subsequent stage, the light output section 30 (TX) of the image quality detecting section 6A is opposed to the optical waveguide 2(01) in the second layer on the data transmission layer side, and the light input section 40 (RX) of the Y/C separation section 6B is opposed to the optical waveguide 2(01) in the second layer.

Likewise, the light output section 30 (TX) of the Y/C separation section 6B is opposed to the optical waveguide 2(02) in the third layer, and the light input section 40 (RX) of the I/P conversion section 6C is opposed to the optical waveguide 2(02) in the third layer.

Also, the light output section 30 (TX) of the I/P conversion section 6C is opposed to the optical waveguide 2(03) in the fourth layer, and the light input section 40 (RX) of the resolution conversion section 6D is opposed to the optical waveguide 2(03) in the fourth layer.

Further, the light output section 30 (TX) of the resolution conversion section 6D is opposed to the optical waveguide 2(04) in the fifth layer, and the light input section 40 of the image quality adjusting section 6E is opposed to the optical waveguide 2(04) in the fifth layer.

Figure 67:
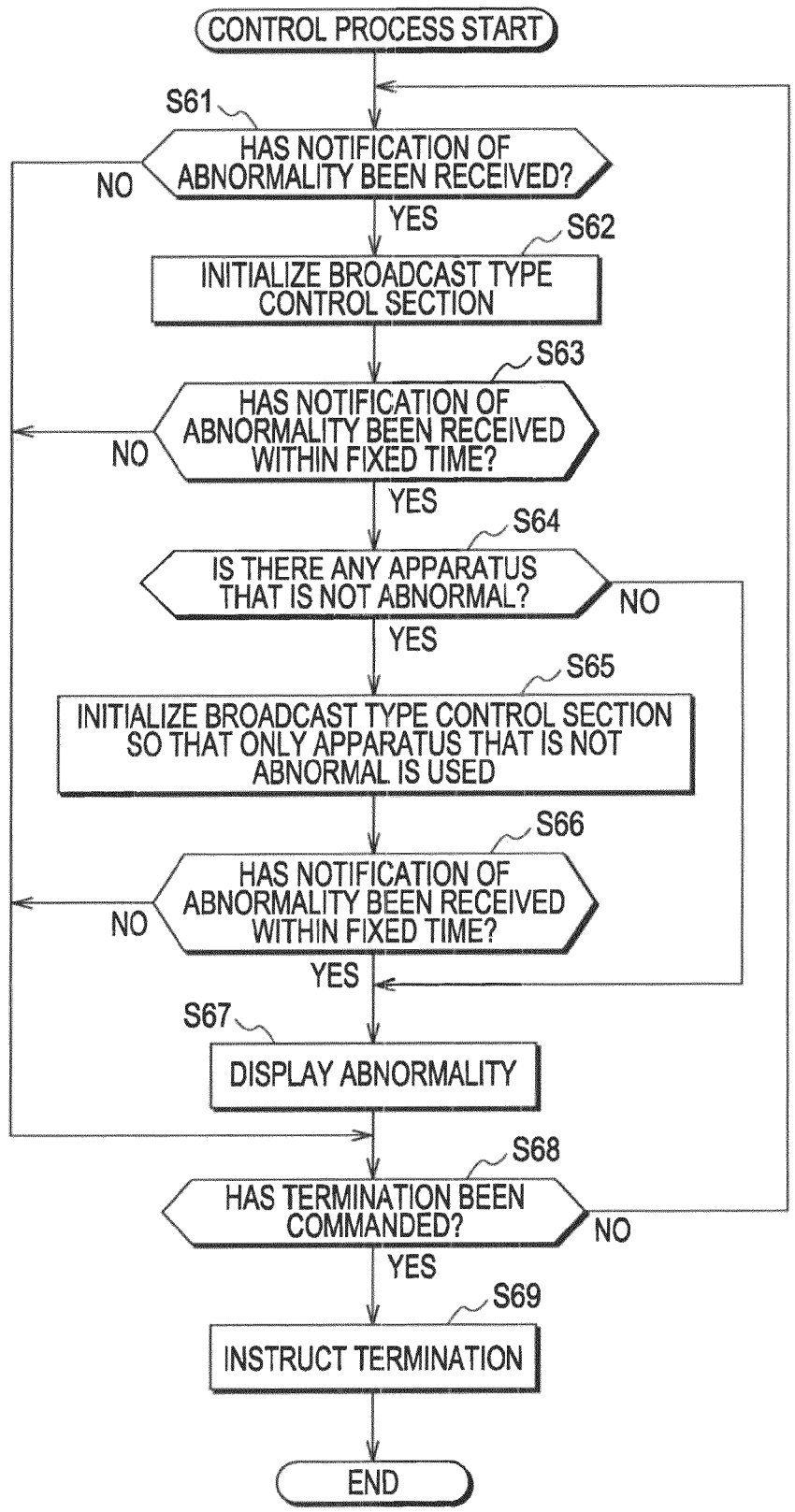
FIG. 67 is a flowchart illustrating a control process.

FIG. 67 is a flowchart illustrating a control process. Next, a description will be given of a process of detecting a failure of a functional board connected by an optical waveguide (optical waveguide structure 7B).

In step S61, the judging section 221 of the control board 6X judges whether or not a notification of an abnormality has been received from each of the signal processing boards 6(A to E). If a notification of an abnormality has not been received from each of the signal processing boards 6(A to E), in step S62, the initialization section 222 executes a process of initializing the broadcast type control section 212.

For example, the initialization section 222 initializes each section such that each of the signal processing boards 6(A to E) generates an HD signal in a progressive mode from an inputted SD signal in an interlaced mode. To this end, the initialization section 222 controls the broadcast type control section 212 to output a broadcast type control signal for converting an SD signal in an interlaced mode into an HD signal in a progressive mode, to the individual signal processing boards 6(A to E), that is, the image quality detecting section, the Y/C separation section, the I/P conversion section, the resolution conversion section, and the image quality adjusting section, via the signal path shown in FIG. 65. The individual signal processing boards 6(A to E) perform their respective processing on the basis of this control signal. Details of this processing will be described later with reference to the flowchart in FIG. 70.

The individual signal processing boards 6(A to E) are cascaded as shown in FIG. 66. A signal inputted from the previous stage is processed and outputted to the subsequent stage. At this time, a synchronous type control signal is also outputted from the previous stage to the subsequent stage together with a processed signal via the signal path shown in FIG. 65. When a synchronous type control signal is not received from the previous stage within a fixed time after a broadcast type control signal is received, each of the signal processing boards 6(A to E) outputs an error signal to the abnormality judging section 213 (the process in step S77 in FIG. 70 described later).

Upon receiving an error signal from each of the signal processing boards 6(A to E), the abnormality judging section 213 judges which one has failed, and notifies the main control section 211 of the judgment result (the process in step S96 in FIG. 72 described later).

Accordingly, in step S63, after executing an initialization process (after outputting a broadcast type control signal), the judging section 221 judges whether or not a notification of an abnormity has been received within a fixed time that is set in advance. The fixed time is set to a time slightly longer than the time required until a signal processed by the image quality detecting section 6A is sequentially outputted to the subsequent stages, processed by the image quality adjusting section 6E, and outputted, when all of the signal processing boards 6(A to E) are operating normally. Therefore, if a notification of an abnormality is not received within this fixed time, each of the signal processing boards 6(A to E) is judged to be operating normally.

If it is judged in step S63 that a notification of an abnormality has been received within a fixed time, in step S64, the judging section 221 judges whether or not there is any apparatus that is not abnormal. If any apparatus that is not abnormal exists, in step S65, the initialization section 222 initializes the broadcast type control section 212 so as to use only the apparatus that is not abnormal. On the basis of this initialization, the broadcast type control section 212 outputs a new broadcast type control signal to each of the signal processing boards 6(A to E).

Figure 68A:
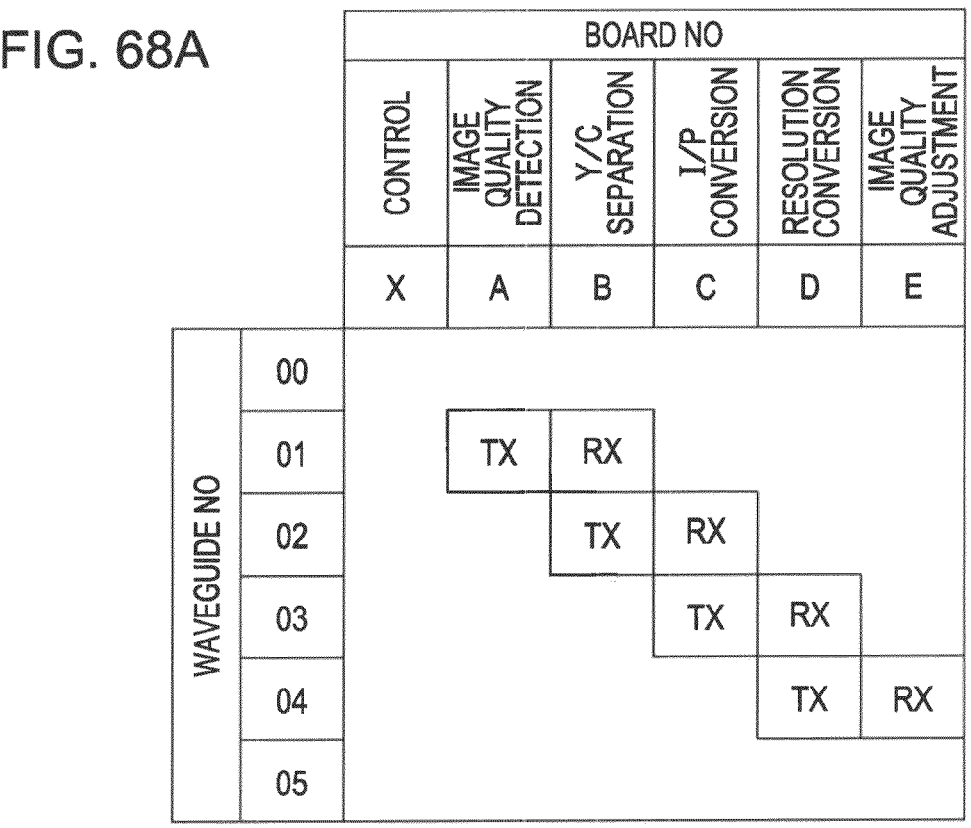
FIG. 68A is an explanatory diagram showing an example of a signal path switching operation at the time of abnormality detection.
Figure 68B:
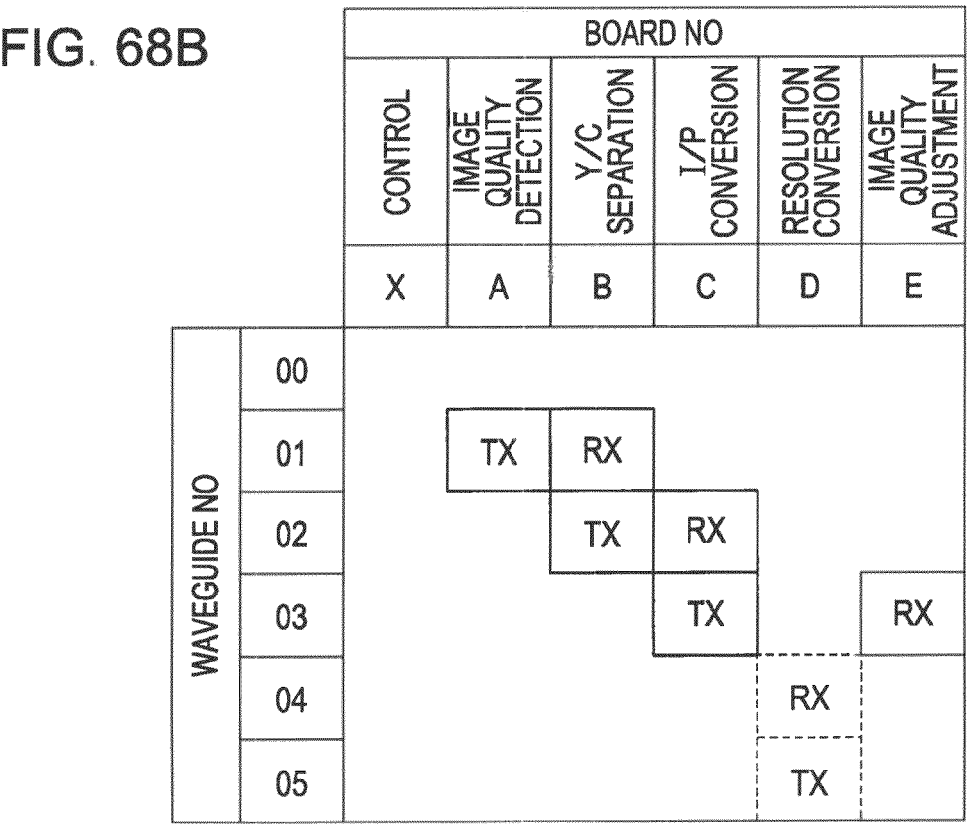
FIG. 68B is an explanatory diagram showing an example of a signal path switching operation at the time of abnormality detection.

FIG. 68A to FIG. 68B are explanatory diagrams each showing an example of a signal path switching operation at the time of abnormality detection, showing a signal path on the data transmission layer 72 side of the optical waveguide structure 7B shown in FIG. 62.

For example, the initialization section 222 first causes each of the Y/C separation section 6B, the I/P conversion section 6C, and the resolution conversion section 6D to operate as shown in FIG. 68A, and instructs each of the sections to convert an inputted SD signal in an interlaced mode into an HD signal in a progressive mode. However, when the resolution conversion section 6D has failed and become unable to perform a resolution conversion process, initialization is performed by outputting a broadcast type control signal to each of the signal processing boards so that an SD signal in an interfaced format is converted into an SD signal in a progressive mode and outputted. By receiving the broadcast type control signal, the image quality adjusting section 6E recognizes that the resolution conversion section 6D in the previous stage has failed and become unable to perform a resolution conversion process, recognizes that the input format will change, and performs control so that processing is performed in accordance with the input format. Here, it is recognized that a signal to be inputted will change from an HD signal to an SD signal.

In this case, a broadcast type control signal for switching signal paths so as to receive data from the I/P conversion section 6C is outputted to the image quality adjusting section 6E. Upon receiving this broadcast type control signal, the image quality adjusting section 6E causes the light input section 40 (RX) to move as shown in FIG. 68B so as to be opposed to the optical waveguide 2 in the same layer as the light output section 30 (TX) of the I/P conversion section 6C.

Thus, a switchover is made to a signal path that skips through the failed resolution conversion section 6D, and an image quality adjusting process is performed in accordance with the format in which an input is given to the image quality adjusting section 6E in the subsequent stage of the failed resolution conversion section 6D. Thus, at least a situation where the user is unable to view an image is prevented.

Thereafter, in step S66, the judging section 221 judges whether or not a notification of an abnormality has been received within a fixed time that is set in advance, after the initialization process in step S65. If a notification of an abnormality has been received, a normal operation can no longer be guaranteed, so the display control section 223 executes a process of displaying an abnormality in step S67. Specifically, for example, control is performed so as to present a message such as "An abnormality has occurred" to the user. The user looks at this message, and takes measures such as repairing the failure if necessary.

In step S68, the judging section 221 judges whether or not termination has been commanded by the user. If termination has not been commanded, the processing returns to step S61, and the subsequent processing is repeatedly executed.

If it is judged in step S61 that a notification of an abnormality has not been received, as well as if it is judged in step S63 or step S66 that a notification of an abnormality has not been received within a fixed time, the processing proceeds to step S68, and it is judged whether or not termination has been commanded. If termination has not been commanded, the processing returns to step S61, and the subsequent processing is repeatedly executed.

If it is judged in step S68 that termination has been commanded by the user, in step S69, the instructing section 224 controls the broadcast type control section 212 to output a broadcast type control signal for instructing termination to each of the signal processing boards 6(A to E). Each of the signal processing boards 6(A to E) terminates processing on the basis of this control signal.

Next, individual processing in the signal processing boards 6(A to E) will be described. Since the basic flow is the same in any case, here, a description will be given of the Y/C separation section 6B as an example.

Figure 69:
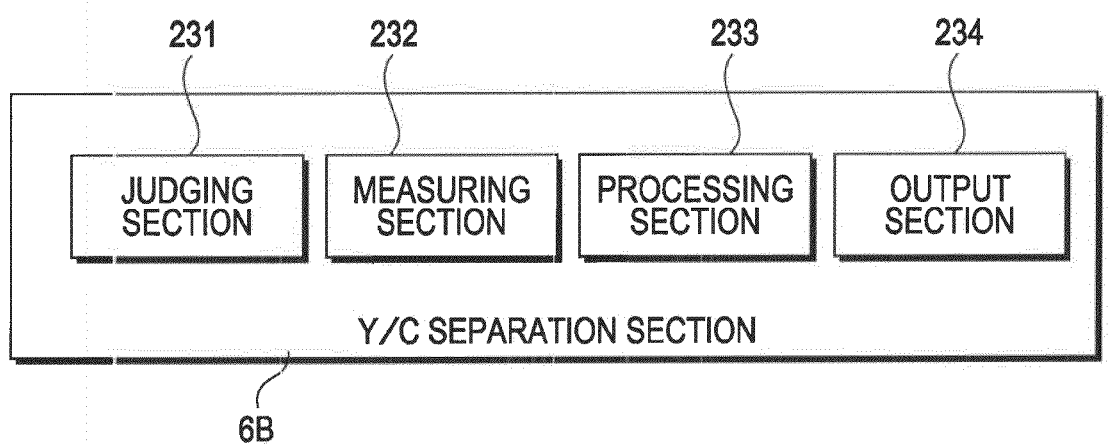
FIG. 69 is a block diagram showing a functional configuration example of a Y/C separation section.

FIG. 69 is a block diagram showing a functional configuration example of the Y/C separation section 6B. The Y/C separation section 6B includes a judging section 231, a measuring section 232, a processing section 233, and an output section 234. Although not shown, the image quality detecting section 6A, the I/P conversion section 6C, the resolution conversion section 6D, and the image quality adjusting section 6E are configured in the same manner.

The judging section 231 performs such determination processes as whether or not a control signal has been received, whether or not the received broadcast type control signal matches a synchronous type control signal, whether or not processing has been finished, whether or not itself is the last apparatus, and whether or not termination has been commanded.

The measuring section 232 performs a timing operation to measure the time from reception of a broadcast type control signal to reception of a synchronous type control signal. The processing section 233 performs processing unique to each board. In the case of this example, since it is a processing section in the Y/C separation section 6B, the processing section 233 performs a process of separating a luminance signal and a chrominance signal from each other. The output section 234 outputs a processed signal processed by the processing section 233 to the subsequent stage (in this case, the I/P converting section 6C), together with a synchronous type control signal having substantially the same content as the received broadcast type control signal.

Figure 70:
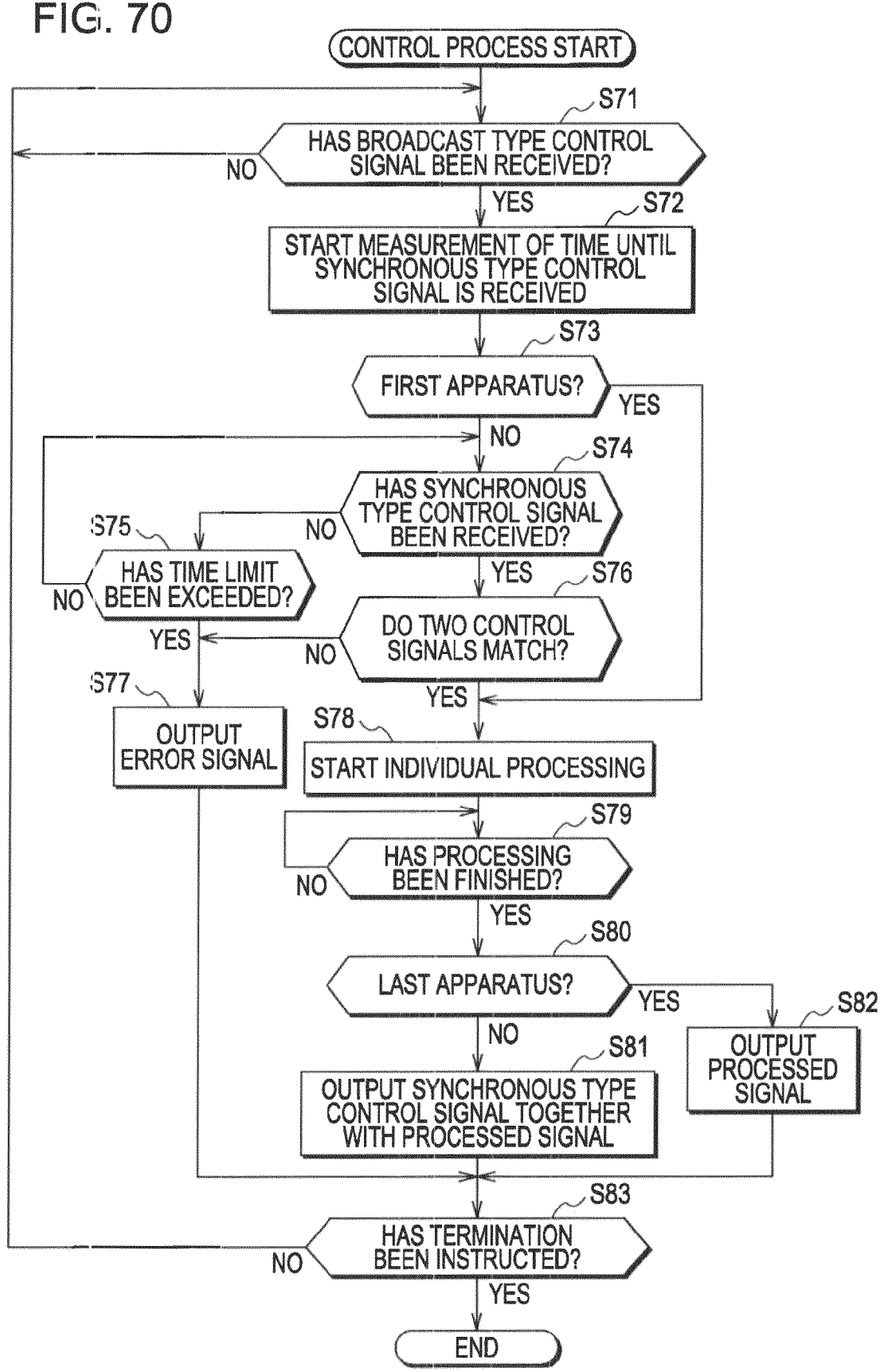
FIG. 70 is a flowchart showing individual processing in a Y/C separation section.

FIG. 70 is a flowchart showing individual processing in a Y/C separation section. Next, individual processing in the Y/C separation section 6B will be described. In step S71, the judging section 231 judges whether or not a broadcast type control signal has been received. This broadcast type control signal is the one outputted in the process of step S62 or step S65 in FIG. 67 described above. If a broadcast type control signal has not been received, the process of step S71 is repeatedly executed until its reception.

If it is judged in step S71 that a broadcast type control signal has been received, in step S72, the measuring section 232 starts measurement of the time until a synchronous type control signal is received. That is, since the image quality detecting section 6A is placed in the previous stage of the Y/C separation section 6B, when the image quality detecting section 6A finishes processing, a synchronous type control signal is outputted to the Y/C separation section 6B together with a processed signal (the process of step S81 by the image quality detecting section 6A described later). The measuring section 232 measures the time taken until this synchronous type control signal is received.

In step S73, the judging section 231 judges whether or not itself (in this case, the Y/C separation section 6B) is the first apparatus among the signal processing boards 6(A to E). Each of the boards stores in advance whether or not itself is the first apparatus, or whether or not itself is the last apparatus as in step S80 described later. Alternatively, the time required until a control signal and a processed signal are inputted from the previous stage after reception of a broadcast control signal may be stored for each of the boards in such a form as seconds, or the number of fields or the number of frames of a video signal, so that each of the boards judges its own ordinal position by itself from the time.

If itself is not the first apparatus, in step S74, the judging section 231 judges whether or not a synchronous type control signal has been received. If itself is not the first apparatus, a synchronous type control signal is supplied from the apparatus in the previous stage together with a processes signal (step S81 described later). Thus, if a synchronous type control signal is not received, in step S75, the measuring section 232 judges whether or not the time since measurement is started in step S72 has exceeded a time limit that is set in advance. This time lime may be a time that is common among each section, or may be a time corresponding to the order of each section in the cascade connection.

If the elapsed time has not exceeded the time limit yet, the processing returns to step S74, and the processes in steps S74 and 75 is repeatedly executed until a synchronous type control signal is received. If it is judged that a synchronous type control signal has been received from the previous stage within the time limit, in step S76, the judging section 231 judges whether or not the two control signals match. That is, in step S81 described later, each section outputs a control signal of substantially the same content as the broadcast type control signal received from the broadcast type control section 212, to the subsequent stage as a synchronous type control signal. Therefore, a broadcast type control signal and a synchronous type control signal are substantially matching signals. If the two control signals match, in step S78, the processing section 233 starts individual processing. Here, since it is a processing section in the Y/C separation section 6B, the processing section 233 executes a process of separating a video signal inputted from the image quality detecting section 6A in the previous stage into a luminance signal and a chrominance signal.

In step S79, the judging section 231 judges whether or not processing has been finished, and waits until processing is finished. Then, when processing is finished, in step S80, the judging section 231 judges whether or not itself is the last apparatus. Since itself is not the last apparatus, in step S81, the output section 234 executes a process of outputting a synchronous type control signal together with a processed signal. That is, the luminance signal and the chrominance signal separated by the processing section 233 are outputted to the I/P conversion section 6C in the subsequent stage, together with a synchronous type control signal of substantially the same content as the broadcast type control signal received in step S71.

If itself is the last apparatus, no cascade-connected signal processing board controlled by the broadcast control section 212 exists in the subsequent stage. In the example shown in FIG. 66, the image quality adjusting section 6E is the last apparatus. Accordingly, in this case, in step S82, since the output section 234 does not need to output a synchronous type control signal, only a processed signal is outputted to the subsequent stage.

If it is judged in step S75 that the time from the reception of a broadcast type control signal to the reception of a synchronous type control signal has exceeded the time limit, or if it is judged in step S76 that the two control signals do not match, in step S77, the output section 234 outputs an error signal to the abnormality judging section 213. The abnormality judging section 213 judges which one of the signal processing boards has failed, on the basis of this error signal (this process will be described later with reference to the flowchart in FIG. 72).

After the process of step S77, S81, or S82, in step S83, the judging section 231 judges whether or not termination has been instructed. If termination has not been instructed by the user yet, the processing returns to step S71, and the subsequent processing is repeatedly executed. If it is judged in step S83 that termination has been instructed by the user, the processing is terminated.

It should be noted that this instruction for termination is also performed on the basis of a broadcast type control signal.

In this way, the image quality detecting section 6A detects the image quality of an inputted SD signal, and after performing detection of the field intensity, noise, and a 2-3 pull-down signal, outputs the detection results and the input signal to the Y/C separation section 6B. The Y/C separation section 6B separates a luminance signal and a chrominance signal from the inputted video signal. The separated luminance signal and chrominance signal are inputted to the I/P conversion section 6C. The I/P conversion section 6C converts the inputted luminance signal and chrominance signal in an interlaced mode into a luminance signal and a chrominance signal in a progressive mode. The resolution conversion section 6D converts the luminance signal and the chrominance signal converted into a progressive mode, which are inputted from the I/P conversion section 6C, from SD signals into HD signals by increasing their pixel density.

The image quality adjusting section 6E adjusts the levels of the luminance signal and chrominance signal that are HD signals supplied from the resolution conversion section 6D, to levels optimum for a display apparatus, and then outputs them to an unillustrated display apparatus as output signals.

Figure 71:
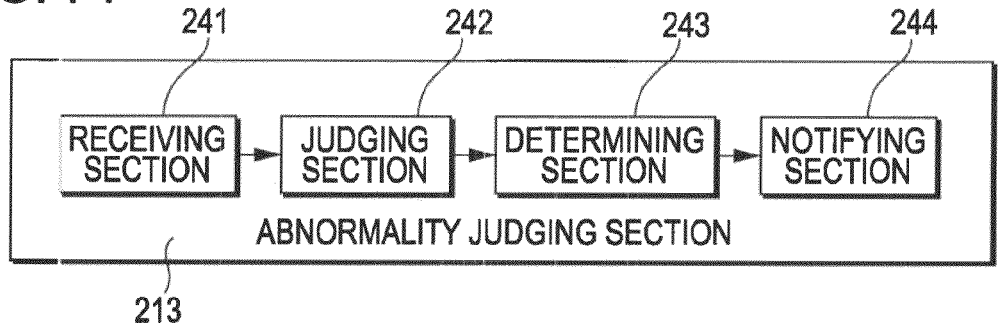
FIG. 71 is a block diagram showing a functional configuration example of an abnormality judging section.

Next, an abnormality judging process by the abnormality judging section 213 will be described. FIG. 71 is a block diagram showing a functional configuration example of the abnormality judging section 213. The abnormality judging section 213 has a receiving section 241, a judging section 242, a determining section 243, and a notifying section 244.

The receiving section 241 receives the error signal outputted from each of the signal processing boards 6(A to E) in step S77 in FIG. 70. The judging section 242 judges which one of the signal processing boards 6(A to E) has failed, on the basis of the error signal received by the receiving section 241. The determining section 243 determines a failed apparatus among the signal processing boards 6(A to E), on the basis of the judgment result by the judging section 242. The notifying section 244 notifies the main control section 211 of the failure of the apparatus determined by the determining section 243.

Figure 72:
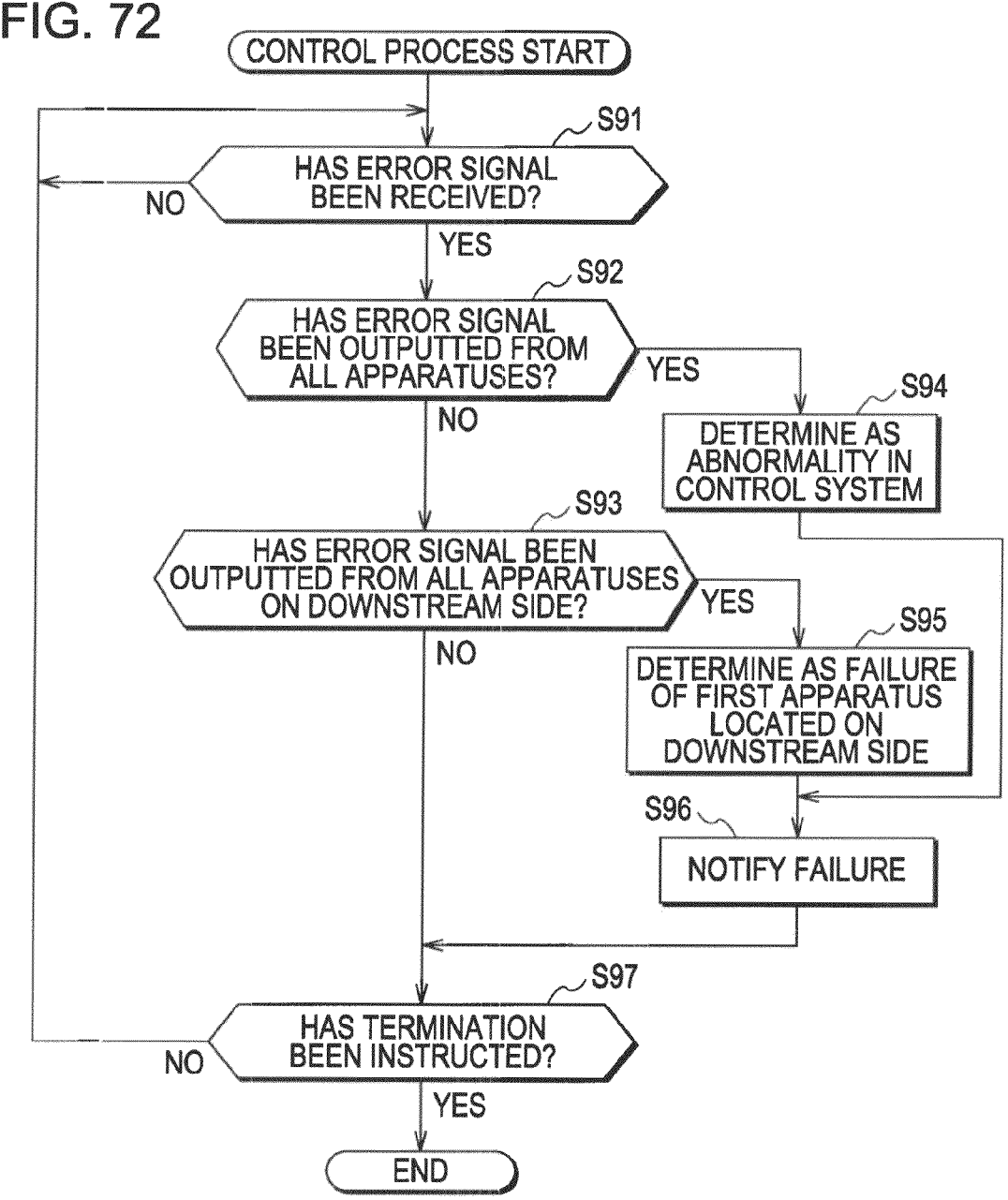
FIG. 72 is a flowchart showing an example of an abnormality judging process.

FIG. 72 is a flowchart showing an example of an abnormality judging process. Next, the abnormality judging process by the abnormality judging section 213 will be described.

In step S91, when an error signal is outputted from any one of the signal processing boards 6(A to E), that is, the image quality detecting section 6A, the Y/C separation section 6B, the I/P conversion section 6C, the resolution conversion section 6D, and the image quality adjusting section 6E, the receiving section 241 receives this, and the judging section 242 judges whether or not an error signal has been received, on the basis of the output of the receiving section 241. If an error signal has been received, in step S92 or step S93, the judging section 242 judges whether an error signal has been outputted from all apparatuses (step S92), or whether an error signal has been outputted from all apparatuses on the downstream side (step S93).

If it is judged in step S92 that an error signal has been outputted from all apparatuses, in step S94, the determining section 243 determines that the control system is abnormal. That is, in this case, since an error signal has been outputted from all of the image quality detecting section 6A, the Y/C separation section 6B, the I/P conversion section 6C, the resolution conversion section 6D, and the image quality adjusting section 6E, there is a possibility that the broadcast type control signal outputted from the broadcast type control section 212 may itself not have been effectively received by each section. Accordingly, in this case, it is judged that the entire control system is abnormal.

If it is judged in step S93 that an error signal has been outputted from all apparatuses on the downstream side, in step S95, the determining section 243 determines that the first apparatus located on the downstream side has failed. For example, if the image quality detecting section 6A has not outputted an error, but an error signal has been outputted from each of the four boards including the Y/C separation section 6B, the I/P conversion section 6C, the resolution conversion section 6D, and the image quality adjusting section 6E on the downstream side of the image quality detecting section 6A, it is judged that there is an abnormality in the Y/C separation section 6B that is the first of the four boards located on the downstream side, and that because a signal is not outputted from there to the subsequent stage, the I/P conversion section 6C, the resolution conversion section 6D, and the image quality adjusting section 6E on the downstream side thereof also output an error signal.

Likewise, if the image quality detecting section 6A and the Y/C separation section 6B have not outputted an error signal, and the I/P conversion section 6C, the resolution conversion section 6D, and the image quality adjusting section 6E on the downstream side thereof have outputted an error signal, it is judged that there is an abnormality in the I/P conversion section 6C that is the first of the three apparatuses located on the downstream side. Also, if the image quality detecting section 6A, the Y/C separation section 6B, and the I/P conversion section 6C have not outputted an error signal, and the resolution conversion section 6D and the image quality adjusting section 6E have outputted an error signal, it is judged that the resolution conversion section 6D that is the first of the two apparatuses located on the downstream side has failed. Further, if neither of the image quality detecting section 6A, the Y/C separation section 6B, the I/P conversion section 6C, and the resolution conversion section 6D has outputted an error signal, and only the image quality adjusting section 6E located on the most downstream side has outputted an error signal, it is judged that the image quality adjusting section 6E has failed.

If the failed apparatus is determined in step S94 or step S95, in step S96, the notifying section 244 executes a process of notifying the failure. Specifically, if the failure is determined to be an abnormality in the control system, a notification to that effect is given to the main control section 211 from the notifying section 244. Likewise, if it is determined that the first apparatus located on the downstream side has failed, the main control section 211 is notified of information for identifying the apparatus, specifically, for example, the fact that the Y/C separation section 6B has failed, if it is judged that the Y/B separation section 6B has failed.

If it is judged in both step S92 and step S93 that an error signal has not been outputted, as well as after a process of notifying a failure is performed in step S96, the processing proceeds to step S97. In step S97, the judging section 242 judges whether or not termination has been instructed. If termination has not been instructed, the processing returns to step S91, and the subsequent processing is repeatedly executed. If it is judged in step S97 that termination has been instructed, the processing is terminated.

The series of processes described above can be either executed by hardware or executed by software. If the series of processes is to be executed by software, a program constituting the software is installed into a computer embedded in dedicated hardware, or into, for example, a general purpose computer that can execute various functions when installed with various programs, from a network or a recording medium.

Control Example of Multipath Countermeasure in Signal Processing Apparatus according to each Embodiment Not only in the case of the signal processing apparatus according to each of the embodiments which transmits a signal by light as described above, but in cases where wireless communication is performed within a space by using a wave, reception of the same wave transmitted via a plurality of paths by a receiving section is referred to as multipath.

When a signal arrives at a receiving section from a sending section via a plurality of paths, the signal arrives at the receiving section with a waveform distortion that varies with each path, due to the influence of the wavelength, the reflectance, refractive index, and absorption index of a material, and the surface shape, roughness, and refraction of a material.

As the causes of waveform distortion due to multipath, there are a path/delay factor due to a delay that occurs because the path length between the sending section and the receiving section varies due to reflection, refraction, or diffraction of a wave, and a level factor due to level attenuation that occurs because a wave passing along different path lengths is reflected, refracted, or diffracted different number of times, or because of a difference in the absorption characteristics of a material.

In multipath, a wave is transmitted via a plurality of transmission paths with different path lengths, that is, a plurality of transmission paths that differ in the time required for transmission. Therefore, the signal value of a predetermined symbol of a signal received by the receiving section is subject to the effect (interference) of a plurality of symbols that are transmitted before the predetermined symbol and transmitted with delay via transmission paths that require longer times for transmission.

When the signal value of a predetermined symbol is subject to the effect of a plurality of symbols transmitted with delay/level attenuation, a distortion (multipath fading) occurs in the waveform represented by the signal value of the predetermined symbol, which makes it impossible for the receiving section to accurately judge the symbol value of a signal and, for example, accurately demodulate the signal.

In the related art, common multipath countermeasures based on signal processing in wireless communication include a method of using OFDM (Orthogonal Frequency Division Multiplexing) as a modulation mode, a method of using Spread Spectrum and Rake reception, and the like.

However, when OFDM is adopted as a modulation mode, there is a fear that a large load is placed on devices that execute such processes as FFT (Fast Fourier Transform) and A/D (Digital/Analog) conversion used in modulation and demodulation, so the amount of heat generation by those devices becomes large. Also, when Spread Spectrum is used, signal processing at a higher speed than that of transmission signals becomes necessary, making it difficult to realize high speed communication.

On the other hand, in the case of optical communication, when using a multimode optical fiber as the transmission path, a method is used in which the refractive index at the center of the core is increased to reduce a delay time difference between modes. However, modal dispersion cannot be completely compensated for with this method.

Also, although a method of using an optical heterodyne detector that extracts information from combined light of signal light and local oscillator light is also conceivable, interference between different paths becomes a problem.

Accordingly, a description will be given of a control whereby the characteristics of waveform distortion resulting from multipath are found to allow accurate demodulation of a signal, in the signal processing apparatus shown in FIG. 28 and the like described above. It should be noted that in the signal processing apparatus shown in FIG. 28 and the like, multipath variation factors include positional relation between the light output section (LD) and the light input section (photodetector), incidence/emission angle, wavelength, difference in refractive index between the first light guide section and the second light guide section that constitute the optical waveguide, the relation between the diameters of the first light guide section and second light guide section, surface roughness of the irregular reflector, and the like.

Figure 73:
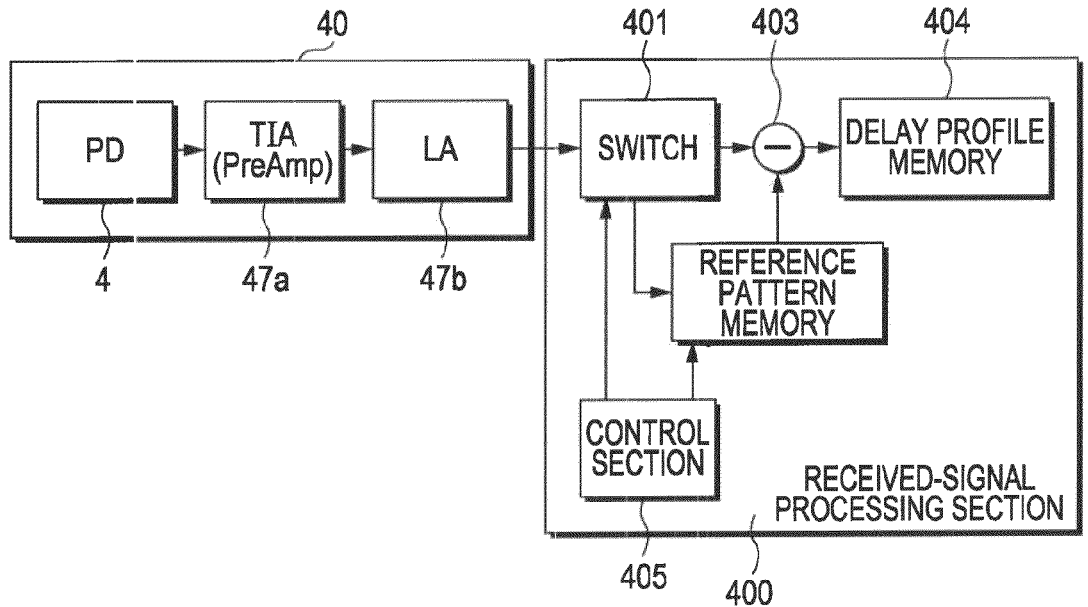
FIG. 73 is a block diagram showing a functional configuration example of a signal processing section.

FIG. 73 is a block diagram showing a functional configuration example of a signal processing section mounted on each of functional boards such as the control board and the signal processing boards shown in FIG. 28.

In the present example, the signal processing apparatus 5(A to E) which processes a signal transmitted via a transmission path such as the optical waveguide 2 where stationary distortion occurs in a waveform represented by the signal value of a specific symbol in accordance with the values of symbols transmitted before the specific symbol, includes: receiving means (for example, the photodetector 4 in FIG. 73) for receiving a test signal, which is a signal including symbols that are set to predetermined values in advance, via the transmission path; acquiring means (for example, the light input section 40 in FIG. 73) for acquiring the signal value of the specific symbol from the test signal received by the receiving means; and characteristics computing means (for example, a reference pattern memory 402 and a subtractor 403 in FIG. 73) for finding the characteristics of distortion that occurs in the waveform represented by the signal value of the specific symbol in accordance with the values of the symbols transmitted before the specific symbol, on the basis of waveforms represented by signal values acquired from a plurality of test signals by the acquiring means.

Also, the above-described characteristics computing means may have: storage means (for example, the reference pattern memory 402 in FIG. 73) for storing a waveform represented by a signal value acquired from, among test signals, a predetermined reference test signal that serves as a reference; and subtracting means (for example, the subtractor 403 in FIG. 73) for subtracting the waveform stored in the storage means from a waveform represented by a signal value acquired from, among test signals, a test signal other than the reference test signal, and finding a waveform obtained as a result as the characteristics of the distortion.

Further, the above-described characteristics computing means may have: a classification section (for example, a classification section 454 in FIG. 82 described later) that classifies a test signal into a predetermined class on the basis of the values of its symbols; and a learning section (for example, a learning section 455 in FIG. 82) that finds the characteristics of distortion by performing learning using the least squares method for each class into which classification has been made by the classification section, by using the values of symbols of a test signal as student data serving as a student in the learning of the characteristics of distortion, and by using the signal value of the specific symbol acquired by the acquiring means as teacher data serving as a teacher in the learning of the characteristics of distortion.

Also, there may be further provided synthesizing means (for example, an adder 444 shown in FIG. 80) for estimating distortion that is caused in a waveform represented by the signal value of a specific symbol due to symbols transmitted before the specific symbol of a signal including symbols set to arbitrary values, by synthesizing the characteristics of distortion found from a plurality of test signals by the characteristics computing means.

Figure 77:
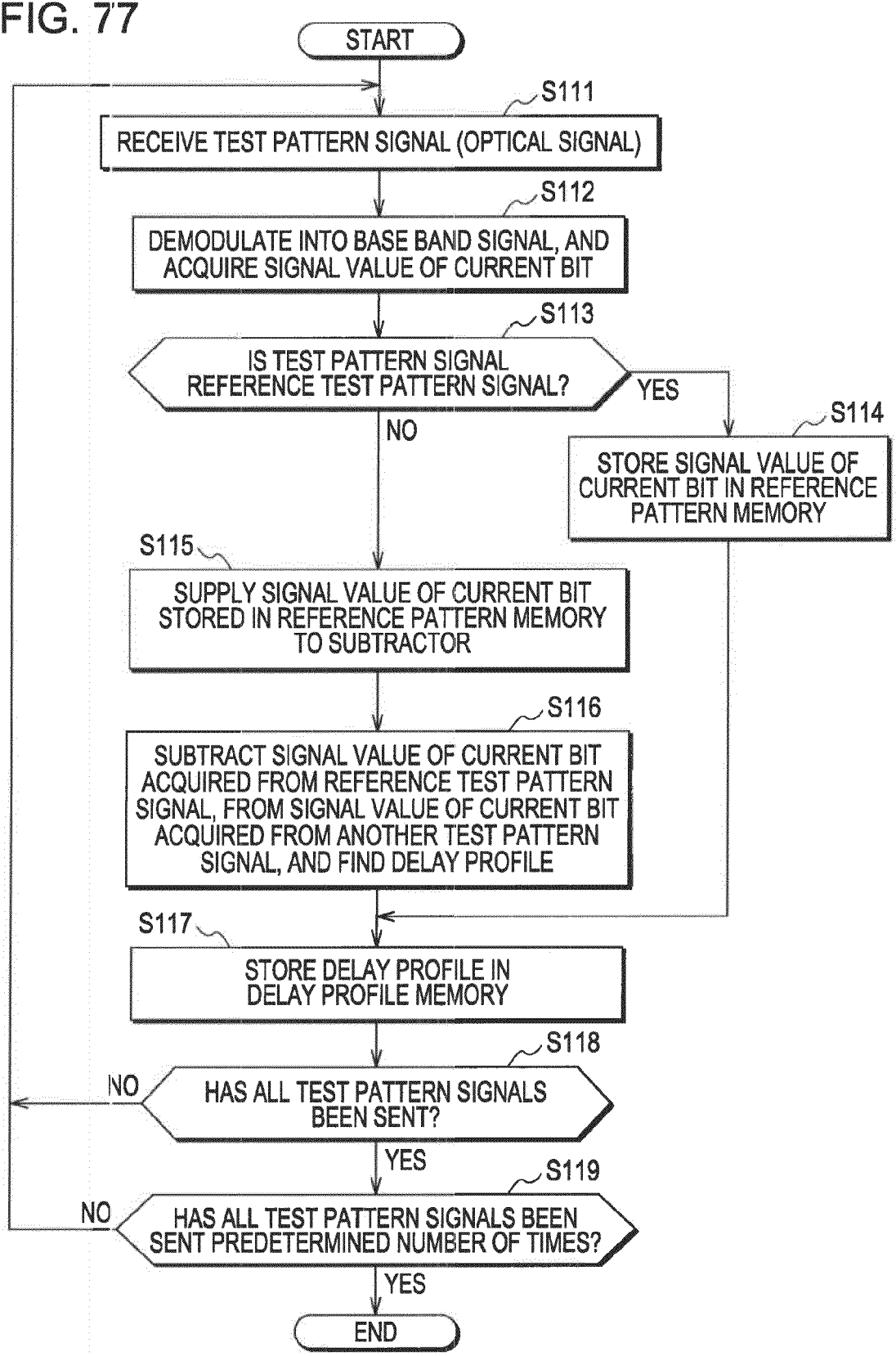
FIG. 77 is a flowchart illustrating a process in which a received-signal processing section receives a delay profile.

A signal processing method or a program executed by the signal processing apparatus according to the present example is a signal processing method for processing a signal transmitted via a transmission path where stationary distortion occurs in a waveform represented by the signal value of a specific symbol in accordance with the values of symbols transmitted before the specific symbol, or a program executed by a computer that controls a signal processing apparatus that processes a signal transmitted via a transmission path where stationary distortion occurs in a waveform represented by the signal value of a specific symbol in accordance with the values of symbols transmitted before the specific symbol, including the steps of: acquiring the signal value of the specific symbol from a test signal which is received via the transmission path and which is a signal including symbols set to predetermined values in advance (for example, step S112 shown in FIG. 77 described later); and computing the characteristics of distortion that occurs in the waveform represented by the signal value of the specific symbol in accordance with the values of the symbols transmitted before the specific symbol, on the basis of waveforms represented by signal values acquired from a plurality of test signals (for example, step S116 shown in FIG. 77).

In the manner as described above, the signal value of a specific symbol is acquired from a test signal which is received via a transmission path and which is a signal including symbols set to predetermined values in advance. Then, on the basis of waveforms represented by signal values acquired from a plurality of test signals, the characteristics of distortion that occurs in the waveform represented by the signal value of the specific symbol in accordance with the values of the symbols transmitted before the specific symbol are found, thereby making it possible to find the characteristics of distortion that occurs in the signal waveform.

Hereinbelow, details of the controls described above with reference to the drawings and functions for realizing the controls will be described.

As shown in, for example, FIG. 28, in the signal processing apparatus, a signal processed by the signal processing section 61 in an arbitrary functional board of either the control board 6X or the signal processing board 6(A to D) is outputted by light from the light output section 30, transmitted through the optical waveguide 2 as a transmission path, and inputted to the light input section 40 of an arbitrary functional board. The signal acquired by the light input section 40 is processed by the signal processing section 61 on the receiving side.

Incidentally, waveform distortion occurring due to the effect of multipath in a signal acquired from light inputted to the light input section 40 does not vary with the elapse of time.

That is, stationary distortion is occurring in the reception waveform due to the effect of multipath.

Figure 74A:
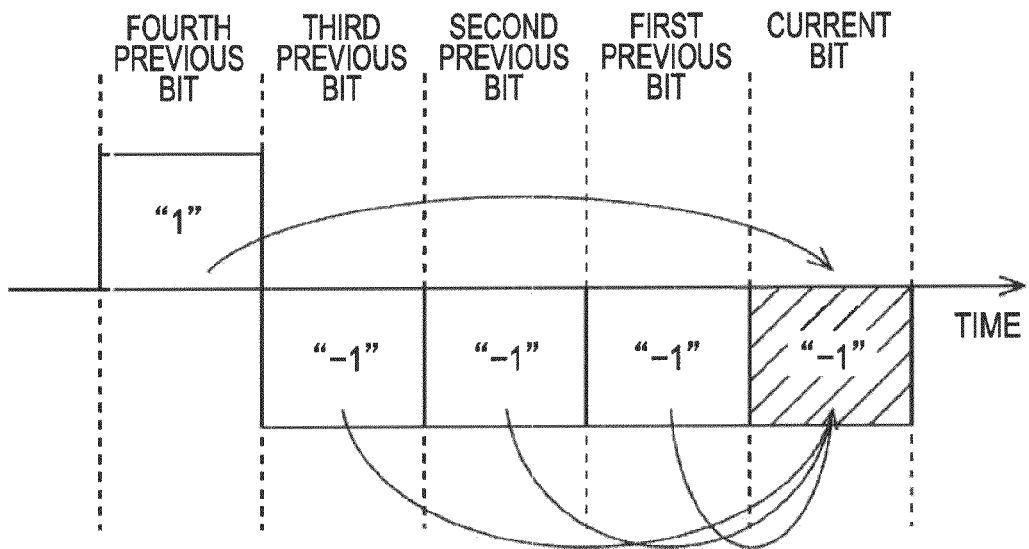
FIG. 74A is a diagram illustrating distortion that occurs in the waveform of a signal received by a signal processing section.

FIG. 74A to FIG. 74B and FIG. 75 are diagrams illustrating distortion that occurs in the waveform of a signal received by a signal processing section. Next, a description will be given of distortion that occurs in the waveform of a signal received by the signal processing section 61.

Here, a signal sent and received by wireless communication such as optical communication includes a plurality of symbols. Depending on the modulation mode, a plurality of bits can be transmitted by one symbol. In the following, a description will be given of an example in which as in, for example, BPSK (Binary Phase Shift Keying), one bit (0 or 1) is transmitted by one symbol.

FIG. 74A to FIG. 74B show, among signals received by the signal processing section 61, a signal of five bits from a bit sent four bits before a specific bit (hereinafter, referred to as "current bit" as appropriate), to the current bit. If the individual bits from the bit sent four bits before the current bit to the current bit are represented as "the fourth previous bit, the third previous bit, the second previous bit, the first previous bit, and the current bit", a 5-bit signal "1, 0, 0, 0, 0" is shown in FIG. 74A, and a 5-bit signal "1, 1, 1, 1, 0" is shown in FIG. 74B.

In FIG. 74A to FIG. 74B, arrows shown as pointing from the individual bits from the fourth previous bit to the first previous bit toward the current bit indicate that the individual bits from the fourth previous bit to the first previous bit are transmitted by different paths in the optical waveguide 2 to be superimposed on the current bit.

While the current bit is 0 in both FIG. 74A and FIG. 74B, between when the bits transmitted before the current bit are "1, 0, 0, 0" and when the bits transmitted before the current bit are "1, 1, 1, 1", since the combination (pattern) of those bits differs, the effect on the current bit, that is, distortion that occurs in the waveform of the current bit differs.

That is, FIG. 75 shows the waveform of the current bit when a 5-bit signal "1, 0, 0, 0, 0" is transmitted, and the waveform of the current bit when a 5-bit signal "1, 1, 1, 1, 0" is transmitted. The horizontal axis in FIG. 75 represents time, and the time equivalent to one bit of the current bit is shown in FIG. 75. Also, the vertical axis in FIG. 75 represents the signal value of a signal.

FIG. 75 shows a group of waveforms L1 of the current bit sampled when the 5-bit signal "1, 0, 0, 0, 0" is sent a plurality of times, and a group of waveforms L2 of the current bit sampled when the 5-bit signal "1, 1, 1, 1, 0" is sent a plurality of times.

As shown in FIG. 75, the groups of waveforms L1 and L2 differ significantly in DC offset position and waveform shape. On the other hand, it is apparent from FIG. 75 that the waveform shape does not differ greatly among the waveforms of the group of waveforms L1, and among the waveforms of the group of waveforms L2, and distortions occurring in the respective waveforms have similar characteristics.

Therefore, for example, the signal processing section 61 shown in FIG. 28 sends/receives a signal including a combination of bits that take preset values such as "1, 0, 0, 0, 0" or "1, 1, 1, 1, 0" (hereinafter, referred to as "test pattern signal" as appropriate) a plurality of times, and applies statistical processing on the waveforms of the current bit acquired as a result, thereby making it possible to acquire the characteristics of distortion (hereinafter, referred to as "delay profile" as appropriate) that occurs in the waveform represented by the signal value of the current bit in accordance with the values of a plurality of bits transmitted before the current bit.

Next, referring to FIG. 73, the functional configuration of a signal processing section on the receiving side will be described. The light input section 40 includes the photodetector (PD) 4 to which light is inputted to be converted into an electric signal, and a trans-impedance amplifier (TIA) 47a and a limiting amplifier (LA) 47b that constitute a PD drive section and amplify the electric signal.

Also, the electric signal outputted from the light input section 40 is processed by a received-signal processing section 400 constituting a clock data recovery circuit (CDR). The received-signal processing section 400 includes a switch 401, a reference pattern memory 402, a subtractor 403, a delay profile memory 404, and a control section 405.

In accordance with control of the control section 405, the switch 401 supplies the signal value of the current bit, which is the signal value of a bit supplied from the light input section 40 and which is acquired from a test pattern signal sent from another functional board, to the reference pattern memory 402 or the subtractor 403.

Here, in the following, among test pattern signals, a signal with all bits being 1 or 0 is referred to as reference test pattern signal, and test pattern signals other than the reference test pattern signal are referred to as other test pattern signals.

In accordance with control of the control section 405, the switch 401 supplies the signal value of the current bit to the reference pattern memory 402 if a test pattern signal is a reference test pattern signal, and supplies the signal value of the current bit to the subtractor 403 if a test pattern signal is another test pattern signal.

The reference pattern memory 402 stores the bit signal value supplied from the switch 401, that is, the signal value of the current bit acquired from the reference test pattern signal. Also, in accordance with control of the control section 405, the reference pattern memory 402 supplies the bit signal value stored in itself to the subtractor 403.

The subtractor 403 computes a value obtained by subtracting the bit signal value supplied from the reference pattern memory 402, from the bit signal value supplied from the switch 401, and supplies a waveform represented by the value as a delay profile to the delay profile memory 404.

That is, each signal processing section 61 sends/receives a test pattern signal to acquire a delay profile by the received-signal processing section 400. For example, other than when distortion occurs in the waveform represented by the signal value of the current bit due to the effect of delayed transmission of bits, distortion also sometimes occurs in the waveform represented by the signal value of the current bit also due to the effect of crosstalk of return light or the like. For example, distortion that occurs in the waveform represented by the signal value of the current bit acquired from a reference test pattern of which all bits are 0 is due to the effect of noise caused by crosstalk or the like. By the subtractor 403 subtracting the waveform acquired from the reference test pattern signal from a waveform acquired from another test pattern signal, the effect of this noise is eliminated, thereby acquiring a delay profile that represents the characteristics of distortion occurring in the waveform represented by the signal value of the current bit in accordance with the values of a plurality of bits transmitted before the current bit.

The delay profile memory 404 stores the delay profile supplied from the subtractor 403.

The control section 405 controls the individual sections of the received-signal processing section 400. The control section 405 stores a protocol to be followed when performing communication with the signal processing section 61 on the sending side. In the protocol, sending/reception timing of test pattern signals, whether or not all bits of the reference test pattern signal are 1 or 0, and bit value combinations of other test pattern signals, and the like are set.

For example, the control section 405 controls the switch 401 on the basis of the protocol to supply the signal value of the current bit to the reference pattern memory 402 if a test pattern signal is a reference test pattern signal, and to supply the signal value of the current bit to the subtractor 403 if a test pattern signal is another test pattern signal.

Also, if a test pattern signal is another test pattern signal, the control section 405 controls the reference pattern memory 402 so as to supply the signal value stored in the reference pattern memory 402, that is, the signal value of the current bit acquired from a reference test pattern signal, to the subtractor 403.

Figure 76:
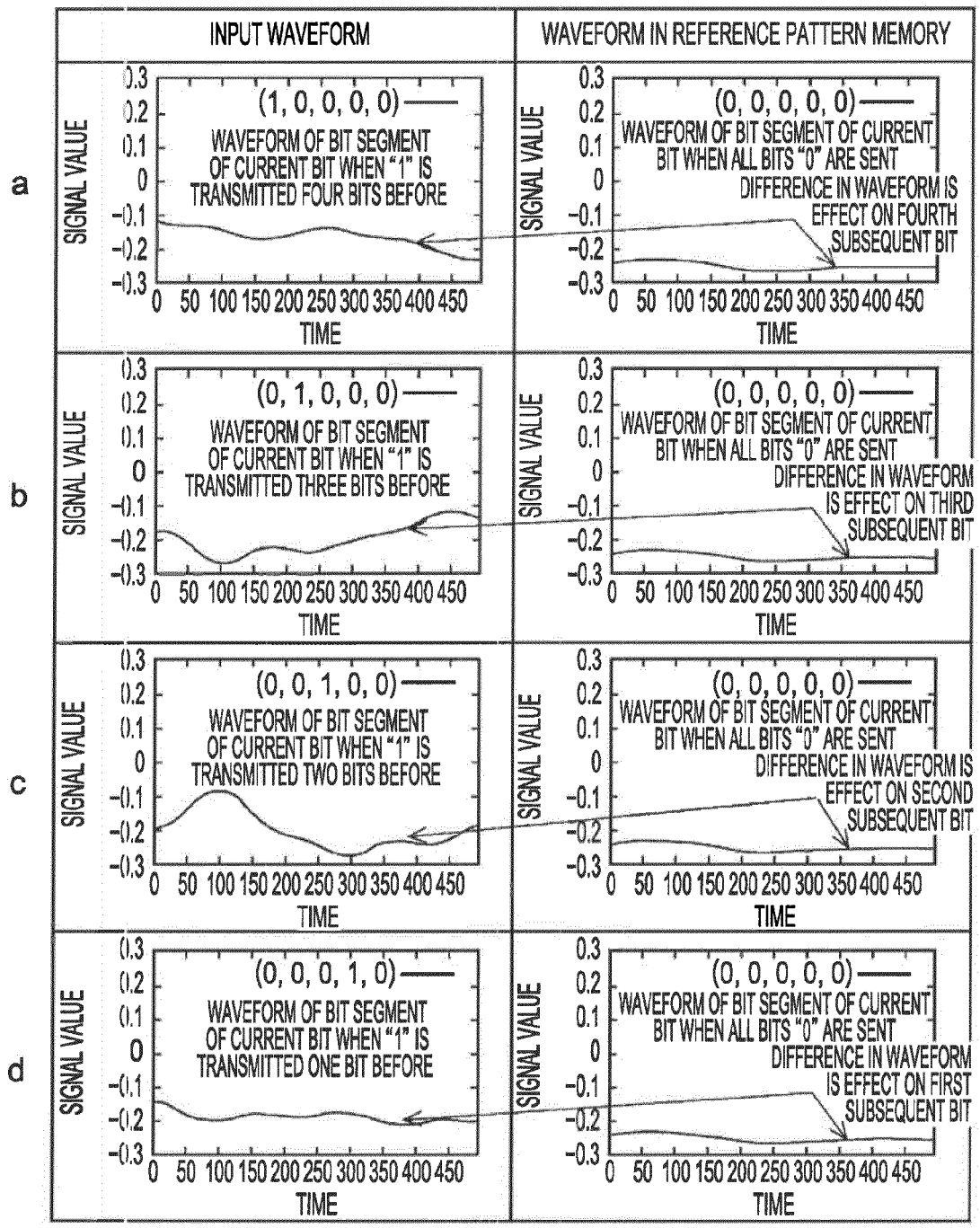
FIG. 76 is a diagram showing waveforms acquired from test pattern signals.

FIG. 76 is a diagram showing waveforms acquired from test pattern signals. FIG. 76 shows waveforms (input waveforms) represented by signal values supplied from the switch 401 to the subtractor 403, and waveforms represented by signal values stored in the reference pattern memory 402.

The waveforms illustrated in FIG. 76 are acquired when "0, 0, 0, 0, 0" is used as a reference test pattern signal, and "1, 0, 0, 0, 0", "0, 1, 0, 0, 0", "0, 0, 1, 0, 0", and "0, 0, 0, 1, 0" are used as other test pattern signals.

The left column in a of FIG. 76 shows the waveform of the current bit acquired from the test pattern signal "1, 0, 0, 0, 0". The right column shows the waveform of the current bit acquired from the reference test pattern signal "0, 0, 0, 0, 0". The difference between these waveforms is a delay profile representing the effect on the waveform of the current bit caused by delayed transmission of the bit "1" transmitted four bits before the current bit.

Also, the left column in b of FIG. 76 shows the waveform of the current bit acquired from the test pattern signal "0, 1, 0, 0, 0". The right column shows the waveform of the current bit acquired from the reference test pattern signal "0, 0, 0, 0, 0". The difference between these waveforms is a delay profile representing the effect on the waveform of the current bit caused by delayed transmission of the bit "1" transmitted three bits before the current bit.

Also, the left column in c of FIG. 76 shows the waveform of the current bit acquired from the test pattern signal "0, 0, 1, 0, 0". The right column shows the waveform of the current bit acquired from the reference test pattern signal "0, 0, 0, 0, 0". The difference between these waveforms is a delay profile representing the effect on the waveform of the current bit caused by delayed transmission of the bit "1" transmitted two bits before the current bit.

Also, the left column in d of FIG. 76 shows the waveform of the current bit acquired from the test pattern signal "0, 0, 0, 1, 0". The right column shows the waveform of the current bit acquired from the reference test pattern signal "0, 0, 0, 0, 0". The difference between these waveforms is a delay profile representing the effect on the waveform of the current bit caused by delayed transmission of the bit "1" transmitted one bit before the current bit.

FIG. 77 is a flowchart illustrating a process in which a received-signal processing section receives a delay profile. Next, referring to the drawings, a description will be given of the process in which the received-signal processing section acquires a delay profile.

When a test pattern signal is processed by the signal processing section of another functional board and sent from the light output section, in step S111, the light input section 40 receives the test pattern signal. In step S112, the signal values of bits represented by the test pattern demodulated into a base band signal are acquired, and the signal values are supplied to the switch 401.

In step S113, the control section 405 judges whether or not the test pattern signal sent from the other functional board is a reference test pattern signal, on the basis of the above-described protocol.

If the control section 405 judges in step S113 that the test pattern signal sent from the other functional board is a reference test pattern signal, the processing proceeds to step S114, and the control section 405 controls the switch 401 to supply the signal value of the current bit, among the signal values of bits supplied from the light input section 40, to the reference pattern memory 402. Thus, the reference pattern memory 402 stores the signal value of the current bit acquired from the reference test pattern signal.

On the other hand, if the control section 405 judges in step S113 that the test pattern signal sent from the other functional board is not a reference test pattern signal, the processing proceeds to step S115.

In step S115, the control section 405 causes the signal value stored into the reference pattern memory 402 in step S114, that is, the signal value of the current bit acquired from the reference test pattern signal, to be supplied to the subtractor 403, and the processing proceeds to step S116.

In step S116, the control section 405 controls the switch 401 to supply the signal value of the current bit among the signal values of bits supplied from the light input section 40, that is, the signal value of the current bit acquired from the other test pattern signal, to the subtractor 403.

The subtractor 403 computes a value obtained by subtracting the signal value of the current bit acquired from the reference test pattern supplied from the reference pattern memory 402 in step S115, from the signal value of the current bit acquired from the other test pattern supplied from the switch 401, and finds the value as a delay profile.

After the processing in step S116, the processing proceeds to step S117, and the subtractor 403 supplies the delay profile found in step S116 to the delay profile memory 404, and the delay profile memory 404 stores the delay profile. Also, after the process in step S114 as well, the processing proceeds to step S117. In this case, the signal value stored in the reference pattern memory 402 is supplied to the delay profile memory 404 as a delay profile acquired from the reference test pattern signal.

After the process in step S117, the processing proceeds to step S118, and the control section 405 judges whether or not all the test pattern signals that are set to be sent from other functional boards have been sent, on the basis of the above-described protocol.

For example, as shown in FIG. 76, if "0, 0, 0, 0, 0" is used as a reference test pattern signal, and "1, 0, 0, 0, 0", "0, 1, 0, 0, 0", "0, 0, 1, 0, 0", and "0, 0, 0, 1, 0" are used as other test pattern signals, the control section 405 judges whether or not all of these five test pattern signals have been sent.

If the control section 405 judges in step S118 that not all the test pattern signals have been sent, the processing returns to step S111, and similar processing is repeated thereafter. On the other hand, if the control section 405 judges in step S118 that all the test pattern signals have been sent, the processing proceeds to step S119.

In step S119, on the basis of the above-described protocol, the control section 405 judges whether or not all the test pattern signals that are set to be sent from other functional boards have been sent a predetermined number of times. That is, by sending all the test pattern signals a predetermined number of times, a predetermined number of waveforms are acquired from each of the test pattern signals. Then, by applying statistical processing on the predetermined number of waveforms obtained for each of the test pattern signals, the accuracy of a delay profile acquired from each of the test pattern signals can be improved.

If the control section 405 judges in step S119 that not all the test pattern signals have been sent a predetermined number of times, the processing returns to step S111, and similar processing is repeated thereafter. On the other hand, if the control section 405 judges in step S119 that all the test pattern signals have been sent a predetermined number of times, the processing is terminated.

In the manner as described above, the received-signal processing section 400 can acquire a delay profile representing the characteristics of distortion that occurs in the waveform represented by the signal value of the current bit in accordance with the values of bits of a test pattern signal.

Figure 78:
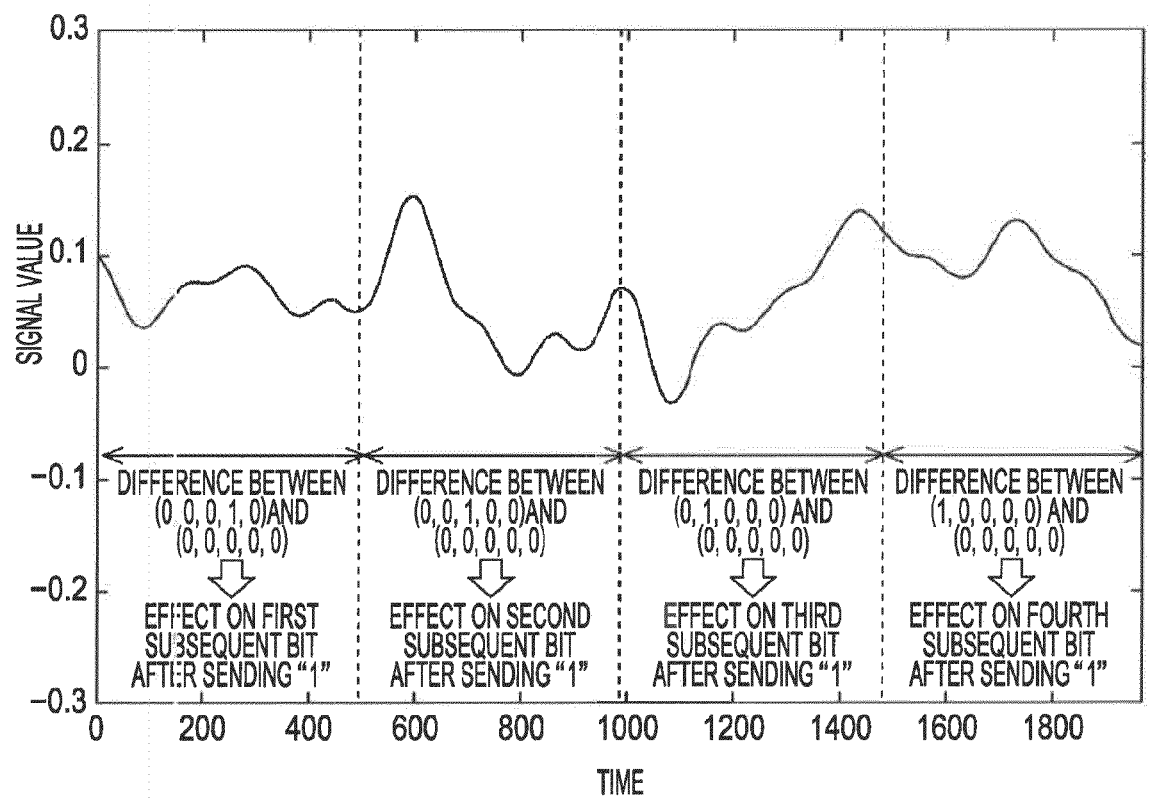
FIG. 78 is a diagram showing an example of delay profiles acquired by a received-signal processing section.

FIG. 78 is a diagram showing an example of delay profiles acquired by a received-signal processing section. FIG. 78 shows an example of delay profiles acquired by the received-signal processing section 400 when the reference test pattern signal is "0, 0, 0, 0, 0", and other test pattern signals are "1, 0, 0, 0, 0", "0, 1, 0, 0, 0", "0, 0, 1, 0, 0", and "0, 0, 0, 1, 0".

In FIG. 78, from the left to right of the horizontal axis, a delay profile acquired from the test pattern signal "0, 0, 0, 1, 0", a delay profile acquired from the test pattern signal "0, 0, 1, 0, 0", a delay profile acquired from the test pattern signal "0, 1, 0, 0, 0", and a delay profile acquired from the test pattern signal "1, 0, 0, 0, 0" are shown in order.

The delay profile obtained from the test pattern signal "0, 0, 0, 1, 0" shows the characteristics of distortion of the waveform of the current bit when the bit "1" is sent one bit before the current bit. Also, the delay profile obtained from the test pattern signal "0, 0, 1, 0, 0" shows the characteristics of distortion of the current bit when the bit "1" is sent two bits before the current bit. Likewise, the delay profile obtained from the test pattern signal "0, 1, 0, 0, 0" shows the characteristics of distortion of the current bit when the bit "1" is sent three bits before the current bit, and the delay profile obtained from the test pattern signal "1, 0, 0, 0, 0" shows the characteristics of distortion of the current bit when the bit "1" is sent four bits before the current bit.

By synthesizing a plurality of delay profiles obtained in this way, when a signal in which bits of arbitrary values are combined before the current bit is transmitted, the waveform of the current bit in which distortion has occurred can be estimated in accordance with the combination.

Figure 79:
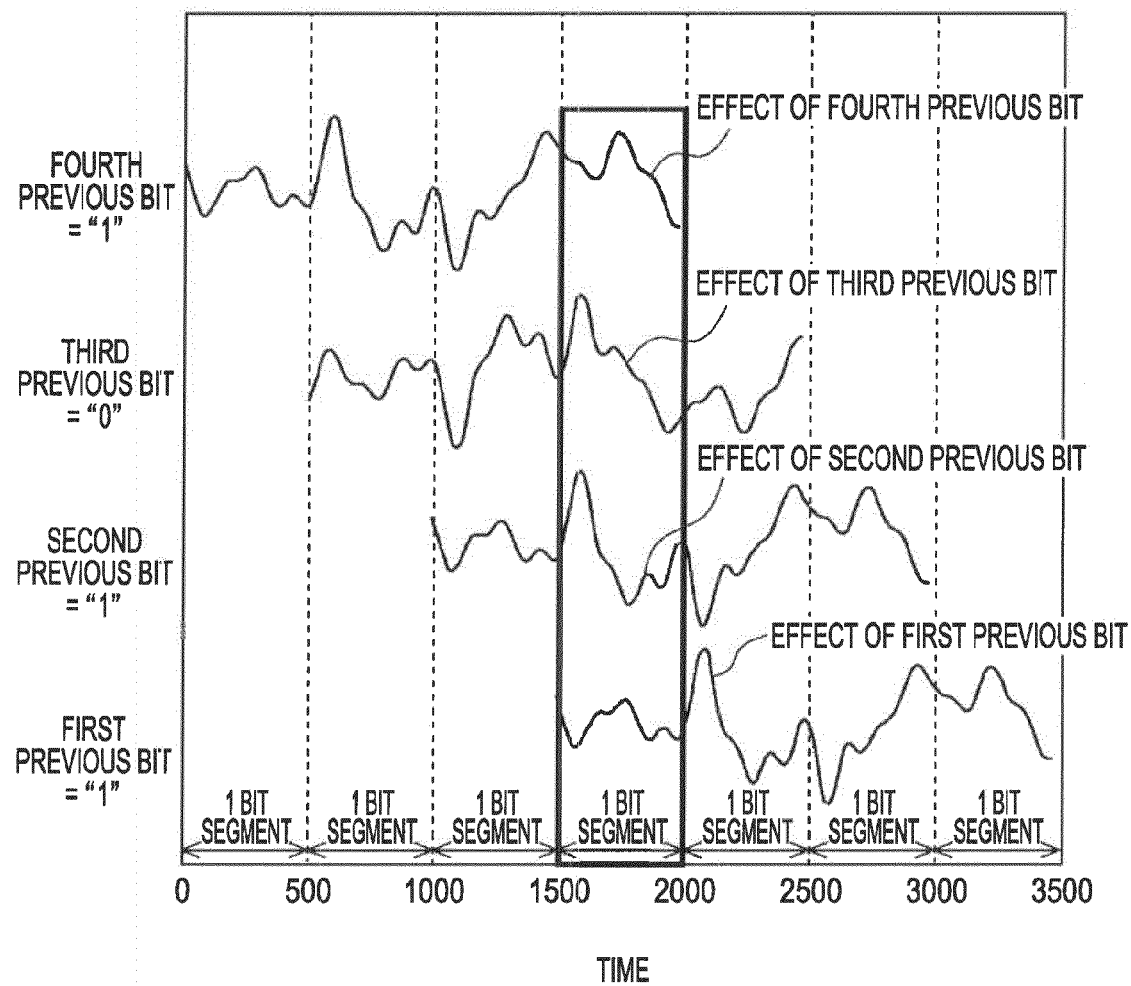
FIG. 79 is a diagram illustrating distortion of the waveform of the current bit which has occurred in accordance with the combination of bits.

FIG. 79 is a diagram illustrating distortion of the waveform of the current bit which has occurred in accordance with the combination of bits, illustrating distortion that occurs in the estimated waveform of the current bit in the case when, for example, the combination of four bits from the fourth previous bit to the first previous bit from the current bit is "1, 0, 1, 1".

In FIG. 79, the segment of the current bit (segment from 1500 to 2000 of time along the horizontal axis) is enclosed by a thick frame. In this segment enclosed by the thick frame, waveforms represented by four delay profiles are shown.

That is, shown first from the top of the segment enclosed by the thick frame is a waveform represented by a delay profile obtained from the test pattern signal "1, 0, 0, 0, 0". Shown second from the top of the segment enclosed by the thick frame is a waveform obtained by inverting a waveform represented by a delay profile obtained from the test pattern signal "0, 1, 0, 0, 0". Here, 0 is sent three bits before the current bit. In order to invert and synthesize the characteristics of distortion that occurs in the waveform of the current bit in the case when 1 is sent three bits before the current bit, the waveform represented by a delay profile obtained from the test pattern signal "0, 1, 0, 0, 0" is inverted.

Also, shown third from the top of the segment enclosed by the thick frame is a waveform represented by a delay profile obtained from the test pattern signal "0, 0, 1, 0, 0". Shown fourth (bottom) from the top of the segment enclosed by the thick frame is a waveform obtained from the test pattern signal "0, 0, 0, 1, 0".

By synthesizing these four waveforms shown in the segment enclosed by the thick frame in this way, distortion that occurs in the waveform of the current bit in the case when "1, 0, 1, 1" is sent before the current bit can be estimated.

Here, in FIG. 79, the description is directed to estimating distortion that occurs in the waveform of the current bit by synthesizing four delay profiles, in the case when four bits sent before the current bit causes distortion in the waveform of the current bit. For example, in the case when n bits sent before the current bit causes distortion in the waveform of the current bit, the waveform of the current bit can be estimated by synthesizing n delay profiles.

FIG. 80 is a block diagram showing a functional configuration example of a computing apparatus that synthesizes n delay profiles, and estimates the synthesized wave obtained as a result, as distortion that occurs in the waveform of the current bit, in the case when n bits sent before the current bit cause distortion in the waveform of the current bit.

In FIG. 80, a computing apparatus 440 includes a delay-profile supplying section 441, n delay elements $442_1$ to $442_n$, (n+1) multipliers $443_1$ to $443_{n+1}$, and an adder 444.

The delay-profile supplying section 441 reads, for example, delay profiles stored in the delay profile memory 404 shown in FIG. 73. Here, a delay profile which is stored in the delay profile memory 404 and which represents the characteristics of distortion that occurs in the waveform of the current bit due to delayed transmission of the bit "1" sent n bits before the current bit, is referred to as delay profile $C_n$ of the n-th previous bit as appropriate. The waveform of the current bit obtained when a reference test pattern signal is sent is referred to as delay profile $C_0$ of the current bit.

Then, the delay-profile supplying section 441 supplies the delay profile $C_0$ of the current bit to the multiplier $443_1$, supplies the delay profile $C_1$ of the first previous bit to the multiplier $443_2$, supplies the delay profile $C_2$ of the second previous bit to the multiplier $443_3$, and thereafter, likewise, supplies the delay profile $C_n$ of the n-th previous bit to the multiplier $443_{n+1}$.

Each of the delay elements $442_1$ to $442_n$ outputs a value inputted thereto with a delay of one bit. That is, when the value (1 or 0) of the current bit is inputted, the delay element $442_1$ supplies the value of a bit one bit before the current bit to the delay element $442_2$ and the multiplier $443_2$. When the value of the bit one bit before the current bit is supplied from the delay elements $442_1$, the delay element $442_2$ supplies the value of a bit two bits before the current bit to the delay element $442_3$ and the multiplier $443_3$. Therefore, likewise, when the value of a bit (n−1) bits before the current bit is supplied from the delay element $442_{n-1}$, the delay element $442_n$ supplies the value of a bit n bits before the current bit to the multiplier $443_{n+1}$.

The delay profiles $C_0$ to $C_n$ are supplied from the delay-profile supplying section 441 to the multipliers $443_1$ to $443_{n+1}$, respectively. Also, the value (1 or 0) of the current bit supplied to the delay element $442_1$ is supplied to the multiplier $443_1$. The bit values of n bits before the current bit are supplied from the delay elements $442_1$ to $442_n$ to the multipliers $443_2$ to $443_{n+1}$, respectively. The multipliers $443_1$ to $443_{n+1}$ perform multiplications by the values respectively supplied thereto, and supply the results to the adder 444.

The adder 444 outputs a value obtained by adding up the values supplied from the multipliers $443_1$ to $443_{n+1}$. That is, the value outputted from the adder 444 is (the delay profile $C_0$ of the current bit×the value of the current bit)+(the delay profile $C_1$ of the first previous bit×the value of a bit one bit before the current bit)+(the delay profile $C_2$ of the second previous bit×the value of a bit two bits before the current bit)+ . . . +(the delay profile $C_n$ of the n-th previous bit×the value of a bit n bits before the current bit). In this way, a waveform represented by the value outputted from the adder 444, that is, a synthesized waveform obtained by synthesizing the delay profiles, represents the waveform of distortion that is estimated to occur in the waveform of the current bit due to n bits transmitted before the current bit.

Figure 81A:
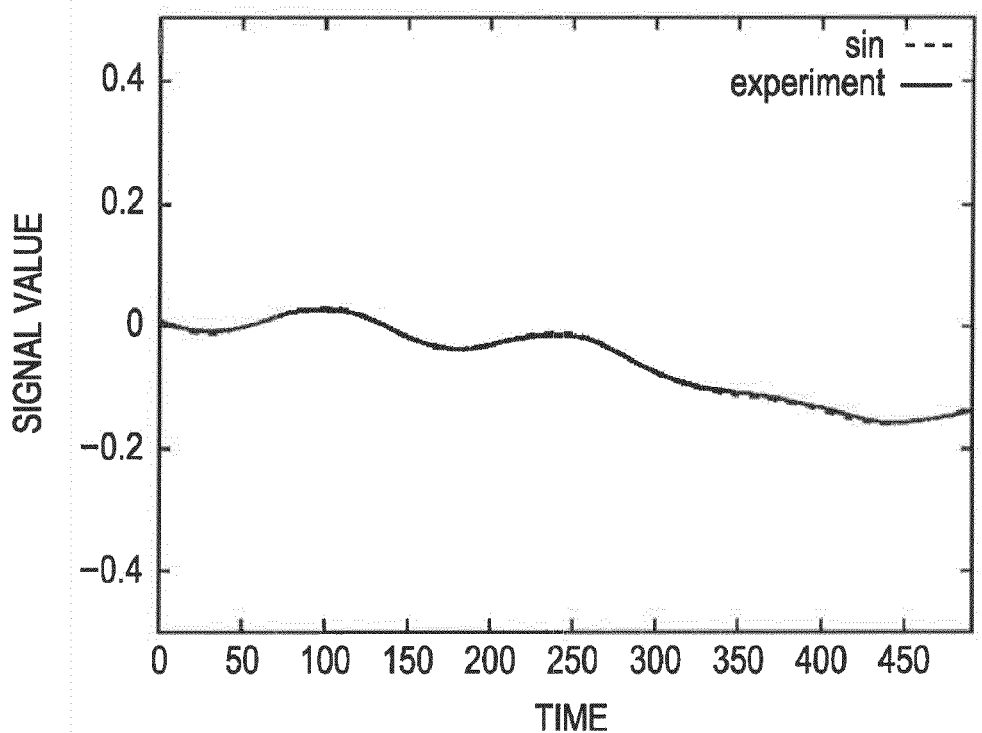
FIG. 81A is a diagram showing a synthesized waveform and an experimental waveform.

FIG. 81A to FIG. 8B are diagrams each showing a synthesized waveform that is the waveform of the current bit in which distortion estimated by the computing apparatus 440 in FIG. 80 by synthesizing the delay profiles has occurred, and the waveform (experimental waveform) of the current bit of a signal received by the received-signal processing section 400 shown in FIG. 73.

Figure 81B:
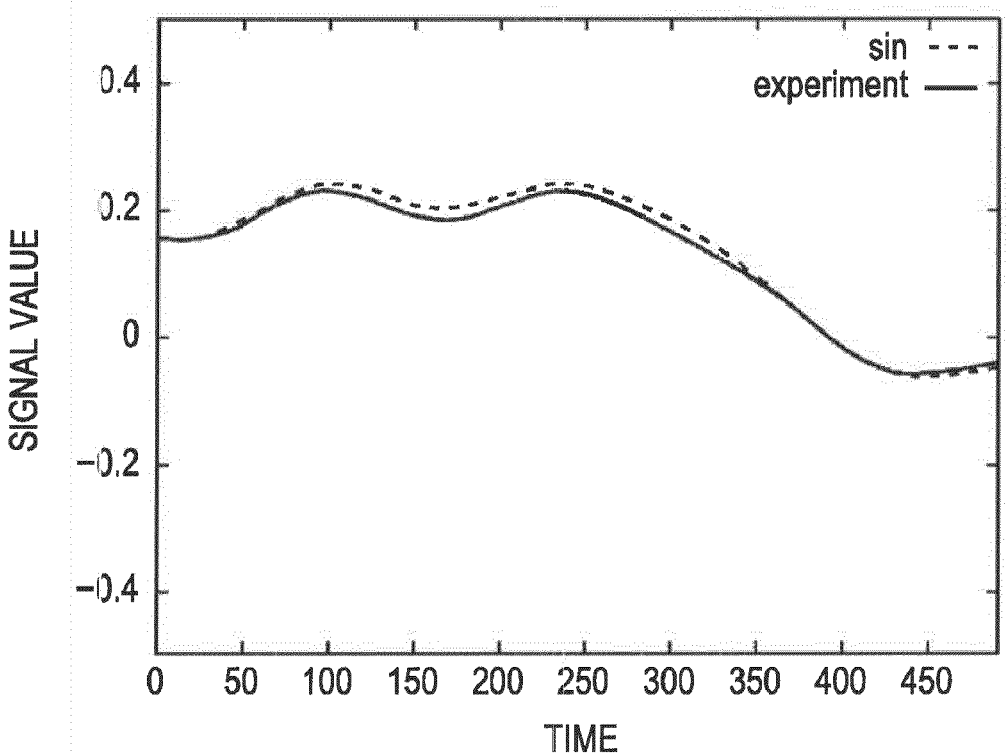
FIG. 81B is a diagram showing a synthesized waveform and an experimental waveform.

Referring to FIG. 81A to FIG. 81B, a dotted line (sim) represents the synthesized waveform, and a solid line (experiment) represents the experimental waveform. FIG. 81A shows the synthesized waveform and the experimental waveform obtained on the basis of the signal "1, 1, 1, 1, 0". FIG. 81B shows the synthesized waveform and the experimental waveform obtained on the basis of the signal "1, 0, 0, 0, 0".

As shown in FIG. 81A to FIG. 81B, the computing apparatus 440 can output a synthesized waveform that substantially matches the experimental waveform that is the waveform of the current bit of a signal received by the received-signal processing section 400.

Incidentally, while a delay profile is found by the above-described processing, a delay profile can be also found by, for example, learning using the least squares method.

Figure 82:
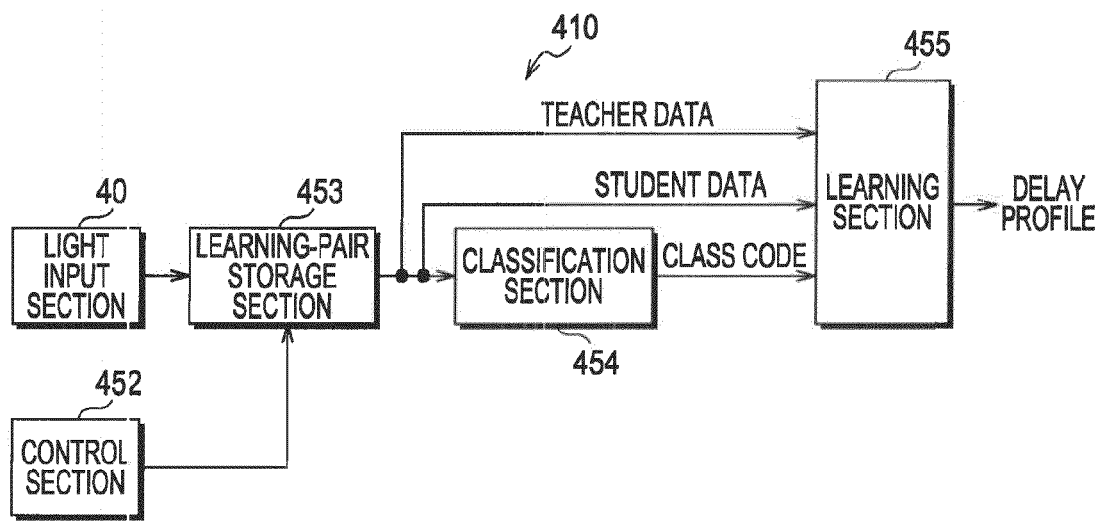
FIG. 82 is a block diagram showing a functional configuration example of a received-signal processing section for finding a delay profile by learning using the least squares method.

FIG. 82 is a block diagram showing a configuration example of a received-signal processing section for finding a delay profile by learning using the least squares method.

In FIG. 82, a received-signal processing section 410 includes the light input section 40, a control section 452, a learning-pair storage section 453, a classification section 454, and a learning section 455. The light input section 40 includes the photodetector 4, the trans-impedance amplifier 47a, the limiting amplifier (LA) 47b, and the like in FIG. 73, and sequentially supplies the signal value of the current bit acquired from a test pattern signal to the learning-pair storage section 453.

Like the control section 405 in FIG. 73, the control section 452 stores a protocol for performing communication with another functional board, and supplies the same signal as a test pattern signal sent from the other functional board, to the learning-pair storage section 453 in accordance with the protocol. That is, the control section 452 supplies the test pattern signal that is sent from the other functional board for the light input section 40 to acquire the signal value of the current bit, to the learning-pair storage section 453.

The learning-pair storage section 453 stores the signal value of the current bit supplied from the light input section 40, and the test pattern signal supplied from the control section 452 in association with each other. That is, the learning-pair storage section 453 stores the signal value of the current bit acquired by the light input section 40, and the test pattern signal that is sent from the other functional board for the light input section 40 to acquire the value of the current bit, in association with each other. Then, the learning-pair storage section 453 supplies the signal value of the current bit to the learning section 455 as teacher data, and supplies the test pattern signal associated with the signal value of the current bit to the learning section 455 as student data. Also, the learning-pair storage section 453 supplies the test pattern signal to the classification section 454.

The classification section 454 performs classification for classifying a test pattern signal into a predetermined class, on the basis of the test pattern signal supplied from the learning-pair storage section 453. Then, the classification section 454 generates a class code representing the class into which classification has been made, and supplies the class code to the learning section 455.

For example, the classification section 454 generates two class codes on the basis of the value (1 or 0) of the current bit of a test pattern signal. Also, for example, when a test pattern signal is a 5-bit signal, the classification section 454 generates 32 ($=2^5$) class codes on the basis of the values of the individual bits.

By using the teacher data and the student data supplied from the learning-pair storage section 453, the learning section 455 performs learning using the least squares method for each class into which classification has been made by the classification section 454, and finds a delay profile. Then, the learning section 455 outputs the delay profile found for each class, and a class code representing the class in association with each other.

Figure 83:
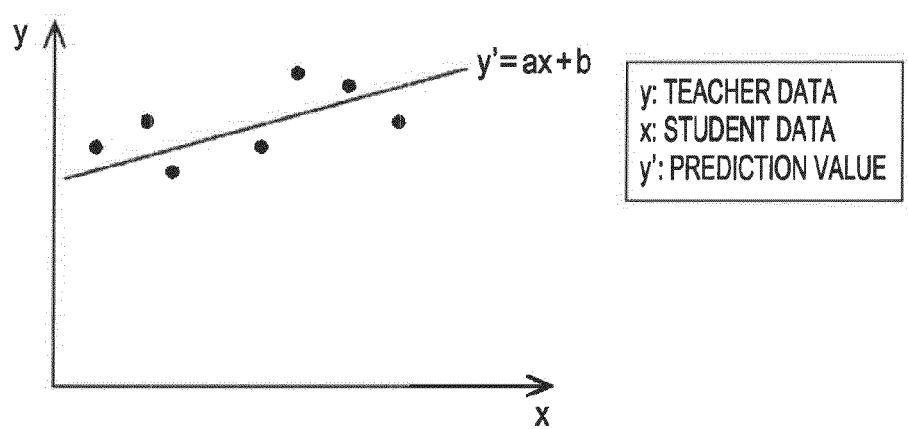
FIG. 83 is a diagram illustrating the concept of the least squares method used for learning by a learning section.
Figure 84A:
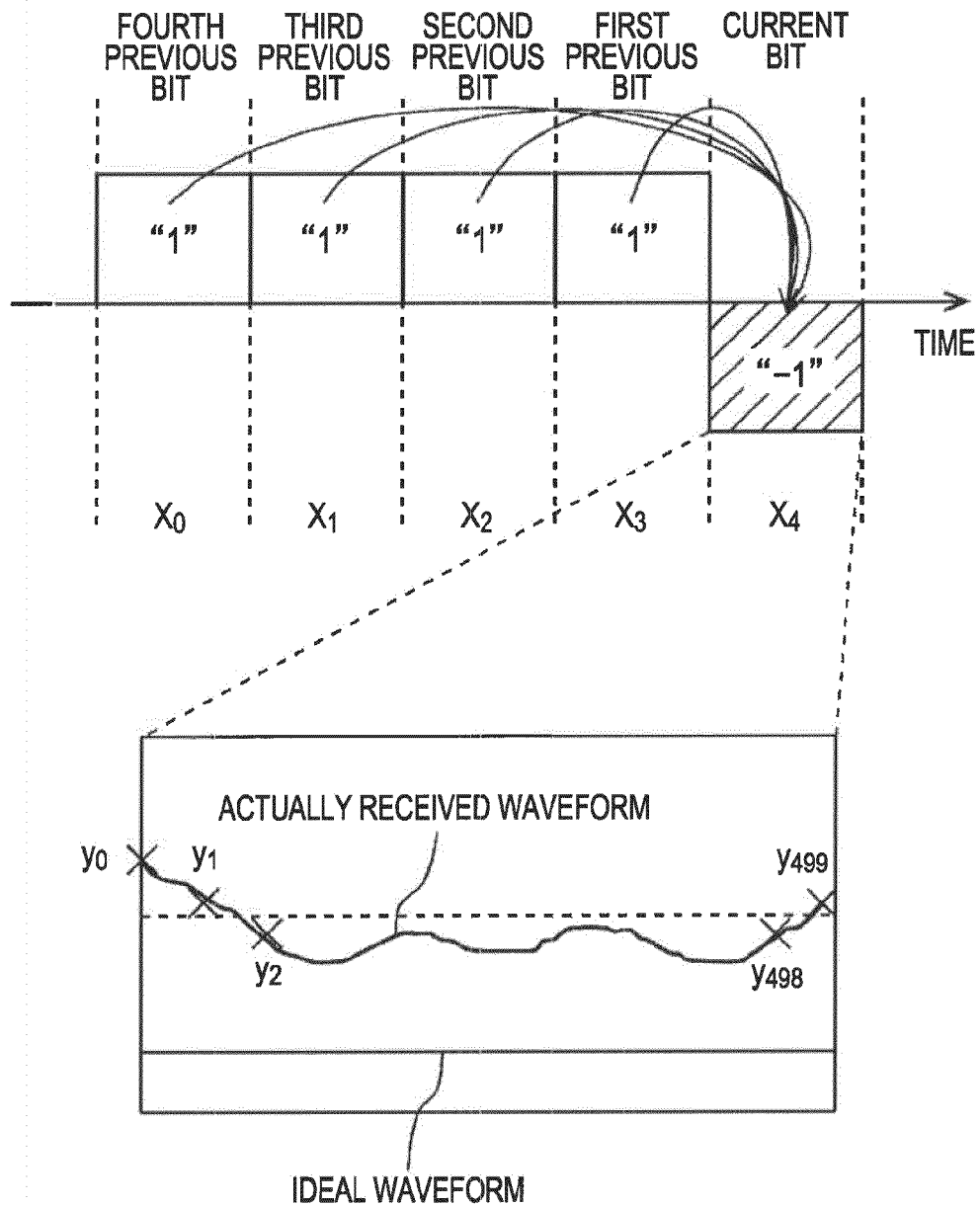
FIG. 84A is a diagram illustrating teacher data and student data used for learning by a learning section.
Figure 84B:
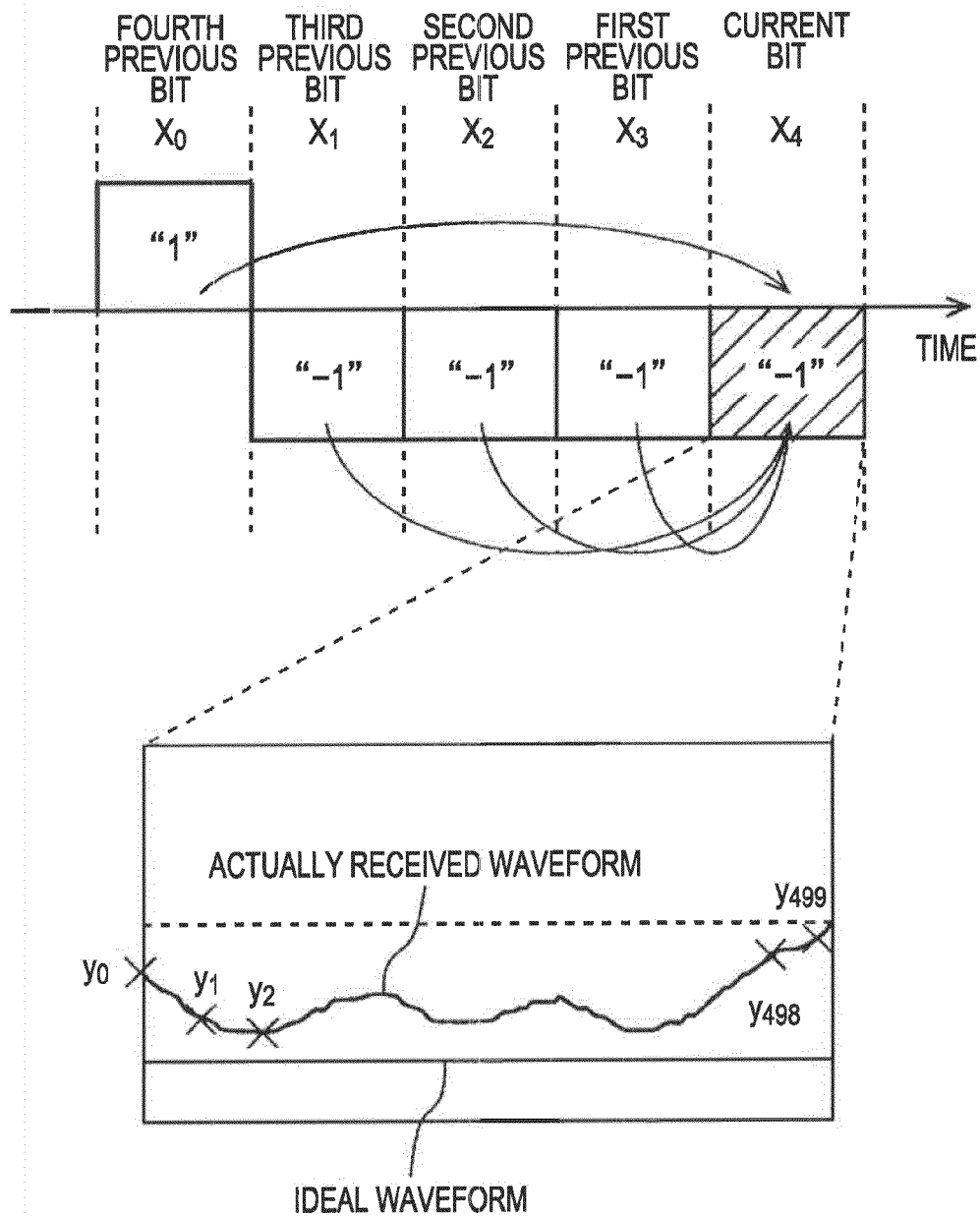
FIG. 84B is a diagram illustrating teacher data and student data used for learning by a learning section.

FIG. 83 is a diagram illustrating the concept of the least squares method used for learning by the learning section 455. FIG. 84A to FIG. 84B are diagrams illustrating teacher data and student data used for learning by the learning section 455. Next, referring to FIG. 83 and FIG. 84A to FIG. 84B, learning performed by the learning section 455 will be described.

First, referring to FIG. 83, a description will be given of the concept of the least squares method used for learning by the learning section 455. In FIG. 83, the horizontal axis represents student data, and the vertical axis represents teacher data. Also, FIG. 83 shows seven points represented by student data and teacher data that are associated with each other, and a straight line that best fits these seven points. The straight line is represented by the following linear first-degree prediction equation using a prediction value y', student data x, a coefficient a, and a coefficient b.

[Eq. 1]

$$y' = a \cdot x + b \quad (1)$$

Letting a prediction error e between the prediction value y' found from Equation (1) and the teacher data y be e=y−y', the sum of squared errors E of the prediction errors is represented by Equation (2).

[Eq. 2]

$$E = \Sigma_{samples}(y - a \cdot x - b)^2 \quad (2)$$

In Equation (2), samples represent the number of samples. In the example shown in FIG. 83, the number of samples is seven.

Here, the least squares method is a method of finding the coefficient a and the coefficient b so that the sum of squared errors E in Equation (2) becomes minimum. Specifically, computations are performed on Equation (2) so that the respective partial differentials of the coefficient a and coefficient b become zero, as shown in the following equation.

[Eq. 3]

$$\frac{\partial E}{\partial a} = 0 \quad (3)$$

[Eq. 4]

$$\frac{\partial E}{\partial b} = 0 \quad (4)$$

Since Equation (3) and Equation (4) are first-degree equations, the coefficient a and the coefficient b can be found from Equation (3) and Equation (4).

By using the least squares method as described above, the learning section 455 finds a delay profile.

Next, referring to FIG. 84A to FIG. 84B, teacher data and student data used for learning by the learning section 455 will be described.

FIG. 84A illustrates the waveform of the current bit obtained from the test pattern signal "1, 0, 0, 0, 0". FIG. 84B illustrates the waveform of the current bit obtained from the test pattern signal "1, 1, 1, 1, 0". As shown in FIG. 84A to FIG. 84B, the waveform of the current bit becomes a straight line (ideal waveform) without the effect of delayed transmission of bits transmitted before the current bit. However, distortion occurs in the waveform actually received after transmission through the optical waveguide.

As student data, the values of the individual bits of a test pattern signal "$X_0, X_1, X_2, X_3, X_4$" are used. Also, as teacher data, values "$y_0, y_1, y_2 \ldots y_{499}$" obtained by sampling the current waveform, which is obtained by actually receiving the test pattern signal "$X_0, X_1, X_2, X_3, X_4$" after transmission through the optical waveguide, at 500 points, for example, are used.

Then, letting prediction coefficients for obtaining prediction values y' from the student data $X_0$ to $X_4$ be $C_{0,0}, C_{0,1} \ldots C_{1,0}, C_{1,1} \ldots C_{499,4}$, each of prediction equations for obtaining the prediction values y' is represented by Equation (5).

[Eq. 5]

$$\begin{aligned}
y'_0 &= C_{0,0} \times X_0 + C_{0,1} \times X_1 + C_{0,2} \times X_2 + C_{0,3} \times X_3 + C_{0,4} \times X_4 \\
y'_1 &= C_{1,0} \times X_0 + C_{1,1} \times X_1 + C_{1,2} \times X_2 + C_{1,3} \times X_3 + C_{1,4} \times X_4 \\
y'_2 &= C_{2,0} \times X_0 + C_{2,1} \times X_1 + C_{2,2} \times X_2 + C_{2,3} \times X_3 + C_{2,4} \times X_4 \\
&\vdots = \ldots \ldots \ldots \ldots \ldots \\
&\vdots = \ldots \ldots \ldots \ldots \ldots \\
y'_{499} &= C_{499,0} \times X_0 + C_{499,1} \times X_1 + C_{499,2} \times X_2 + C_{499,3} \times X_3 + C_{499,4} \times x_4
\end{aligned} \quad (5)$$

Here, of the subscripts of the prediction coefficients C, the subscripts (0 to 499) on the left side of the comma indicate that the prediction coefficients correspond to phase positions (500 sampling points) of the waveform of the current bit, and the subscripts (0 to 4) on the right side of the comma indicate that the prediction coefficients corresponding to the student data $X_0$ to $X_4$.

Then, a prediction error $e_n$ between the prediction value $y_n'$ at a phase position n found from Equation (5), and teacher data $y_n$ is represented by Equation (6).

[Eq. 6]

$$e_n = y_n - y_n' = y_n - \sum_{i=0}^{4} c_{n,i} x_i \quad (6)$$

The sum of squared errors $E_n$ obtained by adding up a number of prediction errors $e_n$ found by Equation (6) equal to the number of samplings of the teacher data $y_n$ with respect to the student data $X_0$ to $X_4$, is represented by Equation (7).

[Eq. 7]

$$E_n = \sum_{samples} e_n^2 \quad (7)$$

$$= \sum_{samples} \left( y_n - \sum_{i=0}^{4} c_{n,i} \cdot x_i \right)^2$$

$$= \sum_{samples} \left( y_n^2 - 2 \cdot y_n \cdot \sum_{i=0}^{4} c_{n,i} \cdot x_i + \left( \sum_{i=0}^{4} c_{n,i} \cdot x_i \right)^2 \right)$$

Here, in Equation (7), samples indicates the number of pairs of student data and teacher data supplied to the learning section 455. For example, if a test pattern signal is a 5-bit signal as shown in FIG. 84A to FIG. 84B, and the waveform of the current bit is sampled at 500 points, samples indicates 2500.

Then, the learning section 455 performs a computation so that all partial differentials in the case of the prediction coefficients $C_{n,i}$ of the sum of squared errors $E_n$ in Equation (7) are zero, that is, a computation for solving the prediction coefficients $C_{n,i}$ so that the following equation holds.

[Eq. 8]

$$\frac{\partial E_n}{\partial c_{n,i}} = 2 \sum_{samples} \frac{\partial e_n}{\partial c_{n,i}} e_n = 2 \sum_{samples} x_i \cdot en \quad (8)$$

$$= 2 \sum_{samples} \left( x_i \cdot \left( y_n - \sum_{j=0}^{4} c_{n,j} \cdot x_j \right) \right) = 0$$

Also, expanding Equation (8) yields the following equation.

[Eq. 9]

$$\Sigma_{samples} \Sigma_{j=0}^{4} x_i \cdot x_j \cdot c_{n,j} = \Sigma_{samples} y_n \cdot x_i \quad (9)$$

For Equation (9), the learning section 455 performs a computation for solving the prediction coefficients $C_{n,i}$ so that a total of about 2500 equations hold, with n=0 to 499 and i=0 to 4. Here, letting samples be s, when Equation (9) is represented as a determinant so that all of n=0 to 499 and i=0 to 4 in Equation (9) are represented, Equation (9) becomes the following equation.

[Eq. 10]

$$\begin{bmatrix} \sum_s x_0 \cdot x_0 & \sum_s x_0 \cdot x_1 & \sum_s x_0 \cdot x_2 & \sum_s x_0 \cdot x_3 & \sum_s x_0 \cdot x_4 \\ \sum_s x_1 \cdot x_0 & \sum_s x_1 \cdot x_1 & \sum_s x_1 \cdot x_2 & \sum_s x_1 \cdot x_3 & \sum_s x_1 \cdot x_4 \\ \cdots & \cdots & \cdots & \cdots & \cdots \\ \sum_s x_4 \cdot x_0 & \sum_s x_4 \cdot x_1 & \sum_s x_4 \cdot x_2 & \sum_s x_4 \cdot x_3 & \sum_s x_4 \cdot x_4 \end{bmatrix} \quad (10)$$

$$\begin{bmatrix} c_{0,0} & c_{1,0} & \cdots & c_{499,0} \\ c_{0,1} & c_{1,1} & \cdots & c_{499,1} \\ \cdots & \cdots & \cdots & \cdots \\ c_{0,4} & c_{1,4} & \cdots & c_{499,4} \end{bmatrix} =$$

$$\begin{bmatrix} \sum_s y_0 \cdot x_0 & \sum_s y_1 \cdot x_0 & \sum_s y_2 \cdot x_0 & \cdots & \sum_s y_{499} \cdot x_0 \\ \sum_s y_0 \cdot x_1 & \sum_s y_1 \cdot x_1 & \sum_s y_2 \cdot x_1 & \cdots & \sum_s y_{499} \cdot x_1 \\ \cdots & \cdots & \cdots & \cdots & \cdots \\ \sum_s y_0 \cdot x_4 & \sum_s y_1 \cdot x_4 & \sum_s y_2 \cdot x_4 & \cdots & \sum_s y_{499} \cdot x_4 \end{bmatrix}$$

When Equation (10) is represented as A·W=B, student data and teacher data supplied from the learning-pair storage section 453 to the learning section 455 are substituted into matrix A and matrix B. Thus, matrix A and matrix B are known, and matrix W represented by the prediction coefficients $C_{n,i}$ is unknown.

The learning section 455 can obtain the prediction coefficients $C_{n,i}$, that is, a delay profile, by substituting (adding) the student data and the teacher data supplied from the learning-pair storage section 453 into Equation (10), and finding matrix W by using a general matrix solution, such as the sweep out method.

It should be noted that Equation (10) is an equation for one given class into which classification has been made by the classification section 454. If, for example, classification has been made into m classes, the learning section 455 needs to prepare m determinants for the individual classes.

Also, the received-signal processing section 410 can effectively find the prediction coefficients $C_{n,i}$ by performing computations by using a number of samples of learning pairs which meets the number of prediction coefficients $C_{n,i}$ and is sufficient. However, even when the number of samples of learning pairs is small, the prediction coefficients $C_{n,i}$ can be found by using some constraint condition in finding matrix W.

Figure 85:
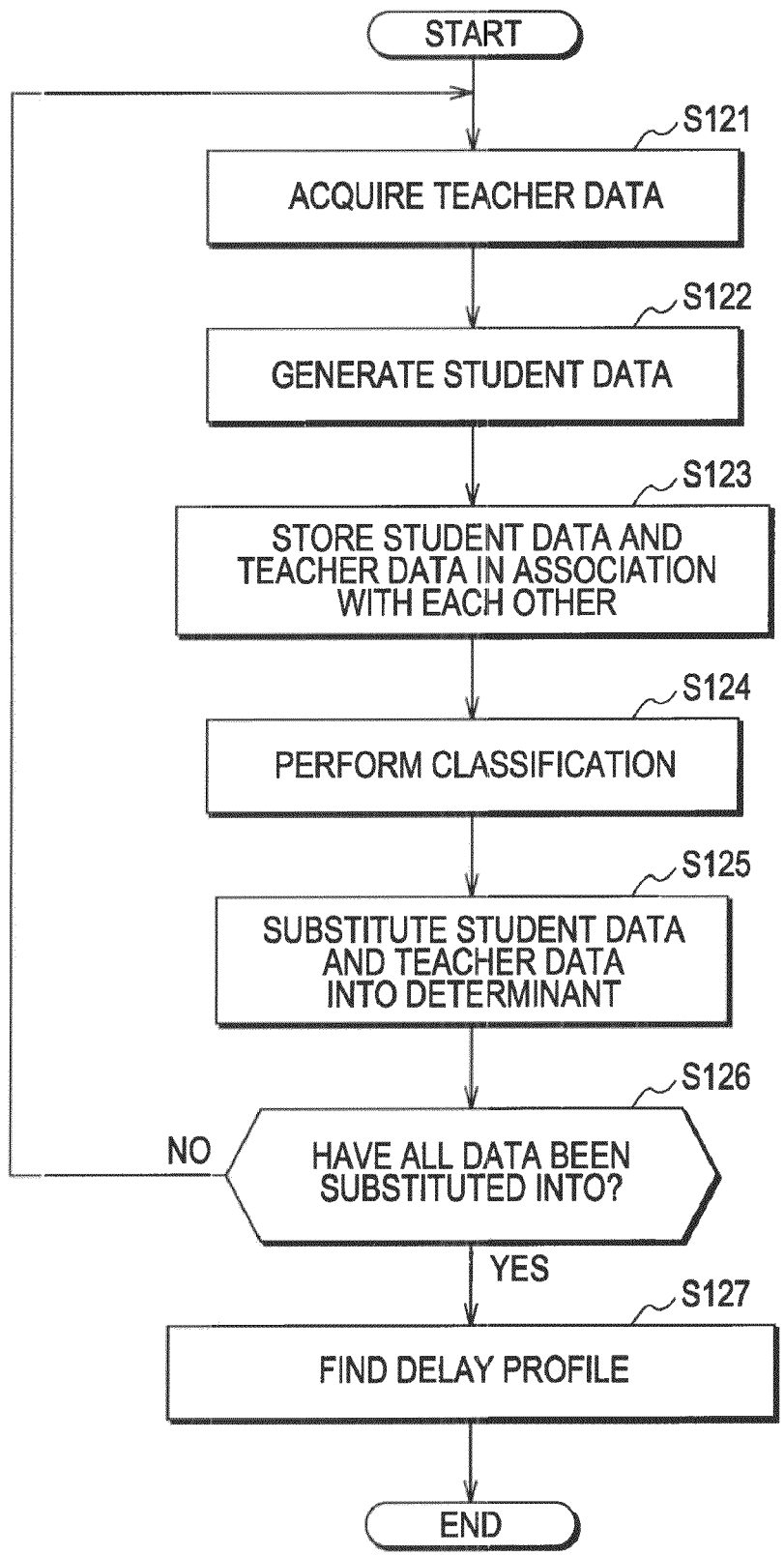
FIG. 85 is a flowchart illustrating a process in which a received-signal processing section finds a delay profile by learning using the least squares method.

FIG. 85 is a flowchart illustrating a process in which the received-signal processing section 410 finds a delay profile by learning using the least squares method. Next, a description will be given of a process in which the received-signal processing section 410 in FIG. 82 finds a delay profile by learning using the least squares method.

When a test pattern signal is sent from another functional board, and the light input section 40 receives the test pattern signal, in step S121, the light input section 40 acquires the signal value of the current bit, that is, teacher data, from the received test pattern signal, and supplies the teacher data to the learning-pair storage section 453.

After the process in step S121, the processing proceeds to step S122. The control section 452 generates the same signal as the test pattern signal sent from the other functional board for the light input section 40 to acquire the signal value of the current bit, that is, student data, and supplies the student data to the learning-pair storage section 453. The processing proceeds to step S123.

In step S123, the learning-pair storage section 453 stores the teacher data supplied from the light input section 40 in step S121 and the student data supplied from the control section 452 in step S122 in association with each other.

After the process in step S123, the processing proceeds to step S124, and the learning-pair storage section 453 supplies the test pattern signal serving as the student data to the classification section 454. On the basis of the test pattern signal, the classification section 454 performs classification for classifying the test pattern signal into a predetermined class, and supplies a class code representing the class into which classification has been made, to the learning section 455. The processing proceeds to step S125.

In step S125, the learning-pair storage section 453 supplies the teacher data and the student data associated with each other to the learning section 455, and the learning section 455 substitutes the student data and the teacher data into Equation (10).

After the process in step S125, the processing proceeds to step S126, and the learning section 455 judges whether or not all of student data and teacher data used for leaning have been supplied.

If the learning section 455 judges in step S126 that all of student data and teacher data used for leaning have been supplied, that is, all values have been substituted into matrices into which the student data and the teacher data should be substituted, the processing proceeds to step S127. If the learning section 455 judges that not all of student data and teacher data used for learning have been supplied, the processing returns to step S121, and thereafter, the above-described processing is repeated.

In step S127, the learning section 455 uses a general matrix solution, such as the sweep out method, to find the matrix represented by the prediction coefficients $C_{n,\,i}$ in Equation (10), and outputs the prediction coefficients obtained as a result, as a delay profile, and terminates the processing.

In the manner as described above, the received-signal processing section 410 can find a delay profile by learning using the least squares method. Then, by estimating distortion that occurs in the waveform of a signal transmitted through an optical waveguide on the basis of the delay profile obtained in this way, examination of a communication system can be conducted with high accuracy.

That is, for example, when designing a communication system, an examination can be conducted so as to ensure that a signal will not be sent with such a sequence of bits that causes large distortion in the signal.

Also, the signal processing section on the receiving side of signal transmission through an optical waveguide estimates distortion that occurs in the waveform of a signal on the basis of delay profiles, and judges bit values on the basis of the waveform obtained as a result. Thus, the bit values can be accurately judged, and the quality of communication can be improved. Also, the quality of communication can be improved also when the signal receiving section on the sending side estimates distortion that occurs in the waveform of a signal received by the signal processing section on the receiving side, on the basis of delay profiles, and performs such a pre-emphasis process that suppresses occurrence of distortion.

Further, in wireless communication according to the related art, for example, it is necessary to insert known data into packets in order to ensure the quality of communication. Since the quality of communication can be improved on the basis of delay profiles, it is not necessary to insert known data. Thus, packet overhead can be reduced, and high-speed communication can be performed.

Also, when communication is performed by a plurality of functional boards, the signal processing section of each of the functional boards acquires a delay profile for each of other functional boards. For example, in the case of the signal processing apparatus 5D in FIG. 28, the signal processing section of each of the control board 6X and the signal processing boards 6(A to D) has its unique coefficient, and stores coefficients of the signal processing sections of the other functional boards, and delay profiles used when receiving signals from the functional boards, in association with each other. Then, each of the functional boards performs communication by using a delay profile associated with the coefficient of a functional board that has sent a signal, thereby enabling high quality communication.

It should be noted that, alternatively, a synchronizing signal may be sent/received simultaneously with data or a control signal so that after delay of reception at each functional board with respect to the sending timing of light is recognized by a delay adjusting circuit, the amount of delay can be automatically set.

Here, in this embodiment, a signal with all bits being 0 is used as a reference test pattern signal, and signals with one of the bits being 1 are used as other test pattern signals. Alternatively, for example, a signal with all bits being 1 may be used as a reference test pattern signal, and signals with one of the bits being 0 may be used as other test pattern signals.

Also, other than an apparatus using a modulation mode in which one bit is transmitted by one symbol, the present invention is also applicable to an apparatus using a modulation mode in which a plurality of bits are transmitted by one symbol, such as QPSK (quadrature phase shift keying), or 8 PSK (quadrature phase shift keying).

Further, the individual processes described with reference to the above-described flowcharts may not necessarily be processed in a time series in the order described in the flowcharts, but also include processes that are executed in parallel or individually (for example, parallel processes or object-based processes).

The series of processes described above can be either executed by hardware or executed by software. If the series of processes is to be executed by software, a program constituting the software is installed into a computer embedded in dedicated hardware, or into, for example, a general purpose computer that can execute various functions when installed with various programs, from a program-recording medium.

INDUSTRIAL APPLICABILITY

The present invention is applied to a many-to-many optical selector that can switch signal transmission paths.

The invention claimed is:
1. An optical waveguide comprising:
a light guide section which is disc-shaped with an outer circumferential area and configured to propagate and emit light made incident from each of a plurality of first positions located about the outer circumferential area of the disc-shaped light guide section from a plurality of second positions on the outer circumferential area of the disc-shaped light guide section; and
a light reflection section with a first reflector parallel to, and facing, a second reflector, the first reflector and the second reflector being disposed parallel to and sandwiching the disc-shaped light guide section at opposing sides, and configured to reflect the light from each of the plurality of first positions into the disc-shaped light guide section,
wherein the light reflection section includes an irregular reflection section with a rough surface area that is configured to irregularly reflect the light such that the light is emitted in a circumferential direction about the outer circumferential area of the disc-shaped light guide section.

2. The optical waveguide according to claim 1, wherein light made incident on the disc-shaped light guide section has rectilinearity that is set in a predetermined direction.

3. The optical waveguide according to claim 2, wherein the irregular reflection section is placed on an optical path of light made incident on the disc-shaped light guide section.

4. The optical waveguide according to claim 3, wherein the irregular reflection section is placed near the center of the light reflection section.

5. The optical waveguide according to claim 1, wherein the disc-shaped light guide section has an optical-path changing section that refracts or diffracts light propagated therein.

6. The optical waveguide according to claim 5, wherein:
the disc-shaped light guide section has a first light guide section formed of a light guide material having a first refractive index, and a second light guide section that is in contact with the first light guide section and formed of a light guide material having a second refractive index; and
the optical-path changing section is an interface portion between the first light guide section and the second light guide section that differ in refractive index.

7. The optical waveguide according to claim 1, wherein the irregular reflection section includes a spherical light guide material placed so as to irregularly reflect incident light.

8. The optical waveguide according to claim 1, further comprising a light output section that is placed at one or more of each of the plurality of first positions on the outer circumferential area of the disc-shaped light guide section, and reflects light toward the disc-shaped light guide section.

9. The optical waveguide according to claim 1, further comprising a light input section that is placed at one or more of each of the plurality of second positions on the outer circumferential area of the disc-shaped light guide section, and receives light emitted from the outer circumferential area of the disc-shaped light guide section.

10. The optical waveguide according to claim 1, wherein the rough surface area is located on an area on the first reflector and the second reflector.

11. The optical waveguide according to claim 1, wherein the rough surface area is configured to reflect the light such that the light is emitted in the entire circumferential direction of the disc-shaped light guide section.

* * * * *